US012694743B2

(12) United States Patent
Blythin et al.

(10) Patent No.: US 12,694,743 B2
(45) Date of Patent: Jul. 28, 2026

(54) BANKNOTE DEPOSIT-WITHDRAWAL SYSTEM AND ARCHITECTURE

(71) Applicant: Crane Payment Innovations, Inc., Malvern, PA (US)

(72) Inventors: Robert James Blythin, Ardmore, PA (US); Gareth Tumblety, Bolton (GB); Matthew Selnick, Ambler, PA (US); Olivier Cabrit, Saint Julien en Genevois (FR); Karen Anita Marvin, Pottstown, PA (US); Evan John Cost, Audubon, PA (US)

(73) Assignee: Crane Payment Innovations, Inc., Malvern, PA (US)

( * ) Notice: Subject to any disclaimer, the term of this patent is extended or adjusted under 35 U.S.C. 154(b) by 1048 days.

(21) Appl. No.: 17/639,561

(22) PCT Filed: Sep. 8, 2020

(86) PCT No.: PCT/US2020/049737
§ 371 (c)(1),
(2) Date: Mar. 1, 2022

(87) PCT Pub. No.: WO2021/046535
PCT Pub. Date: Mar. 11, 2021

(65) Prior Publication Data

US 2022/0335768 A1 Oct. 20, 2022

Related U.S. Application Data

(60) Provisional application No. 62/925,708, filed on Oct. 24, 2019, provisional application No. 62/925,121, (Continued)

(51) Int. Cl.
*G07D 11/14* (2019.01)
*B65H 3/06* (2006.01)
(Continued)

(52) U.S. Cl.
CPC ............... *G07D 11/14* (2019.01); *B65H 3/06* (2013.01); *B65H 5/021* (2013.01);
(Continued)

(58) Field of Classification Search
CPC .... G07D 11/14; G07D 11/16; G07D 2207/00; G07D 2211/00; G07D 11/60;
(Continued)

(56) References Cited

U.S. PATENT DOCUMENTS

| | | | |
|---|---|---|---|
| 5,152,512 | A | 10/1992 | Yoshida et al. |
| 6,068,194 | A | 5/2000 | Mazur |

(Continued)

FOREIGN PATENT DOCUMENTS

| | | | |
|---|---|---|---|
| CA | 2283328 | A1 | 9/1998 |
| CA | 2516555 | A1 | 2/2007 |

(Continued)

OTHER PUBLICATIONS

Second review opinion notice dated Sep. 25, 2024, in connection with Chinese Patent Application No. 202080061949.6, 10 pages.
(Continued)

*Primary Examiner* — Jeffrey A Shapiro

(57) ABSTRACT

A banknote deposit-withdrawal system (300) for assisting in a financial transaction includes an opening (415) to receive banknotes in an orientation where the short edge of the banknotes is the leading-edge. A transportation mechanism (303) transports received banknotes to a separation area in the short edge leading-edge orientation. A separator mechanism (22014) separates banknotes from bulk in the separation area and transports banknotes serially to a sensing unit (1402) in a long edge leading-edge orientation. The sensing unit validates the authenticity of inserted banknotes in the long edge leading-edge orientation. After authentication, if rejected, banknotes are returned to the user in short edge
(Continued)

leading-edge orientation. After authentication banknotes deemed genuine are sent to storage units (1406) in the long edge leading-edge orientation. The opening (415) is operated in a single banknote insertion mode, a bulk banknote insertion mode, a rejection of unacceptable banknote mode, and a banknote dispense mode.

6 Claims, 91 Drawing Sheets

Related U.S. Application Data filed on Oct. 23, 2019, provisional application No. 62/897,095, filed on Sep. 6, 2019.

(51) Int. Cl.
*B65H 5/02* (2006.01)
*B65H 31/30* (2006.01)
*G07D 11/165* (2019.01)
*G07D 11/18* (2019.01)

(52) U.S. Cl.
CPC ..... *B65H 31/3027* (2013.01); *B65H 31/3045* (2013.01); *G07D 11/165* (2019.01); *G07D 11/18* (2019.01); *B65H 2301/42242* (2013.01); *B65H 2301/4314* (2013.01); *B65H 2404/251* (2013.01); *B65H 2404/252* (2013.01); *B65H 2404/255* (2013.01); *B65H 2701/1912* (2013.01); *G07D 2207/00* (2013.01); *G07D 2211/00* (2013.01)

(58) Field of Classification Search
CPC ........ G07D 11/165; G07D 11/18; B65H 3/06; B65H 5/021; B65H 2404/251; B65H 2404/252; B65H 2404/255; B65H 2404/1112; B65H 2404/1113; B65H 2404/1115; B65H 29/54; B65H 29/56; B65H 31/3027; B65H 31/3045; B65H 2301/42242; B65H 2301/4314; B65H 2701/1912; G06Q 20/18; G06Q 20/1085; G07G 1/14; G07F 19/20
See application file for complete search history.

(56) References Cited

U.S. PATENT DOCUMENTS 6,439,395 B1 * 8/2002 Voellmer ............... G07D 11/40 271/225
7,422,118 B2 9/2008 Ugo et al.
7,537,213 B2 5/2009 Chang et al.
7,784,787 B2 8/2010 Ugo et al.
8,025,282 B2 9/2011 Cognome Mantovan et al.
9,045,309 B2 6/2015 Hashimoto
10,467,843 B1 * 11/2019 Moore ................... G07D 11/34
10,515,503 B2 12/2019 Hamada et al.
2002/0126886 A1 9/2002 Jones et al.
2002/0141805 A1 * 10/2002 Bobrow ................. B65H 5/228 400/188
2003/0078123 A1 * 4/2003 Kallin .................... G07D 11/10 474/138
2003/0127791 A1 * 7/2003 Cost ....................... G07D 11/13 271/180
2009/0206541 A1 * 8/2009 Nutzel ..................... B65H 7/06 271/10.01
2009/0242625 A1 10/2009 Graef et al.
2010/0025308 A1 * 2/2010 Nutzel ................... G07D 11/14 209/534
2010/0276485 A1 11/2010 Jones et al.
2011/0115145 A1 5/2011 Yanagida et al.
2012/0156976 A1 6/2012 Blake et al.
2014/0216888 A1 8/2014 Horigome
2015/0187159 A1 7/2015 Yin et al.
2015/0317858 A1 * 11/2015 Suetaka ................. G07D 13/00 194/351
2016/0060070 A1 * 3/2016 Hodatsu ................. G07D 11/10 271/265.04
2017/0094952 A1 * 4/2017 Keller .................. A01K 63/006
2017/0144855 A1 5/2017 Hodatsu
2018/0247286 A1 * 8/2018 Denny ................ G07F 19/2055
2019/0333307 A1 * 10/2019 Grant ..................... G06Q 20/18

FOREIGN PATENT DOCUMENTS

| | | | |
|---|---|---|---|
| CN | 101211480 | A | 7/2008 |
| CN | 101401131 | A | 4/2009 |
| CN | 101405773 | A | 4/2009 |
| CN | 107430797 | A | 12/2017 |
| CN | 208861356 | U | 5/2019 |
| CN | 214796045 | U | 11/2021 |
| WO | 9941695 | A1 | 8/1999 |

OTHER PUBLICATIONS

Supplementary European Search Report dated Aug. 30, 2023, in connection with European Application No. 20861827.2, 4 pages.
Communication pursuant to Article 94(3) EPC dated Sep. 11, 2023, in connection with European Application No. 20861827.2, 9 pages.
Examination report dated Mar. 28, 2023, in connection with Australian Application No. 2020343703, 5 pages.
Examination Report No. 1 dated Nov. 15, 2024, in connection with Australian Application No. 2023266292, 2 pages.
The First Office Action dated Apr. 26, 2024, in connection with Chinese Application No. 202080061949.6, 19 pages.
Notice of acceptance for patent application dated Aug. 15, 2023, in connection with Australian Application No. 2020343703, 3 pages.
The Third Office Action dated Jan. 10, 2025, in connection with Chinese Application No. 202080061949.6, 18 pages.
International Search Report and Written Opinion of the International Searching Authority dated Dec. 10, 2020, in connection with International Application No. PCT/US2020/049737, 7 pages.
Examination Report No. 2 dated Mar. 13, 2025, in connection with Australian Application No. 2023266292, 3 pages.
Fourth Office Action dated Mar. 21, 2025, in connection with Chinese Application No. 202080061949.6, 13 pages.

* cited by examiner

103

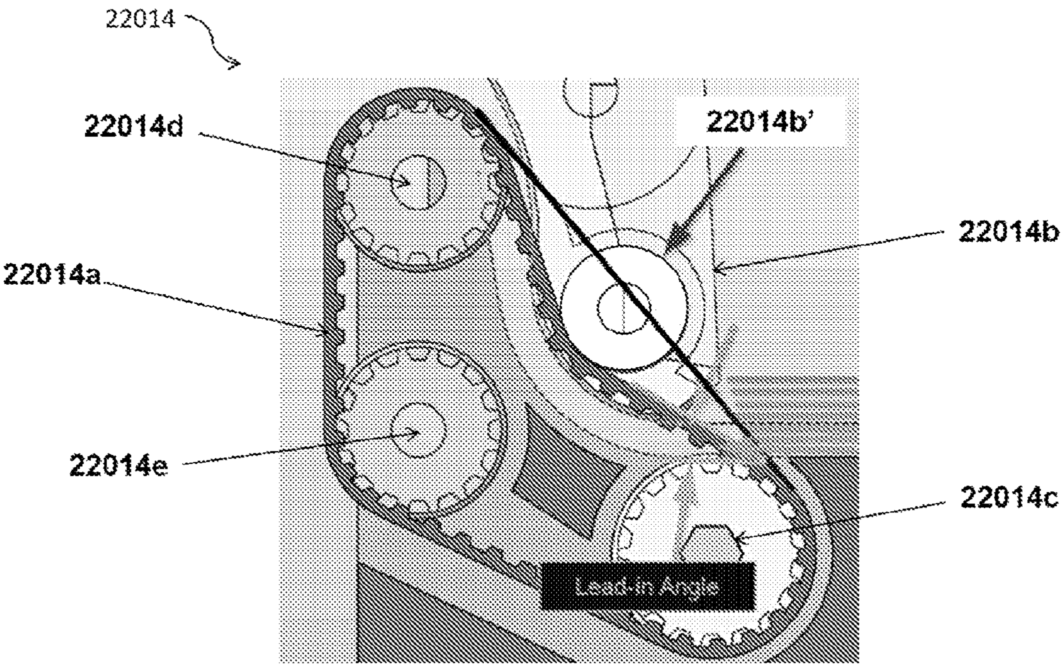
FIG. 22F
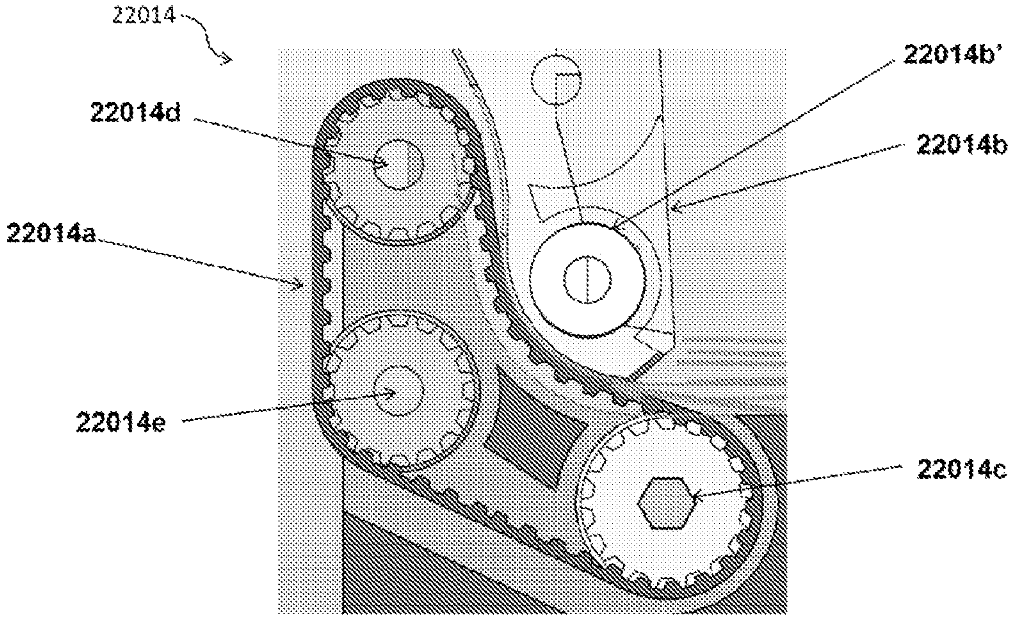
Fig. 22G
FIG. 22G

BANKNOTE DEPOSIT-WITHDRAWAL SYSTEM AND ARCHITECTURE

CROSS-REFERENCE TO RELATED APPLICATIONS

This application is a 371 National Stage of International Application No. PCT/US2020/049737, filed Sep. 8, 2020, which claims the benefit of Provisional Application No. 62/897,095, filed Sep. 6, 2019, Provisional Application No. 62/925,121, filed Oct. 23, 2019, and Provisional Application No. 62/925,708, filed Oct. 24, 2019, the disclosures of which are herein incorporated by reference in their entirety.

TECHNICAL FIELD

This disclosure relates generally to automated payment systems. More specifically, this disclosure relates to an architecture of a banknote transportation implementation within a banknote deposit-withdrawal system or other system.

BACKGROUND

Banknote deposit-withdrawal systems can be included in cashier safes, gaming machines, cashier-assisted automated cash handling systems, change providing systems, self-service terminals such as self-checkout terminals, vending machines, ticket dispensers, photocopiers, ATMs, and the like. In banknote deposit-withdrawal systems, the banknote transportation path is a critical area that can have very tight tolerances, while also being prone to many variables and locations for a banknote to jam. When a jam occurs in existing banknote deposit-withdrawal systems, there are often many doors, latches, and steps required to gain access to the location of the jammed note, and there are no points of visibility from the exterior of the unit to be able to see where the jam is located. The only way for the operator/servicer to find the jam is to get a notification or code from their external device communication system, or to search for the jam through all of the available access points. Additionally, these existing devices are not designed with the operator's processes or time in mind, which has led to devices that are not clearly marked, indicated, or intuitive when having to go through the task of resolving a jam or servicing a unit's banknote transportation path.

SUMMARY

This disclosure provides an architecture of banknote transportation implementation within a banknote deposit-withdrawal system or other system.

The present invention relates to a banknote deposit-withdrawal system that accepts banknotes from a user, verifies inserted banknotes, stores accepted banknotes, provides genuine currency back for change or cash-back and rejects non-genuine banknotes. A banknote deposit-withdraw system may include an escrow position where a banknote may be temporarily stored during a transaction. A banknote deposit-withdrawal system has an opening where a customer or user may insert single or multiple banknotes. A banknote deposit-withdrawal system further includes a banknote transportation path to convey a banknote from said opening to one or more sensor systems, and/or to a storage unit. The storage unit can be a temporary storage unit such as an escrow module or recycling module, or a permanent storage unit such as a cashbox, cashbag or any other storage area. A sensor system may scan the banknote and a computational system may determine if the inserted banknote is genuine or not. A computational system may further determine where to send an accepted banknote, i.e. to one of the escrow module, recycling module, or other storage unit. A banknote storage unit may be removable from the banknote deposit-withdrawal system or may have an opening for a service operator to remove banknotes from the banknote storage unit. In addition, a banknote deposit-withdrawal system may include one or more escrow positions to temporarily store a banknote before sending a banknote to a storage unit. A banknote deposit-withdrawal system may have a bulk feeder system that may allow insertion of a stack of banknotes for serial processing.

A banknote deposit-withdrawal system may sort banknotes and transport one or more banknotes to one or more storage locations. A banknote deposit-withdrawal system may provide change to a user at the end of a financial transaction. A deposit made by a customer may become change for a future customer. This arrangement of utilizing change, especially lower denomination banknotes, may result in a banknote deposit-withdrawal system conducting more transactions compared to a banknote acceptor that has one or more banknote storage units, as the banknote acceptor stores every accepted banknote into a permanent storage unit. This may result in a banknote deposit-withdrawal system with lower capacity banknote storage units or a banknote deposit-withdrawal system that requires less frequent banknote collections. As lower denomination banknotes are provided as change back to the users, higher denomination banknotes may be accumulated in the storage units. This may increase operational efficiency by executing more transactions per banknote collection and may increase the value of the banknote collection. An additional benefit of a banknote deposit-withdrawal system is the ability to provide cashback to the user of a non-ATM device. Cashback to the users reduces the accumulation of banknotes in a banknote storage unit. The reduced accumulation of banknotes in a deposit-withdrawal unit provides for more transactions before the banknote storage unit becomes full.

A subset of banknote deposit-withdrawal systems is an accept-dispense system. An accept-dispense system comprises a banknote acceptor and a banknote dispenser machine. An accept-dispense system has a larger envelope than a banknote deposit-withdrawal system. An accept-dispense system generally requires more frequent banknote collections and service operator interventions as the banknote acceptor is always accepting and filling up the banknote storage unit and the banknote dispenser machine is always dispensing banknotes and may run out of banknotes to dispense.

A banknote transaction system for assisting in a financial transaction may include an opening for the user to insert a banknote in a short edge leading-edge orientation. The opening may be formed by a shutter. The opening may operate in a single banknote insertion mode, bulk banknote insertion mode, rejection of unacceptable banknote mode, or banknote dispense mode. The size of the opening may change depending upon the mode of operation of the banknote transaction system. The size of the opening may be restricted to a limited size during an unacceptable banknote rejection mode or a banknote dispense mode. During a bulk banknote insertion mode, the size of the opening may be restricted to allow insertion of a specific number of banknotes. For example, for a maximum bulk banknote insertion capacity, the transaction system bulk banknote insertion mode is X (number), and the size of the maximum opening is Y (mm). If the user is required to insert only 0.2× banknotes, then the opening can be restricted to open to 0.2Y instead of opening to Y.

A banknote transaction system for assisting in a financial transaction may include a banknote accepting module. The banknote accepting module may include a banknote transport mechanism that can transport banknotes in a forward or reverse direction. The banknote accepting module may include a moveable platform. The moveable platform in a banknote accepting module in the banknote transaction system may include a banknote transport mechanism that transports banknotes in a forward or reverse direction in a short edge leading edge orientation. The moveable platform may form a top portion of the banknote transportation path during a banknote acceptance mode. During a single banknote insertion mode, a shutter and a roller may form the opening for banknote insertion. Once a banknote is inserted, a roller coupled with a shutter and a bottom roller may pull the banknote into the banknote accepting module. Intake belts on the bottom of a banknote transportation path and belts on the bottom of a moveable platform may pull the banknote further into the banknote accepting module in the short edge leading edge orientation. During bulk banknote insertion mode, the shutter is open, the moveable platform and the roller form an opening for bulk banknote insertion. When a stack of banknotes is inserted in the banknote accepting module, the moveable platform is lowered and intake belts and belts on the moveable platform move in a forward direction and the stack of banknotes is transported further into the banknote accepting module in the short edge leading edge orientation.

The moveable platform may form a bottom portion of the banknote transportation path during a banknote dispense or reject mode. During a banknote reject mode or a banknote dispense mode, banknotes for rejection or dispensing may be collected on top of the moveable platform. Once banknotes for rejection or dispensing are collected on the movable platform, the moveable platform is moved upward to pinch the collected banknotes between the moveable platform and belts facing downward from the top of the internal banknote accepting module. Once the collected banknotes are pinched between the belts facing downward from the top of the internal banknote accepting module and the top of the moveable platform, the belts move the banknotes in the short edge leading edge orientation toward the user, the shutter opens, and the collected banknotes are dispensed A set of proximal and distal feed rollers may transport banknotes pulled in to the banknote accepting module in a short edge leading edge orientation into a long edge leading edge orientation to a sensing module. In a bulk banknote insertion mode, the stack of banknotes is pulled into the banknote accepting module, the proximal and distal feed rollers feed one banknote at a time to a banknote separation mechanism in the long edge leading edge orientation. The banknote separation mechanism separates individual banknotes serially towards the banknote sensing module in the long edge leading edge orientation.

Once a banknote is examined in the banknote sensing module, a decision is made to either accept or reject the banknote. If the banknote is to be rejected, then the banknote is sent back to the banknote accepting module in long edge leading edge orientation on top of the moveable platform. Once the banknotes for rejection are collected on top of the moveable platform, the moveable platform moves upward towards belts facing downward from the top of the internal banknote accepting module to pinch the collected banknotes and either return rejected banknotes or dispense banknotes after the shutter is open.

In another embodiment, a banknote deposit-withdrawal system for performing depositing of banknotes to assist in a financial transaction includes at least one banknote recycling module in addition to a banknote accepting module, a banknote sensing unit, and a banknote transportation system. The banknote recycling module may add additional functionality such as providing change and/or prolonging the operation of the banknote deposit-withdrawal system. The banknote recycling module may add complexity in the banknote transportation system as banknotes are transported into and out of a banknote recycling module and transported in a forward and/or reverse direction to a banknote accepting unit and/or a banknote storage unit dispensing unit. The banknote transportation system in the proposed banknote deposit-withdrawal system for performing a deposit of banknotes during a financial transaction transports banknotes in forward direction between modules in a long edge leading edge orientation. In some embodiments, the transportation system moves banknotes forward between modules, avoiding moving banknotes forward and in reverse, which removes a cause of jams in the banknote transportation system. In some embodiments, the transportation system can move banknotes backwards, such as if there is a jam in the banknote transportation system, in which case the backwards movement of the banknotes can clear the jam. In some embodiments, the transportation system can move banknotes backwards to straighten the banknote if a banknote is skewed more than the transportation system can move without causing a jam.

In another embodiment, a banknote deposit-withdrawal system may include an externally accessible banknote transportation path. The banknote deposit-withdrawal system may also includes a spine module operable to support and couple with one or more other modules. The banknote deposit-withdrawal system may also include one or more banknote storage modules operable to store banknotes received from one or more other modules in the banknote deposit-withdrawal system. Each of the one or more banknote storage modules may include at least one openable panel that provides access to a banknote transportation path. Each of the one or more banknote storing modules may also include at least one indicator configured to signal an operational status of the banknote storage module.

In another embodiment, a banknote deposit-withdrawal system includes an externally accessible banknote transportation path. The banknote deposit-withdrawal system may also include a spine module operable to support and couple with one or more other modules. The banknote deposit-withdrawal system may also include one or more banknote storage modules operable to store banknotes received from one or more other modules in the banknote deposit-withdrawal system. Each of the one or more banknote storage modules may include at least one openable panel that provides access to a banknote transportation path. Each of the one or more banknote storing modules may also include at least one indicator light source configured to signal an operational status of the banknote storage module.

In another embodiment, a banknote accepting module for performing deposit of banknotes to assist in a financial transactions includes an opening for a user to insert a stack of banknotes in an orientation where the short edge of the banknotes is the leading-edge. The banknote accepting module may also include a transportation mechanism to transport banknotes from the opening to a separation area in the short edge leading-edge orientation. The banknote accepting module may include a separator mechanism in the separation area to separate banknotes one at a time from the stack of banknotes in the long-edge leading-edge orientation. The transportation mechanism may transport individual banknotes serially to a sensing unit in an orientation where the long edge of the banknote is the leading-edge. The transportation mechanism may transport separated banknotes serially to the sensing unit for validating the authenticity of inserted banknotes in the long edge leading-edge orientation. The transport mechanism may transport one or more rejected banknotes from the sensing unit to a collection area above a platform above the separation area. The collection area may also include a guide plates to guide an incoming banknote onto the platform and to prevent a curling up of the banknote. In addition, the collection area may also include one or more flexible impellers mounted on a shaft that pushes the trailing edge of the banknote out of the way of one or more incoming banknotes. Once all inserted banknotes are separated and sent to either one of the storage units or rejected in the collection area, the platform is moved up. The rejected banknotes are then transported back to the user in bulk in the short edge leading-edge orientation.

In another embodiment, a banknote deposit-withdrawal system for performing deposit of banknotes to assist in a financial transaction includes an accepting module. The accepting module includes an opening for a user to insert banknotes in bulk in an orientation where the short edge of the banknotes is the leading-edge. The accepting module may also include a transportation mechanism to transport banknotes from the opening to a separation area in the short edge leading-edge orientation. The banknote acceptor may include a separator mechanism to separate banknotes from bulk in the separation area and to transport individual banknotes serially to the sensing unit in an orientation where the long edge of the banknotes is the leading-edge. The transportation mechanism transports separated banknotes serially to the sensing unit for validating the authenticity of inserted banknotes in the long edge leading-edge orientation. Banknotes deemed genuine by the sensing unit are sent to one of the storage units by transportation in the long edge leading-edge orientation. At least one of the storage units may be a recycling module. The recycling module may accept and dispense banknotes in the long edge leading-edge orientation. The transport mechanism may transport dispensed banknotes in the long edge leading-edge orientation from the recycling module to a sensing unit and then the transport mechanism may transport dispensed banknotes from the sensing unit to the collection area above the platform above the separation area. The collection area may also include a guide plates to guide an incoming banknote on to the platform and to prevent the curling up of banknotes. In addition, the collection area may also include one or more flexible impellers mounted on a shaft that pushes the trailing edge of the banknote out of the way of one or more incoming banknotes as the banknote is disposed on the platform. Once all dispensed banknotes from one or more recycling modules are collected in the collection area, the platform is moved up. The banknotes are then transported to the user in bulk in the short edge leading-edge orientation. Banknotes rejected by the sensing unit may be sent to the collection area prior to dispensing banknotes from the one or more recycling modules. In some embodiments, the user can be provided the credit only for accepted banknotes and can be asked to insert new banknotes to complete the transaction.

In another embodiment, a banknote accepting module inside an accept-withdrawal system for performing deposit of banknotes to assist in a financial transactions includes one or more transportation rollers to transport to a user inserted banknotes in a first orientation where the short edge of the banknotes is the leading-edge. The banknote accepting module may also include a transportation mechanism to transport banknotes from the opening to a separation area in the short edge leading-edge orientation. The banknote accepting module may include a separator mechanism in the separation area to separate banknotes one at a time from the stack of banknotes in the long-edge leading-edge orientation. The transportation mechanism may transport individual banknotes serially to a sensing unit in an orientation where the long edge of the banknote is the leading-edge. Banknotes deemed acceptable by the sensing unit may be sent to a banknote storage units by a banknote transport module in the second orientation where the long edge of the banknotes is leading-edge. The banknote accepting module may include a platform comprising recesses to allow rollers to emerge from the bottom of the moveable platform to transport banknotes in the first orientation where the short edge of the banknotes is the leading-edge. The platform may include one or more recesses to allow one ore more rollers to emerge from the bottom of the moveable platform to transport banknotes in the second orientation where the long edge of the banknotes is leading-edge. The platform may be configured to move in a third orientation that is orthogonal to either the first and second directions or first and second orientations. The platform may include a raised portion on the bottom surface in the first orientation. Banknotes may be pressed between the rollers and the raised portion of the bottom surface to transport banknotes in the first orientation. The banknote accepting module may also include at least one flexible impeller mounted on a shaft that pushes the trailing edge of a banknote out of the way of one or more incoming banknotes as the banknote is disposed on the platform. The banknote accepting module may also include a guide plate to guide banknotes to be presented to the user onto the top surface of the platform. Banknotes rejected by the banknote sensing module may be sent by a transport module on to the platform guided by a guide plate to the sensing unit in an orientation where the long edge of the banknote is the leading-edge. The trailing edge of the banknote on the top surface of the platform is held in place by one or more impellers. Once all rejected banknotes are collected on the platform, the platform moves towards rollers that transport the banknotes to the user in an orientation where the short edge of the banknotes is the leading-edge.

In another embodiment, a banknote deposit-withdrawal system for performing deposit or withdrawal of banknotes to assist in a financial transaction includes an accepting module. The accepting module may include one or more transportation rollers to transport banknotes in a first orientation where the short edge of the banknotes is the leading-edge. The banknote accepting module may include a separator mechanism in a separation area to separate banknotes from a stack of banknotes and transport individual banknotes serially to a sensing unit in a second orientation where the long edge of the banknotes is the leading-edge. The banknote accepting module may include a platform comprising recesses to allow rollers to emerge from the bottom of the platform to move banknotes in the first orientation where the short edge of the banknotes is the leading-edge. The platform may include recesses to allow rollers to emerge from the bottom of the platform to move banknotes in the second orientation where the long edge of the banknotes is the leading-edge. The platform may be configured to move in a third orientation that is orthogonal to either the first and second directions or first and second orientations. The platform may include a raised portion on the bottom surface in the first orientation. The raised portion of the bottom surface permits banknotes to be pressed between the rollers and the raised portion of the bottom surface to move banknotes in the first orientation The banknote accepting module may also include one or more flexible impellers mounted on a shaft that pushes the trailing edge of the banknote out of the way of one or more incoming banknotes as the banknote is disposed on the platform. The banknote accepting module may also include a guide plate to guide banknotes to be presented to the user onto the top surface of the platform. Banknotes selected by a control unit or processor to be dispensed are sent from the banknote accepting module to the banknote sensing module and then to the platform by the transport module in the orientation where the long edge of the banknotes is leading-edge. The guide plate guides the selected banknote onto the platform in an orientation where the long edge of the banknotes is leading-edge and the trailing edge of the banknote is moved out of the way by at least an impeller. Once all banknotes selected for dispensing are collected on the platform, the platform moves towards rollers to transport the banknotes to the user in an orientation where the short edge of the banknotes is the leading-edge.

In another embodiment, banknote deposit-withdrawal system for performing deposit or withdrawal of banknotes to assist in a financial transaction includes a movable platform. The movable platform includes a top surface to collect banknotes. A bottom surface of the moveable platform may include ribs in a first orientation. The moveable platform may include one or more cavities in a first and second orientation in the moveable platform. The one or more cavities in the first orientation may allow rollers to emerge from the bottom of the moveable platform to move banknotes in the first orientation. The one or more cavities in a second orientation in the moveable platform are substantially orthogonal to the cavities of the first orientation. The cavities in the second orientation can allow rollers to emerge from the bottom of the moveable platform to move banknotes in the second orientation.

A banknote deposit-withdrawal system for performing deposit or withdrawal of banknotes to assist in a financial includes an accepting module. The accepting module may include one or more rollers to collect a banknote in the accepting module. The banknote accepting module may also include a separator mechanism to separate banknotes from a stack of banknotes. The accepting module may include a moveable platform configured to move above the one or more rollers to collect banknotes in the accepting module. The moveable platform may be further configured to move below the separator mechanism to separate banknotes from stack of banknotes. The moveable platform may further comprise one or more cavities to allow one or more rollers to emerge from the bottom of the moveable platform to move banknotes.

The banknote recycling module and the banknote accepting module each include a banknote separation mechanism. The banknote separation mechanism is fed banknotes from a stack of banknotes by feed rollers proximal and distal from the separation mechanism. The proximal and distal feed rollers include friction pads that are radially offset from each other. In some cases, the stack of banknotes may include banknotes of differing widths that can result in banknotes not being aligned. This can cause friction pads of the proximal and distant feed rollers that are not radially offset from each other to push more than one banknote to the separation mechanism at the same time, increasing the probability of a jam. The radial offset of the friction pads on the proximal and distal feed rollers prevents the pushing of multiple banknotes at the same time. A banknote in the stack comes into contact with the friction pad of the distal feed roller and is pushed towards the friction pad of the proximal feed roller, and is then pushed further to the separation mechanism.

The separation mechanism includes at least a rotating belt and at least a retarder rib at an offset to the rotating belt. As the banknote pushed by the proximal feeding roller comes into contact with the rotating belt, it is pulled towards the banknote transportation path. One face of the banknote comes in contact with the rotating belt, and another face of the banknote comes in contact with the retarding rib. If more than one banknote happens to be pulled towards the banknote transportation path, one banknote contacts the rotating belt and one contacts the retarding rib. The friction between the rotating belt and the banknote contacting the rotating belt causes the banknote in contact with the rotating belt to be pushed forward. The banknote not in contact with the rotating belt and in contact with the retarding rib has higher friction than the friction between the two banknotes, resulting in the banknote in contact with the retarding rib to be slowed down and not allowed to move forward until it can contact the rotating belt.

Other technical features may be readily apparent to one skilled in the art from the following FIGS., descriptions, and claims.

Before undertaking the DETAILED DESCRIPTION below, it may be advantageous to set forth definitions of certain words and phrases used throughout this patent document. The term “couple” and its derivatives refer to any direct or indirect communication between two or more elements, whether or not those elements are in physical contact with one another. The terms “transmit,” “receive,” and “communicate,” as well as derivatives thereof, encompass both direct and indirect communication. The terms “include” and “comprise,” as well as derivatives thereof, mean inclusion without limitation. The term “or” is inclusive, meaning and/or. The phrase “associated with,” as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term “controller” means any device, system or part thereof that controls at least one operation. Such a controller may be implemented in hardware or a combination of hardware and software and/or firmware. The functionality associated with any particular controller may be centralized or distributed, whether locally or remotely. The phrase “at least one of,” when used with a list of items, means that different combinations of one or more of the listed items may be used, and only one item in the list may be needed. For example, “at least one of: A, B, and C” includes any of the following combinations: A, B, C, A and B, A and C, B and C, and A and B and C.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which:

FIGS. 30 and 3P illustrates another example of a transaction in a banknote accepting apparatus in accordance with various embodiments of the present disclosure;

FIGS. 70 and 7P illustrate an example banknote dispenser attachable to the example banknote deposit-withdrawal system in accordance with various embodiments of the present disclosure;

FIGS. 21B, 22C, 22D, 22E, 22F, 22G, 22H, and 211 illustrate a process of separating a bottom most banknote from a bulk of banknotes in accordance with various embodiments of the present disclosure;

FIGS. 22A, 22B, 22C, 22D, 22E, 22F, and 22G illustrates various views of an example banknote separation mechanism in accordance with various embodiments of the present disclosure;

DETAILED DESCRIPTION

FIGS. 1A through 26B, discussed below, and the various embodiments used to describe the principles of the present invention in this patent document are by way of illustration only and should not be construed in any way to limit the scope of the disclosure. Those skilled in the art will understand that the principles of this disclosure may be implemented in any suitably arranged device or system.

As used throughout this specification, the terms currency denomination, denomination of currency, document, valuable document, currency bill, bill, banknote, note, bank check, paper money, paper currency, and cash may be used interchangeably herein to refer to a type of a negotiable instrument or any other writing that evidences a right to the payment of a monetary obligation, typically issued by a central banking authority. In addition, direction, orientation or axis may be used interchangeably herein to refer to the direction of linear mechanical movement of components. In this specification terms banknote storing unit, banknote storing module, banknote storing portion, tamper-evident storage, secured banknote storage may be used interchangeably herein to refer to a type of an instrument or any other device that may store currency from any systems incorporating a banknote acceptor.

The embodiments of a document transport system illustrated in FIGS. 1A-26B are for illustration only. FIGS. 1-26B do not limit the scope of this disclosure to any particular implementation of a document transport system.

Figure 1A:
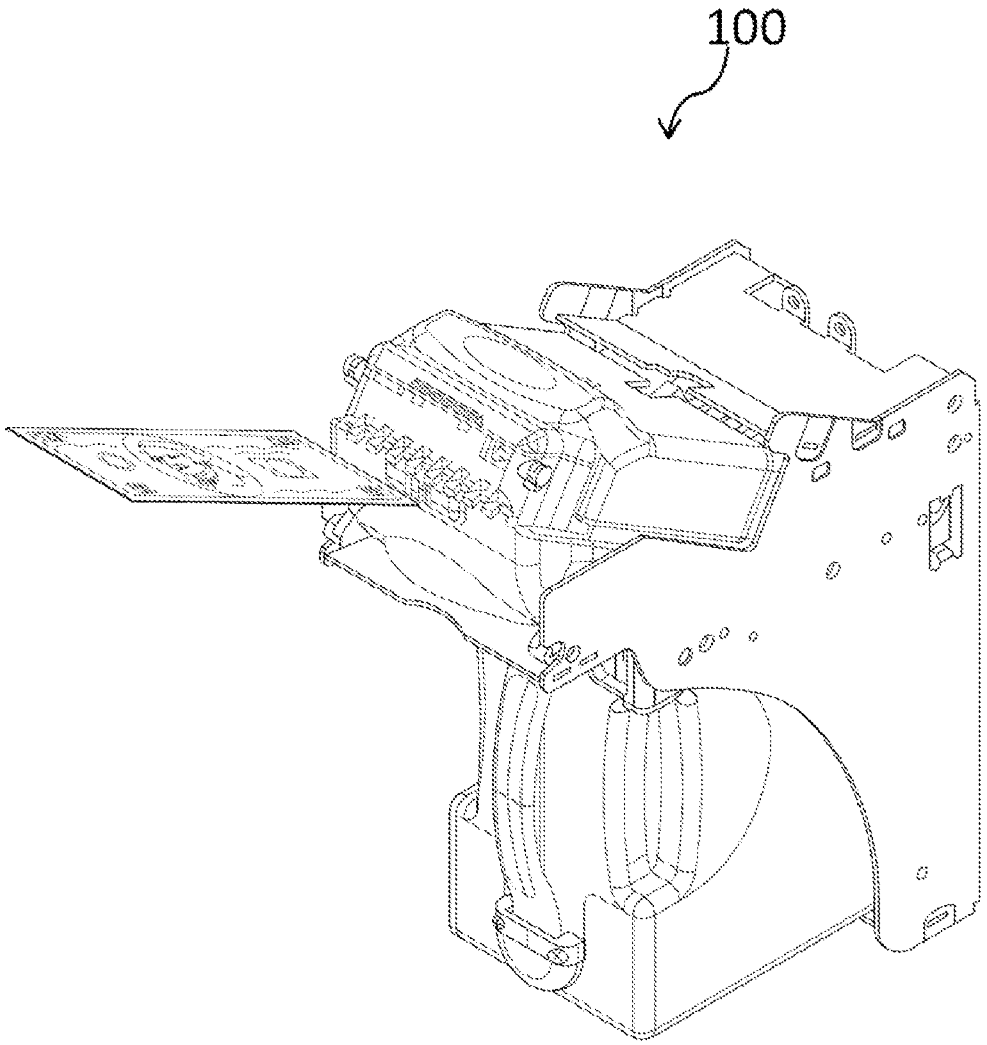
FIG. 1A illustrates an example of a banknote accepting apparatus in accordance with various embodiments of the present disclosure.
Figure 1B:
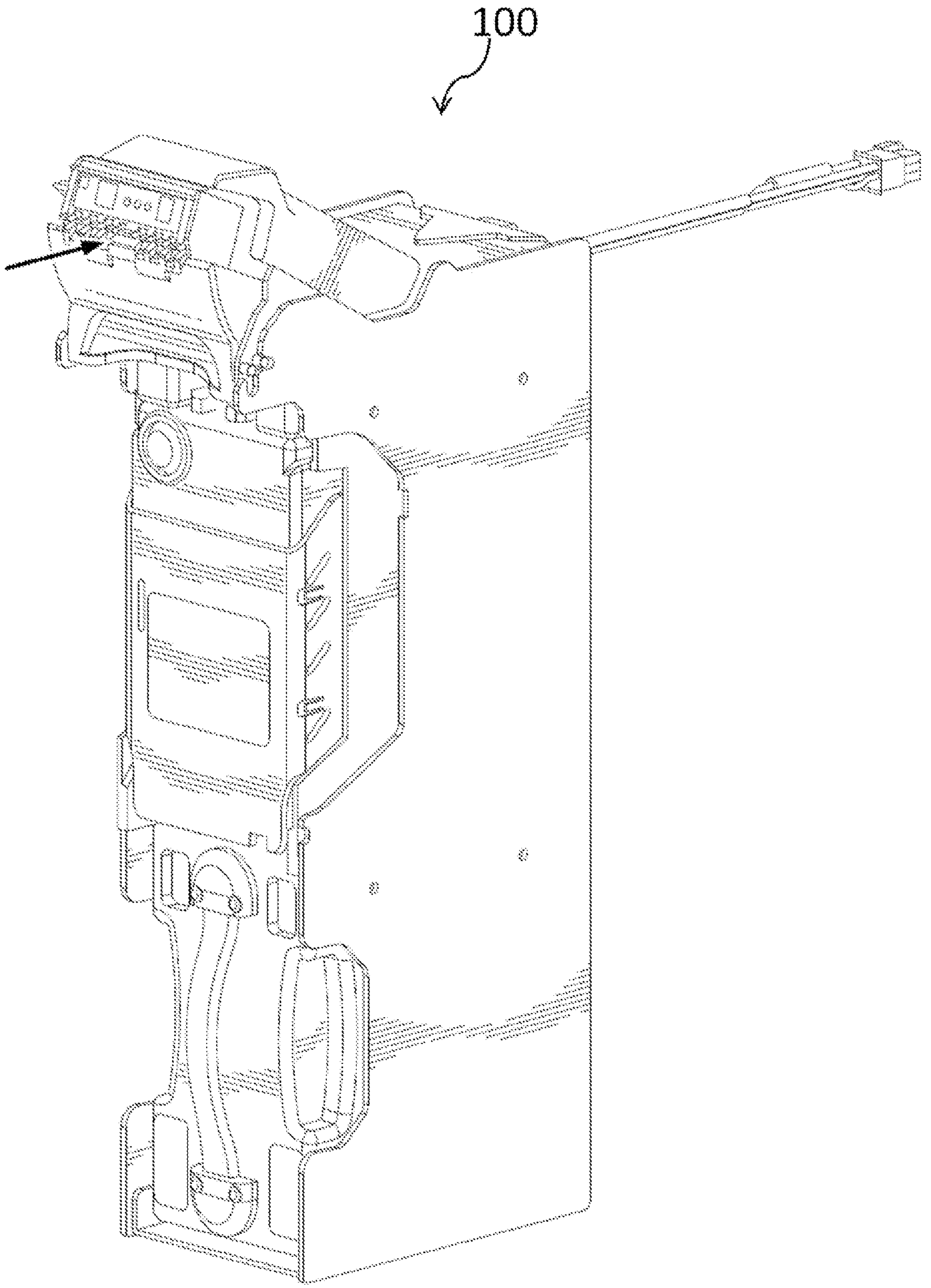
FIG. 1B illustrates an example of a banknote accepting apparatus in accordance with various embodiments of the present disclosure.
Figure 1C:
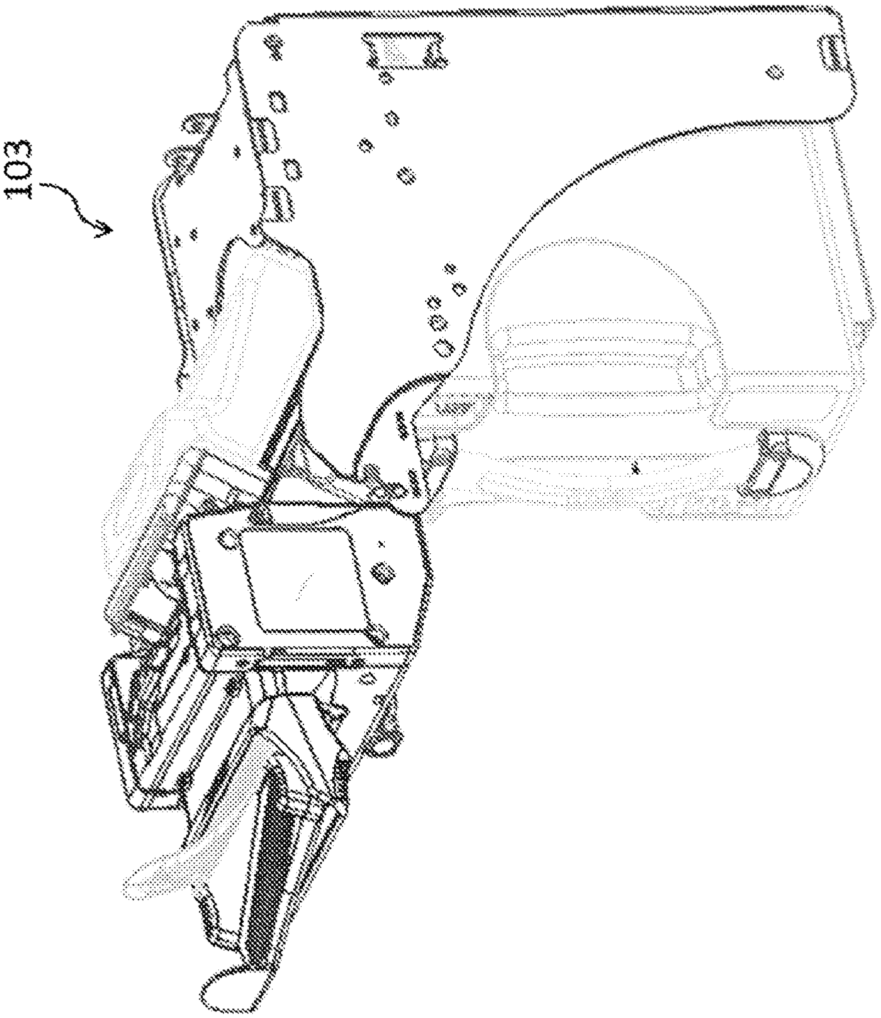
FIG. 1C illustrates an example of a banknote accepting apparatus in accordance with various embodiments of the present disclosure.
Figure 1D:
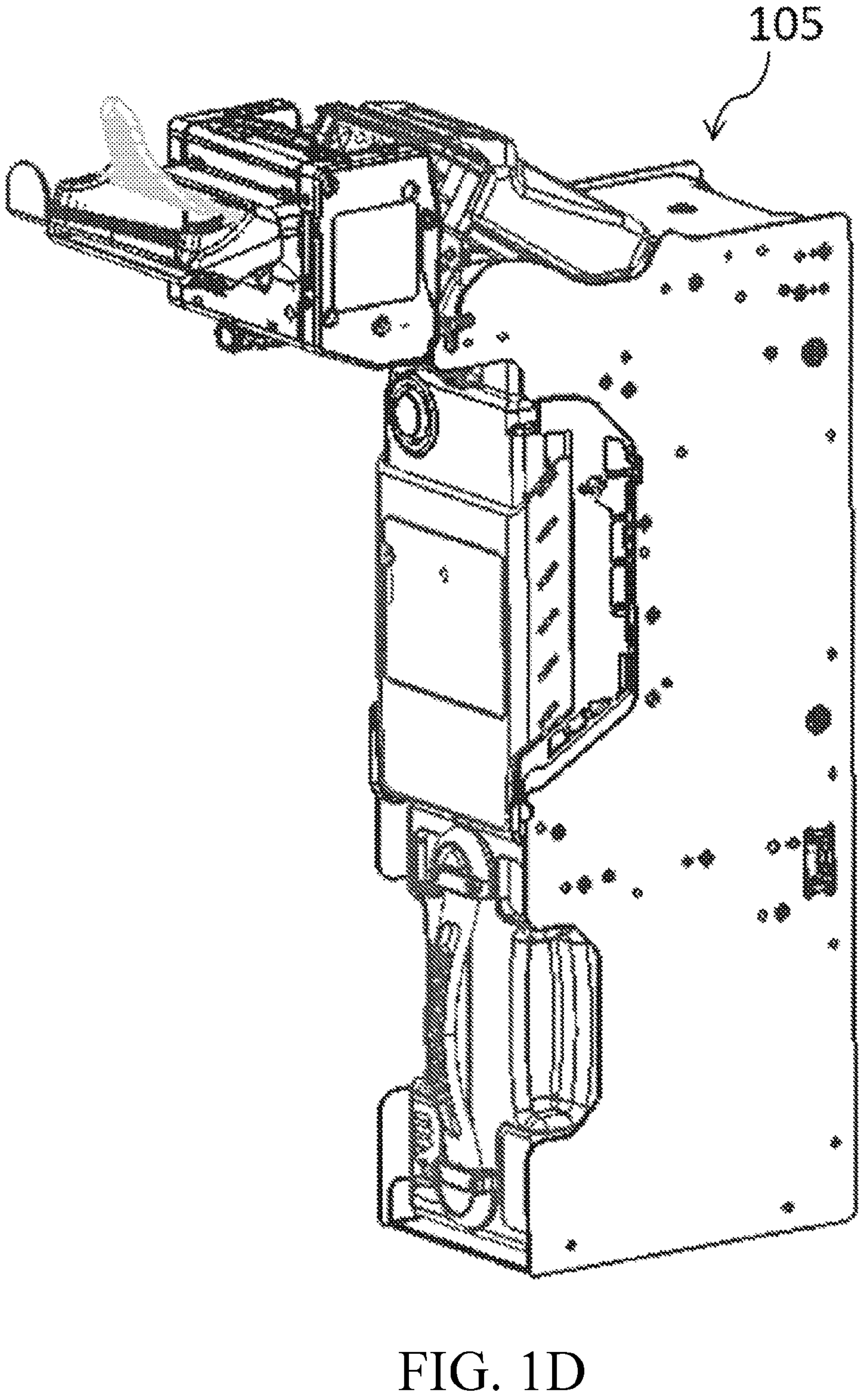
FIG. 1D illustrates an example of a banknote accepting apparatus in accordance with various embodiments of the present disclosure.
Figure 1E:
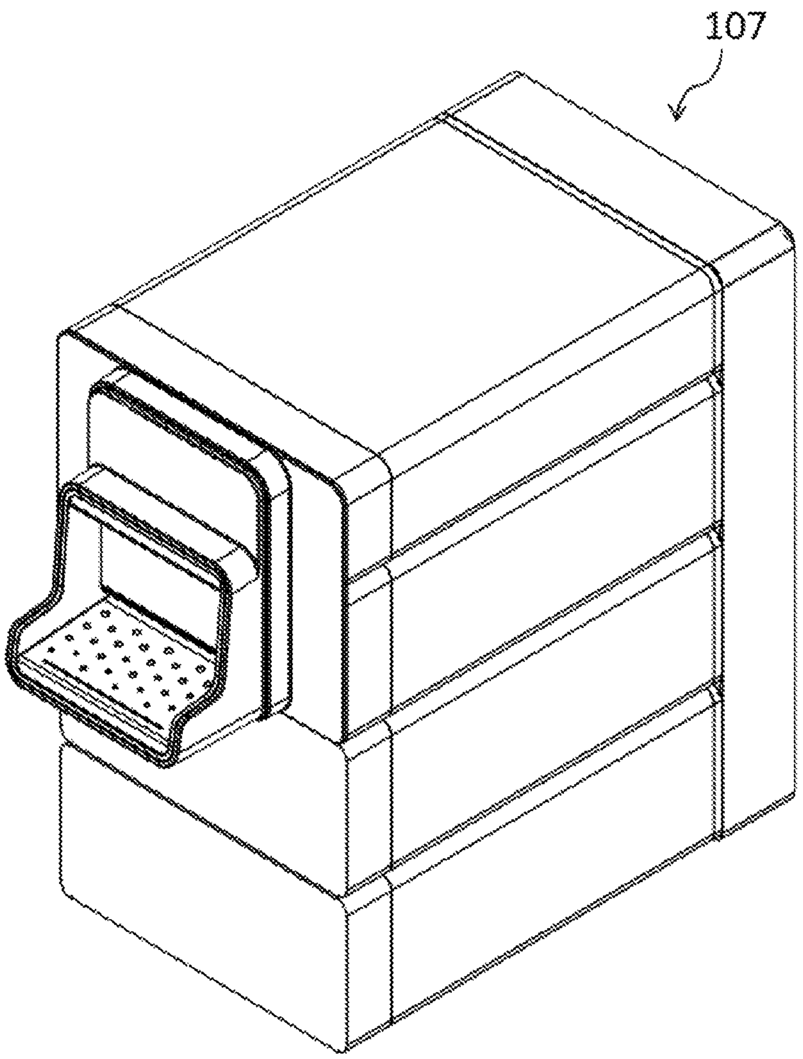
FIG. 1E illustrates an example of a banknote accepting apparatus in accordance with various embodiments of the present disclosure.
Figure 1F:
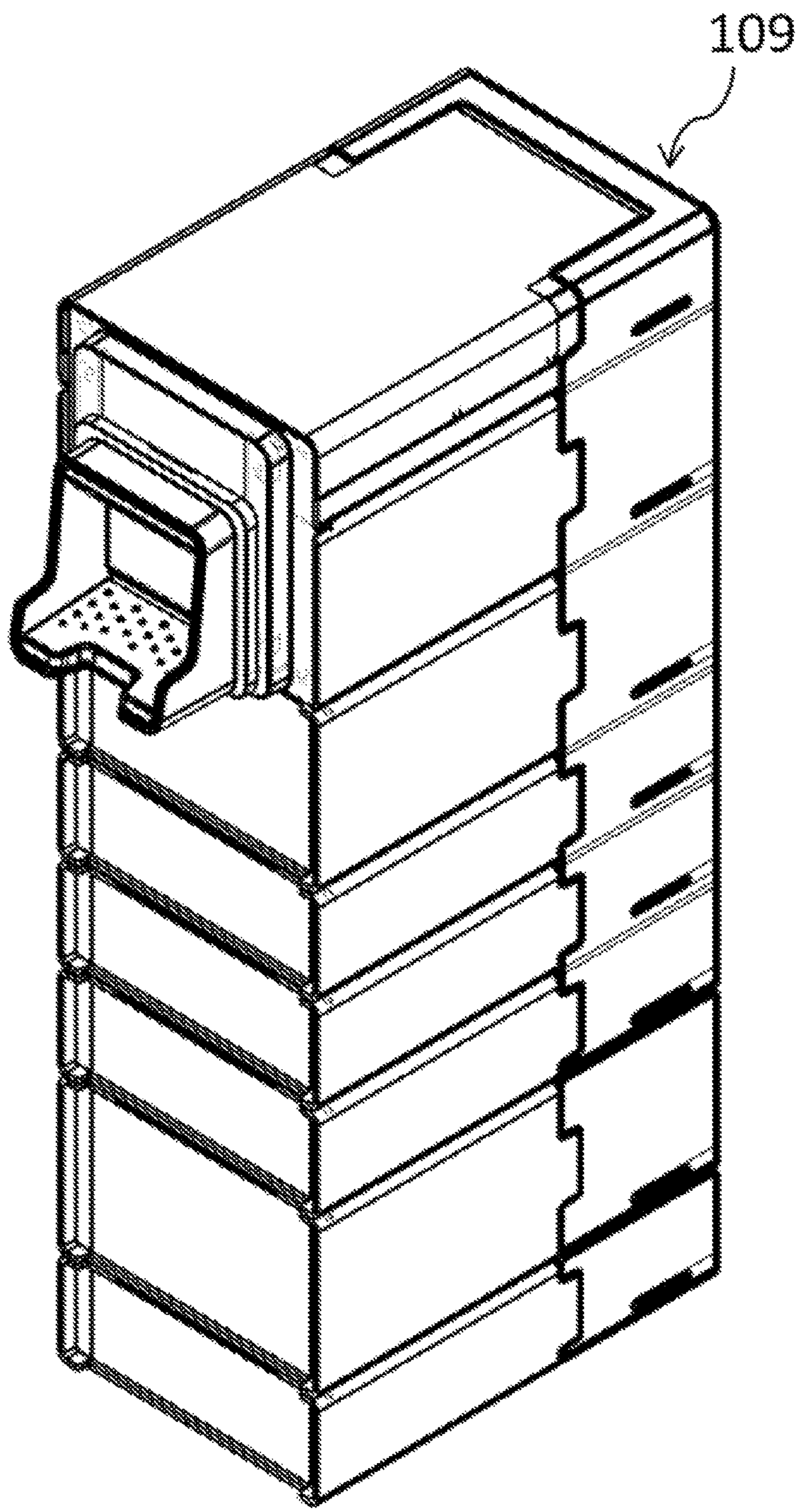
FIG. 1F illustrates an example of a banknote accepting apparatus in accordance with various embodiments of the present disclosure.

FIGS. 1A-1F illustrate schematic views of banknote acceptor and banknote deposit-withdrawal systems in accordance with various embodiments of the present disclosure. FIG. 1A illustrates an example of a banknote acceptor system 100 in accordance with various embodiments of the present disclosure. FIG. 1B illustrates an example of a banknote deposit-withdrawal system 101 in accordance with various embodiments of the present disclosure. FIG. 1C illustrates an example of a banknote acceptor system 103 in accordance with various embodiments of the present disclosure. FIG. 1D illustrates an example of a banknote deposit-withdrawal system 105 in accordance with various embodiments of the present disclosure. FIG. 1E illustrates an example of a banknote deposit-withdrawal system 107 in accordance with various embodiments of the present disclosure. FIG. 1F illustrates an example of a banknote deposit-withdrawal system 109 in accordance with various embodiments of the present disclosure.

FIG. 1A shows a banknote acceptor system 100 configured to verify the authenticity of the inserted banknote. The banknote acceptor system 100 generally has an acceptor head, a banknote transport system and a removable banknote storage unit. Inserted banknotes are generally authenticated in a banknote accepting module using various sensors, once the banknote is deemed authentic and deemed acceptable the banknote is transported further into the banknote acceptor using the banknote transport system into the removable banknote storage unit.

FIG. 1B illustrates a banknote deposit-withdrawal system 101 in accordance with various embodiments of the present disclosure. In addition to a banknote accepting module, a banknote transport system, and a removable banknote storage unit as shown in FIG. 1A, the banknote deposit-withdrawal system 101 illustrated in FIG. 1B comprises a banknote recycling module that allows the unit to provide banknotes back to the customer. For example, the banknote deposit-withdrawal system 101 could be used in an automated payment system where a customer presents a high denomination banknote to purchase goods or services that are valued more than the value of purchased goods or services and the unit provides lower denomination banknotes to provide change to the customer to assist in completing the transaction. The recycling module may act as an escrow unit that holds the accepted document until the transaction is completed.

FIG. 1C illustrates a banknote acceptor system 103 in accordance with various embodiments of the present disclosure. FIG. 1C shows a banknote acceptor system 103 configured to receive multiple banknotes in bulk to verify the authenticity of the inserted banknotes in bulk. The banknote acceptor includes an adapter to accept banknotes in bulk, and has a banknote accepting module, a banknote transport system, and a removable banknote storage unit. Inserted banknotes are separated serially and sent to be authenticated in the banknote accepting module using various sensors. Once the banknote is deemed authentic and deemed acceptable, the banknote is transported further into the banknote acceptor using the banknote transport system and into the removable banknote storage unit.

FIG. 1D illustrates a banknote deposit-withdrawal system 105 in accordance with various embodiments of the present disclosure. In addition to a banknote accepting module, a banknote transport system, and a removable banknote storage unit as shown in FIG. 1C, the banknote deposit-withdrawal system 105 illustrated in FIG. 1D comprises a banknote recycling module that allows the unit to provide banknotes back to the customer. For example, the banknote deposit-withdrawal system 105 could be used in an automated payment system where a customer presents a high denomination banknote to purchase goods or services that are valued more than the value of purchased goods or services and the unit provides lower denomination banknotes to provide change to the customer to assist in completing the transaction. The recycling module may act as an escrow unit that holds the accepted document until the transaction is completed.

FIG. 1E illustrates a banknote deposit-withdrawal system 107 in accordance with various embodiments of the present disclosure. The banknote deposit-withdrawal system 107 includes a banknote accepting module, a banknote transport system, a removable banknote storage unit, and a banknote recycling module that allows the unit to provide banknotes back to the customer. For example, the banknote deposit-withdrawal system 107 can be used in an automated payment system where a customer presents a high denomination banknote to purchase goods or services that are valued more than the value of purchased goods or services; and the unit provides lower denomination banknotes to provide change to the customer to assist in completing the transaction. The recycling module may act as an escrow unit that holds the accepted document until the transaction is completed.

FIG. 1F illustrates a banknote deposit-withdrawal system 109 in accordance with various embodiments of the present disclosure. The banknote deposit-withdrawal system 109 includes a banknote accepting module, a banknote transport system and a removable banknote storage unit, an escrow module and multiple banknote recycling modules that allows the unit to provide banknotes back to the customer. For example, the banknote deposit-withdrawal system could be used in an automated payment system where a customer presents a high denomination banknote to purchase goods or services that are valued more than the value of purchased goods or services and the unit provides lower denomination banknotes to provide change to the customer to assist in completing the transaction. The escrow unit holds the accepted document until the transaction is completed.

Figure 2:
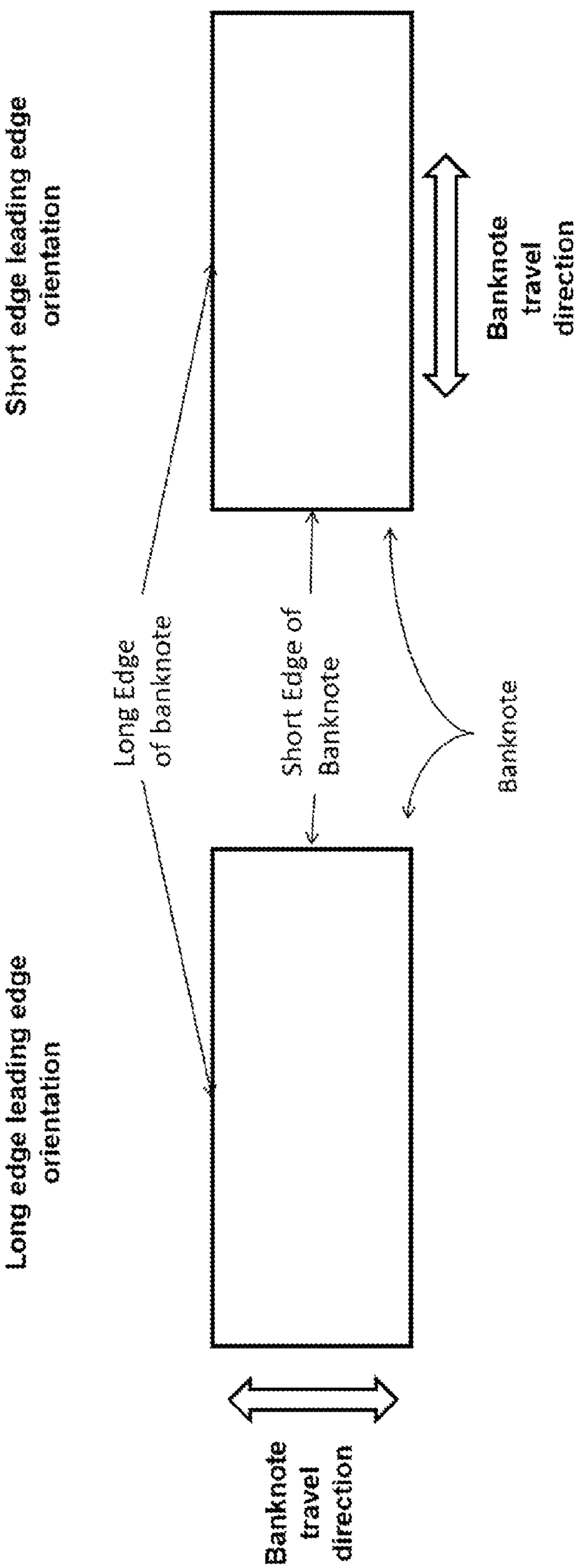
FIG. 2 illustrates orientations and travel directions of banknotes inside a banknote accepting apparatus in accordance with various embodiments of the present disclosure.

FIG. 2 illustrates orientations and travel directions of banknote inside a banknote accepting apparatus in accordance with various embodiments of the present disclosure. Generally, banknotes are thin rectangular sheets made of paper or plastic or a combination of paper and plastic. These banknotes generally have a long edge and a short edge, and travel directions are defined by which of the long edge and the short edge of the document is the leading-edge. If a document is traveling along the short edge with the long edge of the document entering or leaving a module, then the document is traveling in the long edge leading-edge orientation. If the document is traveling along the long edge with the short edge of the document entering or leaving a module, then the document is traveling in the short edge leading-edge orientation.

Figure 3B:
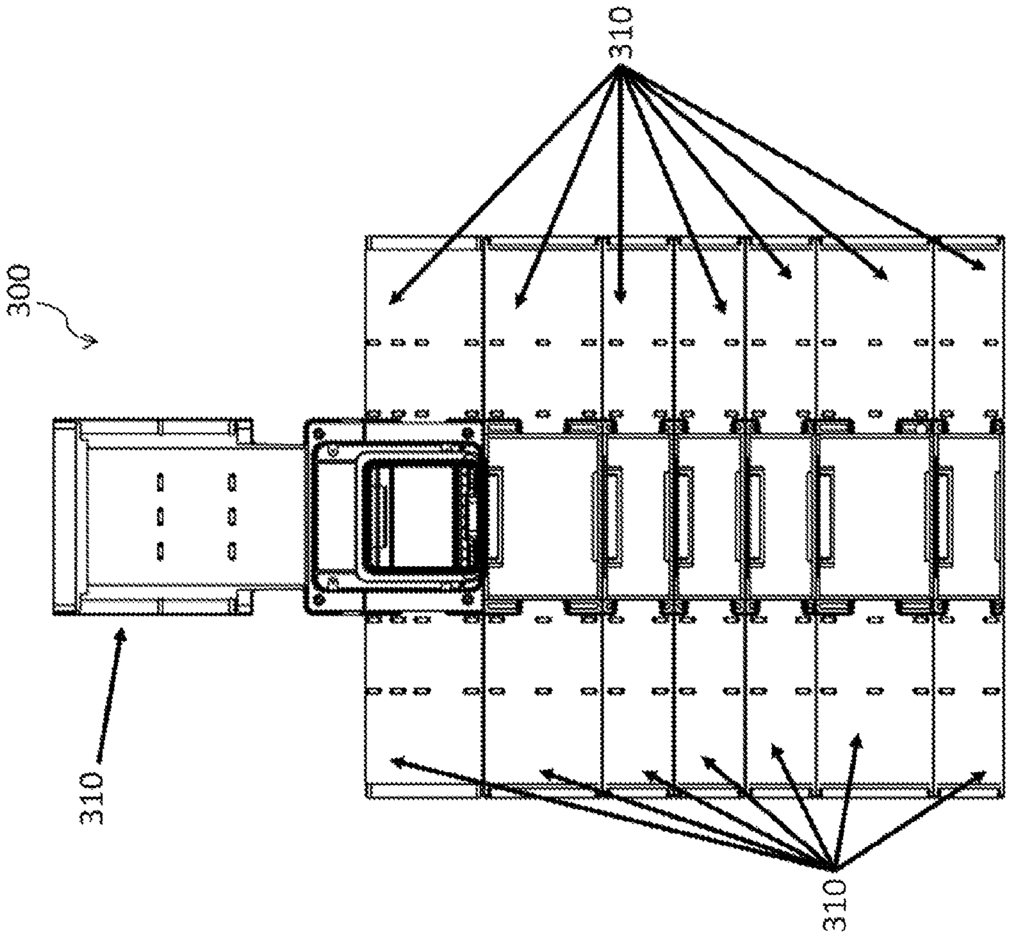
FIG. 3B illustrates an example banknote deposit-withdrawal system in an open configuration in accordance with various embodiments of the present disclosure.
Figure 3A:
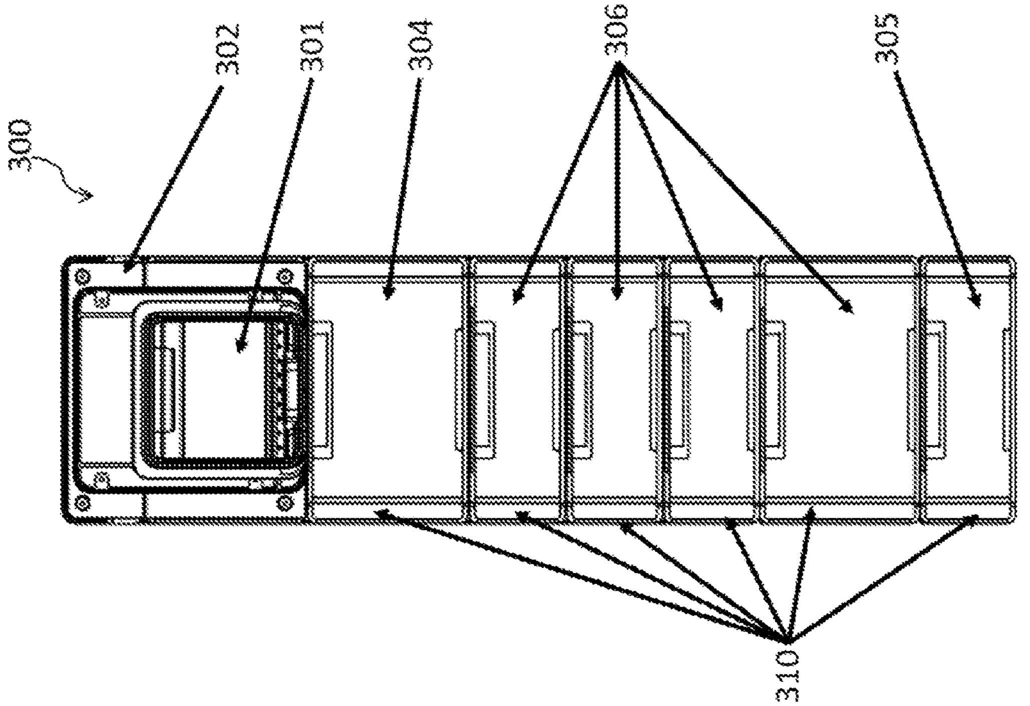
FIG. 3A illustrates an example banknote deposit-withdrawal system in accordance with various embodiments of the present disclosure.
Figure 3D:
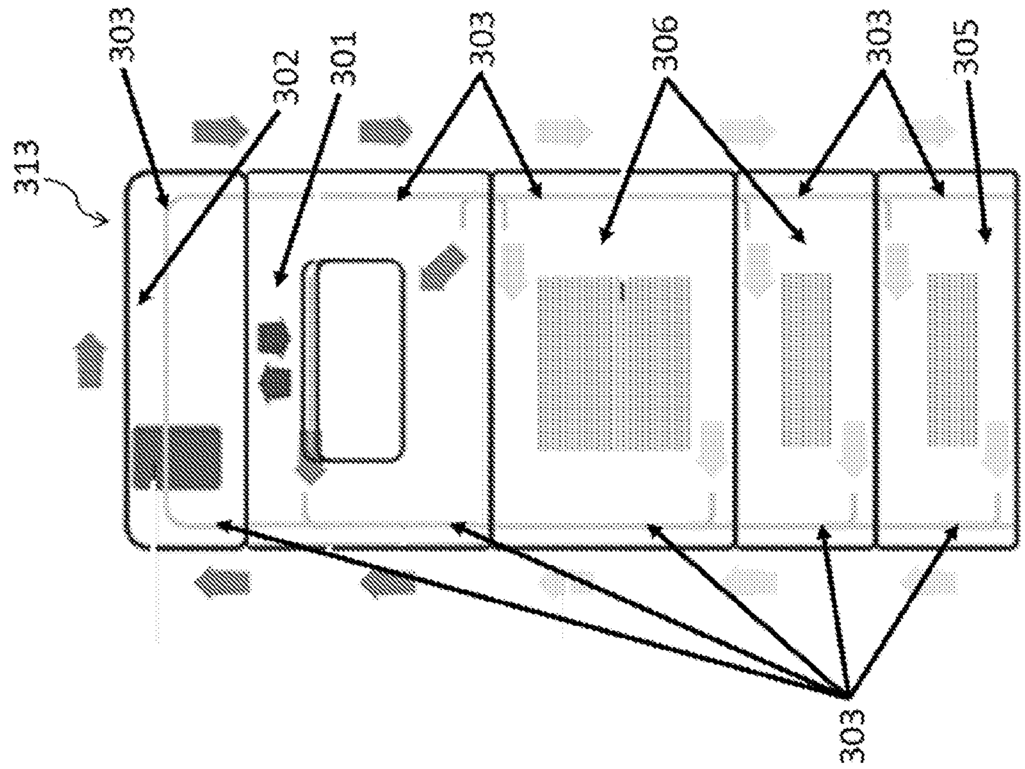
FIG. 3D illustrates example transportation paths of a banknote deposit-withdrawal system in accordance with various embodiments of the present disclosure.
Figure 3C:
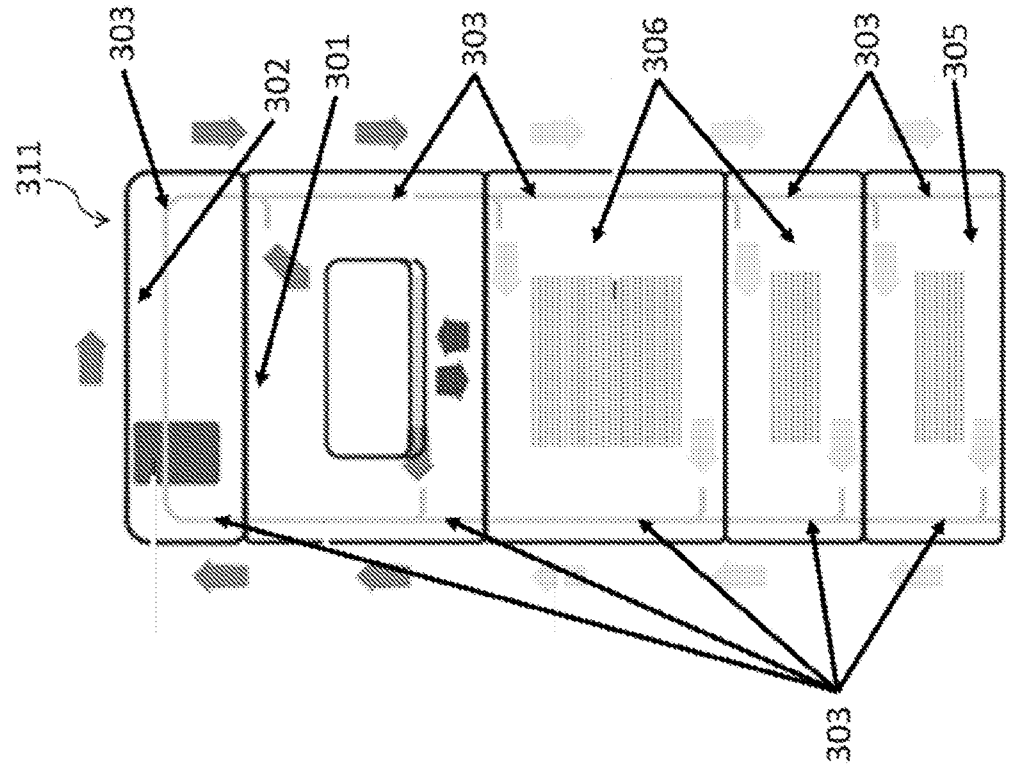
FIG. 3C illustrates example transportation paths of a banknote deposit-withdrawal system in accordance with various embodiments of the present disclosure.
Figure 3F:
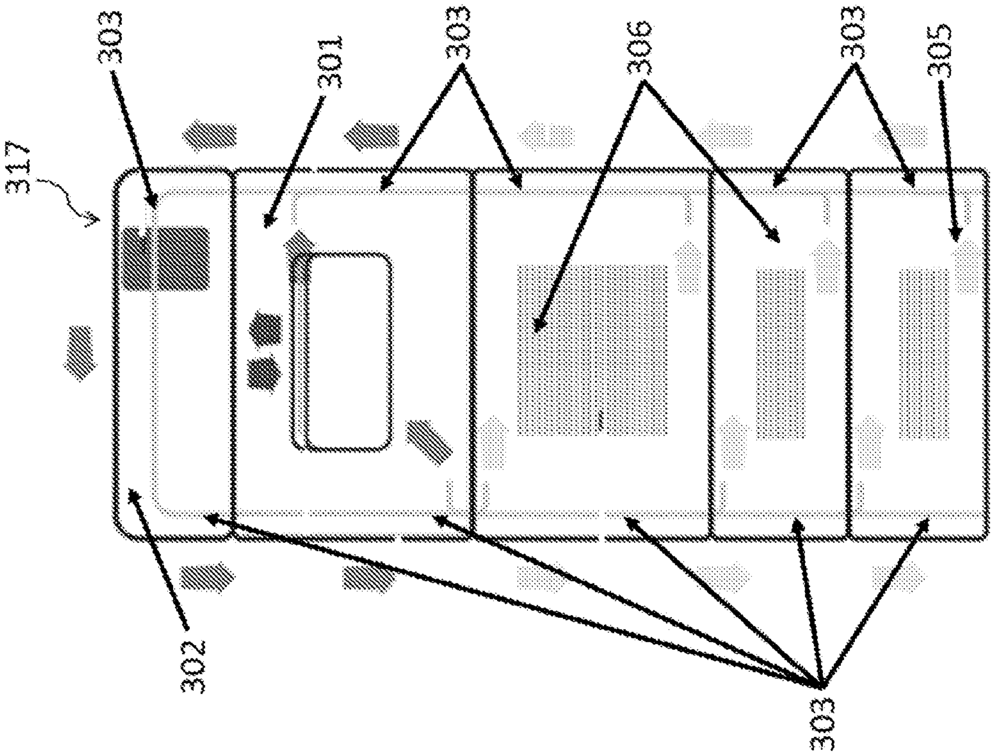
FIG. 3F illustrates example transportation paths of a banknote deposit-withdrawal system in accordance with various embodiments of the present disclosure.
Figure 3E:
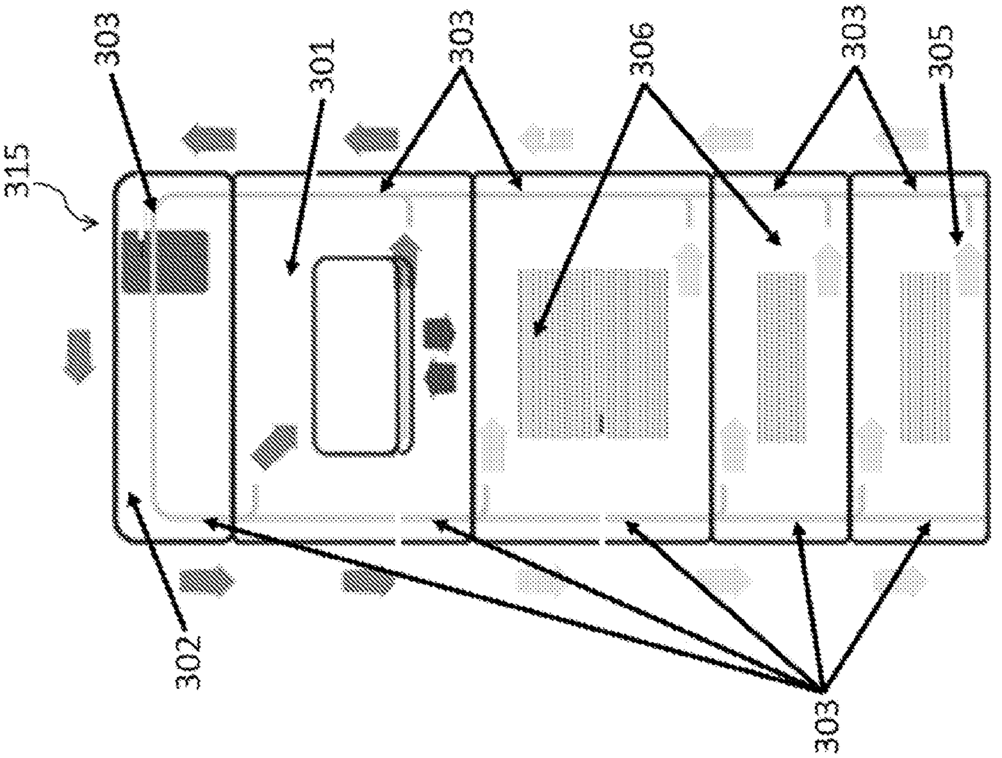
FIG. 3E illustrates example transportation paths of a banknote deposit-withdrawal system in accordance with various embodiments of the present disclosure.
Figure 3H:
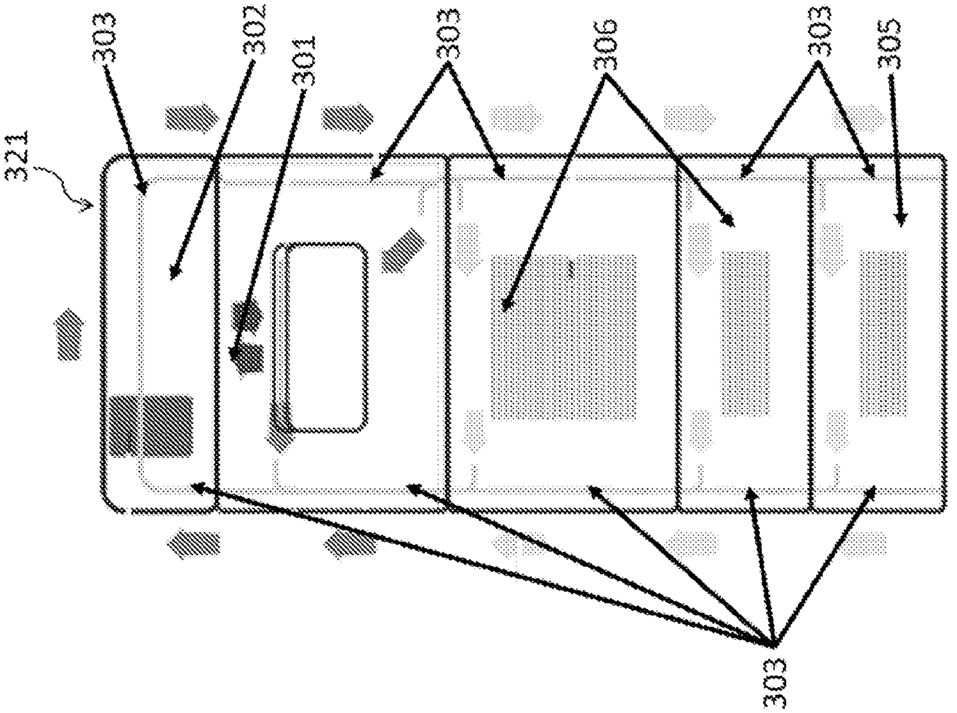
FIG. 3H illustrates example transportation paths of a banknote deposit-withdrawal system in accordance with various embodiments of the present disclosure.
Figure 3G:
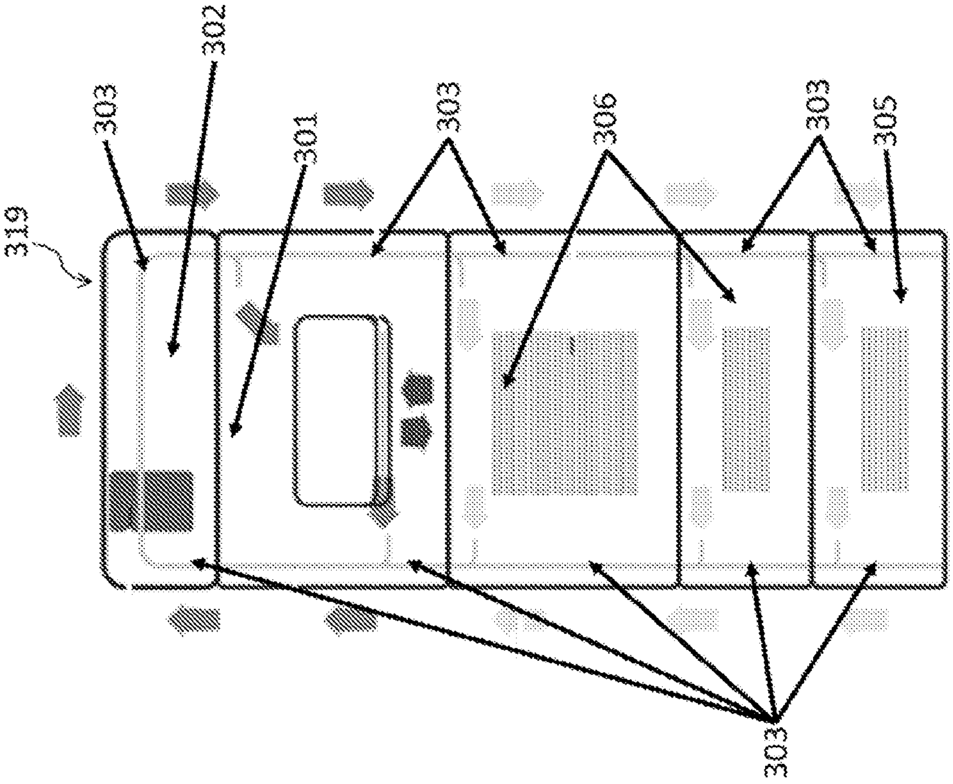
FIG. 3G illustrates example transportation paths of a banknote deposit-withdrawal system in accordance with various embodiments of the present disclosure.
Figure 3J:
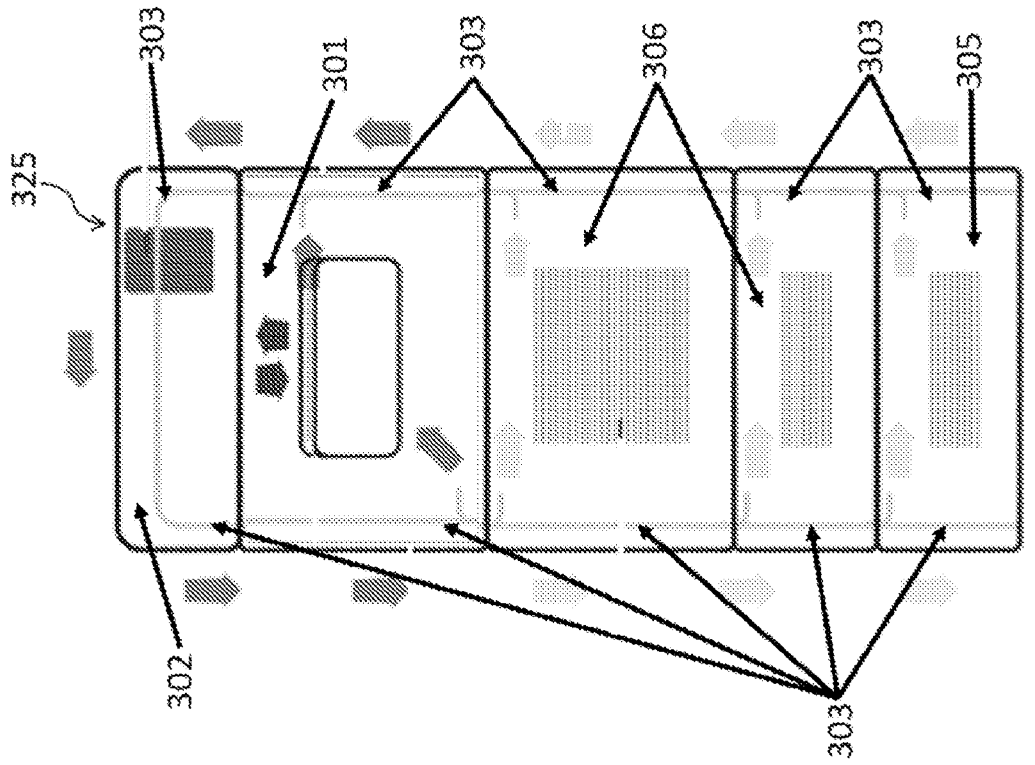
FIG. 3J illustrates an example transaction in a banknote accepting apparatus in accordance with various embodiments of the present disclosure.
Figure 3I:
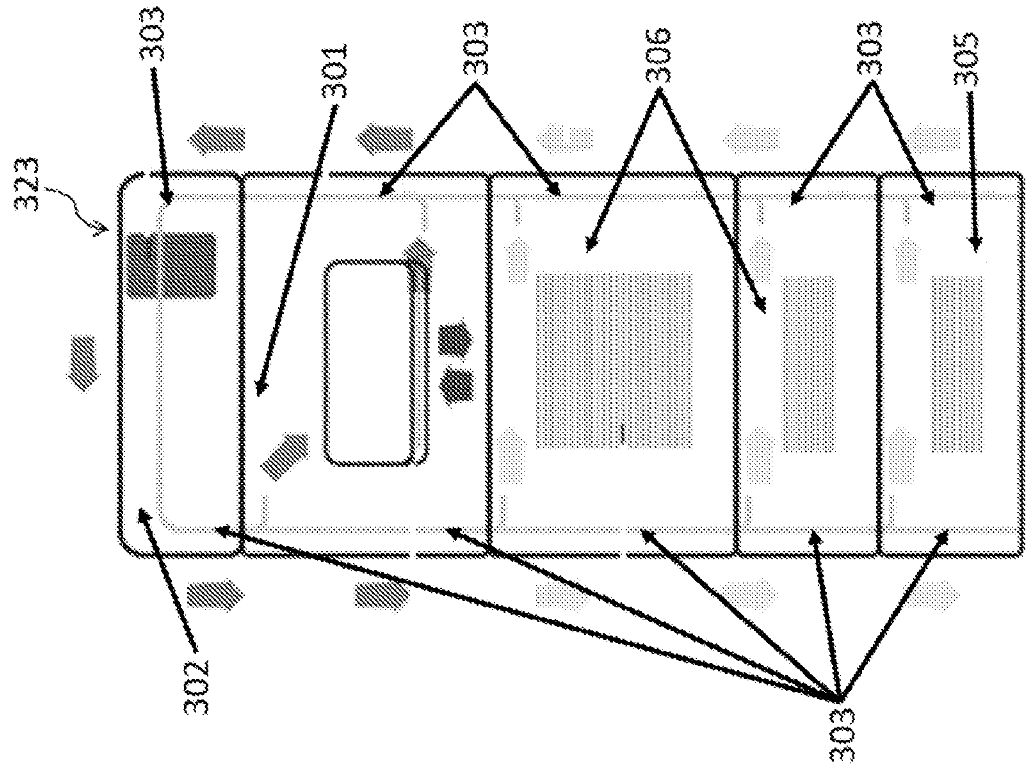
FIG. 3I illustrates an example transaction in a banknote accepting apparatus in accordance with various embodiments of the present disclosure.
Figure 3L:
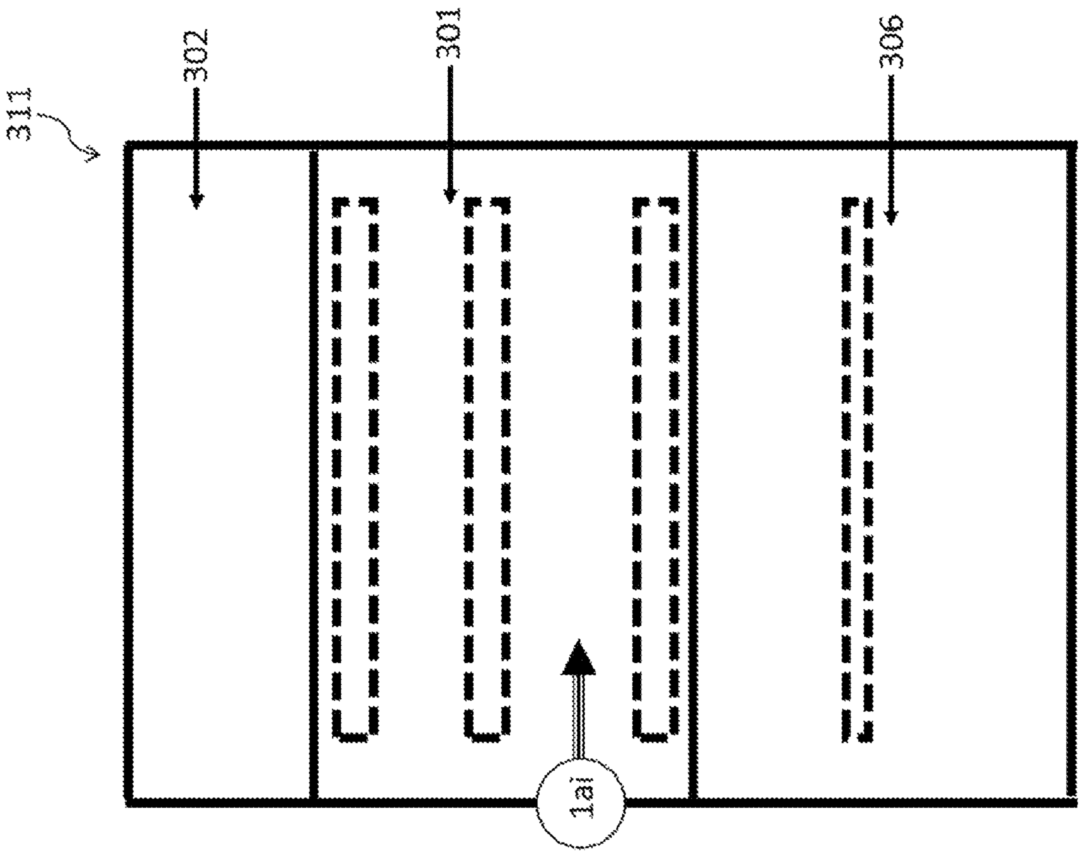
FIGS. 3K and 3L illustrate an example of a transaction in a banknote accepting apparatus in accordance with various embodiments of the present disclosure.
Figure 3K:
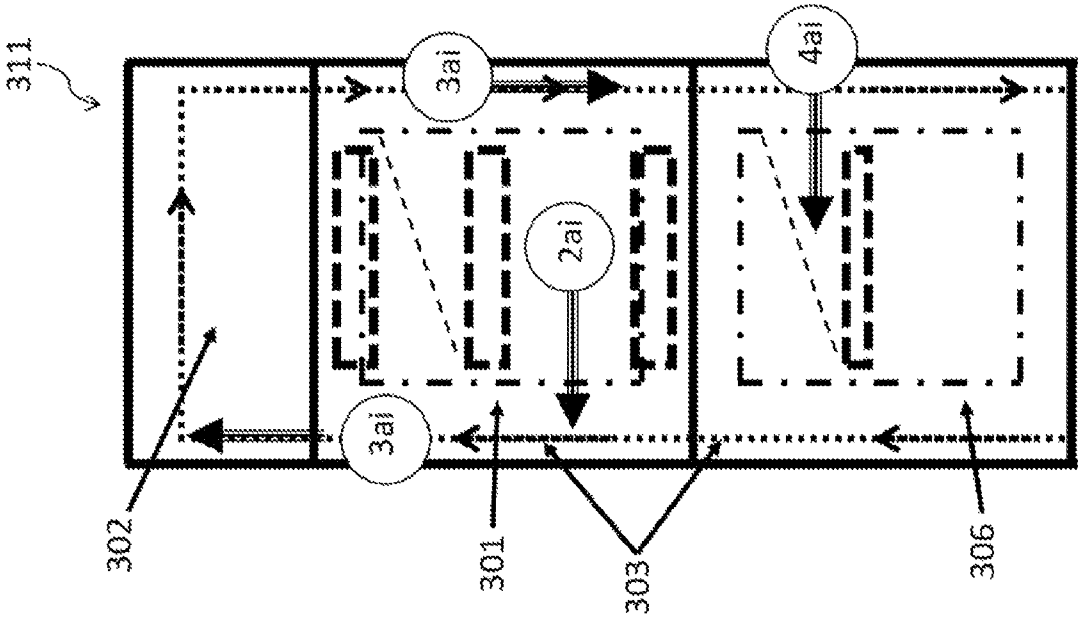
Figure 3N:
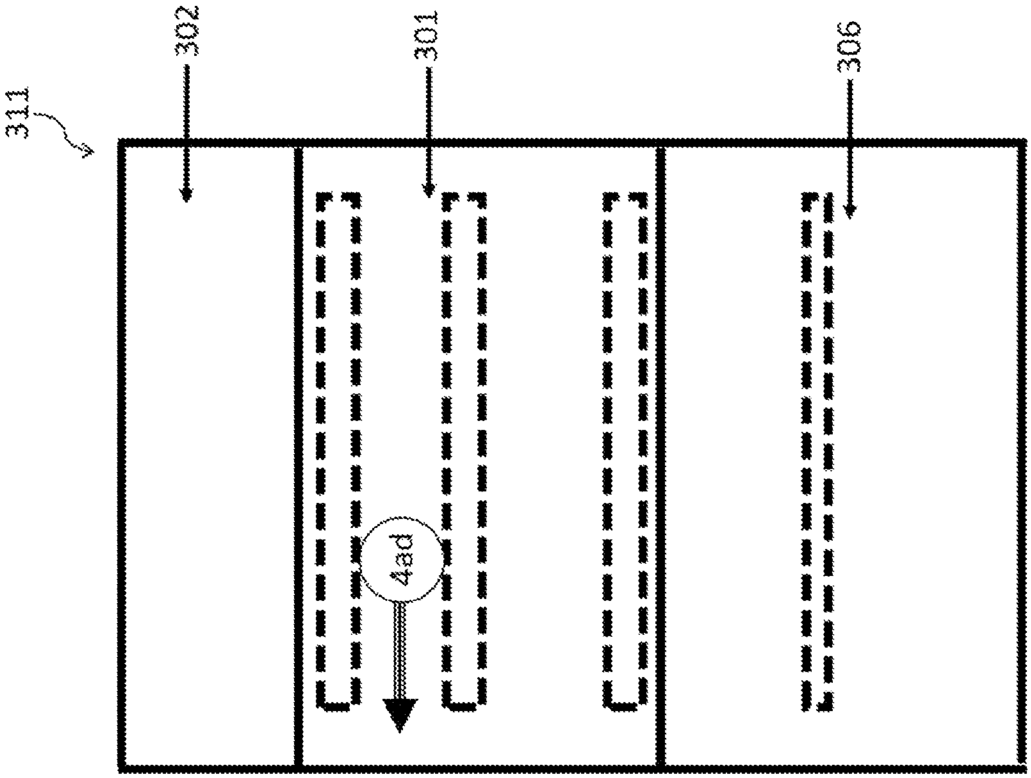
FIGS. 3M and 3N illustrate an example of a transaction in a banknote accepting apparatus in accordance with various embodiments of the present disclosure.

FIGS. 3A-3N illustrate various schematic views of embodiments of banknote deposit-withdrawal systems in accordance with various embodiments of the present disclosure. FIG. 3A illustrates an example banknote deposit-withdrawal system 300 in accordance with various embodiments of the present disclosure. FIG. 3B illustrates an example of the banknote deposit-withdrawal system 300 in an open configuration in accordance with various embodiments of the present disclosure. FIG. 3C illustrates an example banknote deposit-withdrawal system 311 in accordance with various embodiments of the present disclosure. FIG. 3D illustrates an example banknote deposit-withdrawal system 313 in accordance with various embodiments of the present disclosure. FIG. 3E illustrates an example banknote deposit-withdrawal system 315 in accordance with various embodiments of the present disclosure. FIG. 3F illustrates an example banknote deposit-withdrawal system 317 in accordance with various embodiments of the present disclosure. FIG. 3G illustrates an example banknote deposit-withdrawal system 319 in accordance with various embodiments of the present disclosure. FIG. 3H illustrates an example banknote deposit-withdrawal system 321 in accordance with various embodiments of the present disclosure. FIG. 3I illustrates an example banknote deposit-withdrawal system 323 in accordance with various embodiments of the present disclosure. FIG. 3J illustrates an example banknote deposit-withdrawal system 325 in accordance with various embodiments of the present disclosure.

Figure 3M:
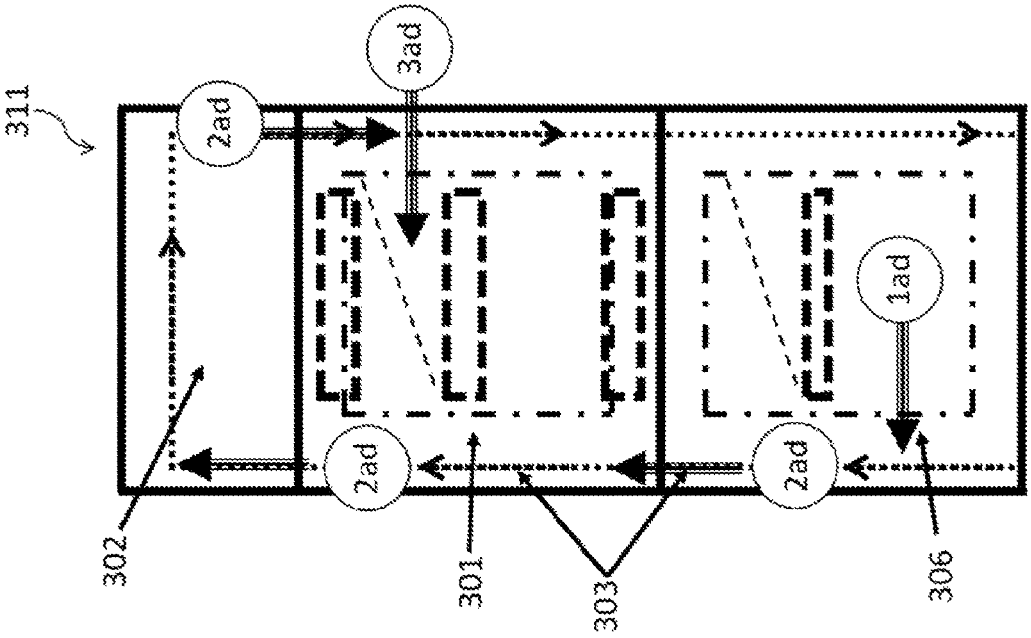
Figure 3P:
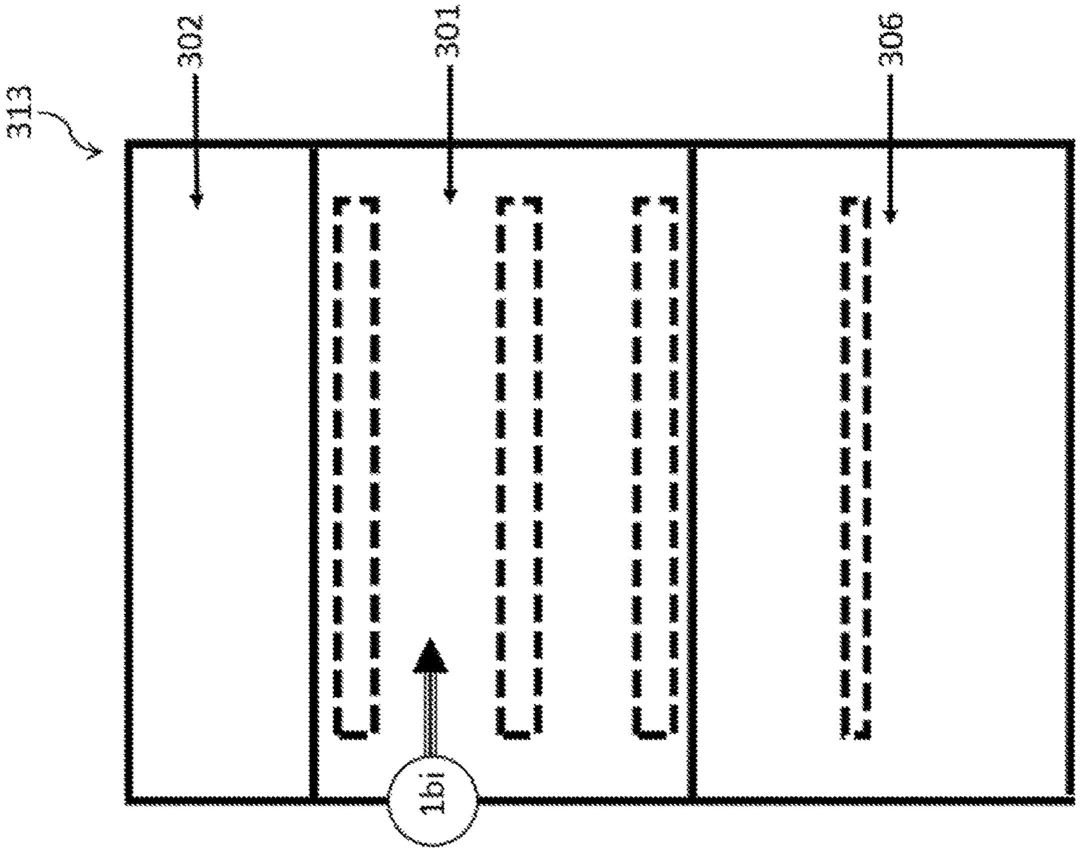
Figure 3O:
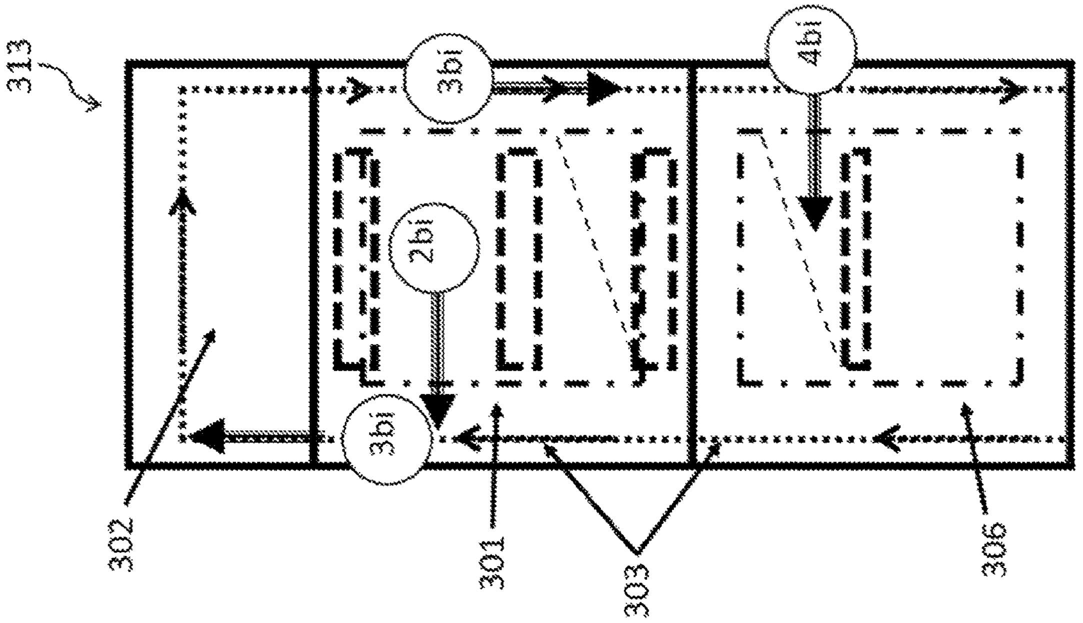
Figure 3R:
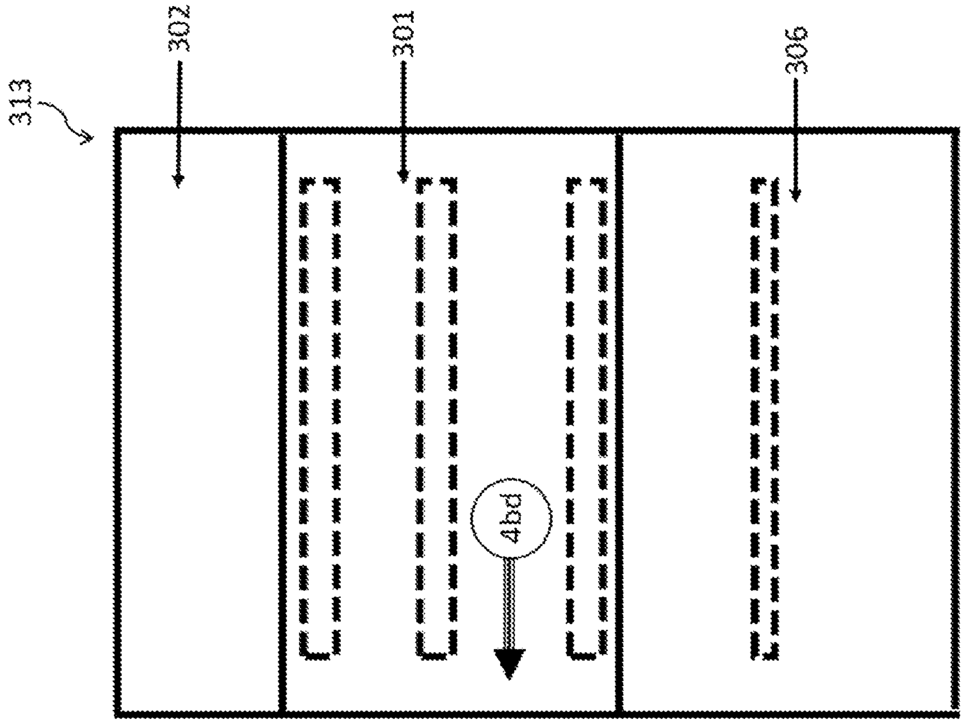
FIGS. 3Q and 3R illustrate another example of a transaction in a banknote accepting apparatus in accordance with various embodiments of the present disclosure.
Figure 3Q:
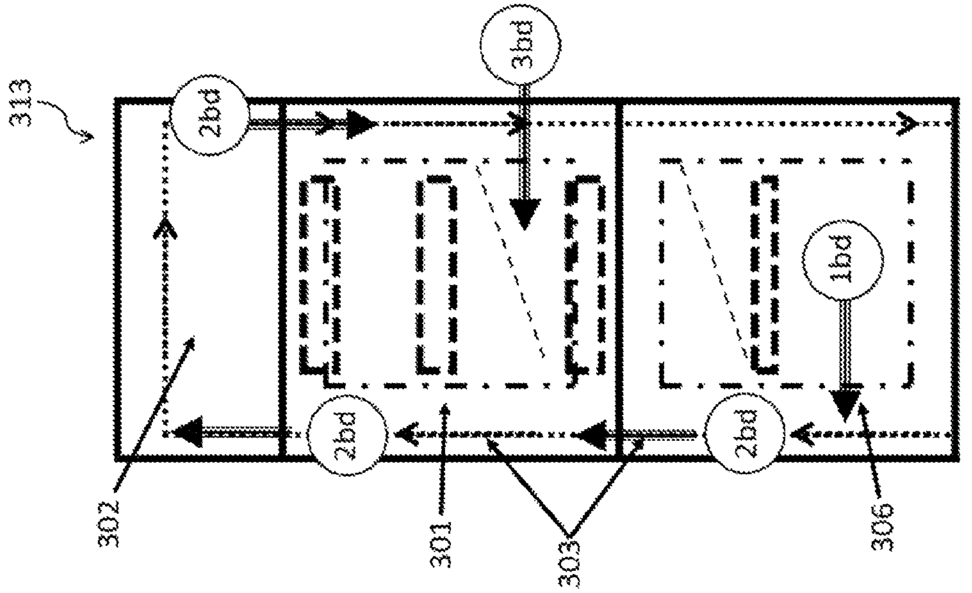

FIG. 3K illustrates a front view of an example banknote acceptance transaction in the banknote deposit-withdrawal system 311 in accordance with various embodiments of the present disclosure. FIG. 3L illustrates a side view of the example banknote acceptance transaction in the banknote deposit-withdrawal system 311 in accordance with various embodiments of the present disclosure. FIG. 3M illustrates a front view of an example banknote dispensing transaction in the banknote deposit-withdrawal system 311 in accordance with various embodiments of the present disclosure. FIG. 3N illustrates a side view of the example banknote dispensing transaction in the banknote accepting apparatus 311 in accordance with various embodiments of the present disclosure. FIG. 3O illustrates a front view of an example banknote acceptance transaction in the banknote deposit-withdrawal system 313 in accordance with various embodiments of the present disclosure. FIG. 3P illustrates a side view of the example banknote acceptance transaction in the banknote deposit-withdrawal system 313 in accordance with various embodiments of the present disclosure. FIG. 3Q illustrates a front view of an example banknote dispensing transaction in the banknote deposit-withdrawal system 313 in accordance with various embodiments of the present disclosure. FIG. 3R illustrates a side view of the example banknote dispensing transaction in the banknote deposit-withdrawal system 313 in accordance with various embodiments of the present disclosure.

FIG. 3A shows a banknote deposit-withdrawal system 300 configured to receive multiple banknotes in bulk to verify the authenticity of the inserted banknotes in bulk. A banknote accepting module 301 accepts banknotes either serially in single note insertion mode or in bulk in bulk banknote insertion mode. Banknotes are inserted in the banknote accepting module 301 in an orientation where the short edge of the banknotes is leading-edge. Banknotes are transported by the short edge leading-edge orientation to a separation area. Banknotes are separated and transported towards a banknote sensing module 302 serially in an orientation where the long edge of the banknotes is leading-edge by a banknote transportation module. The banknote transportation module comprises openable panels 310 for access to a banknote transportation path. The banknote transportation module could also include one or more of rollers, belts, motors and ribs to transport banknotes along banknote transportation path. Banknotes deemed not acceptable are returned to the banknote accepting module 301 by the banknote transportation module in the long edge leading orientation. Unacceptable banknotes are returned to the user in the short edge leading-edge orientation. Once the banknote storage module 305 is filled or after a certain number of transactions or after a predetermined fixed time duration, the banknote storage module 305 is removed to collect banknotes from the banknote deposit-withdrawal system 300. The banknote deposit-withdrawal system 300 also includes a banknote escrow module 304. The banknote transportation module transports all accepted banknotes into the banknote escrow module 304 for temporary storage in the long edge leading-edge orientation until completion of the transaction. If the user cancels transaction then the banknote transportation module transports banknotes from the banknote escrow module 304 via the banknote sensing module 302 to the banknote accepting module 301 in the long edge leading-edge orientation and they are returned to the user in the short edge leading-edge orientation. Upon completion of a successful transaction banknotes from the banknote escrow module 304 are moved either to the banknote storage module 305 or a banknote recycling module 306 in the long edge leading orientation via the banknote sensing module 302 and the banknote accepting module 301. The banknote recycling module 306 accepts banknotes in the long edge leading-edge orientation for temporary storage. Banknotes stored in the banknote recycling module 306 are used to provide change to the users to complete the transaction. Banknotes dispensed from the banknote recycling module 306 are sent by the banknote transportation module to the banknote accepting module 301 via the banknote sensing module 302 in the long edge leading-edge orientation and dispensed to the user in the short edge leading-edge orientation.

FIG. 3B illustrates a banknote deposit-withdrawal system 300 in accordance with various embodiments of the present disclosure. FIG. 3B shows a banknote deposit-withdrawal system 300 with the openable panels 310 of the banknote transportation module opened to show a banknote transportation path. The banknote transportation module transports accepted banknotes from the banknote sensing module 302 to the banknote escrow module 304 in the long edge leading edge orientation. If the user decides to cancel the transaction, then banknotes collected in the banknote escrow module 304 are transported by the banknote transportation module to the banknote accepting module 301 via the banknote sensing module 302 to dispense banknote back to the user in the long edge leading edge orientation. If the user completes the transaction, then banknotes collected in the banknote escrow module 304 are sent to either one of the banknote recycling modules 306 or to the banknote storage module 305 by the banknote transportation module through the banknote sensing module 302, the banknote accepting module 301 and to one of the banknote recycling modules 306 or to the banknote storage module 305.

FIGS. 3C and 3D illustrate banknote deposit-withdrawal systems 311 and 313, respectively, in accordance with various embodiments of the present disclosure. FIGS. 3C and 3D show examples of how banknotes move inside a banknote deposit-withdrawal system. Once a user has inserted banknotes either serially or in bulk in short edge leading edge orientation in banknote accepting module 301, the banknotes are further moved inside the banknote accepting module 301 in short edge leading edge orientation to a banknote separation area. The system 311 illustrated in FIG. 3C shows an example in which a banknote insertion area, such as a bezel or banknote slot, has a downward orientation such that banknotes are inserted into the banknote insertion area and banknotes are accepted into the system 311 serially from a bottom of a banknote stack. The system 313 illustrated in FIG. 3C shows an example in which a banknote insertion area, such as a bezel or banknote slot, has a upward orientation such that banknotes are inserted into the banknote insertion area and banknotes are accepted into the system 313 serially from a top of a banknote stack. Once the banknotes reach the separation area inside the banknote accepting module 301, the banknotes are separated by a separation module (not shown), and then banknotes are sent serially by a banknote transportation module or path 303 along a banknote transportation path into the banknote sensing module 302 in long edge leading edge orientation in a clockwise direction. If a banknote is rejected by the banknote sensing module 302, then the banknote is sent back to the banknote accepting module 301 in the long edge leading edge orientation in a clockwise direction. If a banknote is deemed acceptable by the banknote sensing module 302, then the banknote transportation module 303 moves the accepted banknote to either one of the banknote recycling modules 306 or to the banknote storage module 305 in the long edge leading edge orientation in a clockwise direction. If a banknote is to be dispensed from one of the banknote recycling modules 306, then the banknote is transported by the banknote transportation module 303 into the banknote sensing module 302 in long edge leading edge orientation in a clockwise direction and then to the banknote accepting module 301 in the long edge leading edge orientation in a clockwise direction.

FIGS. 3E and 3F illustrate banknote deposit-withdrawal systems 315 and 317, respectively, in accordance with various embodiments of the present disclosure. FIGS. 3E and 3F show examples of how banknotes move inside a banknote deposit-withdrawal system. Once a user has inserted banknotes either serially or in bulk in short edge leading edge orientation in banknote accepting module 301, the banknotes are further moved inside the banknote accepting module 301 in short edge leading edge orientation to a banknote separation area. The system 315 illustrated in FIG. 3E shows an example in which a banknote insertion area, such as a bezel or banknote slot, has a downward orientation such that banknotes are inserted into the banknote insertion area and banknotes are accepted into the system 315 serially from a bottom of a banknote stack. The system 317 illustrated in FIG. 3F shows an example in which a banknote insertion area, such as a bezel or banknote slot, has a upward orientation such that banknotes are inserted into the banknote insertion area and banknotes are accepted into the system 317 serially from a top of a banknote stack. Once the banknotes reach the separation area inside the banknote accepting module 301, the banknotes are separated by a separation module (not shown), and then banknotes are sent serially by the banknote transportation module 303 into the banknote sensing module 302 in long edge leading edge orientation in a counter-clockwise direction. If a banknote is rejected by the banknote sensing module 302, then the banknote is sent back to the banknote accepting module 301 in the long edge leading edge orientation in a counter-clockwise direction. If a banknote is deemed acceptable by the banknote sensing module 302, then the banknote transportation module 303 moves accepted banknote to either one of the banknote recycling modules 306 or to the banknote storage module 305 in the long edge leading edge orientation in a counter-clockwise direction. If a banknote is to be dispensed from one of the banknote recycling modules 306, then the banknote is transported by the banknote transportation module 303 into the banknote sensing module 302 in long edge leading edge orientation in a counter-clockwise direction and then to the banknote accepting module 301 in the long edge leading edge orientation in a counter-clockwise direction.

FIGS. 3G and 3H illustrate banknote deposit-withdrawal systems 319 and 321, respectively, in accordance with various embodiments of the present disclosure. FIGS. 3G and 3H show examples of how banknotes move inside a banknote deposit-withdrawal system. Once a user has inserted banknotes either serially or in bulk in short edge leading edge orientation in banknote accepting module 301, the banknotes are further moved inside the banknote accepting module 301 in short edge leading edge orientation to a banknote separation area. The system 319 illustrated in FIG. 3G shows an example in which a banknote insertion area, such as a bezel or banknote slot, has a downward orientation such that banknotes are inserted into the banknote insertion area and banknotes are accepted into the system 319 serially from a bottom of a banknote stack. The system 321 illustrated in FIG. 3H shows an example in which a banknote insertion area, such as a bezel or banknote slot, has a upward orientation such that banknotes are inserted into the banknote insertion area and banknotes are accepted into the system 321 serially from a top of a banknote stack. Once the banknotes reach the separation area inside the banknote accepting module 301, the banknotes are separated by a separation module (not shown), and then banknotes are sent serially by the banknote transportation module 303 into the banknote sensing module 302 in long edge leading edge orientation in a clockwise direction. If a banknote is rejected by the banknote sensing module 302, then the banknote is sent back to the banknote accepting module 301 in the long edge leading edge orientation in a clockwise direction. If a banknote is deemed acceptable by the banknote sensing module 302, then the banknote transportation module 303 moves accepted banknote to either one of the banknote recycling modules 306 or to the banknote storage module 305 in the long edge leading edge orientation in a clockwise direction. If a banknote is to be dispensed from one of the banknote recycling modules 306, then the banknote is transported by the banknote transportation module 303 into the banknote sensing module 302 in long edge leading edge orientation in a clockwise direction and then to the banknote accepting module 301 in the long edge leading edge orientation in a clockwise direction.

FIGS. 3I and 3J illustrate banknote deposit-withdrawal systems 323 and 325. Respectively, in accordance with various embodiments of the present disclosure. FIGS. 3I and 3J show examples of how banknotes move inside a banknote deposit-withdrawal system. Once a user has inserted banknotes either serially or in bulk in short edge leading edge orientation in banknote accepting module 301, the banknotes are further moved inside the banknote accepting module 301 in short edge leading edge orientation to a banknote separation area. The system 323 illustrated in FIG. 3I shows an example in which a banknote insertion area, such as a bezel or banknote slot, has a downward orientation such that banknotes are inserted into the banknote insertion area and banknotes are accepted into the system 323 serially from a bottom of a banknote stack. The system 325 illustrated in FIG. 3J shows an example in which a banknote insertion area, such as a bezel or banknote slot, has a upward orientation such that banknotes are inserted into the banknote insertion area and banknotes are accepted into the system 325 serially from a top of a banknote stack. Once the banknotes reach the separation area inside the banknote accepting module 301, the banknotes are separated by a separation module (not shown), and then banknotes are sent serially by the banknote transportation module 303 into the banknote sensing module 302 in long edge leading edge orientation in a counter-clockwise direction. If a banknote is rejected by the banknote sensing module 302, then the banknote is sent back to the banknote accepting module 301 in the long edge leading edge orientation in a counter-clockwise direction. If a banknote is deemed acceptable by the banknote sensing module 302, then the banknote transportation module 303 moves accepted banknote to either one of the banknote recycling modules 306 or to the banknote storage module 305 in the long edge leading edge orientation in a counter-clockwise direction. If a banknote is to be dispensed from one of the banknote recycling modules 306, then the banknote is transported by the banknote transportation module 303 into the banknote sensing module 302 in long edge leading edge orientation in a counter-clockwise direction and then to the banknote accepting module 301 in the long edge leading edge orientation in a counter-clockwise direction.

The banknote transportation module 303, as explained in FIGS. 3A-3J moves banknotes in long edge leading edge orientation in only one direction between modules. This unidirectional movement of banknotes, clockwise in FIGS. 3C, 3D, 3G and 3H, and counter-clockwise in 3E, 3F 3I, and 3J, increases efficiency of the movement of the banknotes in the banknote deposit-withdrawal system as banknotes do not travel forward and backward in the banknote transportation module 303 between modules during normal operation of the banknote deposit-withdrawal system. During abnormal conditions, such as a banknote jam in the banknote transportation path, the banknote that is jammed can be moved in reverse to clear the jam. Banknotes in the banknote transportation path can have a higher probability of a jam inside the banknote transportation path 303 if the leading edge of the banknote becomes a trailing edge if the banknote has to travel backward. In addition, by removing backward motion of banknotes in the banknote transportation path between modules, there is no need for complex three-way gates for the banknote accepting module 301 and banknote recycling modules 306. This removal of the three-way gates allows the use of more straightforward two-way gates for banknote the banknote accepting module 301 and banknote recycling modules 306. The more straightforward two-way gates and absence of backward movement of banknotes reduce the probability of jam as banknotes only travel forward and encounter the more efficient gates. In addition, the more straightforward two-way gates and absence of backward movement of banknotes permit the banknote deposit-withdrawal system to operate at higher speeds.

The banknote recycling modules 306, as explained in FIGS. 3A-3J accept and dispense banknotes in long edge leading edge orientation. These banknote recycling modules 306 accept banknotes from the top and dispense banknotes from bottom in FIGS. 3C, 3D, 3E, and 3F, and from the bottom in FIGS. 3G, 3H, 3I, and 3J. The banknote recycling modules 306 accept and dispense banknotes from different sides. This accepting and dispensing from different sides of the banknote recycling modules 306 permits the banknote transportation module 303 to move banknotes in the only forward direction and use more straightforward two-way gates to move banknotes in and out of the banknote recycling modules 306.

The banknote accepting module 301, as explained in FIGS. 3A-3J accept and dispense banknotes in short edge leading edge orientation to a user and accept and dispense banknotes in long edge leading edge orientation to banknote transportation module 303. These banknote accepting modules 301 accept banknotes from a user and separate accepted banknotes from bottom of the bulk in FIGS. 3C, 3E, 3G, and 3I and from the top of the bulk in FIGS. 3D, 3F, 3H, and 3J. The banknote accepting module 301 accept and dispense banknotes from different sides. This acceptance and dispense from different sides of the banknote accepting modules 301 permits the banknote transportation module 303 to move banknotes in the only forward direction and use more straightforward two-way gates to move banknotes in and out of the banknote accepting module 301.

In FIGS. 3K and 3L, a banknote acceptance process using a banknote deposit withdrawal system such as the banknote deposit-withdrawal system 311 is illustrated. In step 1*ai*, after a user has inserted a single banknote or a bulk of banknotes in a banknote accepting module 301, the single banknote or bulk of banknotes is transported inside the banknote accepting module 301 in a short edge leading edge orientation. In step 2*ai*, the single banknote is transported to a banknote recycling module 306 by a banknote transportation module 303 in a long edge leading edge orientation. If processing a bulk of banknotes, at step 2*ai*, banknotes are separated from the bulk of banknotes and transported serially to the banknote recycling module 306 by the banknote transportation module 303 in a long edge leading edge orientation. The single banknote or banknotes transported in a short edge leading edge orientation in step 1*ai* are transported to the banknote sensing module 302 in a long edge leading edge orientation in step 2*ai*. In step 3*ai*, the single banknote or the separated banknotes being transported serially are transported further into the banknote deposit-withdrawal system in a long edge leading edge orientation. If the single banknote, or each of the banknotes separated from the bulk of banknotes, is accepted as a genuine banknote by the banknote sensing module 302, then the genuine banknote is transported in a long edge leading edge orientation to a banknote recycling module 306. In step 4*ai*, the accepted banknote or banknotes are stored inside the banknote recycling module 306.

In FIGS. 3M and 3N, a banknote dispensing process using a banknote deposit withdrawal system such as the banknote deposit-withdrawal system 311 is illustrated. In step 1*ad*, after a user has initiated either a single banknote or a multiple banknotes withdrawal or dispense from a banknote recycling module 306 in the banknote deposit-withdrawal system, a single banknote or multiple banknotes in a serial manner are dispensed to a banknote transportation module 303 in a long edge leading edge orientation. In step 2*ad*, the banknote transportation module 303 transports the single banknote or the multiple banknotes dispensed by the banknote recycling module 306 towards a banknote sensing module 302 in a long edge leading edge orientation to verify the genuineness of the single banknote or each of the multiple banknotes, which are then sent to a banknote accepting module 301. In step 3*ad*, the banknote transportation module 303, in a long edge leading edge orientation, delivers the genuine banknote or banknotes into the banknote accepting module 301. If performing a multiple banknotes withdrawal, at step 3*ad*, the multiple banknotes delivered serially into the banknote accepting module 301 are also gathered into a stack or bulk of collected banknotes. In step 4*ad*, the single banknote or the bulk of banknotes is transported to the user in a short edge leading edge orientation by the banknote accepting module 301.

In FIGS. 30 and 3P, a banknote acceptance process using a banknote deposit-withdrawal system, such as the banknote deposit-withdrawal system 313, is illustrated. In step 1*bi*, after a user has inserted a single banknote or a bulk of banknotes in a banknote accepting module 301, the single banknote or bulk of banknotes is transported inside the banknote accepting module 301 in a short edge leading edge orientation. In step 2*bi*, the single banknote is transported to a banknote recycling module 306 by a banknote transportation module 303 in a long edge leading edge orientation. If processing a bulk of banknotes, at step 2*bi*, banknotes are separated from the bulk of banknotes and transported serially to the banknote recycling module 306 by the banknote transportation module 303 in a long edge leading edge orientation. The single banknote or the multiple banknotes transported in a short edge leading edge orientation in step 1*bi* are transported to the banknote sensing module 302 in a long edge leading edge orientation in step 2*bi*. In step 3*bi*, the single banknote or the separated banknote being transported serially are transported further into the banknote deposit-withdrawal system in a long edge leading edge orientation. If the banknote is accepted as a genuine banknote by the banknote sensing module 302, then the genuine banknote is transported in a long edge leading edge orientation to a banknote recycling module 306. In step 4*bi*, the accepted banknote or banknotes are stored inside the banknote recycling module 306.

In FIGS. 3Q and 3R, a banknote dispensing process using a banknote deposit withdrawal system, such as the banknote deposit-withdrawal system 313, is illustrated. In step 1*bd*, after a user has initiated either a single banknote or multiple banknotes withdrawal or dispense from a banknote recycling module 306 in the banknote deposit-withdrawal system, a single banknote or multiple banknotes in a serial manner are dispensed to a banknote transportation module 303 in a long edge leading edge orientation. In step 2*bd*, the banknote transportation module 303 transports the single banknote or the multiple banknotes dispensed by the banknote recycling module 306 towards a banknote sensing module 302 in a long edge leading edge orientation to verify the genuineness of the single banknote or each of the multiple banknotes, which are then sent to a banknote accepting module 301. In step 3*bd*, the banknote transportation module 303 delivers, in a long edge leading edge orientation, the genuine banknote or banknotes into the banknote accepting module 301. If performing a multiple banknotes withdrawal, at step 3*bd*, the multiple banknotes delivered serially into the banknote accepting module 301 are also gathered into a stack or bulk of collected banknotes. In step 4*bd*, the single banknote or the bulk of banknotes is transported to the user in a short edge leading edge orientation by the banknote accepting module 301.

It will be understood that the banknote deposit-withdrawal systems 311, 313, 315, 317, 319, 321, 323, and 325 are various examples of the banknote deposit-withdrawal system 300, and references to the banknote deposit-withdrawal system 300 within this disclosure can also apply to the banknote deposit-withdrawal systems 311, 313, 315, 317, 319, 321, 323, and 325 and any combination thereof.

Figure 4A:
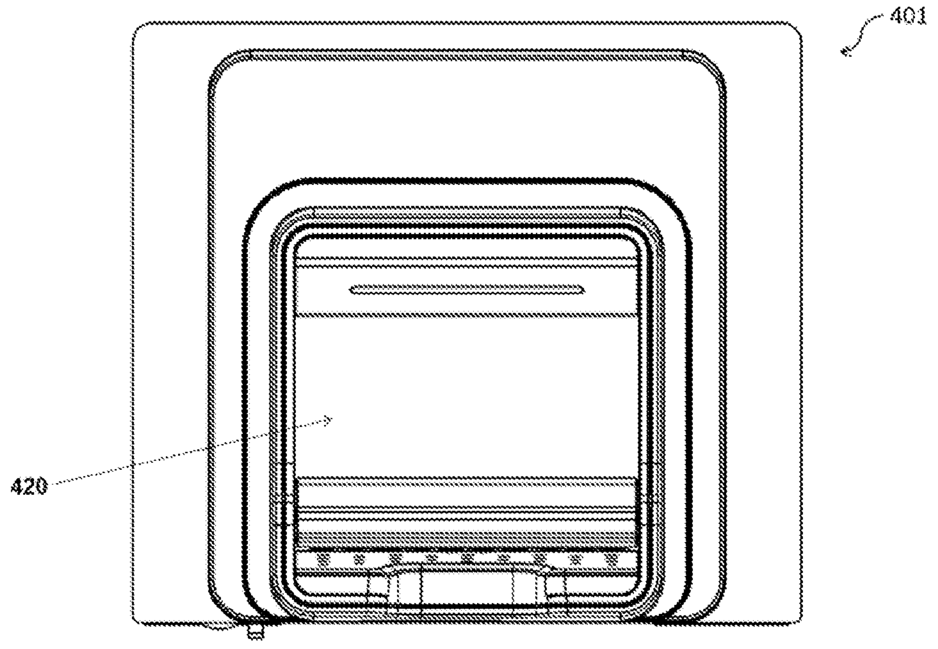
FIGS. 4A, 4B, 4C, 4D, 4E, and 4F illustrate various views of an example banknote accepting module in accordance with various embodiments of the present disclosure.
Figure 4B:
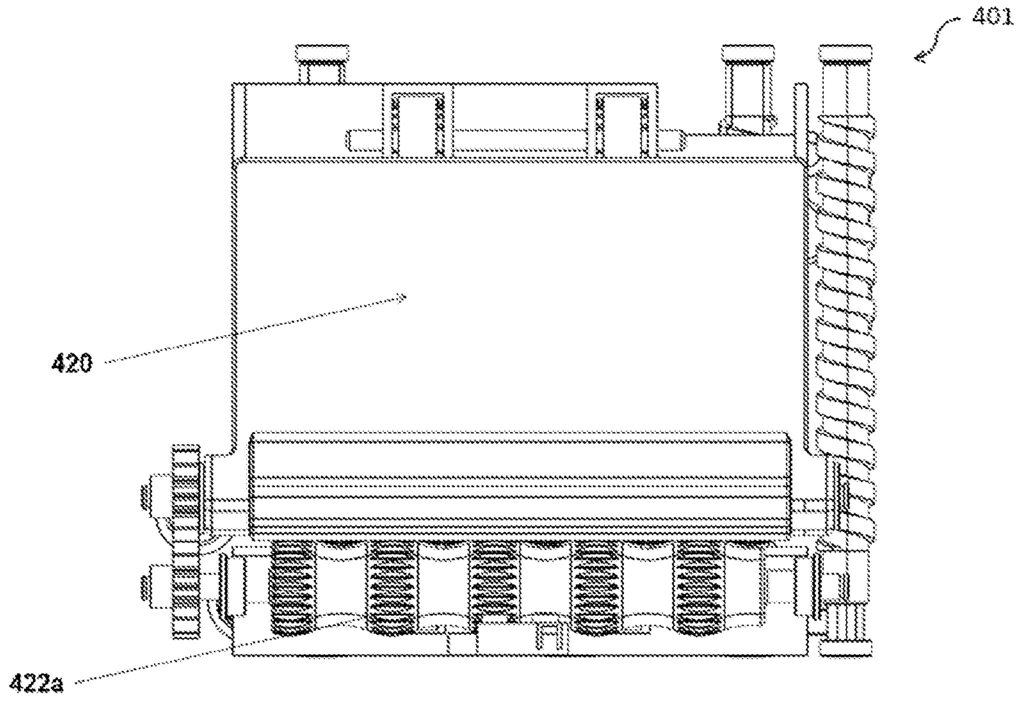
Figure 4C:
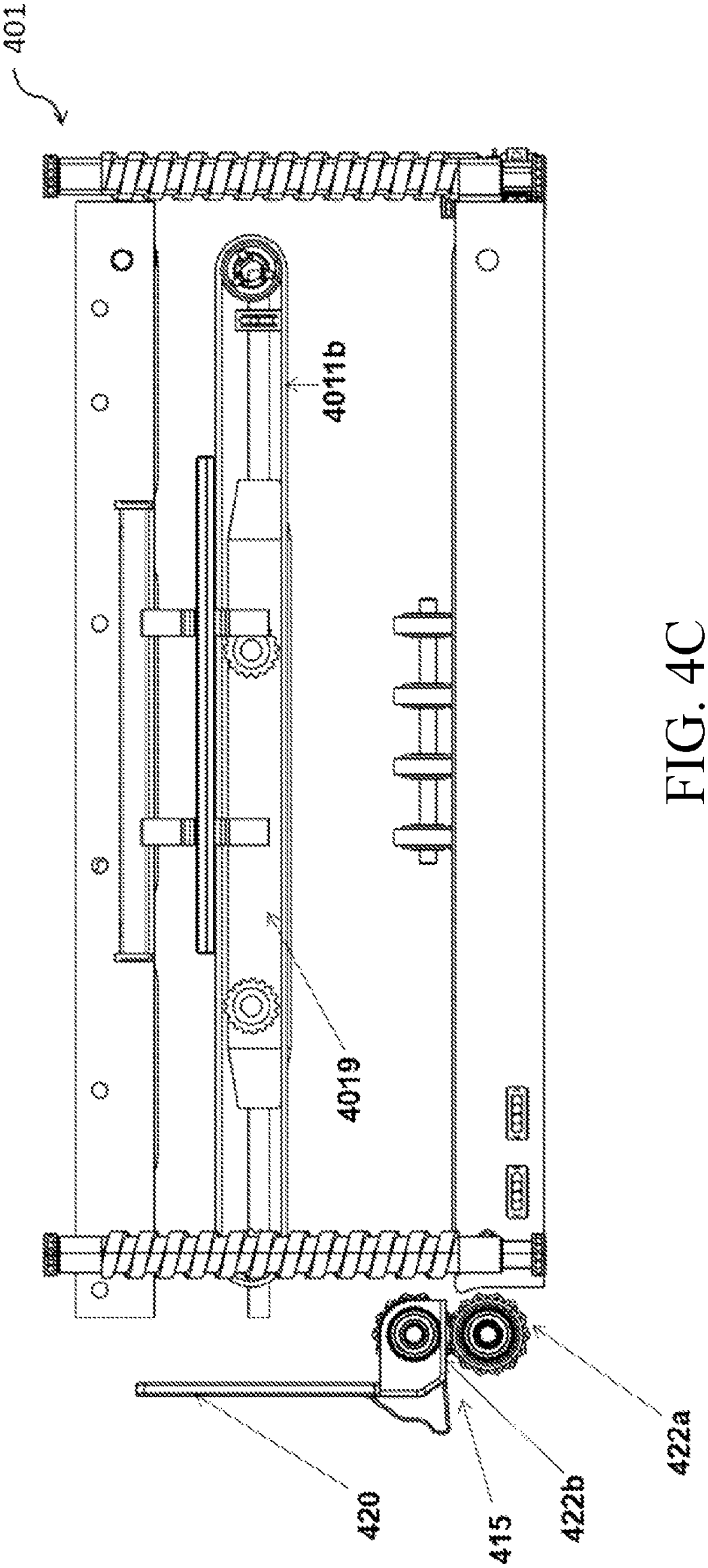
Figure 4D:
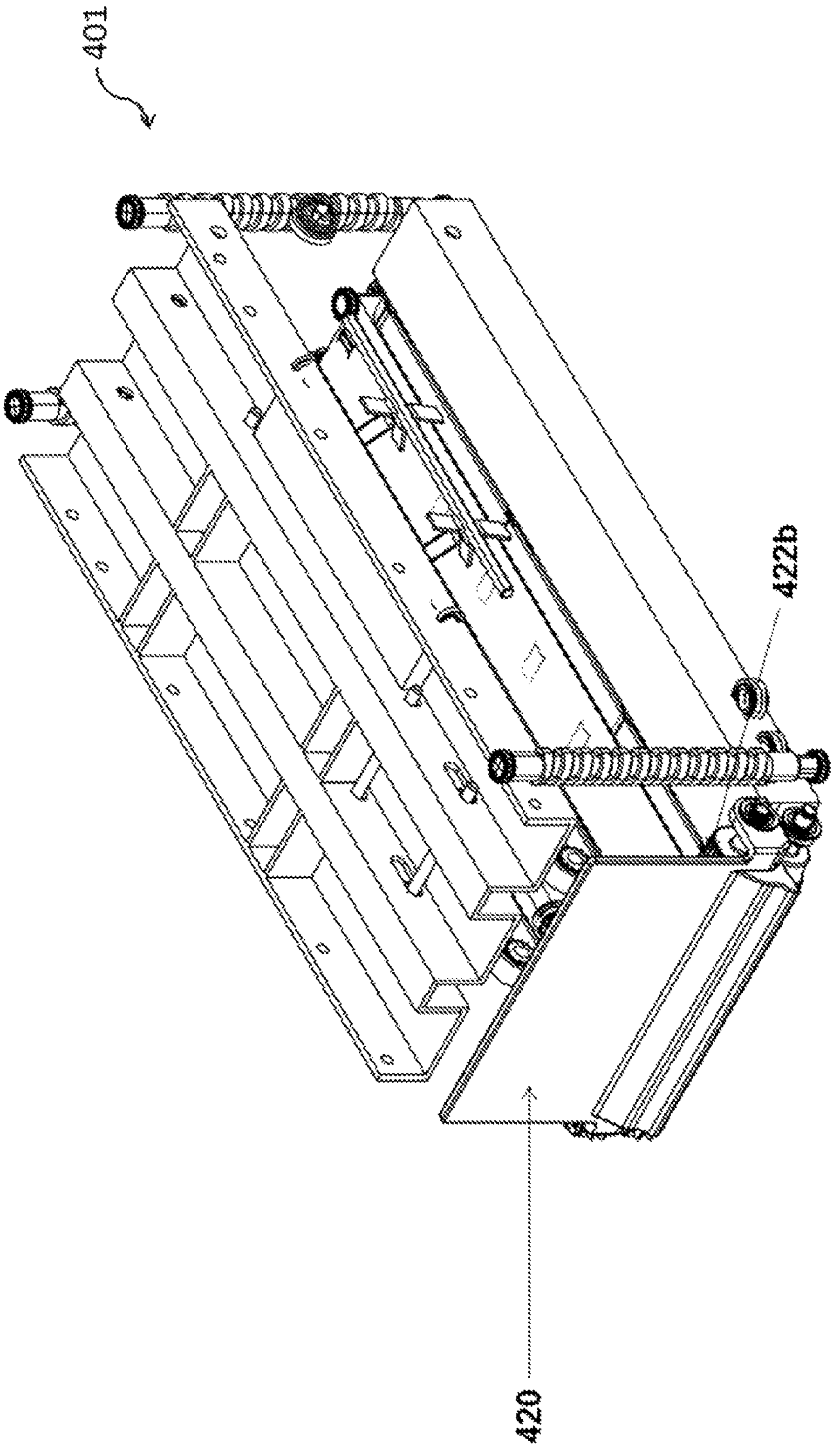
Figure 4E:
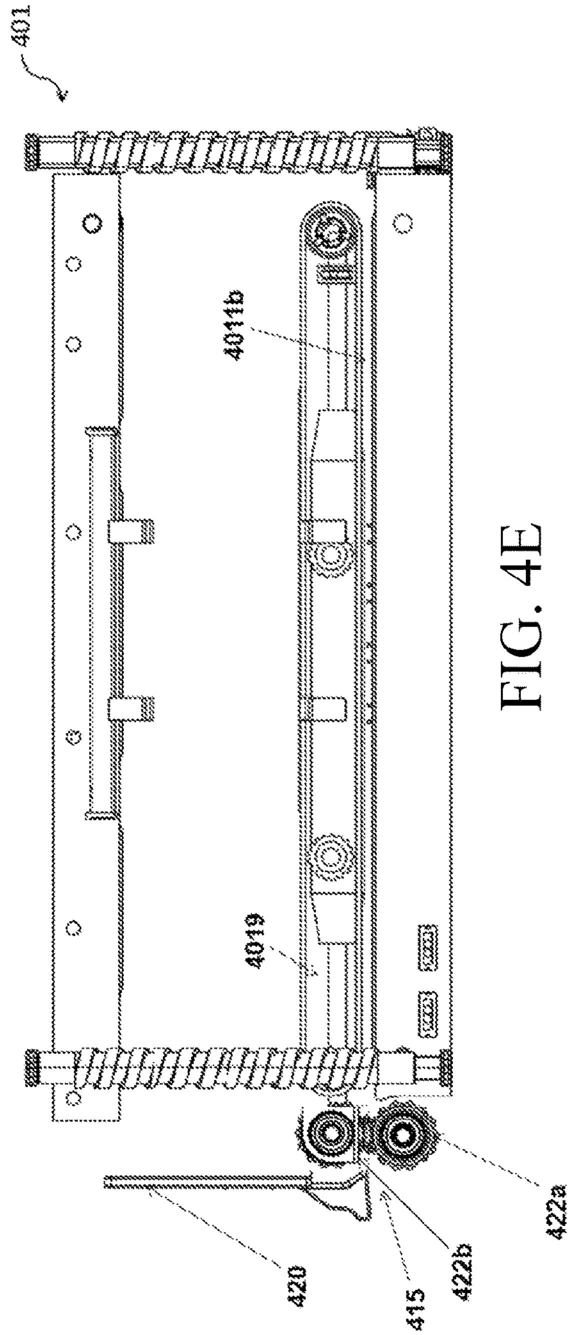
Figure 4F:
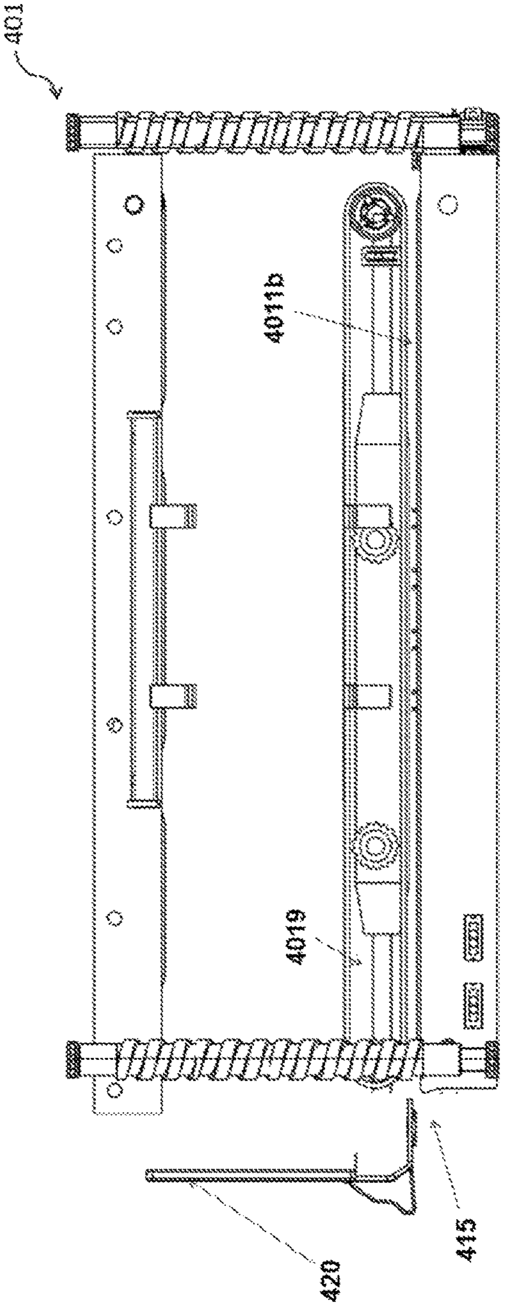

FIGS. 4A-4F illustrate various views of examples of a banknote accepting module 401 in accordance with various embodiments of the present disclosure. FIG. 4A illustrates a front view of an example banknote accepting module 401 in accordance with various embodiments of the present disclosure. FIG. 4B illustrates a front view of an example banknote accepting module 401 in accordance with various embodiments of the present disclosure. FIG. 4C illustrates a side view of an example banknote accepting module 401 in accordance with various embodiments of the present disclosure. FIG. 4D illustrates a perspective view of an example banknote accepting module 401 in accordance with various embodiments of the present disclosure. FIG. 4E illustrates a side view of an example banknote accepting module 401 in accordance with various embodiments of the present disclosure. FIG. 4F illustrates a side view of an example banknote accepting module 401 in accordance with various embodiments of the present disclosure.

FIGS. 4A-4D illustrate various views of one example banknote accepting module 401 in accordance with various embodiments of the present disclosure. An opening 415 in the banknote accepting module 401 to insert a banknote in a single banknote acceptance mode is opened between a roller 422*a* and a shutter 420. The shutter 420 is coupled with a roller 422*b*. In a single banknote acceptance mode, a user inserts a banknote between rollers 422*a* and 422*b* in short edge leading edge orientation. Upon detection of the banknote between rollers 422*a* and 422*b*, the rollers 422*a* and 422*b* are activated, and the banknote is pulled inside the banknote accepting module 401. A moveable platform 4019 is moved down to pinch the inserted banknote between the feeding belts 4011*a* (not shown) and 4011*b* on the moveable platform 4019. Once the inserted banknote is pinched, it is then pulled further into the banknote accepting module 401 towards the separation area.

FIG. 4E illustrates a side view of another example of a banknote accepting module 401 in accordance with various embodiments of the present disclosure. An opening 415 in the banknote accepting module 401 to insert a banknote in a single banknote acceptance mode is opened between a roller 422*a* and a shutter 420. The moveable platform 4019 is coupled with a roller 422*b*. In a single banknote acceptance mode, a user inserts a banknote between rollers 422*a* and 422*b* in short edge leading edge orientation. Upon detection of the banknote between rollers 422*a* and 422*b*, the rollers 422*a* and 422*b* are activated, and the banknote is pulled inside the banknote accepting module 401. A moveable platform 4019 is moved down to pinch the inserted banknote between the feeding belts 4011*a* (not shown) and 4011*b* on the moveable platform 4019. Once the inserted banknote is pinched, it is then pulled further into the banknote accepting module 401 towards the separation area.

FIG. 4F illustrates a side view of another example banknote accepting module 401 in accordance with various embodiments of the present disclosure. An opening 415 in the banknote accepting module 401 to insert a banknote in a single banknote acceptance mode is opened between a moveable platform 4019 and a base of the opening 415. In a single banknote acceptance mode, a user inserts a banknote in the opening. Upon detection of the banknote in the opening 415, the banknote is pulled inside the banknote accepting module 401, such as by belts within the banknote accepting module 401. A moveable platform 4019 is moved down to pinch the inserted banknote between the feeding belts 4011*a* (not shown) and 4011*b* on the moveable platform 4019. Once the inserted banknote is pinched, it is then pulled further into the banknote accepting module 401 towards the separation area.

In other embodiments of a banknote accepting module 401 in accordance with various embodiments of the present disclosure, feeding rollers could be used to move and pinch an inserted banknote. In other embodiments of a banknote accepting module 401 in accordance with various embodiments of the present disclosure, the moveable platform 4019 is moved up to pinch the inserted banknote between the moveable platform 4019 and top of the opening 415. In this embodiment, the shutter 420 moves down to the bottom to open the opening 415.

In other embodiments, the moveable shutter 420 can show an indicia to indicate an operating mode of the banknote deposit-withdrawal system 300. In other embodiments, the moveable shutter 420 can be made of multiple moving plates such that the opening 415 can be formed by moving more than one plates. In other embodiments, the moveable shutter 420 can be made out of a mesh allowing user a view of the moveable platform 4019. In other embodiments, the moveable shutter 420 can include at least a window to allow user a view of the moveable platform 4019. In other embodiments, the moveable shutter 420 can include a transparent plate to allow user a view of the moveable platform 4019. In other embodiments, the moveable shutter 420 can include a display to show user text and video messages. In this embodiments, text and video messages can be advertisement or instructions regarding how to perform routine maintenance on the banknote deposit-withdrawal system 300.

Figure 5A:
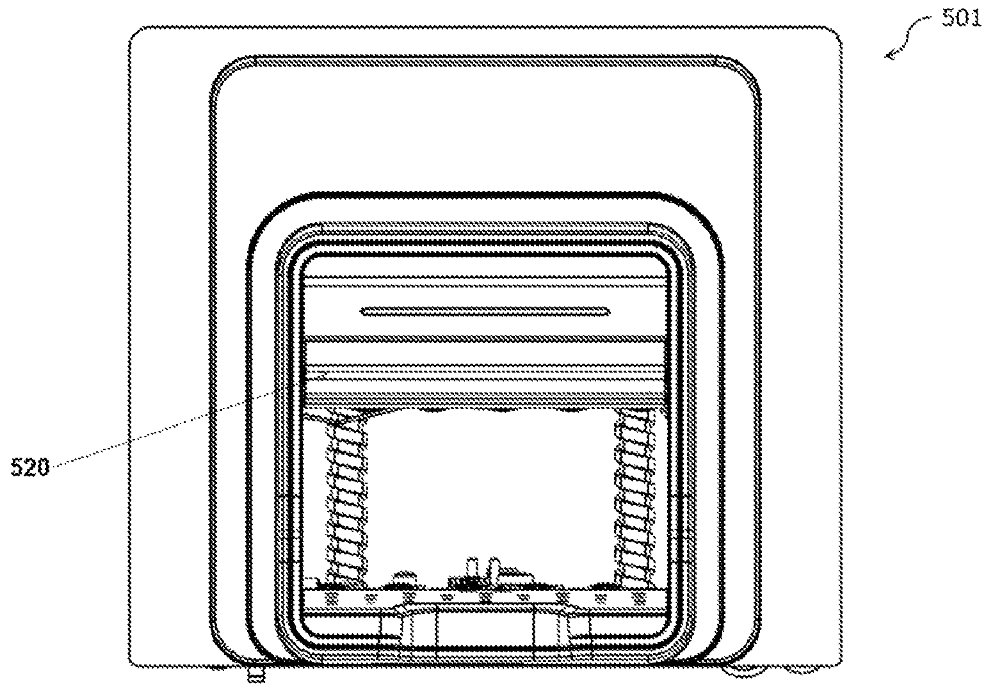
FIGS. 5A, 5B, 5C, 5D, 5E, and 5F illustrate various views of an example banknote accepting module in accordance with various embodiments of the present disclosure.
Figure 5B:
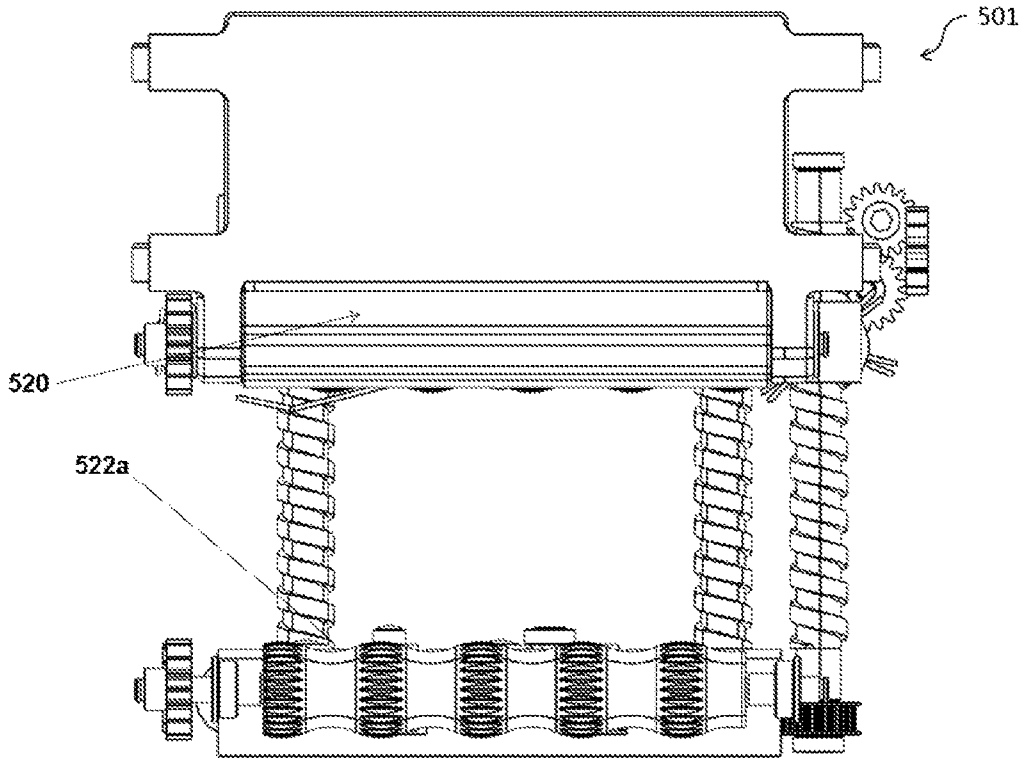
Figure 5C:
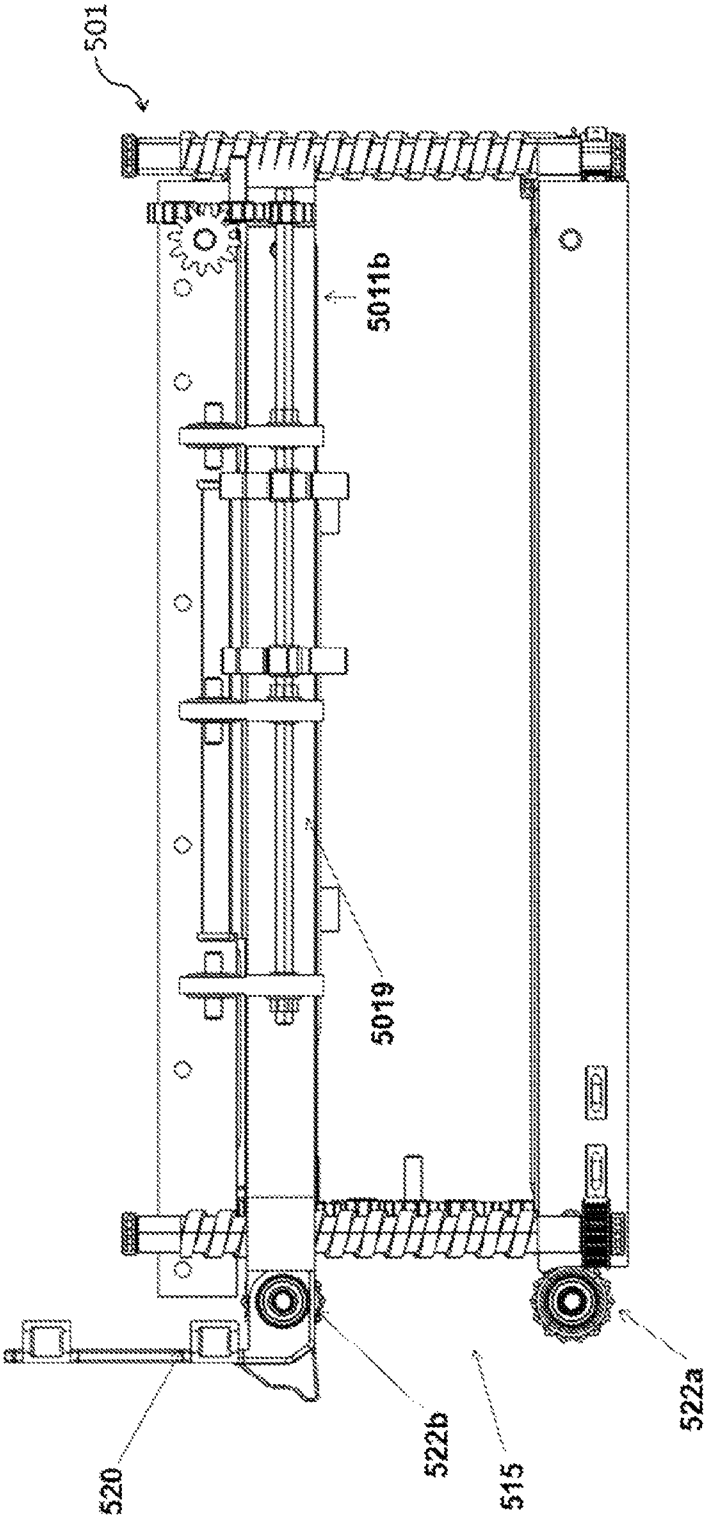
Figure 5D:
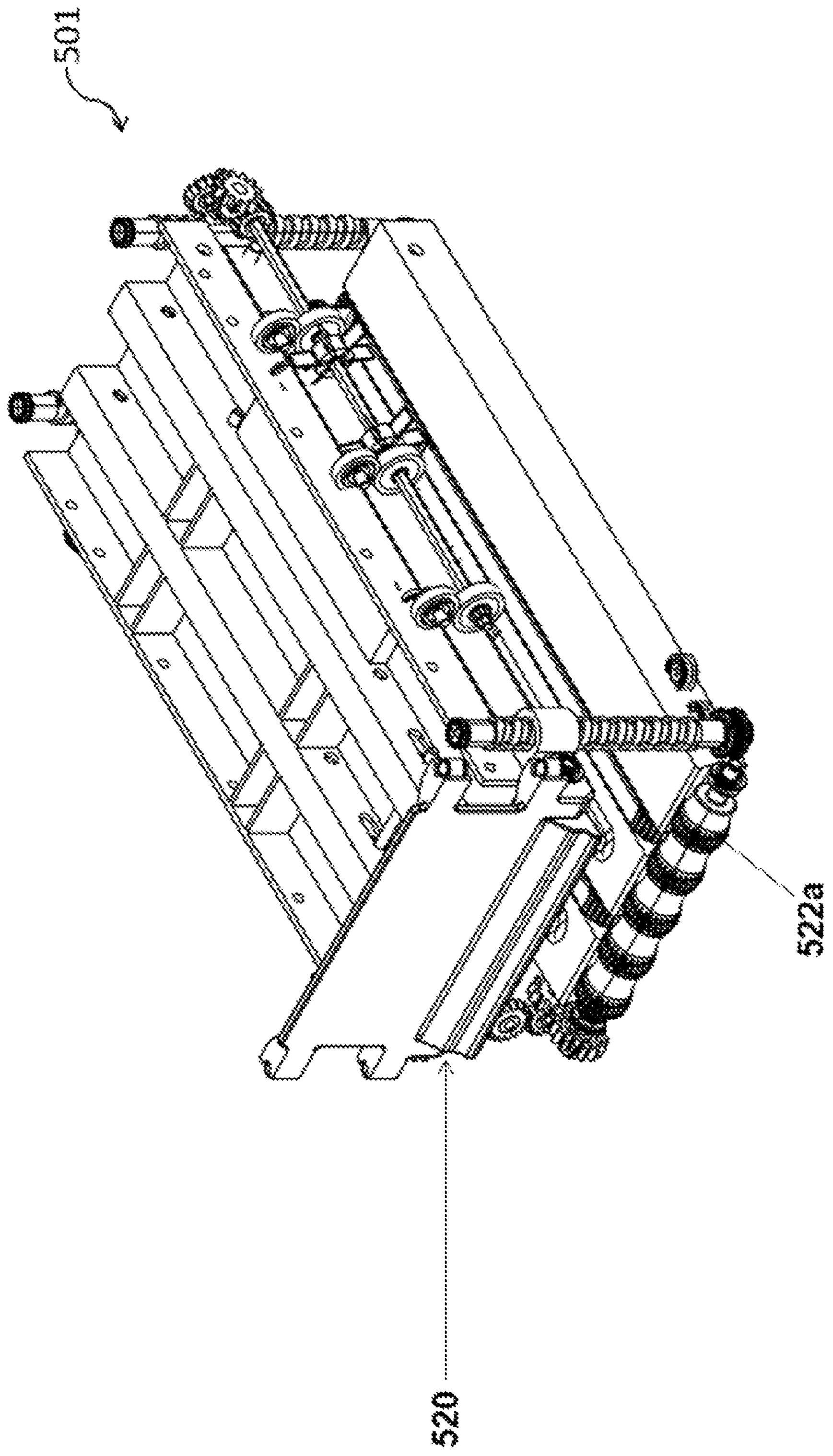
Figure 5E:
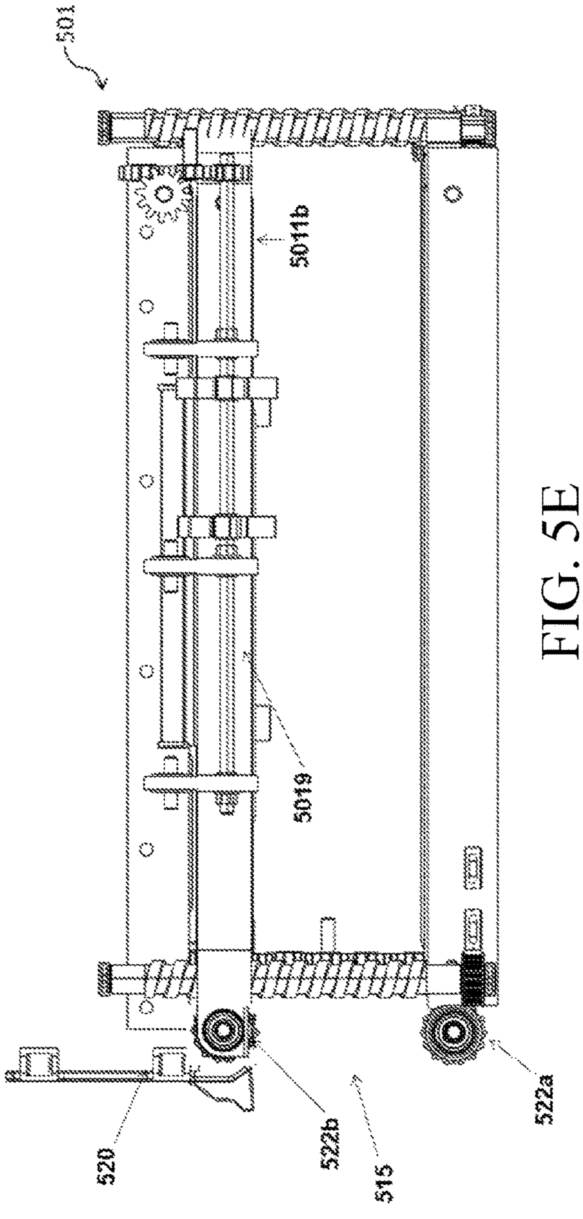
Figure 5F:
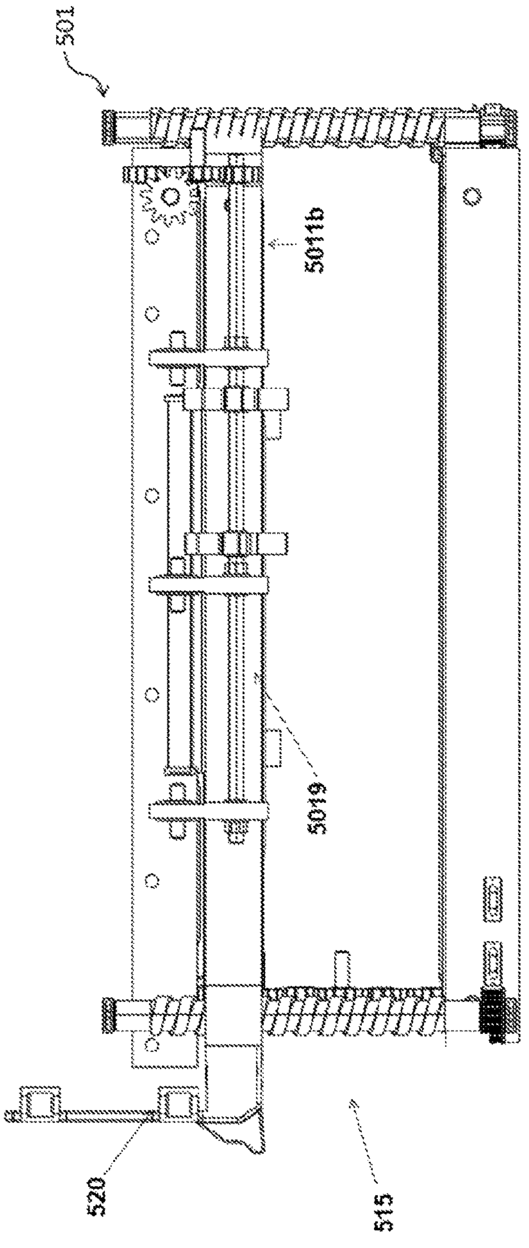

FIGS. 5A-5F illustrate various views examples of a banknote accepting module 501 in accordance with various embodiments of the present disclosure. FIG. 5A illustrates a front view of an example banknote accepting module 501 in accordance with various embodiments of the present disclosure. FIG. 5B illustrates a front view of an example banknote accepting module 501 in accordance with various embodiments of the present disclosure. FIG. 5C illustrates a side view of an example banknote accepting module 501 in accordance with various embodiments of the present disclosure. FIG. 5D illustrates a perspective view of an example banknote accepting module 501 in accordance with various embodiments of the present disclosure. FIG. 5E illustrates a side view of an example banknote accepting module 501 in accordance with various embodiments of the present disclosure. FIG. 5F illustrates a side view of an example banknote accepting module 501 in accordance with various embodiments of the present disclosure.

FIGS. 5A-5D illustrate various views of one example banknote accepting module 501 in accordance with various embodiments of the present disclosure. An opening 515 in the banknote accepting module 401 to insert a banknote in a bulk banknote acceptance mode is opened between a roller 522*a* and a shutter 520. The shutter 520 is coupled with a roller 522*b*. In a bulk banknote acceptance mode, a user inserts a bulk of banknotes between rollers 522*a* and 522*b* in short edge leading edge orientation. Upon detection of the bulk of banknotes between rollers 522*a* and 522*b*, the moveable platform 5019 is moved down to pinch the inserted banknote between the feeding belts 5011*a* (not shown) and 5011*b* on the moveable platform 5019. The rollers 522*a* and 522*b* and feeding belts 5011*a* and 5011*b* are then activated, and the bulk of banknotes is pulled inside the banknote accepting module 501 towards the separation area. If the inserted bulk of banknotes is to be rejected in its entirety, then the feeding belts 5011*a* and 5011*b* push the bulk of the banknotes out of the banknote accepting module 501 in short edge leading edge orientation by rotating in reverse.

FIG. 5E illustrates a side view of another example banknote accepting module 501 in accordance with various embodiments of the present disclosure. An opening 515 in the banknote accepting module 501 to insert a bulk of banknotes in a bulk banknote acceptance mode is opened between a roller 522*a* and a shutter 520. The moveable platform 5019 is coupled with a roller 522*b*. In a bulk banknote acceptance mode, a user inserts a bulk of banknotes between rollers 522*a* and 522*b* in short edge leading edge orientation. Upon detection of the bulk of banknotes between rollers 522*a* and 522*b*, the rollers 522*a* and 522*b* are activated, and the bulk of banknotes is pulled inside the banknote accepting module 501. A moveable platform 5019 is moved down to pinch the inserted bulk of banknotes between the feeding belts 5011*a* (not shown) and 5011*b* on the moveable platform 5019. Once the inserted bulk of banknotes is pinched, it is then pulled further into the banknote accepting module 501 towards the separation area.

FIG. 5F illustrates a side view of another example banknote accepting module 501 in accordance with various embodiments of the present disclosure. An opening 515 in the banknote accepting module 501 to insert a bulk of banknotes in a bulk banknote acceptance mode is opened between a moveable platform 5019 and base of the opening 515. In a bulk banknote acceptance mode, a user inserts a bulk of banknotes in the opening 515. Upon detection of the bulk of banknotes in the opening 515, the bulk of banknotes is pulled inside the banknote accepting module 501. A moveable platform 5019 is moved down to pinch the inserted bulk of banknotes between the feeding belts 5011*a* (not shown) and 5011*b* on the moveable platform 5019. Once the inserted banknote is pinched, it is then pulled further into the banknote accepting module 501 towards the separation area.

In other embodiments of a banknote accepting module 501 in accordance with various embodiments of the present disclosure, feeding rollers could be used to move pinch inserted banknote. In other embodiments, of a banknote accepting module 501 in accordance with various embodiments of the present disclosure, the moveable platform 5019 is moved up to pinch the inserted banknote between the moveable platform 5019 and top of the opening 515. In this embodiment, the shutter 520 moves down to the bottom to open the opening 515.

In other embodiments, the moveable shutter 520 can show an indicia to indicate operating mode of the banknote deposit-withdrawal system 300. In other embodiments, the moveable shutter 520 can be made of multiple moving plates such that the opening 515 can be formed by moving more than one plates. In other embodiments, the moveable shutter 520 can be made out of a mesh allowing user a view of the moveable platform 5019. In other embodiments, the moveable shutter 520 can include at least a window to allow user a view of the moveable platform 5019. In other embodiments, the moveable shutter 520 can include a transparent plate to allow user a view of the moveable platform 5019. In other embodiments, the moveable shutter 520 can include a display to show user text and video messages. In this embodiments, text and video messages can be advertisement or instructions regarding how to perform routine maintenance on the banknote deposit-withdrawal system 300.

Figure 6A:
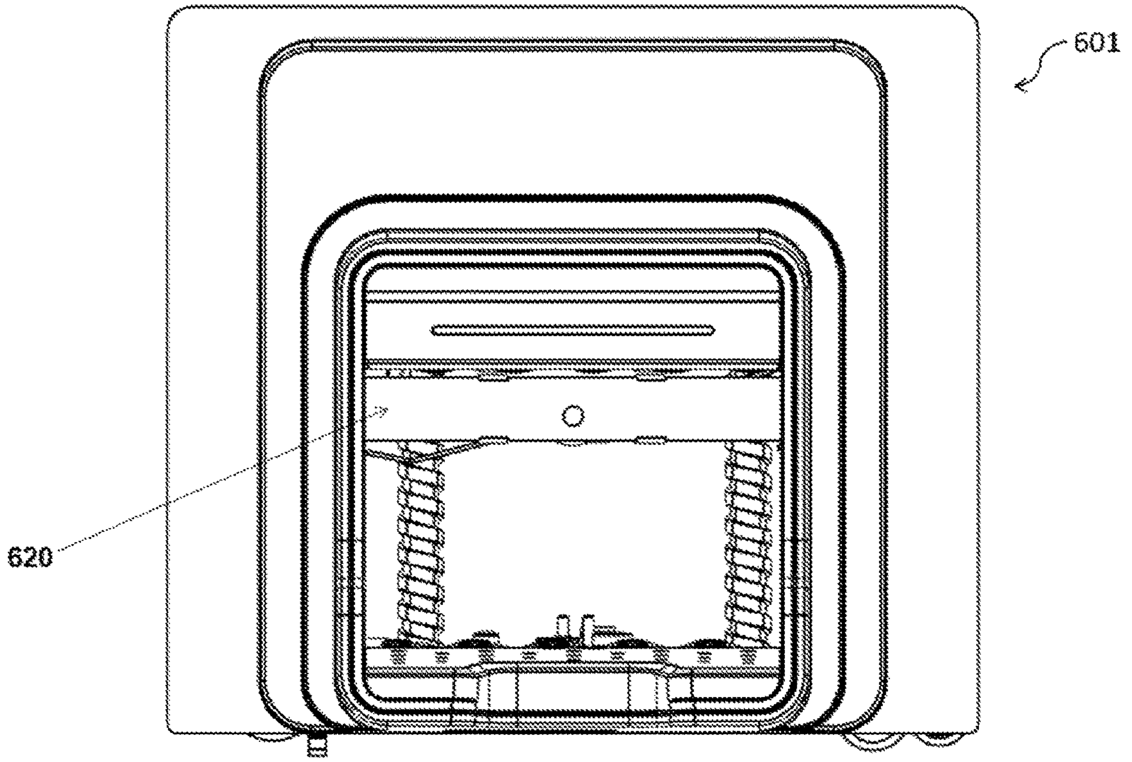
FIGS. 6A, 6B, 6C, 6D, 6E, 6F, and 6G illustrate various views of an example banknote accepting module in accordance with various embodiments of the present disclosure.
Figure 6B:
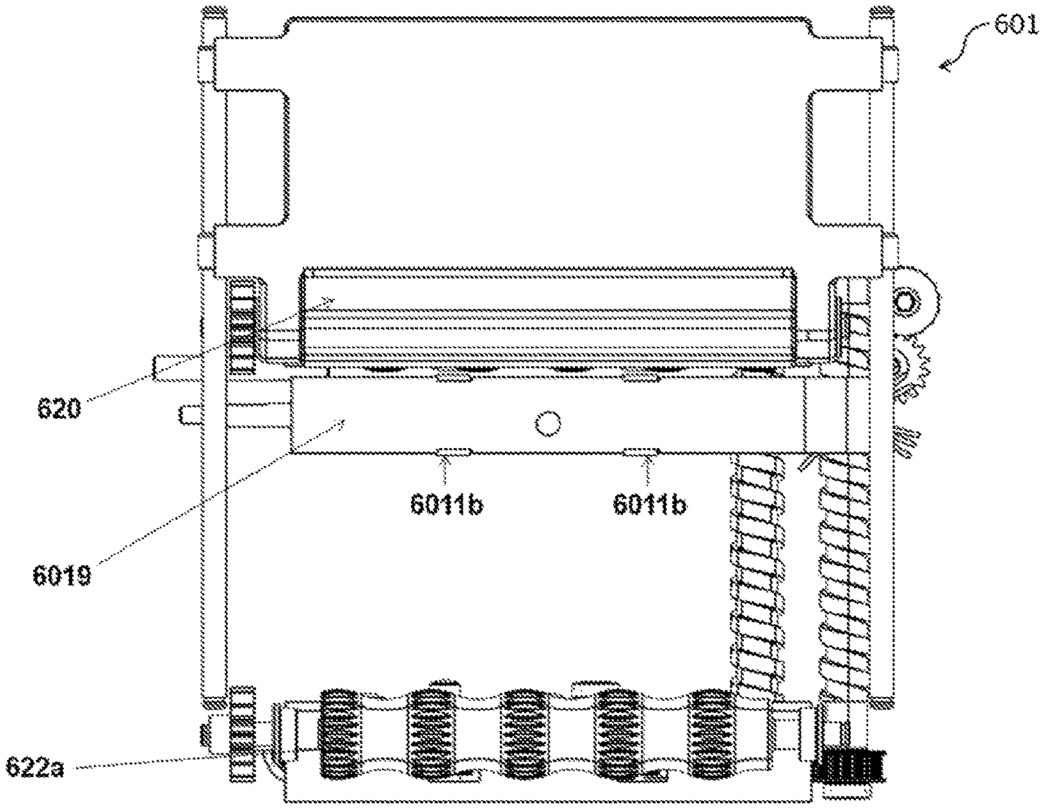
Figure 6C:
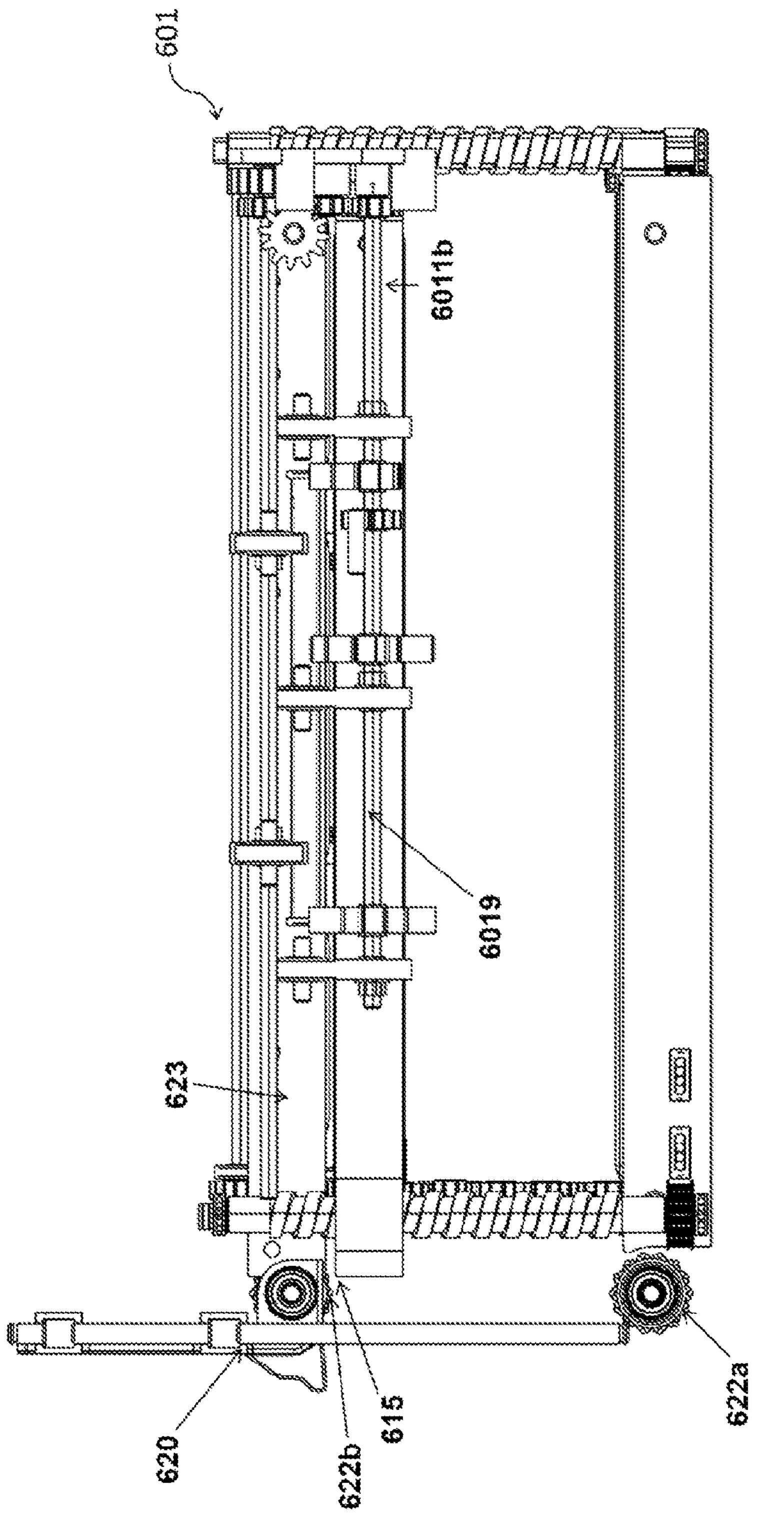
Figure 6D:
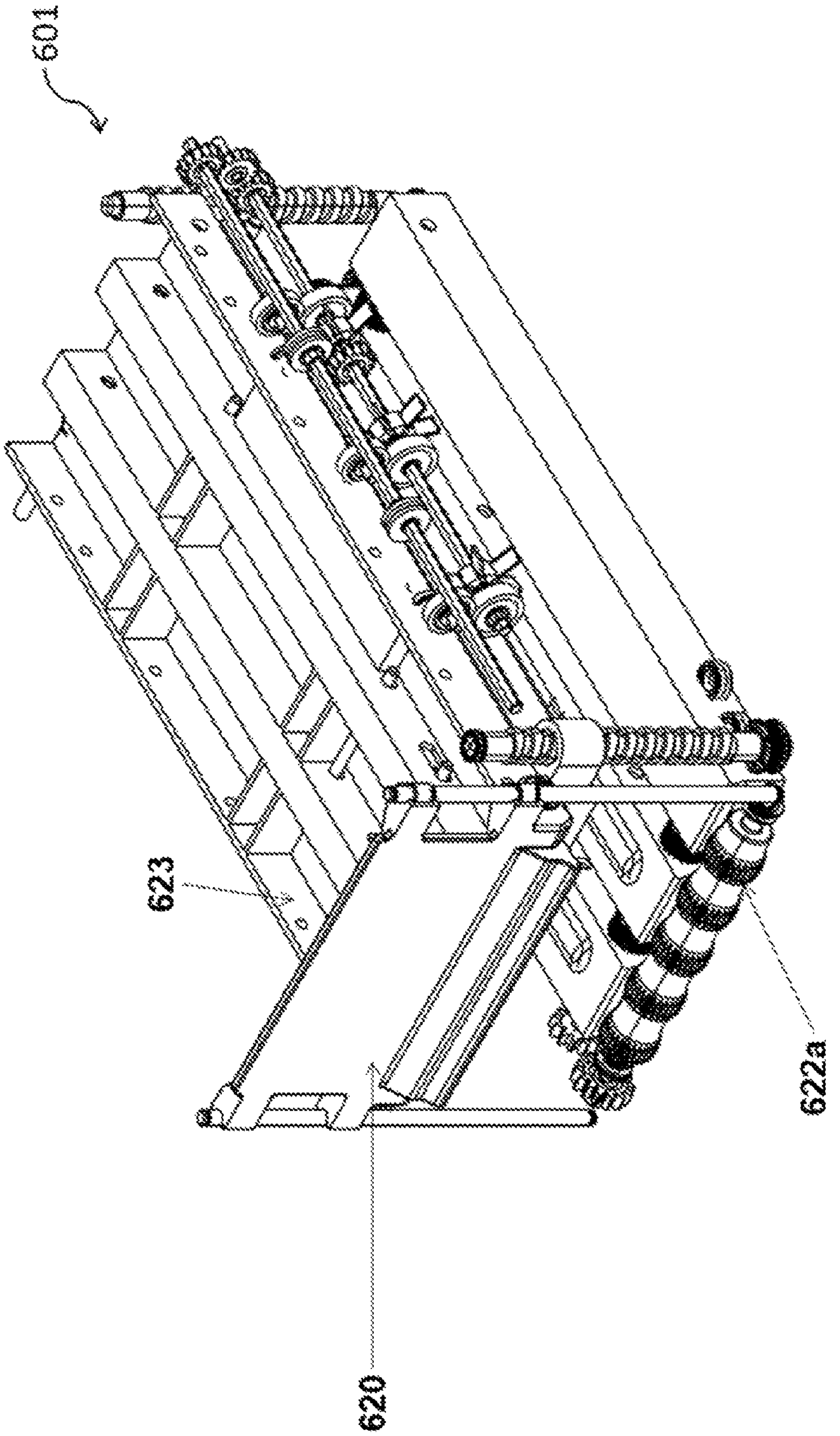
Figure 6E:
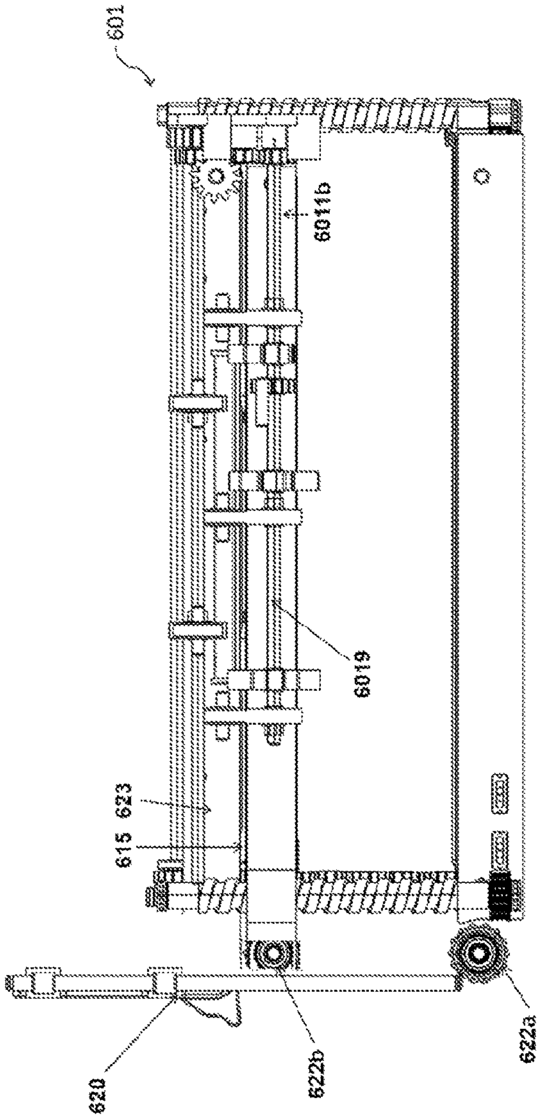
Figure 6F:
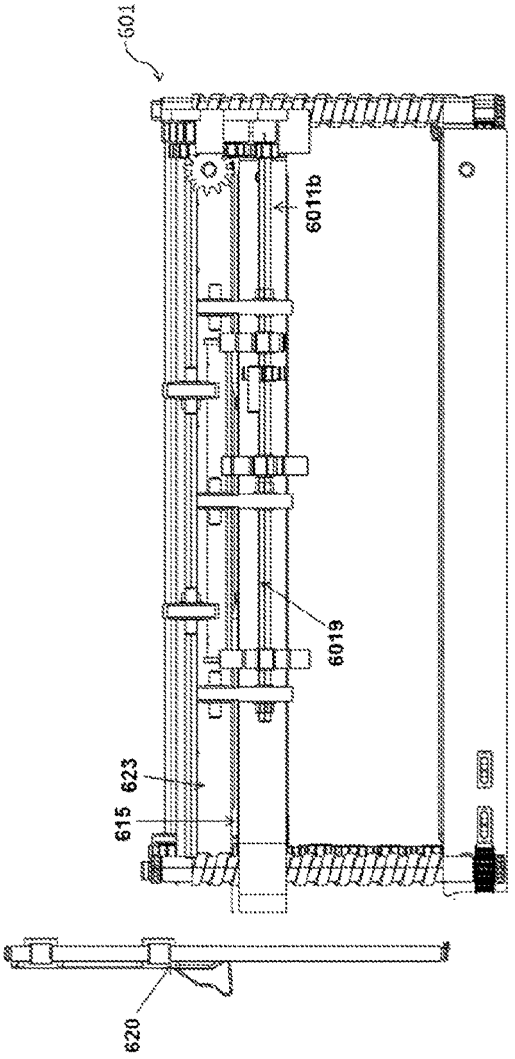
Figure 6G:
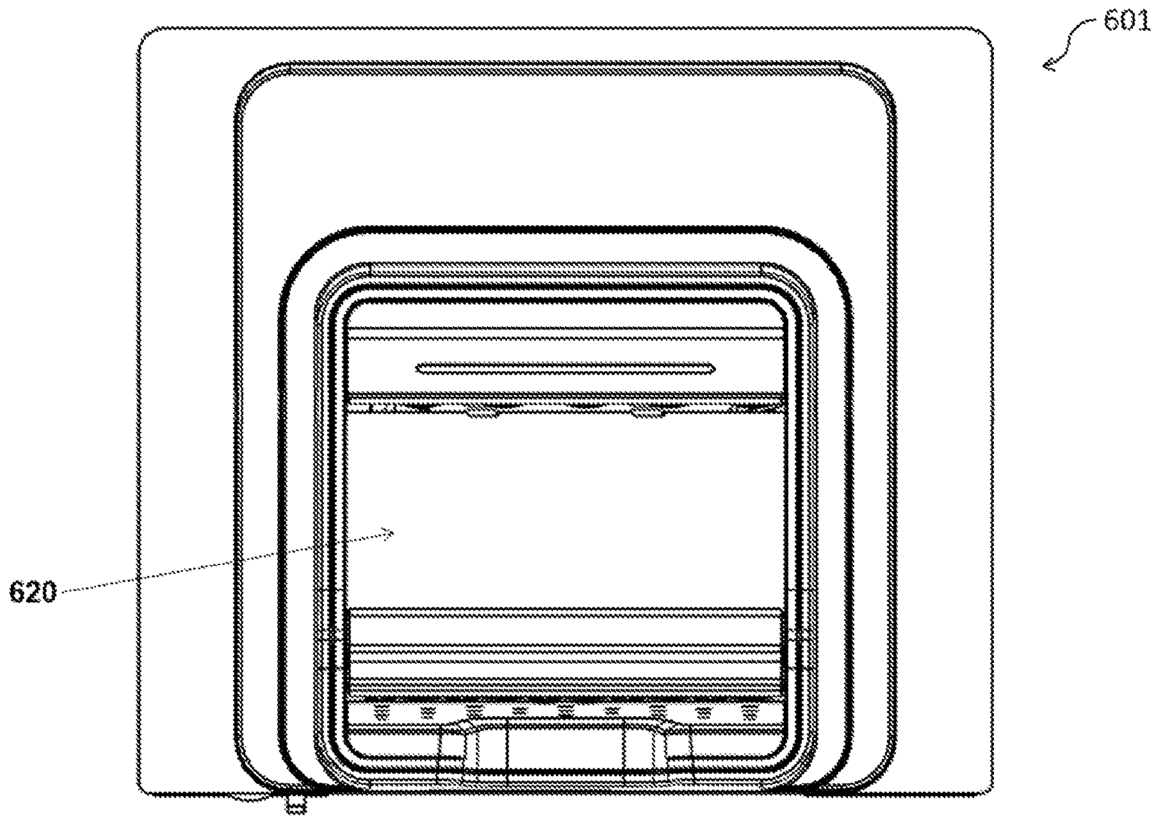

FIGS. 6A-6G illustrate various views of examples of a banknote accepting module 601 in accordance with various embodiments of the present disclosure. FIG. 6A illustrates a front view of an example banknote accepting module 601 in accordance with various embodiments of the present disclosure. FIG. 6B illustrates a front view of an example banknote accepting module 601 in accordance with various embodiments of the present disclosure. FIG. 6C illustrates a side view of an example banknote accepting module 601 in accordance with various embodiments of the present disclosure. FIG. 6D illustrates a perspective view of an example banknote accepting module 601 in accordance with various embodiments of the present disclosure. FIG. 6E illustrates a side view of an example banknote accepting module 601 in accordance with various embodiments of the present disclosure. FIG. 6F illustrates a side view of an example banknote accepting module 601 in accordance with various embodiments of the present disclosure. FIG. 6G illustrates a front view of an example banknote accepting module 601 in accordance with various embodiments of the present disclosure.

FIGS. 6A-6D illustrate various views of one example banknote accepting module 601 in accordance with various embodiments of the present disclosure. An opening 615 in the banknote accepting module 601 to reject or dispense a banknote in a banknote reject or dispense mode is opened between a roller 622*b* and a moveable platform 6019. The shutter 620 is coupled with a roller 622*b*. In a banknote reject or dispense mode, a user is provided a banknote between rollers 622*b* and the moveable platform 6019 in short edge leading edge orientation. Once the banknote for rejection or dispensation is collected on top of the moveable platform 6019 in long edge leading edge orientation, the moveable platform 6019 moves upward to pinch the banknote to belts 6011*b* and 6011*c* (not shown) on bottom of the top surface 623 of the banknote accepting module 601. Once a banknote to be dispensed is pinched between belts 6011*b* and 6011*c* are driven to push the banknote out of the banknote accepting module 601 in a short edge leading edge orientation.

FIG. 6E illustrates a side view of another example banknote accepting module 601 in accordance with various embodiments of the present disclosure. An opening 615 in the banknote accepting module 601 to reject or dispense a banknote in a banknote reject or dispense mode is opened between a roller 622*b* and a moveable platform 6019. The moveable platform 6019 is coupled with a roller 622*b*. In a banknote reject or dispense mode, a user is provided a banknote between rollers 622*b* and the moveable platform 6019 in short edge leading edge orientation. Once the banknote for rejection or dispensation is collected on top of the moveable platform 6019 in long edge leading edge orientation, the moveable platform 6019 moves upward to pinch the banknote to belts 6011*b* and 6011*c* (not shown) on bottom of the top surface 623 of the banknote accepting module 601. Once a banknote to be dispensed is pinched between belts 6011*b* and 6011*c* are driven to push the banknote out of the banknote accepting module 601 in a short edge leading edge orientation.

FIG. 6F illustrates a side view of another example banknote accepting module 601 in accordance with various embodiments of the present disclosure. An opening 615 in the banknote accepting module 601 to reject or dispense a banknote in a banknote reject or dispense mode is opened between a shutter 620 and a moveable platform 6019. In a banknote reject or dispense mode, a user is provided a banknote between the shutter 620 and the moveable platform 6019 in short edge leading edge orientation. Once the banknote for rejection or dispensation is collected on top of the moveable platform 6019 in long edge leading edge orientation, the moveable platform 6019 moves upward to pinch the banknote to belts 6011*b* and 6011*c* (not shown) on bottom of the top surface 623 of the banknote accepting module 601. Once a banknote to be dispensed is pinched between belts 6011*b* and 6011*c* are driven to push the banknote out of the banknote accepting module 601 in a short edge leading edge orientation.

FIG. 6G illustrates a front view of another example banknote accepting module 601 in accordance with various embodiments of the present disclosure. The shutter 620 can have an opening in the banknote accepting module 601 to reject or dispense a banknote in a banknote reject or dispense mode. In other embodiments, the shutter 620 can be made out of multiple pieces. By moving these pieces of shutter can move around and create an opening 615 to reject or dispense a banknote in a banknote reject or dispense mode. In other embodiments, the moveable shutter 620 can be made of multiple moving plates such that the opening 615 can be formed by moving more than one plates.

In an embodiment where multiple banknotes are to be rejected or dispensed, all banknotes are collected on top of the moveable platform 6019. Once all banknotes are collected on top of the moveable platform 6019, the moveable platform 6019 moves upward to pinch collected banknotes between belts 6011*b* and 6011*c*. Once the banknotes for rejection or dispensation are pinched, belts 6011*b* and 6011*c* are driven to push the banknotes out of the banknote accepting module 601 in a short edge leading edge orientation.

In other embodiments of a banknote accepting module 601 in accordance with various embodiments of the present disclosure, feeding rollers could be used to move pinch inserted banknote. In other embodiments, of a banknote accepting module 601 in accordance with various embodiments of the present disclosure, the moveable platform 6019 is moved up to pinch the inserted banknote between the moveable platform 6019 and top of the opening 615. In this embodiment, the shutter 620 moves down to the bottom to open the opening 615.

In other embodiments, the moveable shutter 620 can show an indicia to indicate operating mode of the banknote deposit-withdrawal system 300. In other embodiments, the moveable shutter 620 can be made out of a mesh allowing user a view of the moveable platform 6019. In other embodiments, the moveable shutter 620 can include at least a window to allow user a view of the moveable platform 6019. In other embodiments, the moveable shutter 620 can include a transparent plate to allow user a view of the moveable platform 6019. In other embodiments, the moveable shutter 620 can include a display to show user text and video messages. In this embodiments, text and video messages can be advertisement or instructions regarding how to perform routine maintenance on the banknote deposit-withdrawal system 300.

Figure 7A:
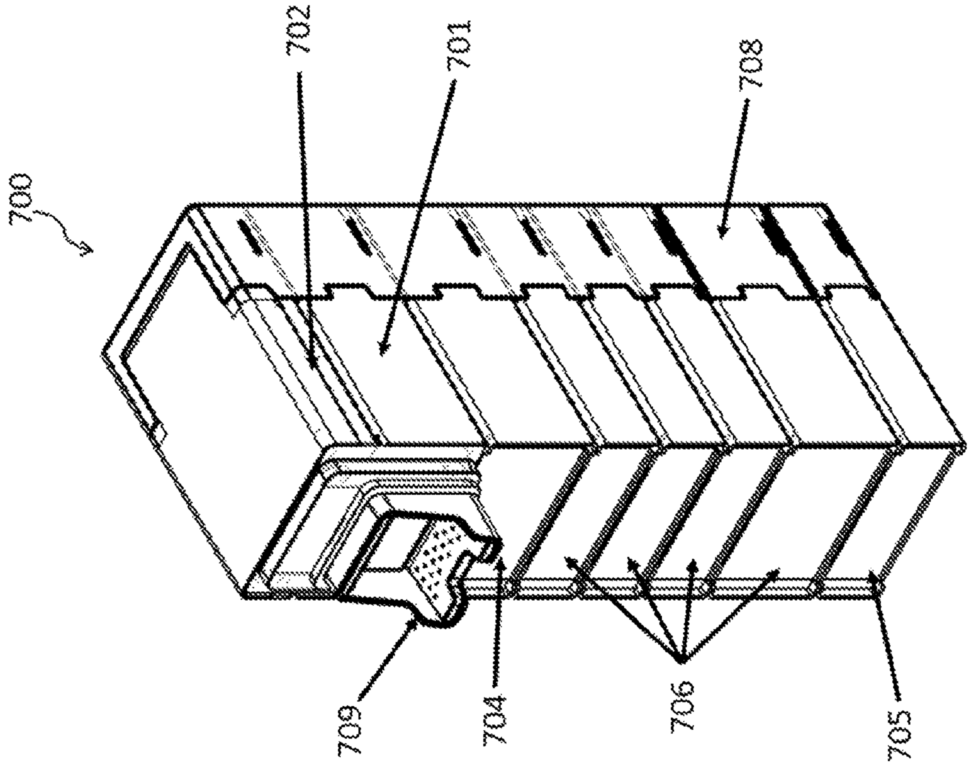
FIGS. 7A, 7B, 7C, 7D, 7E, 7F, 7G, 7H, 7I, 7J, 7K, 7L, 7M, and 7N illustrate various views of an example banknote deposit-withdrawal system in accordance with various embodiments of the present disclosure.
Figure 7B:
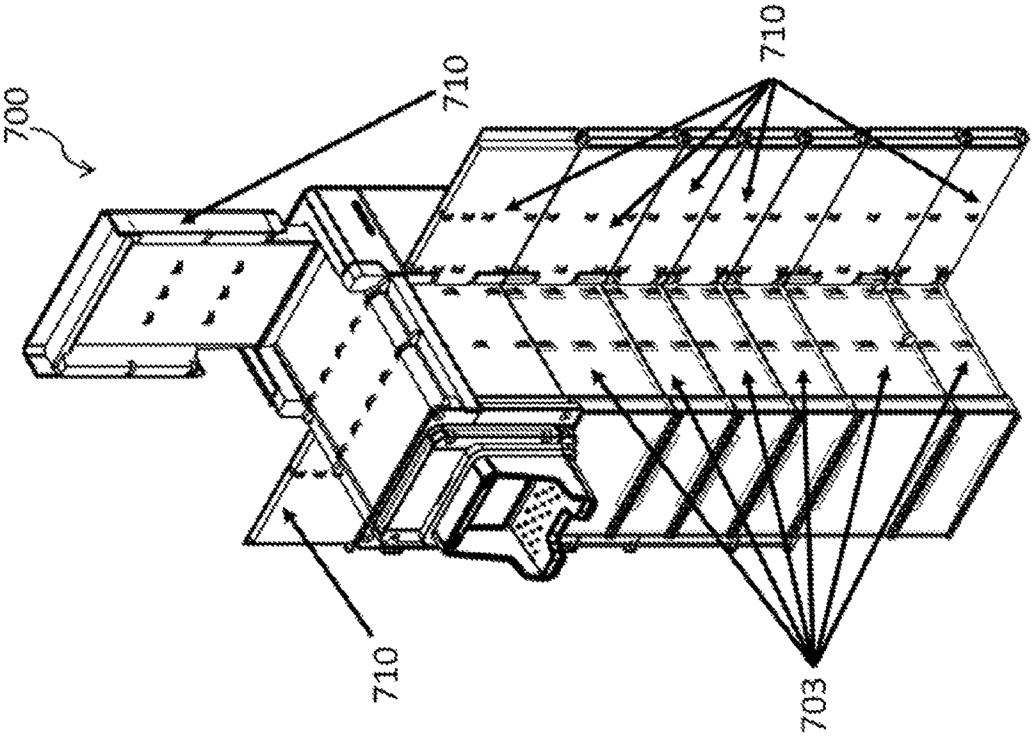
Figure 7D:
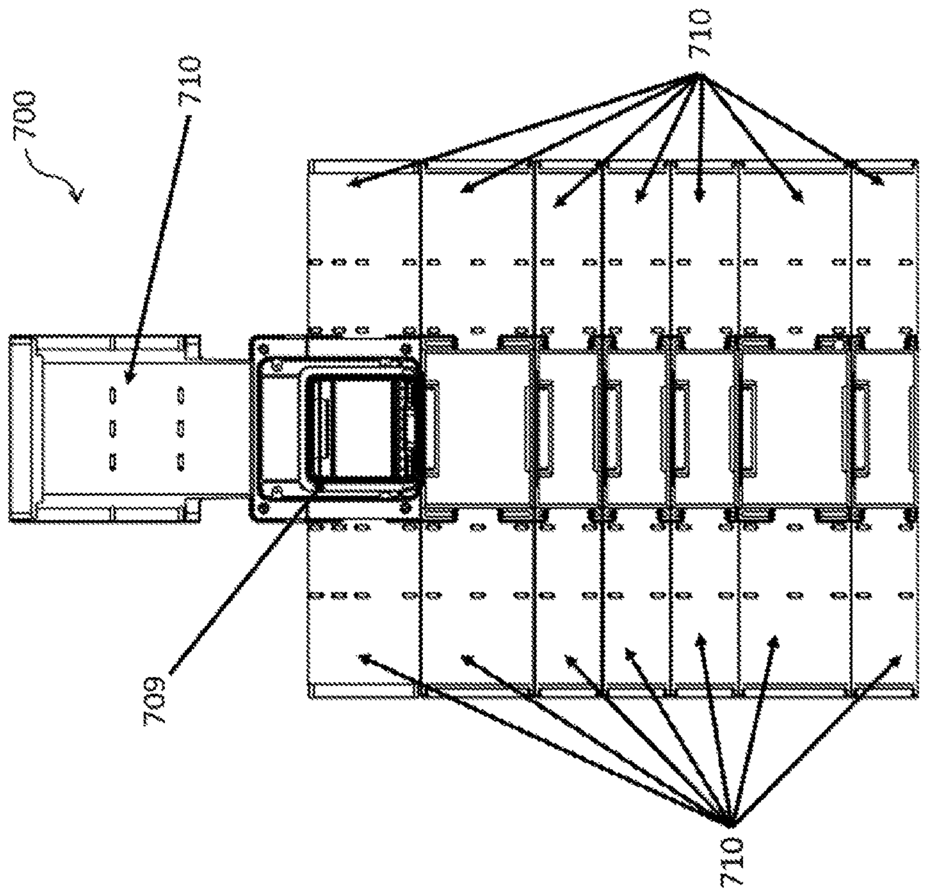
Figure 7C:
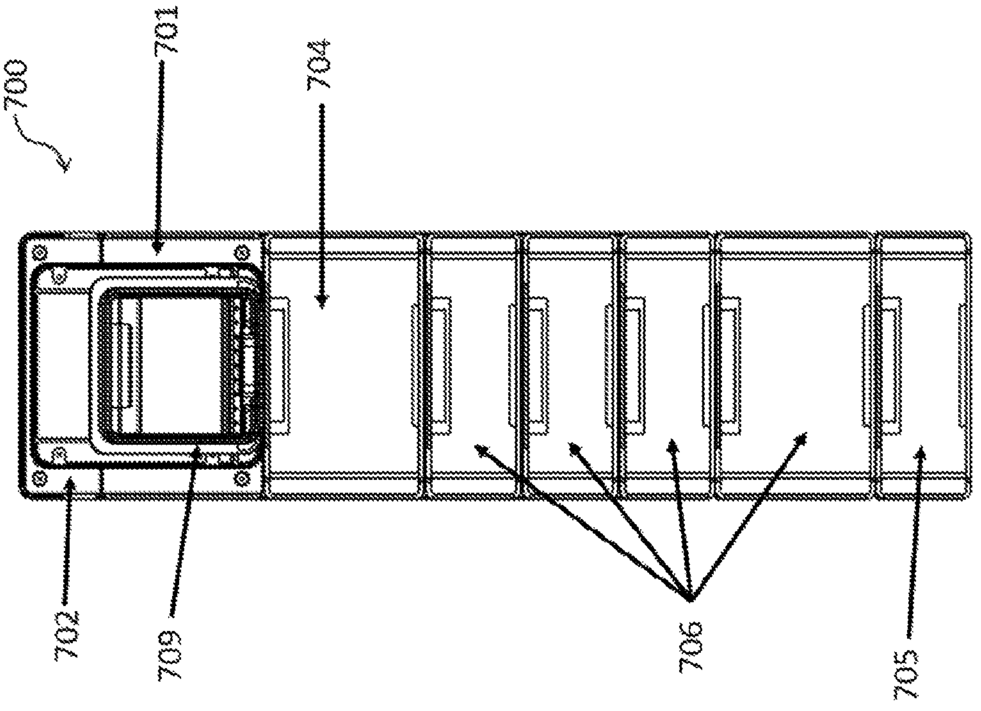
Figure 7F:
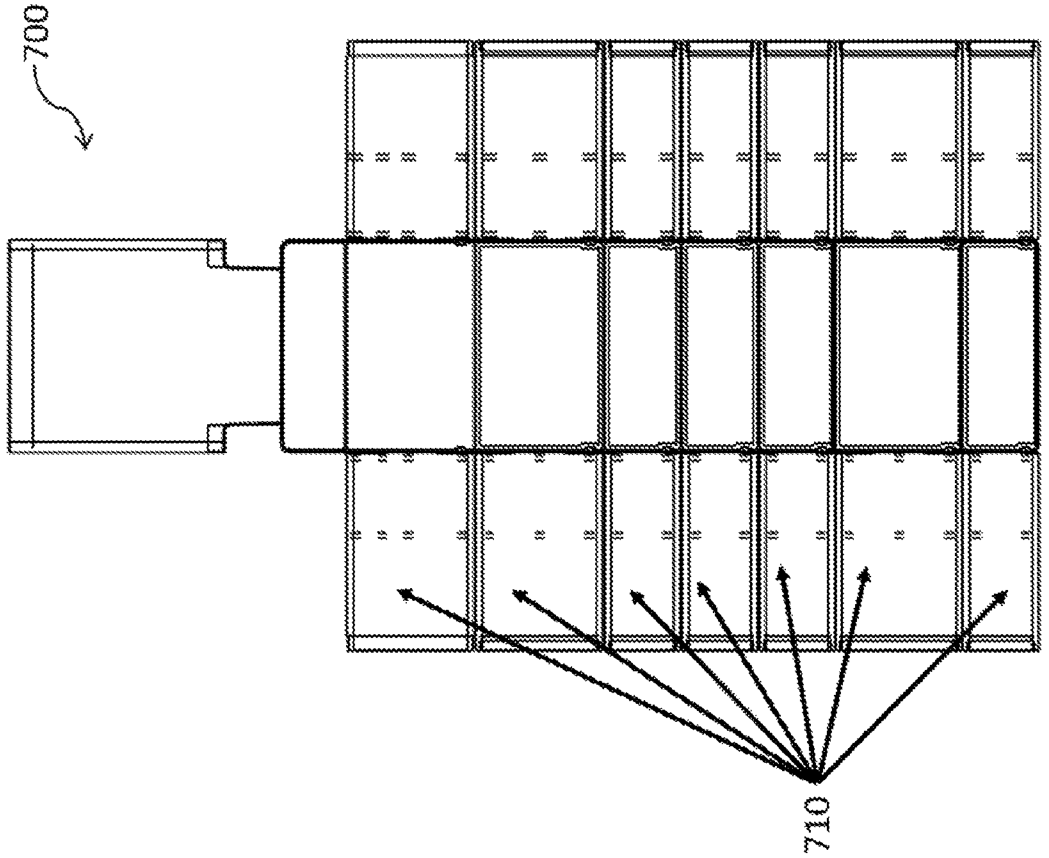
Figure 7E:
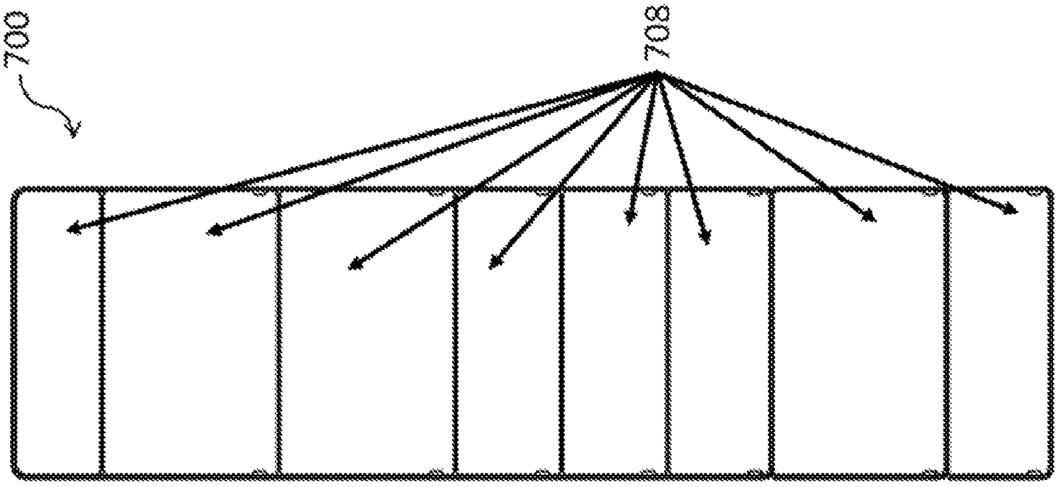
Figure 7G:
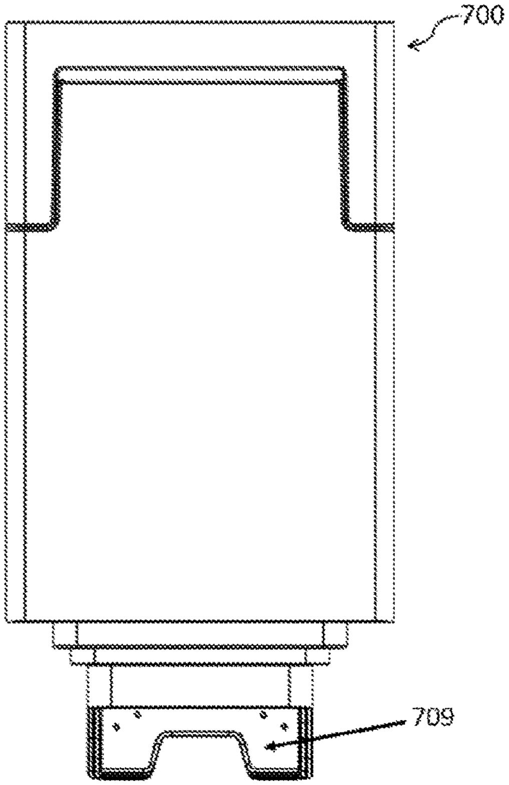
Figure 7H:
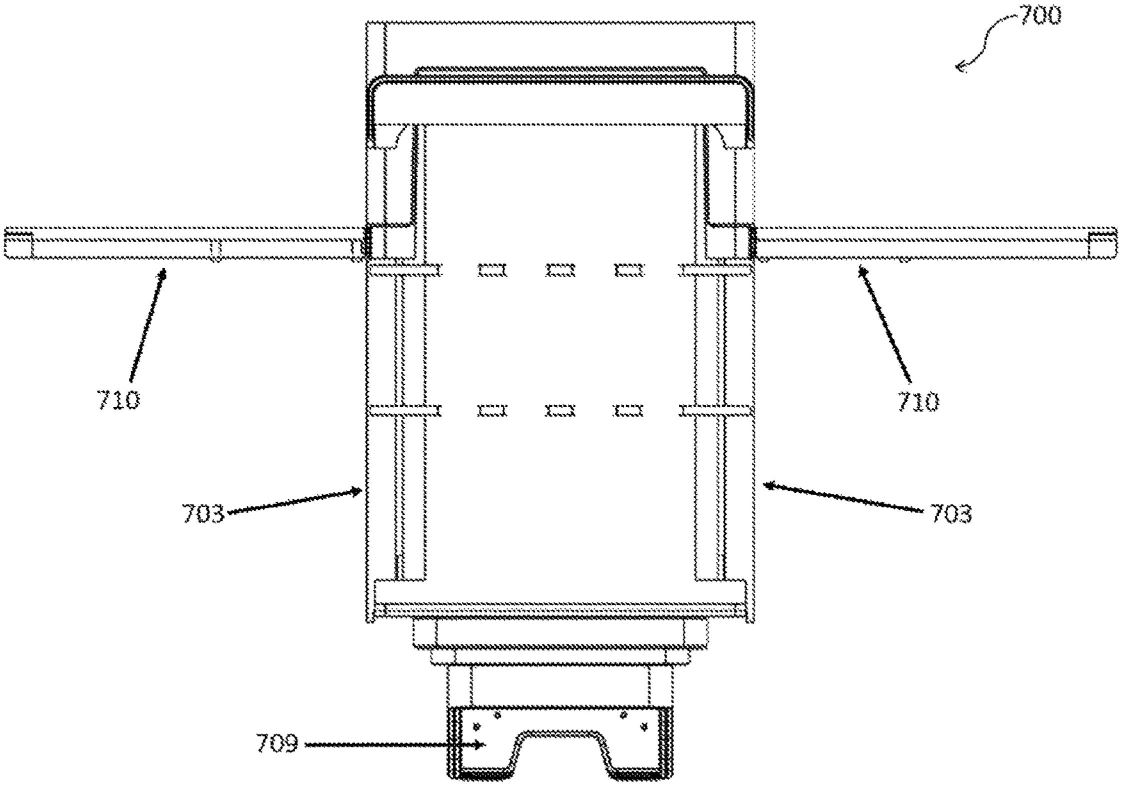
Figure 7I:
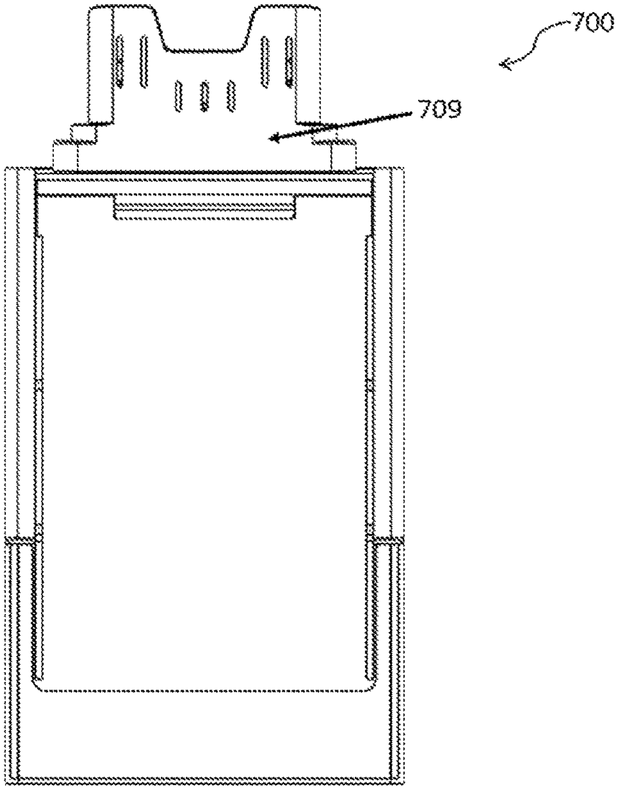
Figure 7J:
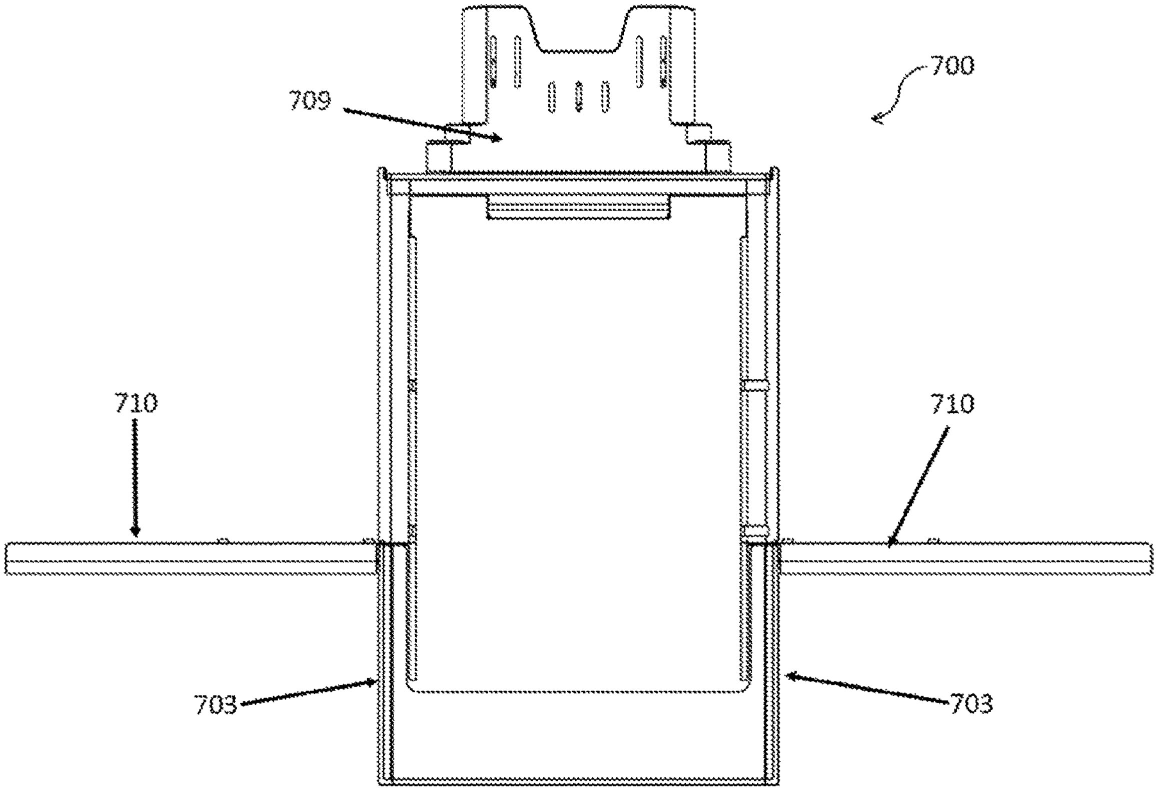
Figure 7N:
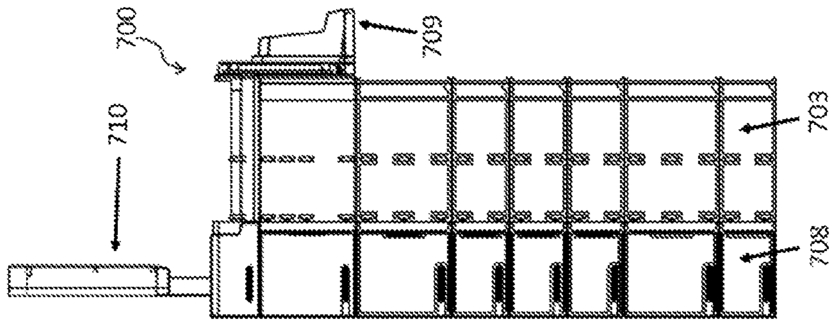
Figure 7M:
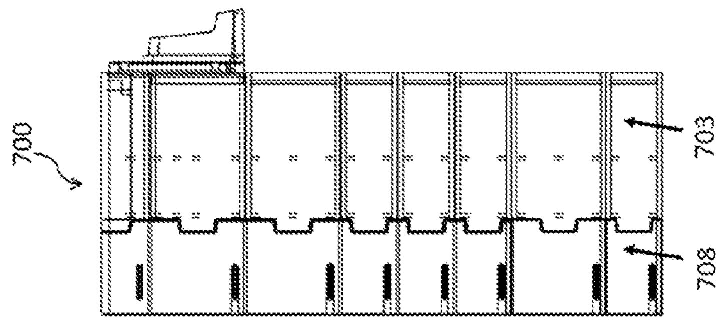
Figure 7L:
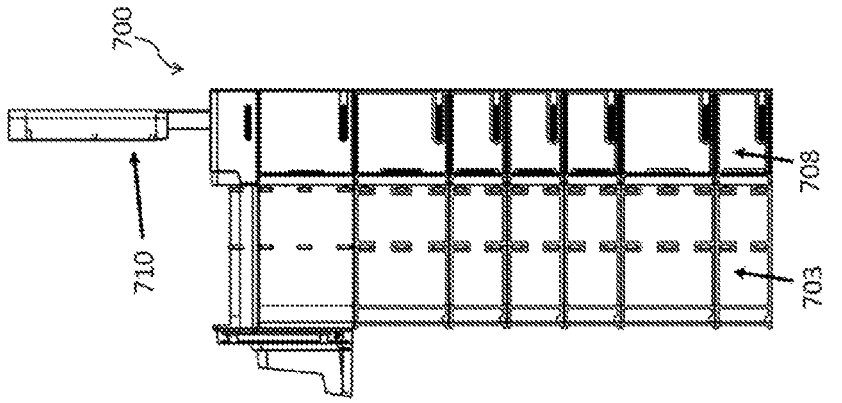
Figure 7K:
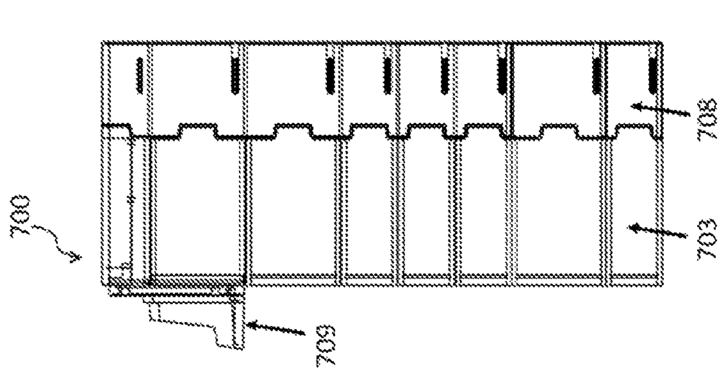
Figure 7O:
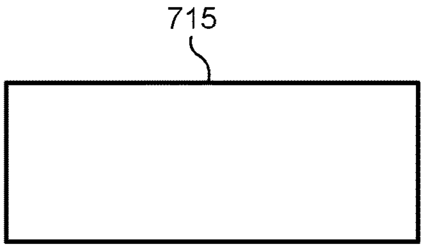
Figure 7P:
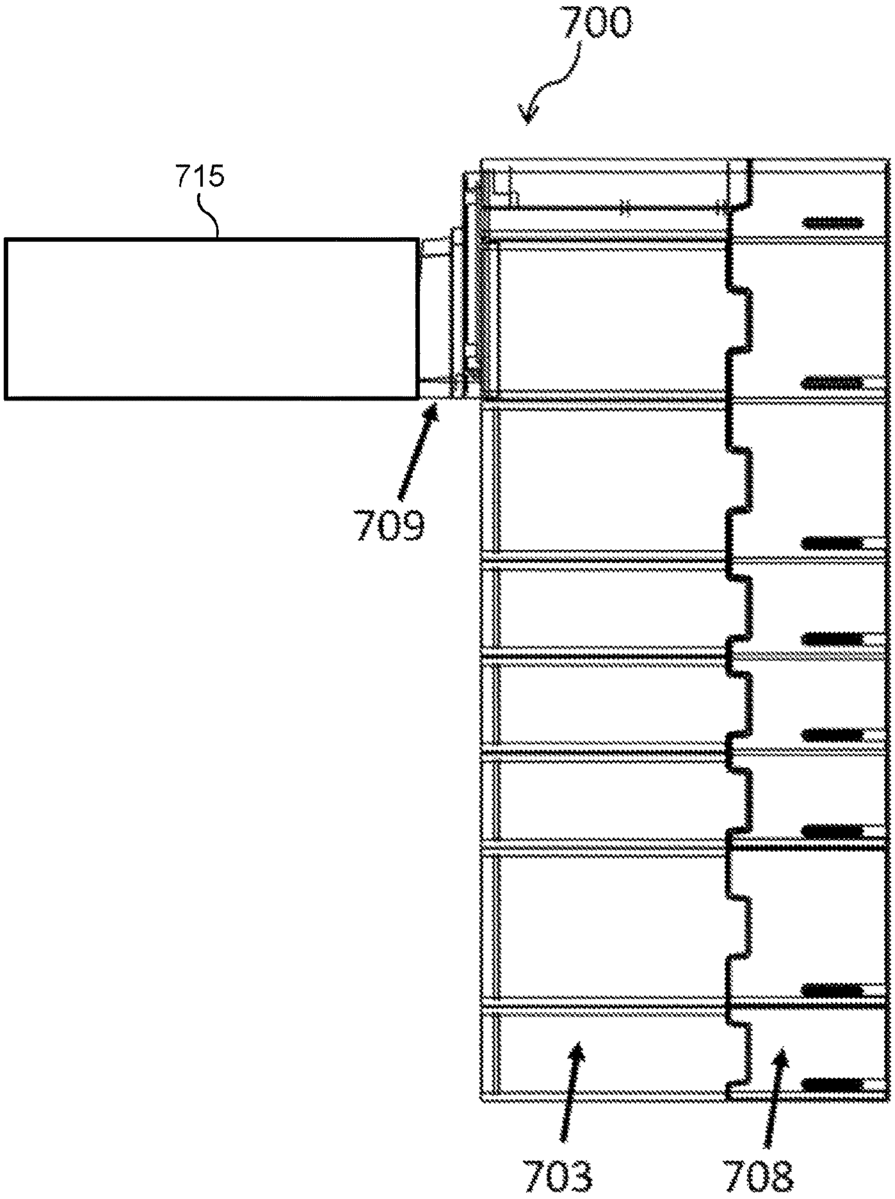

FIGS. 7A-7P illustrate various views of an example banknote deposit-withdrawal system 700 in accordance with various embodiments of this disclosure. FIG. 7A illustrates a perspective view of the banknote deposit-withdrawal system 700 in a closed state. FIG. 7B illustrates a perspective view of the banknote deposit-withdrawal system 700 in an open state. FIG. 7C illustrates a front view of the banknote deposit-withdrawal system 700 in the closed state. FIG. 7D illustrates a front view of the banknote deposit-withdrawal system 700 in the open state. FIG. 7E illustrates a back view of the banknote deposit-withdrawal system 700 in the closed state. FIG. 7F illustrates a back view of the banknote deposit-withdrawal system 700 in the open state. FIG. 7G illustrates a top view of the banknote deposit-withdrawal system 700 in the closed state. FIG. 7H illustrates a top view of the banknote deposit-withdrawal system 700 in the open state. FIG. 7I illustrates a bottom view of the banknote deposit-withdrawal system 700 in the closed state. FIG. 7J illustrates a bottom view of the banknote deposit-withdrawal system 700 in the open state. FIG. 7K illustrates a left side view of the banknote deposit-withdrawal system 700 in the closed state. FIG. 7L illustrates a left side view of the banknote deposit-withdrawal system 700 in the open state. FIG. 7M illustrates a right side view of the banknote deposit-withdrawal system 700 in the closed state. FIG. 7N illustrates a right side view of the banknote deposit-withdrawal system 700 in the open state. FIG. 7O illustrates an example banknote dispenser 715 attachable to the banknote deposit-withdrawal system 700 in accordance with various embodiments of the present disclosure. FIG. 7P illustrates the example banknote dispenser 715 attached to the banknote deposit-withdrawal system 700 in accordance with various embodiments of the present disclosure. Banknote deposit-withdrawal systems 700 come in a wide variety of configurations, and FIGS. 7A-7P do not limit the scope of this disclosure to any particular implementation of a banknote deposit-withdrawal system 700.

As illustrated in FIGS. 7A-7P, the banknote deposit-withdrawal system 700 includes a banknote sensing module 702, a banknote accepting module 701, a payment accepting and dispensing bezel 709, a spine module 708, a banknote escrow module 704, a banknote storage module 705, and one or more banknote recycling modules 706. Each of the banknote sensing module 702, the banknote accepting module 701, the banknote escrow module 704, the banknote storage module 705 and the banknote recycling modules 706, can be modular components of the banknote deposit-withdrawal system 700, such that each of these components can be removed from the banknote deposit-withdrawal system 700 for maintenance, jam correction, or other operations. The spine module 708 can include components operable to support each of the banknote sensing module 702, the banknote accepting module 701, the banknote escrow module 704, the banknote storage module 705, the banknote recycling modules 706, or other modules that can be installed in the banknote deposit-withdrawal system 700. The modules can be arranged in the order from top to bottom of the banknote sensing module 702, the banknote accepting module 701, the banknote escrow module 704, the banknote storage module 705, and the banknote recycling modules 706. The banknote escrow module 704, the banknote storage module 705, and one or more banknote recycling modules 706 can all be interchanged as banknote storage module (704, 705, 706).

The payment accepting and dispensing bezel 709 can be mounted to a front portion of the banknote deposit-withdrawal system 700. For example, the payment accepting and dispensing bezel 709 can be mounted in front of the banknote sensing module 702 and the banknote accepting module 701, such that banknotes introduced into the banknote deposit-withdrawal system 700 via the payment accepting and dispensing bezel 709 enter the banknote accepting module 701. The banknote accepting module 701 can include internal transport components to transport the banknote, such as rollers or rollers, belts, or other transport components to transport the banknote through an interior of the banknote accepting module 701. The banknote can then be transferred via internal transport components to the banknote sensing module 702. Once the banknote is transferred to the banknote sensing module 702, imaging sensors or other components in the banknote sensing module 702 can view or otherwise detect banknotes traveling through the interior of the banknote sensing module 702.

If the banknote is accepted, the banknote can then be transported out of the banknote sensing module 702 to another module of the banknote deposit-withdrawal system 700, such as one of the banknote escrow module 704, the banknote storage module 705, the banknote recycling modules 706. If the banknote is rejected, the banknote sensing module 702 can transport the banknote back to the banknote accepting module 701 to dispense the banknote from the payment accepting and dispensing bezel 709. In some embodiments, the rejected banknote can be first transferred to one of the banknote escrow module 704, the banknote storage module 705, the banknote recycling modules 706 before being dispensed. Transporting received banknotes first to the banknote sensing module before storing the banknotes in the various storage modules of the banknote deposit-withdrawal system, as disclosed with respect to this embodiment and with respect to the various other embodiments disclosed herein, provides various benefits over prior banknote processing systems. For example, since the head of the banknote deposit-withdrawal system includes the banknote accepting module and the banknote sensing module, and includes the ability for bulk banknote filling, and since banknotes received into the system are transported to the banknote sensing module before being transported to a recycler, cashbox, or other storage unit, a higher accountability of the banknotes in the system is achieved over other banknote processing systems. In some embodiments, details on banknotes can be stored in memory as well, as described in the various embodiments herein.

In some embodiments, the banknote sensing module 702 can detect banknotes as the banknotes travel through the banknote accepting module 701, such as if the banknote accepting module 701 includes an opening in a top portion of the banknote accepting module 701 that allows imaging sensors or other components in the banknote sensing module 702 to view or otherwise detect banknotes traveling through the interior of the banknote accepting module 701. In some embodiments, the banknote accepting module 701 can pass banknotes to the banknote sensing module 702, and the banknote sensing module 702 can detect the banknotes and pass the banknotes back to the banknote accepting module 701.

Based on the detected denomination of the banknote by the banknote sensing module 702, the banknote can be stored in an appropriate banknote recycling module 706 or in the banknote storage module 705 of the banknote deposit-withdrawal system 700 in accordance with the detected denomination. The banknote detection components in the banknote sensing module 702 can be physically or communicatively coupled to a controller or processor and memory for controlling transport of the banknote based on the detection of the banknote, and for storing banknote characteristics of the detected banknote, such as serial numbers, denomination, or other characteristics, so that the banknote deposit-withdrawal system 700 can track the banknote in the banknote deposit-withdrawal system 700 and keep an accurate accounting of the banknotes stored in the banknote deposit-withdrawal system 700.

As also illustrated in FIGS. 7A-7P each of the banknote sensing module 702, the banknote accepting module 701, and a banknote escrow module 704, a banknote storage module 705, and one or more banknote recycling modules 706 can include openable side panels 710 that allow a user or operator to open the panel and access an interior portion of the module. This allows the user or operator to access a banknote transportation path 703 inside each module. For example, while in the closed configuration as shown in FIGS. 7A, 7C, 7E, 7G, 7I, 7K and 7M, the banknote storing modules 704, 705 and 706 can be installed onto the spine module 708 and operated in conjunction with the banknote deposit-withdrawal system 700 to receive and dispense banknotes. The banknote recycling modules 706 each includes within an interior portion a plurality of transport mechanisms such as rollers, rollers, belts, or other transport mechanisms. For example, rollers can be operable to transport banknotes along a banknote transportation path 703 within each of the banknote recycling modules 706. Each of the banknote sensing module 702, the banknote accepting module 701, the banknote escrow module 704, the banknote storage module 705, and one or more banknote recycling modules 706 also include one or more openable side panels 710 that allow for an operator to inspect inside portions of the banknote storing module (704, 705, 706), such as in the event of a banknote jam as shown in FIGS. 7B, 7D, 7F, 7H, 7J, 7L and 7N. For example, each banknote storing module (704, 705, 706) and the banknote accepting module 701 can include one or more openable side panels 710 on a side exterior surface. Each openable side panel 710 can be hingedly coupled to a side of the banknote escrow module 704, the banknote storage module 705, and one or more banknote recycling modules 706 or the banknote accepting module 701 such that the openable side panel 710 opens away from the side of the recycling module 706 or the banknote accepting module 701 and extends in a direction perpendicular to the banknote transportation path 703 when fully opened. Opening the one or more openable side panels 710 grants access to at least some of the transport mechanisms inside the module, and the banknote transport path, such that, if a banknote is jammed, the jam can be corrected.

In some embodiments, the banknote sensing module 702, the banknote accepting module 701, the banknote escrow module 704, banknote accepting or recycling modules 706 and the banknote storing module 705 can include transparent windows, such as transparent glass or plastic portions, that are disposed at one or more of the openable side panels 710, or elsewhere on various surfaces of the modules, such as a top surface overlooking the banknote transportation path 703, to allow an operator or user to view banknotes either traveling through the banknote transportation path 703, or jammed banknotes. For example, if one of the openable side panels 710 includes a transparent surface, and a banknote becomes jammed in the area behind the openable side panel 710, an operator or user would be able to see the location of the jam, open the openable side panel 710, and correct the jam. In some embodiments, the banknote sensing module 702, the banknote accepting module 701, and/or banknote storing modules (704, 705, 706) can each also include an openable side panel 710 on a front portion of the recycling module that can be hingedly connected such that the operator can view inside the module and reach into the module if needed to correct issues within the module.

As another example, the banknote sensing module 702 can also include an openable panel 710, such as an openable panel 710 on a top surface that, when opened fully, extends up vertically from a top of the banknote deposit-withdrawal system 700, as shown in FIG. 7B. While in the closed configuration, the banknote sensing module 702 can be installed onto the spine module 708 and operated in conjunction with the banknote deposit-withdrawal system 700 to detect and/or recognize banknotes and banknote characteristics. The banknote sensing module 702 includes within an interior portion of the banknote sensing module 702 one or more banknote transport mechanisms. One or more passive rails can be placed opposite an active roller in the banknote sensing module 702. The active rollers are operable to transport banknotes along a banknote transportation path 703 within the banknote sensing module 702. While the banknote sensing module 702 is in the open configuration, an operator can inspect inside portions of the banknote sensing module 702, such as in the event of a banknote jam. For example, the openable panel 710 on the top portion of the banknote sensing module 702 can be hingedly connected such that the operator can view inside the banknote sensing module 702 and reach into the banknote sensing module 702 if needed to correct issues within the banknote sensing module 702.

Opening the panel grants access to at least some of the transport mechanisms, such that, if a banknote is jammed at one or more of the transport mechanisms, the jam can be corrected. In some embodiments, the banknote sensing module 702 can include transparent windows, such as transparent glass or plastic portions, that are disposed at one or more of the openable panels 710, or elsewhere on various surfaces of the banknote sensing module 702, such as a top surface overlooking the banknote transportation path 703 on the openable side panel 710 of the top portion, to allow an operator or user to view banknotes either traveling through the banknote transportation path 703, or jammed banknotes. In some embodiments, the banknote sensing module 702 can include a banknote transportation path 703 that is oriented in a different direction than that of the banknote accepting module 701, such as shown in FIGS. 7B and 7H, such that banknotes can be passed from the banknote accepting module 701 to the banknote sensing module 702 for banknote recognition, and then passed back to the banknote accepting module 701 for further processing through the banknote deposit-withdrawal system 700.

In some embodiments, at least one of the banknote sensing module 702, the banknote accepting module 701, and banknote storing modules 704, 705, 706 include one or more light sources such as one or more light-emitting diodes (LEDs). In some embodiments, the light sources can be disposed on a side portion or a front portion of the banknote storing module. In some embodiments, the light sources can also be disposed on a portion of an openable side panel 710. The light sources are configured to display indicators of an issue within the module on which the light source is disposed, such as emitting a green color when there are no issues and the module is operating normally, or emitting a red color when there is an issue within the module, such as a jam. In some embodiments, the payment accepting and dispensing bezel 709 can also include a light source to indicate whether or not there is an issue in one of the modules of the banknote deposit-withdrawal system 700, or to indicate whether or not the payment accepting and dispensing bezel 709 is accepting new banknotes. For example, if there is a jam in a banknote storing module 704, 705, 706, the payment accepting and dispensing bezel 709 can display a red color by the light source to indicate that no additional banknotes can be introduced into the banknote deposit-withdrawal system 700 until the jam is corrected. In some embodiments, no light may be emitted when the banknote deposit-withdrawal system 700 is operating normally. It will be understood that using green and red lights is merely an example, and other colors could be used, or other indicators could be used, such as flashing lights.

As illustrated in FIGS. 70 and 7P, an attachable banknote dispenser 715 can be attached to the payment accepting and dispensing bezel 709. The attachable banknote dispenser 715 is operable to dispense banknotes, in bulk or serially, included within the attachable banknote dispenser 715 into the banknote deposit-withdrawal system 700 when attached to the payment accepting and dispensing bezel 709. In some embodiments, the attachable banknote dispenser 715 can be filled with banknotes in a location remote from a location of the banknote deposit-withdrawal system 700. In some embodiments, the attachable banknote dispenser 715 can be filled with banknotes at a same facility as the banknote deposit-withdrawal system 700. A filled attachable banknote dispenser 715 can then be attached to the payment accepting and dispensing bezel 709 to dispense banknotes in bulk or serially into the payment accepting and dispensing bezel 709 to replenish banknotes within the banknote deposit-withdrawal system 700, such as by filling up one or more of the banknote recycling modules 706. It will be understood that banknotes received during the replenishment can be processed in the same manner as the various embodiments herein, such as first transporting the banknotes to the banknote sensing module 702 before transporting the banknotes to appropriate storing modules 704, 705, 706. In some embodiments, when the attachable banknote dispenser 715 is attached to the payment accepting and dispensing bezel 709 and a replenishment operation is ongoing, other cash operations of the banknote deposit-withdrawal system 700 can be ceased until the replenishment operation is concluded and the attachable banknote dispenser 715 is removed from the payment accepting and dispensing bezel 709.

Although FIGS. 7A-7P illustrate various examples of a banknote deposit-withdrawal system 700, various changes may be made to FIGS. 7A-7P. For example, the banknote deposit-withdrawal system 700 could be used in automatic ticket seller machines, automatic teller machines, vending machines and other kiosks. Also, there could be more or less banknote storing modules than shown.

Figure 8A:
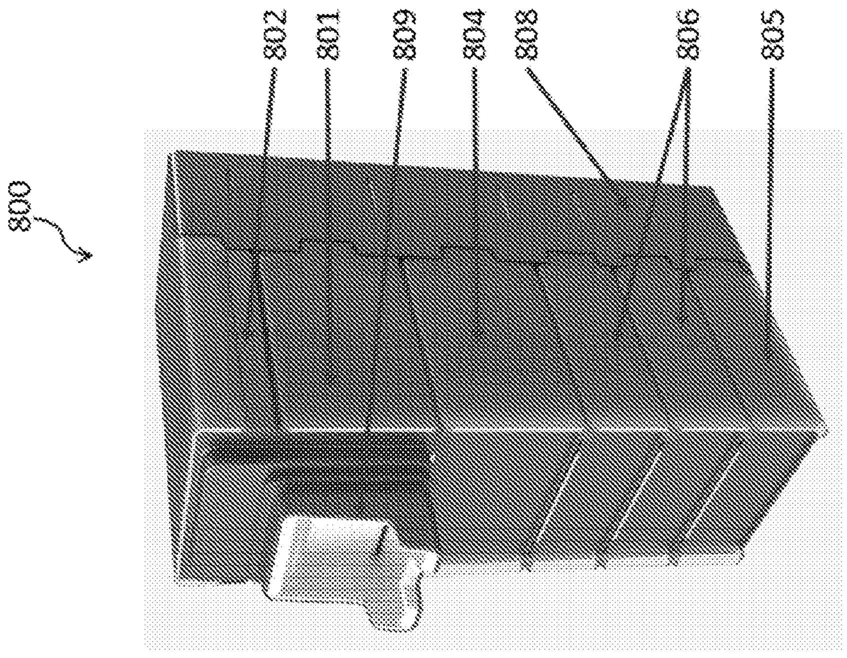
FIGS. 8A and 8B illustrate an example banknote deposit-withdrawal system with indicator light sources in accordance with various embodiments of this disclosure.
Figure 8B:
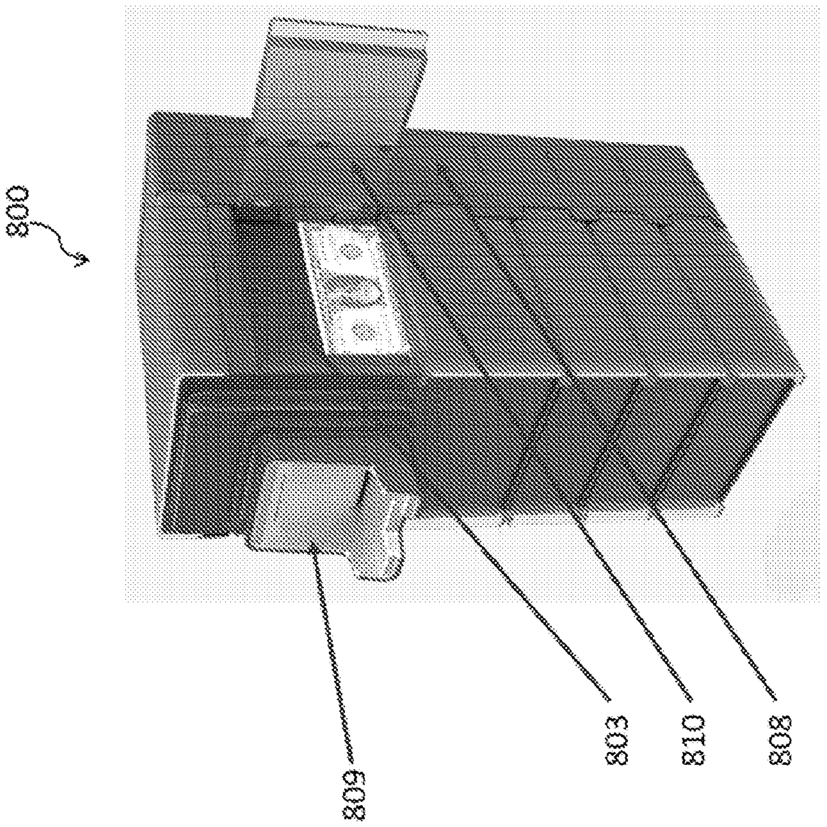

FIGS. 8A and 8B illustrate an example banknote deposit-withdrawal system 800 with indicator light sources in accordance with various embodiments of this disclosure. FIG. 8A illustrates a perspective view of the banknote deposit-withdrawal system 800 with indicator light sources in a closed state. FIG. 8B illustrates a perspective view of the banknote deposit-withdrawal system 800 with indicator light sources in an open state. Banknote deposit-withdrawal systems 800 come in a wide variety of configurations, and FIGS. 8A and 8B do not limit the scope of this disclosure to any particular implementation of a banknote deposit-withdrawal system 800.

The banknote deposit-withdrawal system 800 again includes a banknote sensing module 802, a banknote the banknote accepting module 801, a payment accepting and dispensing bezel 809, a spine module 808, and one or more banknote storing modules 804, 805, 806. The least one of the banknote sensing module 802, the banknote accepting module 801, and banknote storing modules 804, 805, 806 includes one or more light sources such as one or more LEDs. In some embodiments, the light sources can be disposed on a side portion or a front portion of the banknote storing modules 804, 805, 806. In some embodiments, the light sources can also be disposed on a portion of an openable panel 810. The light sources are configured to display indicators of an issue within the module on which the light source is disposed, such as emitting a green color when there are no issues and the module is operating normally, or emitting a red color when there is an issue within the module, such as a jam. In some embodiments, the payment accepting and dispensing bezel 809 can also include a light source to indicate whether or not there is an issue in one of the modules of the banknote deposit-withdrawal system 800, or to indicate whether or not the payment accepting and dispensing bezel 809 is accepting new banknotes. For example, if there is a jam in a banknote storing module 804, 805, 806, the payment accepting and dispensing bezel 809 can display a red color by the light source to indicate that no additional banknotes can be introduced into the banknote deposit-withdrawal system 800 until the jam is corrected.

For example, as shown in FIG. 8B, the banknote accepting module 801 and the payment accepting and dispensing bezel 809 each are illustrated as displaying a red indicator light, indicating by the banknote accepting module 801 that there is an issue within the banknote accepting module 801, and indicating by the payment accepting and dispensing bezel 809 there is an issue in the banknote deposit-withdrawal system 800, and/or that the payment accepting and dispensing bezel 809 is not accepting banknotes. The other modules the banknote sensing module 802, and banknote storing modules 804, 805, 806 continue to display a green indicator to show that they are still operating without issue. As also shown in FIG. 8B, an openable panel 810 of the banknote accepting module 801 can be opened to inspect an interior and the banknote transportation path 803 of the banknote accepting module 801 to correct the issue. In some embodiments, modules can include more than one openable panel 810, and only a light source of the openable panel 810 in which the issue such as a jam is occurring displays a red indicator.

For example, as shown in FIG. 8B, the opened openable panel 810 is displaying a red light indicator because a jam is occurring in the banknote transportation path 803 on that side of the banknote accepting module 801, but the openable panel 810 on the opposite side of the banknote accepting module 801 can continue displaying a green light so that the user or operator knows the jam is occurring on the side with the red indicator. In some embodiments, no light may be emitted when the banknote deposit-withdrawal system 800 is operating normally. It will be understood that using green and red lights is merely an example, and other colors could be used, or other indicators could be used, such as flashing lights.

Although FIGS. 8A and 8B illustrate various examples of a banknote deposit-withdrawal system 800, various changes may be made to FIGS. 8A and 8B. For example, the banknote deposit-withdrawal system 800 could be used in automatic ticket seller machines, automatic teller machines, vending machines and other kiosks. Also, there could be more or less banknote storing modules 804, 805, 806 than shown.

In other embodiments, the banknote deposit-withdrawal system 800 includes an externally accessible banknote transportation path 803, a spine module 808 operable to support and couple with one or more other modules, the banknote accepting module 801, a payment accepting and dispensing bezel 809, a spine module 808, and one or more banknote storing modules 804, 805, 806 operable to store banknotes received from one or more other modules in the banknote deposit-withdrawal system 800, wherein each of the one or more banknote storing modules 804, 805, 806 includes at least one openable panel 810 that provides access to a banknote transportation path 803 and at least one indicator configured to signal an operation status of the banknote storing module 804, 805, 806. The indicator could be a light source, an audible noise generator source, a signal sent to host machine or a signal sent to operator's device that could be connected wirelessly or connected through a connector.

Figure 9B:
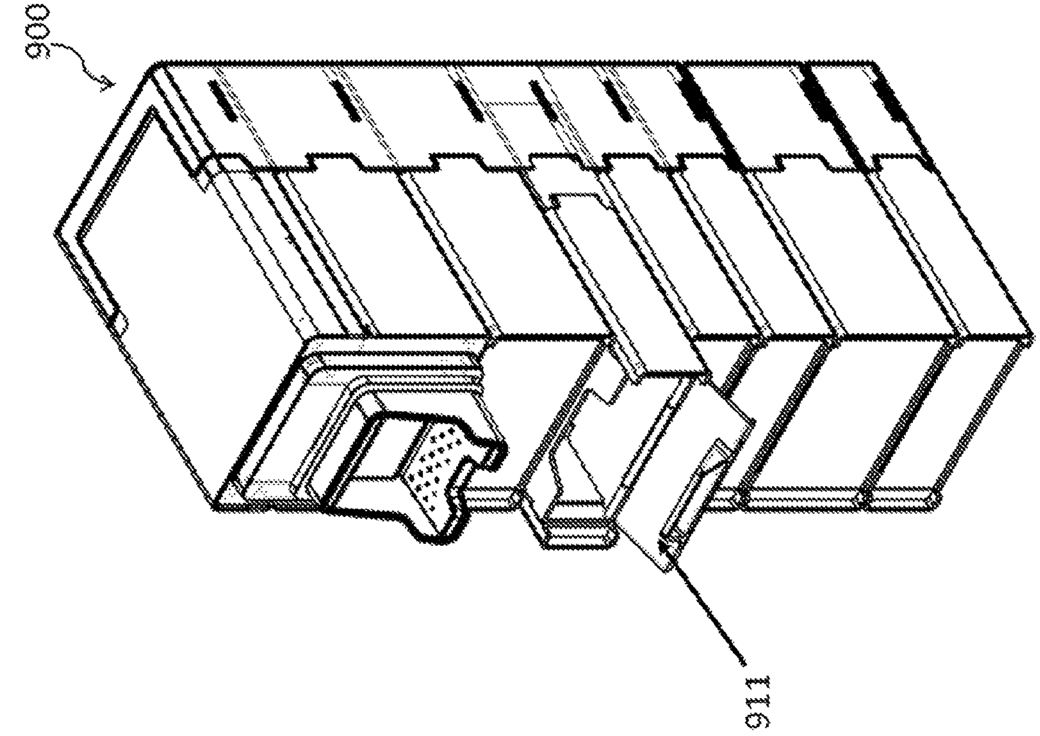
FIGS. 9A, 9B, 9C, 9D, 9E, 9F, 9G, 9H, 9I, 9J, 9K, and 9L illustrate various views of an example banknote deposit-withdrawal system with openable and removable modules in accordance with various embodiments of this disclosure.
Figure 9A:
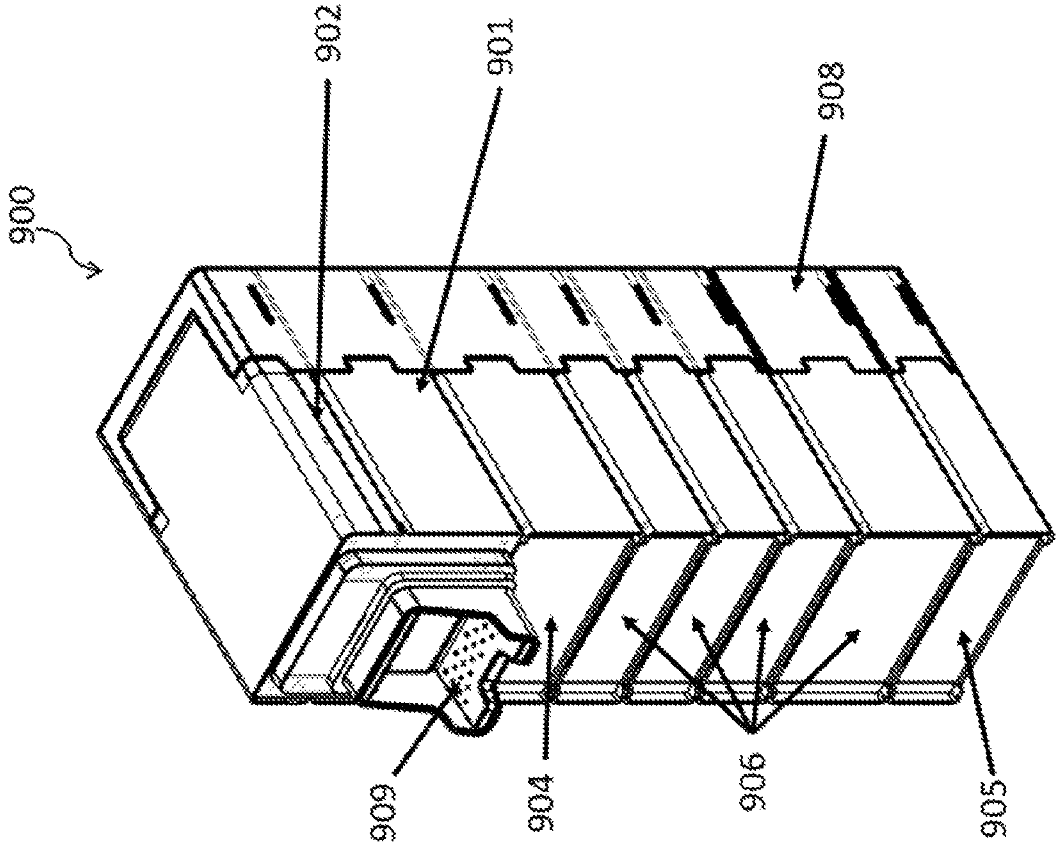
Figure 9D:
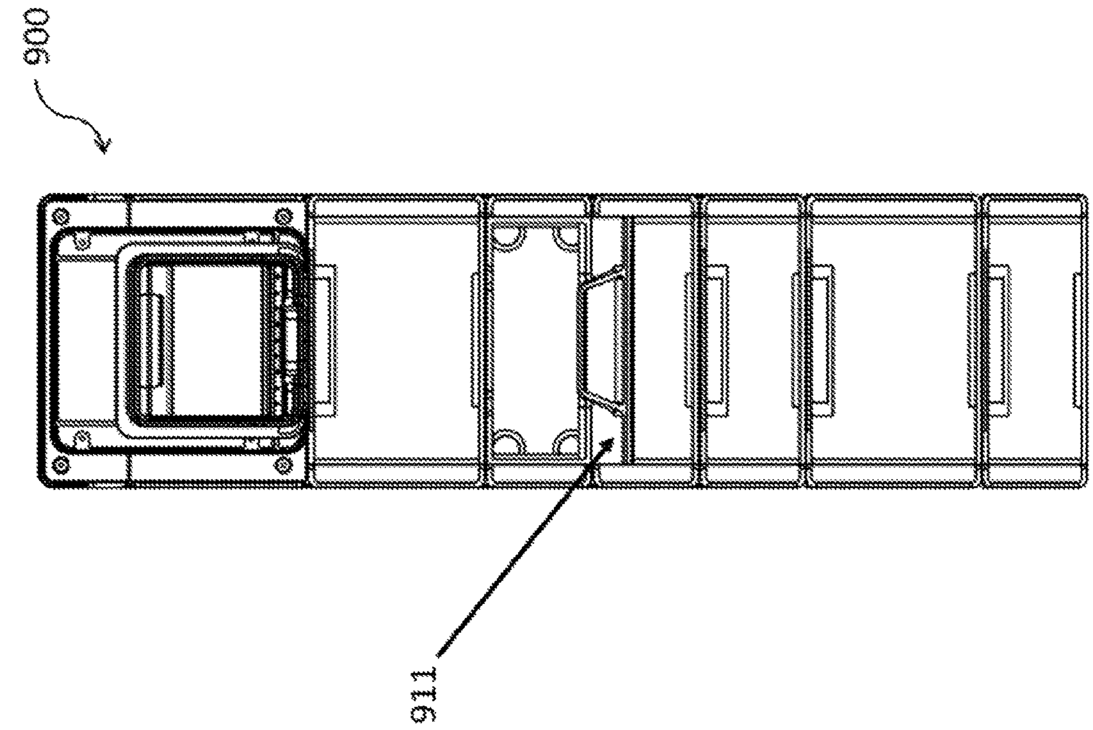
Figure 9C:
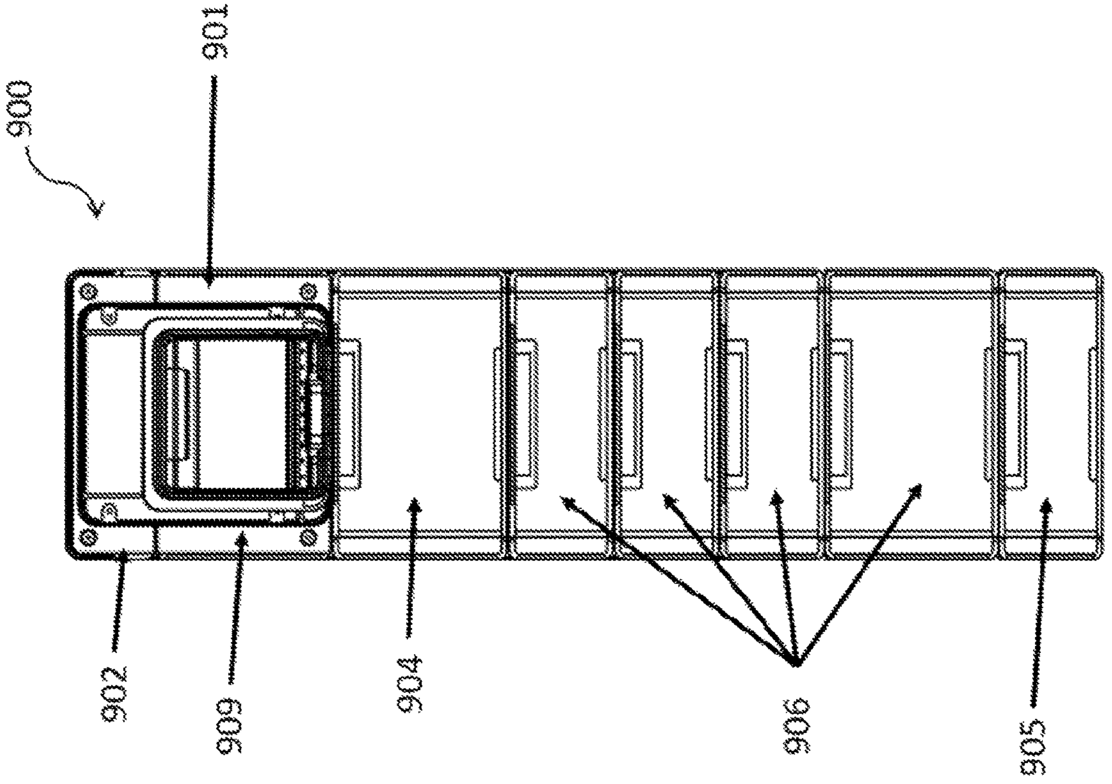
Figure 9E:
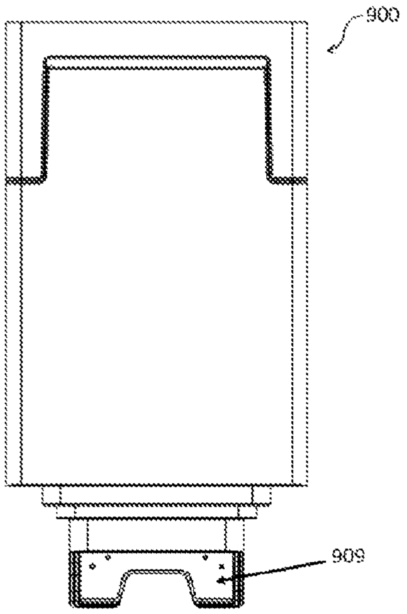
Figure 9F:
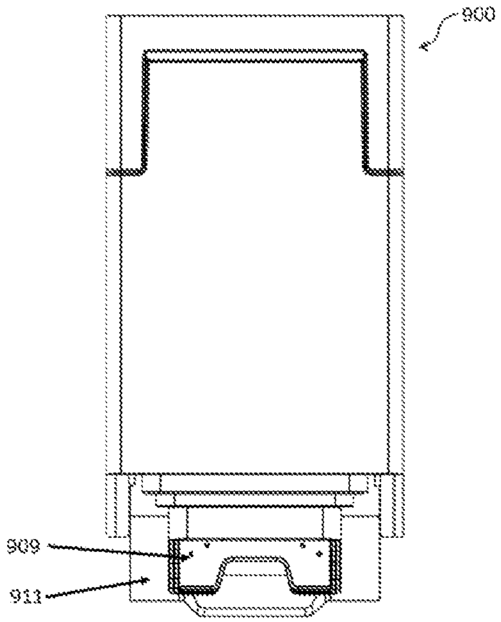
Figure 9G:
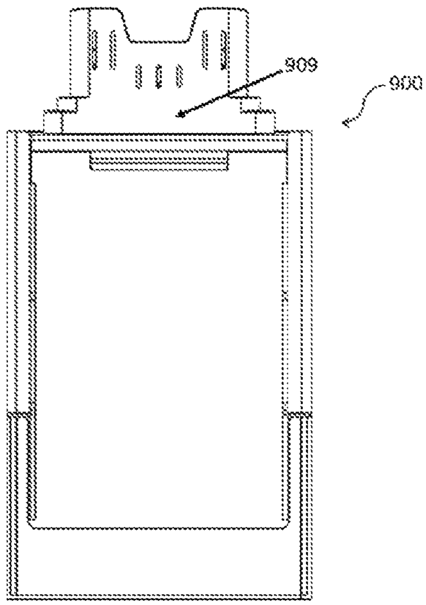
Figure 9H:
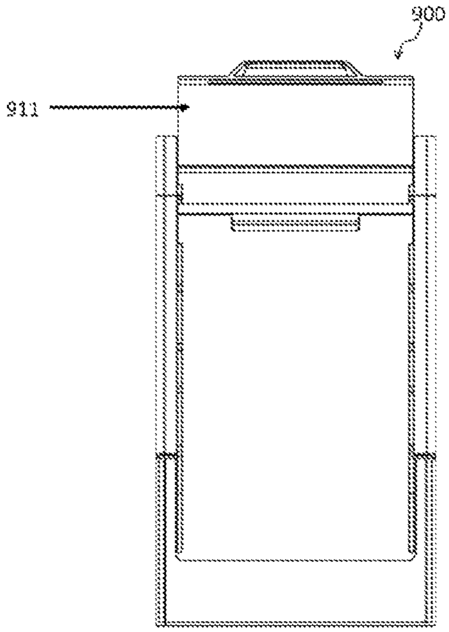
Figure 9J:
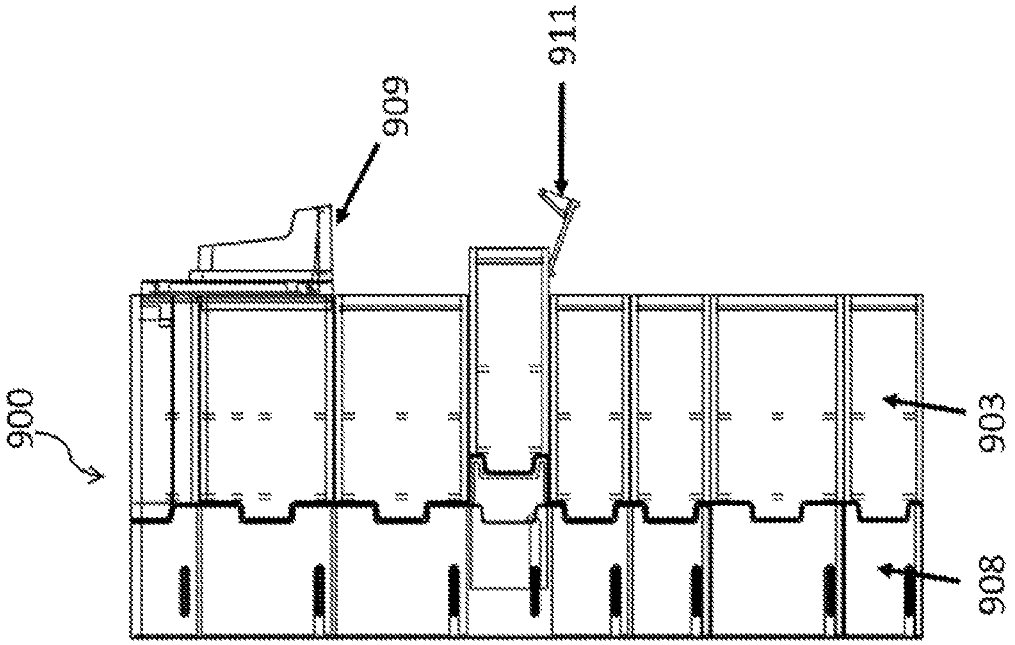
Figure 9I:
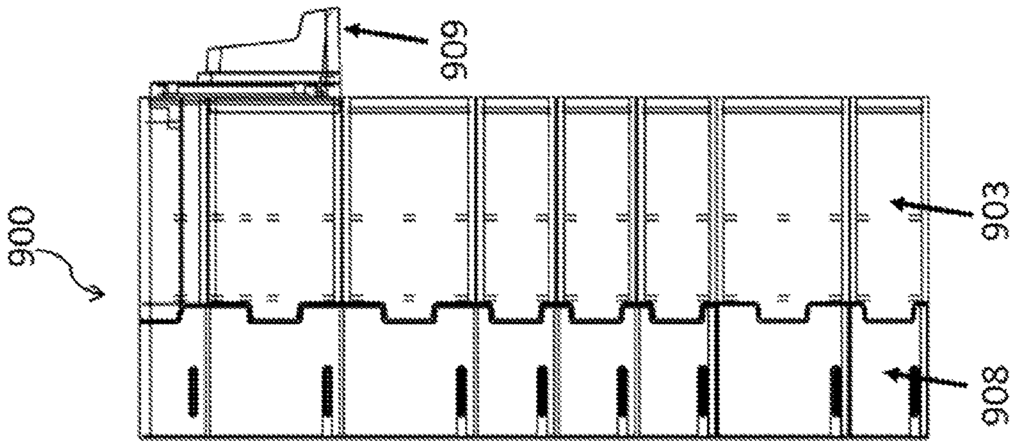
Figure 9L:
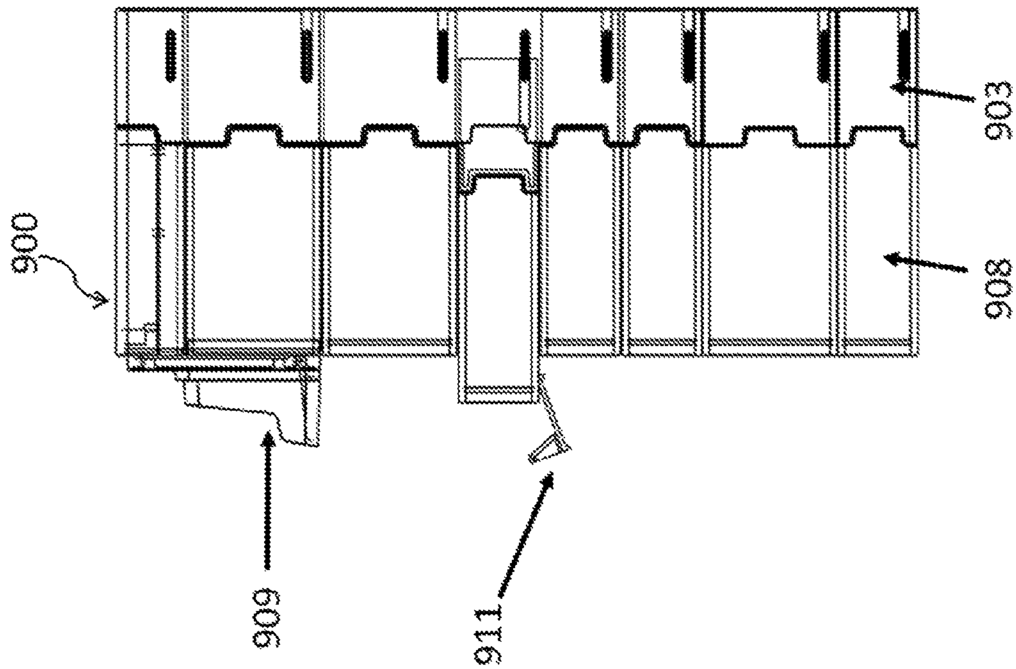
Figure 9K:
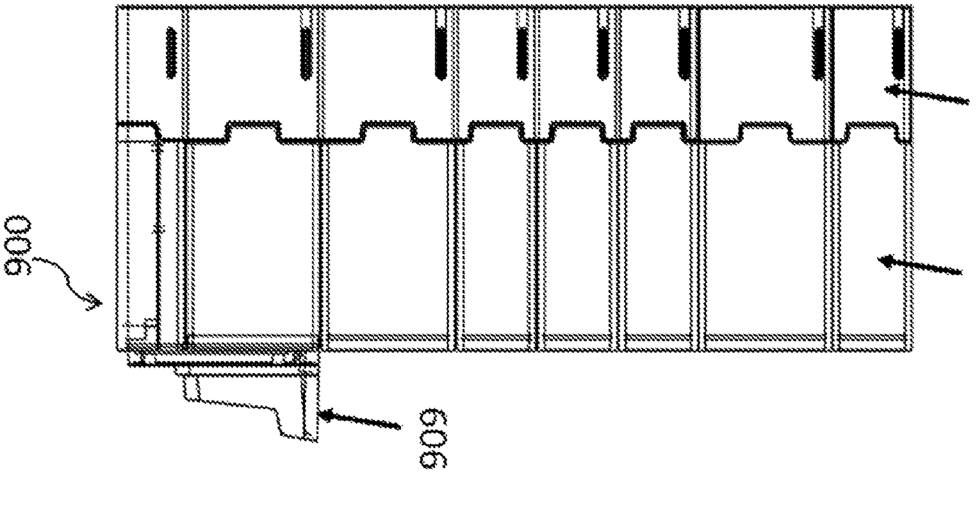

FIGS. 9A-9L illustrate various views of an example banknote deposit-withdrawal system 900 with openable and removable modules in accordance with various embodiments of this disclosure. FIG. 9A illustrates a perspective view of the banknote deposit-withdrawal system 900 with openable and removable modules in a closed state. FIG. 9B illustrates a perspective view of the banknote deposit-withdrawal system 900 with openable and removable modules in an open state. FIG. 9C illustrates a front view of the banknote deposit-withdrawal system 900 with openable and removable modules in the closed state. FIG. 9D illustrates a front view of the banknote deposit-withdrawal system 900 with openable and removable modules in the open state. FIG. 9E illustrates a top view of the banknote deposit-withdrawal system 900 with openable and removable modules in the closed state. FIG. 9F illustrates a top view of the banknote deposit-withdrawal system 900 with openable and removable modules in the open state. FIG. 9G illustrates a bottom view of the banknote deposit-withdrawal system 900 with openable and removable modules in the closed state. FIG. 9H illustrates a bottom view of the banknote deposit-withdrawal system 900 with openable and removable modules in the open state. FIG. 9I illustrates a right side view of the banknote deposit-withdrawal system 900 with openable and removable modules in the closed state. FIG. 9J illustrates a right side view of the banknote deposit-withdrawal system 900 with openable and removable modules in the open state. FIG. 9K illustrates a left side view of the banknote deposit-withdrawal system 900 with openable and removable modules in the closed state. FIG. 9L illustrates a left side view of the banknote deposit-withdrawal system 900 with openable and removable modules in the open state. Banknote deposit-withdrawal systems 900 come in a wide variety of configurations, and FIGS. 9A-9L do not limit the scope of this disclosure to any particular implementation of a banknote deposit-withdrawal system 900.

As illustrated in FIGS. 9B, 9D, 9F, 9H, 9J and 9L in various embodiments of this disclosure, the banknote storing modules 904, 905, 906 can include front openable panels 911, and the banknote storing modules 904, 905, 906 can also be removed from the banknote deposit-withdrawal system 900, such as by pulling the banknote storing modules 904, 905, 906 forward to remove the banknote storing modules 904, 905, 906 from the spine module 908. This allows an operator more access to the banknote storing modules 904, 905, 906 to clear a jam. The banknote storing modules 904, 905, 906 can each include grooves that interact with rails of the spine module 908 and that fit within the grooves to hold the banknote storage modules 904, 905, 906 in place in the spine module 908. In some embodiments, fixation devices such as screws, bolts, brackets, or other devices can be used to further couple the banknote storing modules 904, 905, 906 to the spine module 908. In some embodiments, the banknote sensing module 902 and the banknote accepting module 901 can also be coupled to the spine module 908 and removed from the banknote deposit-withdrawal system 900 in a similar manner.

Although FIGS. 9A-9L illustrate various examples of a banknote deposit-withdrawal system 900, various changes may be made to FIGS. 9A-9L. For example, the banknote deposit-withdrawal system 900 could be used in automatic ticket seller machines, automatic teller machines, vending machines and other kiosks. Also, there could be more or less banknote storing modules than shown.

Figure 10A:
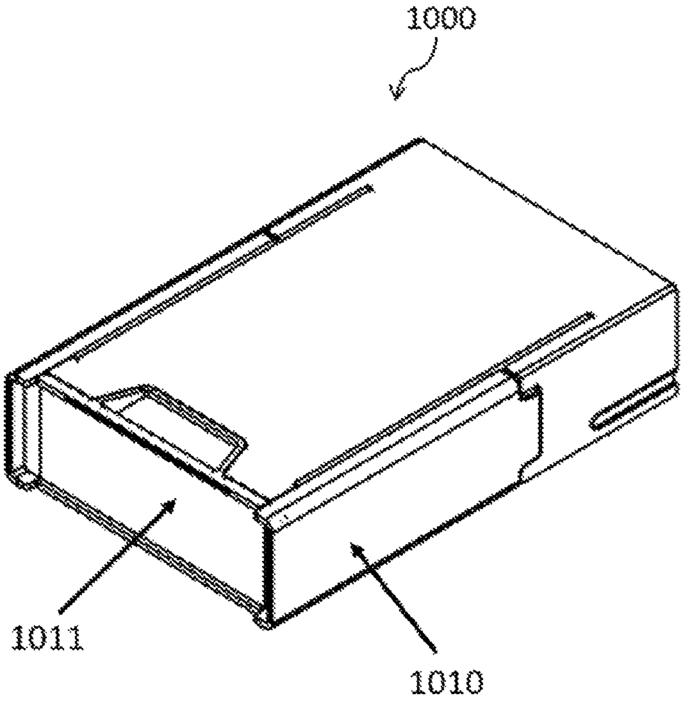
FIGS. 10A, 10B, 10C, 10D, 10E, 10F, 10G, 10H, 10I, 10J, 10K, 10L, 10M, and 10N illustrate various views of an example banknote storing module in accordance with various embodiments of this disclosure.
Figure 10B:
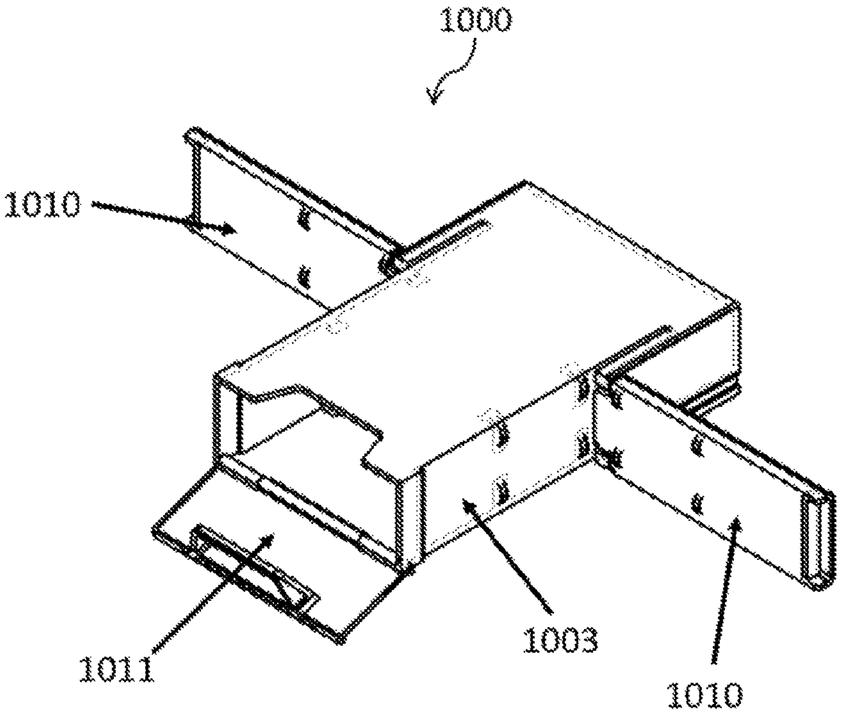
Figure 10C:
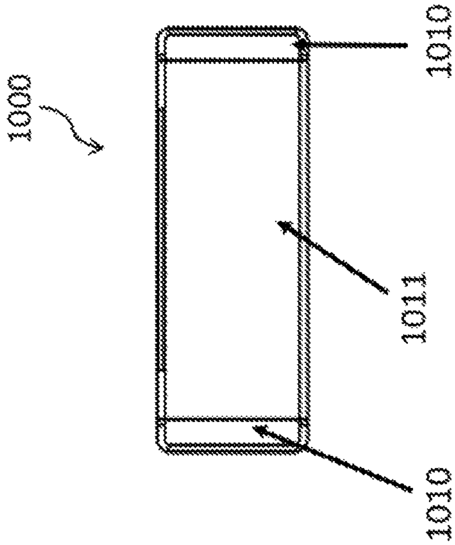
Figure 10D:
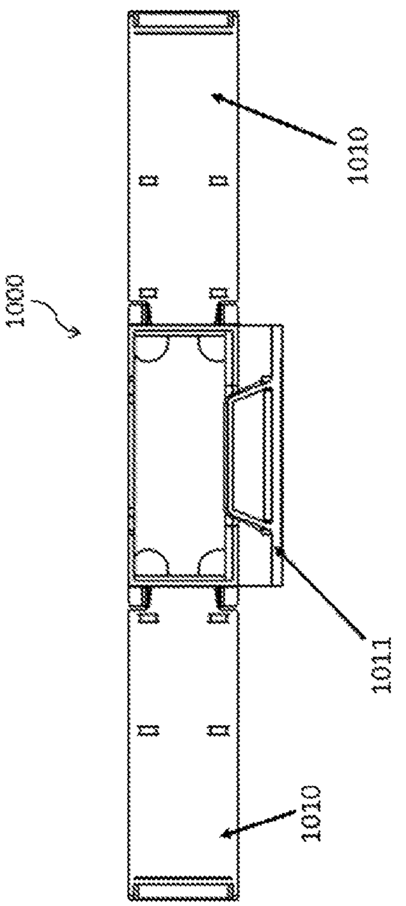
Figure 10E:
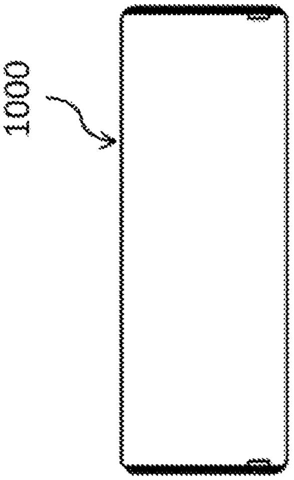
Figure 10F:
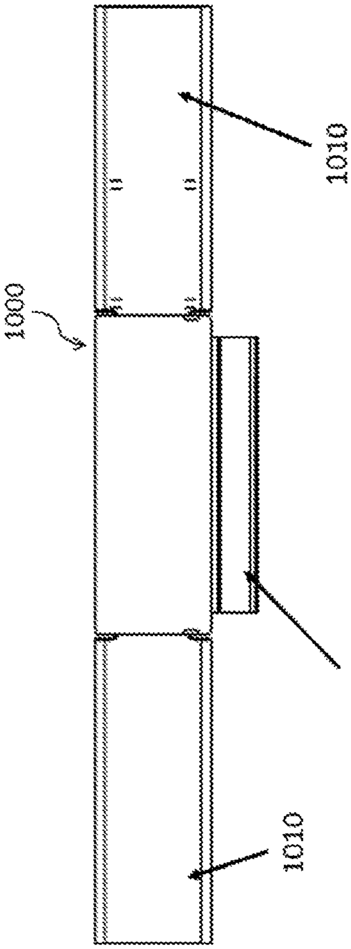
Figure 10G:
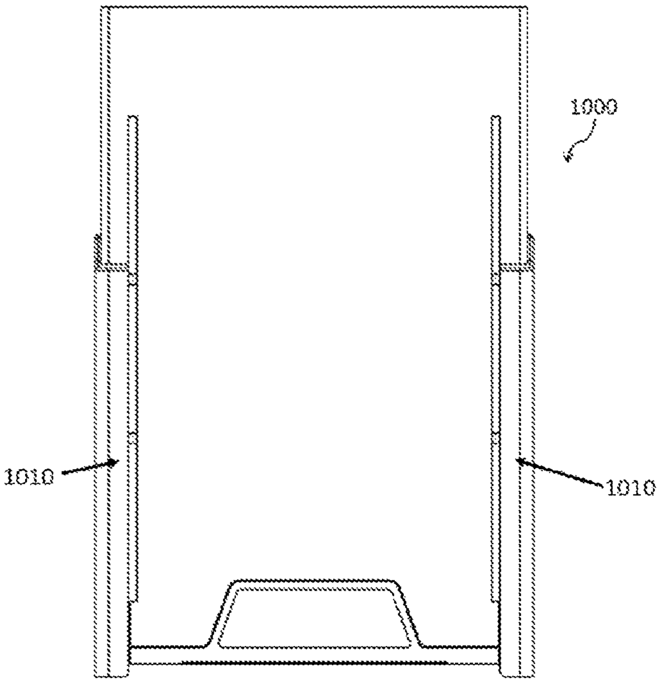
Figure 10H:
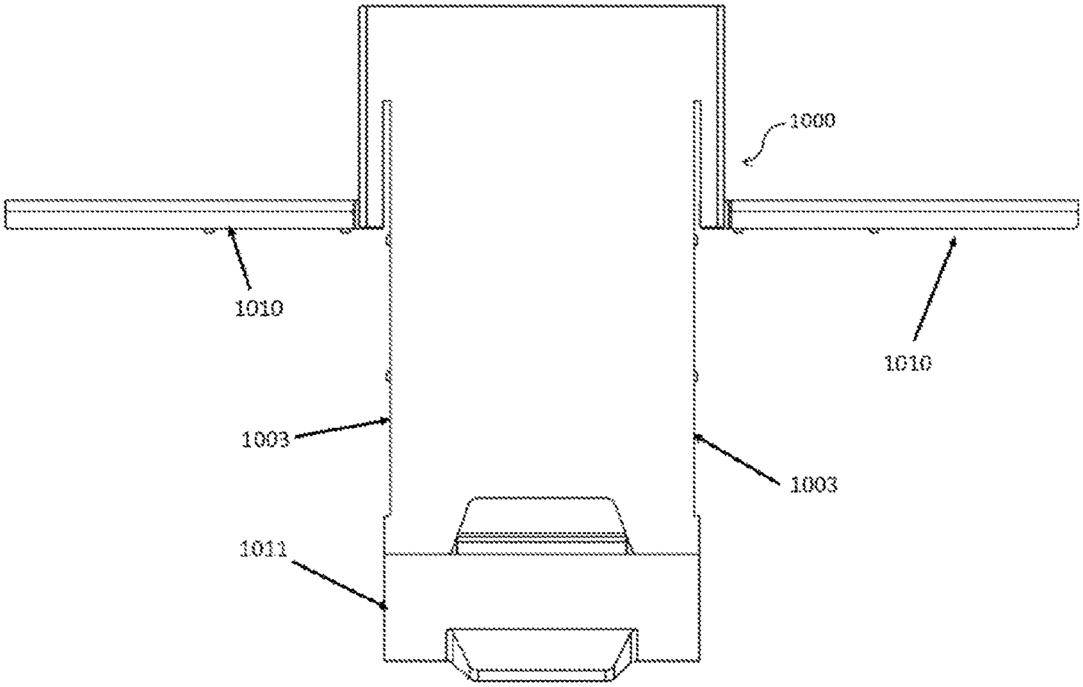
Figure 10I:
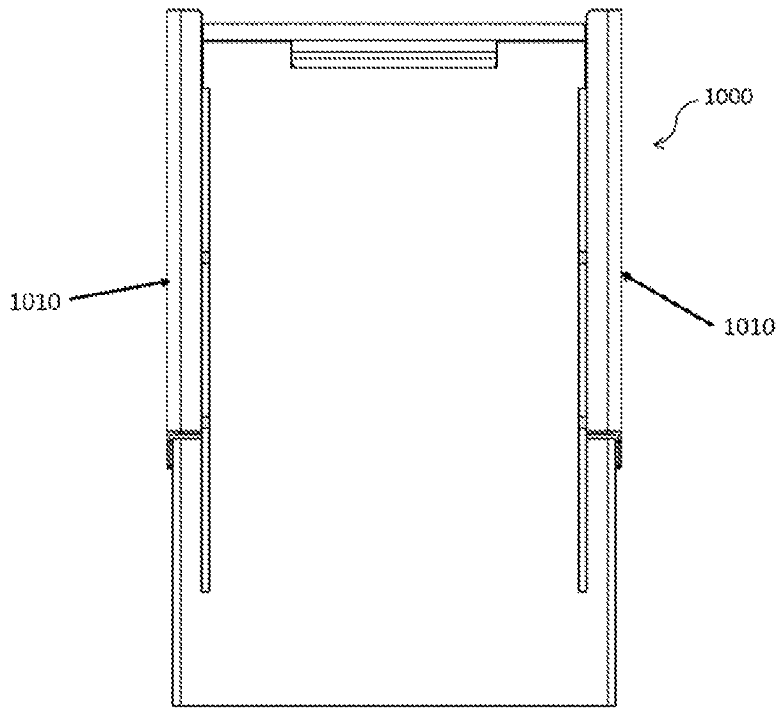
Figure 10J:
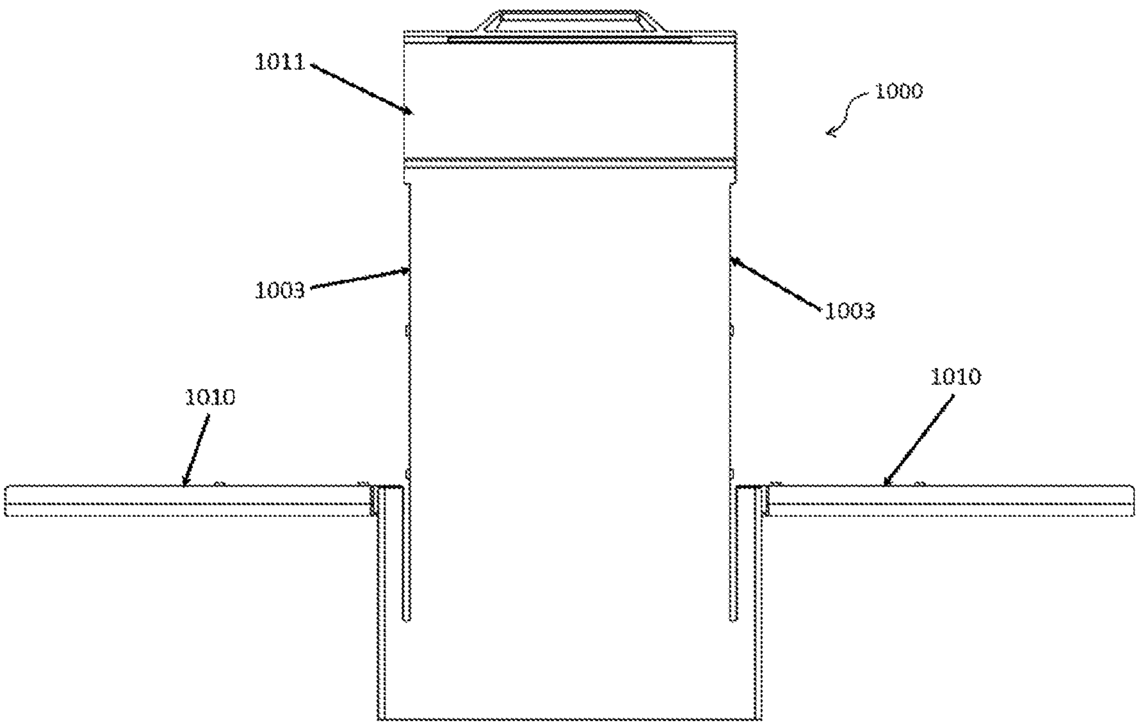
Figure 10L:
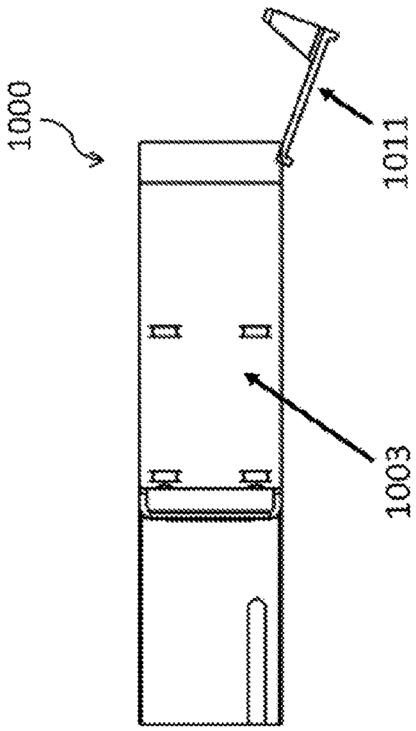
Figure 10N:
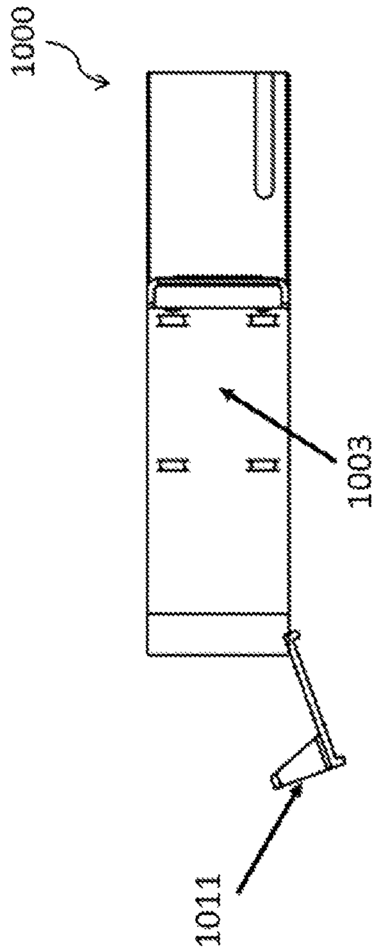
Figure 10K:
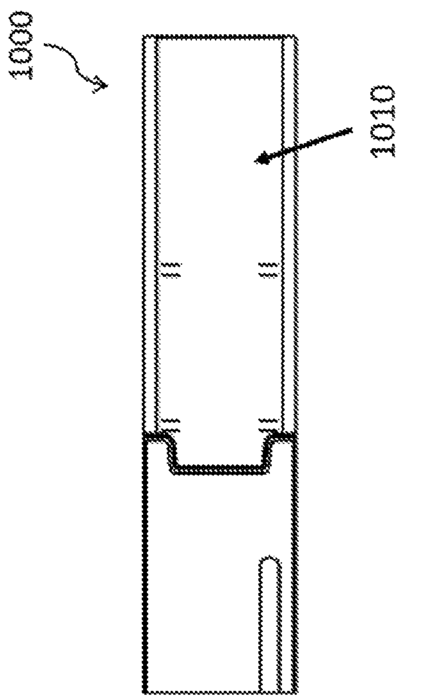
Figure 10M:
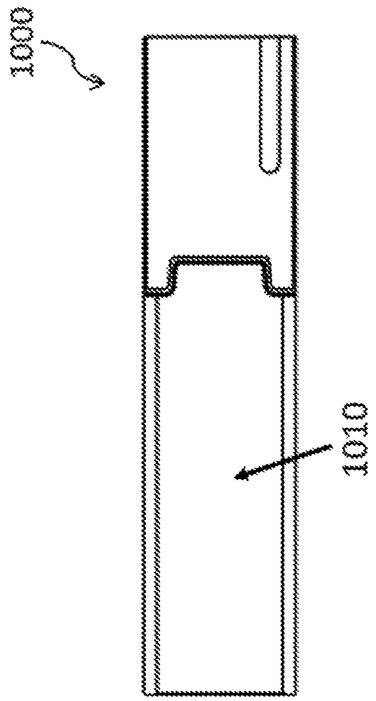

FIGS. 10A-10N illustrate various views of an example banknote storing module 1000 in accordance with various embodiments of this disclosure. FIG. 10A illustrates a perspective view of the banknote storing module in a closed state. FIG. 10B illustrates a perspective view of the banknote storing module in an open state. FIG. 10C illustrates a front view of the banknote storing module 1000 in the closed state. FIG. 10D illustrates a front view of the banknote storing module 1000 in the open state. FIG. 10E illustrates a back view of the banknote storing module 1000 in the closed state. FIG. 10F illustrates a back view of the banknote storing module 1000 in the open state. FIG. 10G illustrates a top view of the banknote storing module 1000 in the closed state. FIG. 10H illustrates a top view of the banknote storing module 1000 in the open state. FIG. 10I illustrates a bottom view of the banknote storing module 1000 in the closed state. FIG. 10J illustrates a bottom view of the banknote storing module 1000 in the open state. FIG. 10K illustrates a right side view of the banknote storing module 1000 in the closed state. FIG. 10L illustrates a right side view of the banknote storing module 1000 in the open state. FIG. 10M illustrates a left side view of the banknote storing module 1000 in the closed state. FIG. 10N illustrates a left side view of the banknote storing module 1000 in the open state. The banknote storing module can come in a wide variety of configurations, and FIGS. 10A-10N do not limit the scope of this disclosure to any particular implementation of a banknote storing module 1000. In some embodiments, the banknote escrow module 704/804/904, and the banknote storage module 705/805/905, described in FIGS. 7-9, can be the banknote storing module 1000.

The banknote storing modules 1000 include openable panels 1010 and 1011 that allow a user or operator to open the openable panels 1010 and 1011 and access an interior portion of the banknote storing module 1000. This allows the user or operator to access a banknote transportation path 1003 inside each banknote storing module 1000. For example, while in the closed configuration, the banknote storing modules 1000 can be installed onto the spine module 708/808/908 and operated in conjunction with the banknote deposit-withdrawal system 700/800/900 to receive and dispense banknotes. The banknote storing modules 1000 each includes within an interior portion a plurality of transport mechanisms such as rollers, rollers, belts, or other transport mechanisms. For example, rollers can be operable to transport banknotes along a banknote transportation path 1003 within each of the banknote storing modules 1000. The one or more openable panels 1010 and 1011 that allow for an operator to inspect inside portions of the banknote storing modules 1000, and banknote recycling modules 706/806/906, such as in the event of a banknote jam. For example, each banknote storing module 1000 can include one or more openable panels 1010 on a side exterior surface. Each openable side panel 1010 can be hingedly coupled to a side of a banknote storing module 1000 such that the openable side panel 1010 opens away from the side of the recycling modules 706/806/906 and extends in a direction perpendicular to the banknote transportation path 1003 when fully opened. Opening the one or more openable side panels 1010 grants access to at least some of the transport mechanisms inside the banknote storing module 1000, and the banknote transportation path 1003, such that, if a banknote is jammed, the jam can be corrected.

In various embodiments, the banknote storing modules 1000, include a front openable panel 1011. The front openable panel 1011 grants further access to an interior portion of the banknote storing module 1000 to correct issues within the banknote storing module 1000. The banknote storing modules 1000 can also be removed from the banknote deposit-withdrawal system 700/800/900, such as by pulling the banknote storing modules 700/800/900 forward to remove the banknote storing modules 1000 from the spine module 708/808/908. This allows an operator more access to the banknote storing module 1000 to clear a jam. The banknote storing modules 1000 can each include grooves that interact with rails of the spine module and that fit within the grooves to hold the banknote storage modules 1000 in place in the spine module 708/808/908. In some embodiments, fixation devices such as screws, bolts, brackets, or other devices can be used to further couple the banknote storing modules 1000 to the spine module 708/808/908.

Although FIGS. 10A-10N illustrate various examples of a banknote storing module 1000, various changes may be made to FIGS. 10A-10N. For example, the banknote storing module 1000 could be used in automatic ticket seller machines, automatic teller machines, vending machines and other kiosks.

Figure 11A:
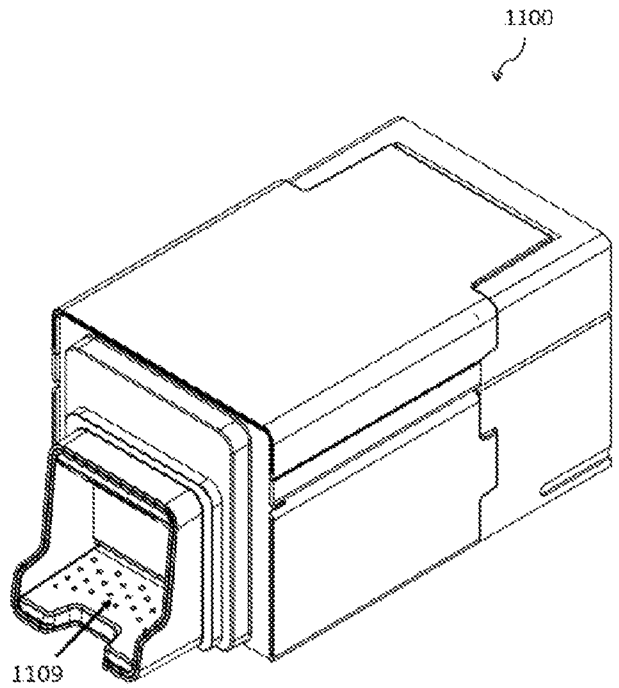
FIGS. 11A, 11B, 11C, 11D, 11E, 11F, 11G, 11H, 11I, 11J, 11K, and 11L illustrate various views of an example banknote accepting module with a payment accepting and dispensing bezel in accordance with various embodiments of this disclosure.
Figure 11B:
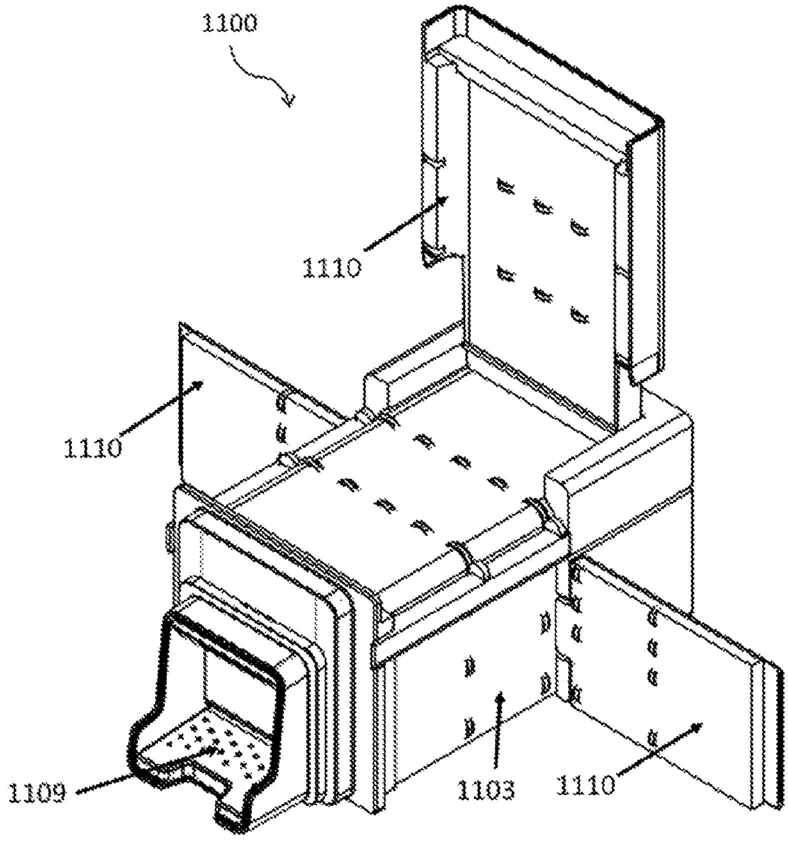
Figure 11C:
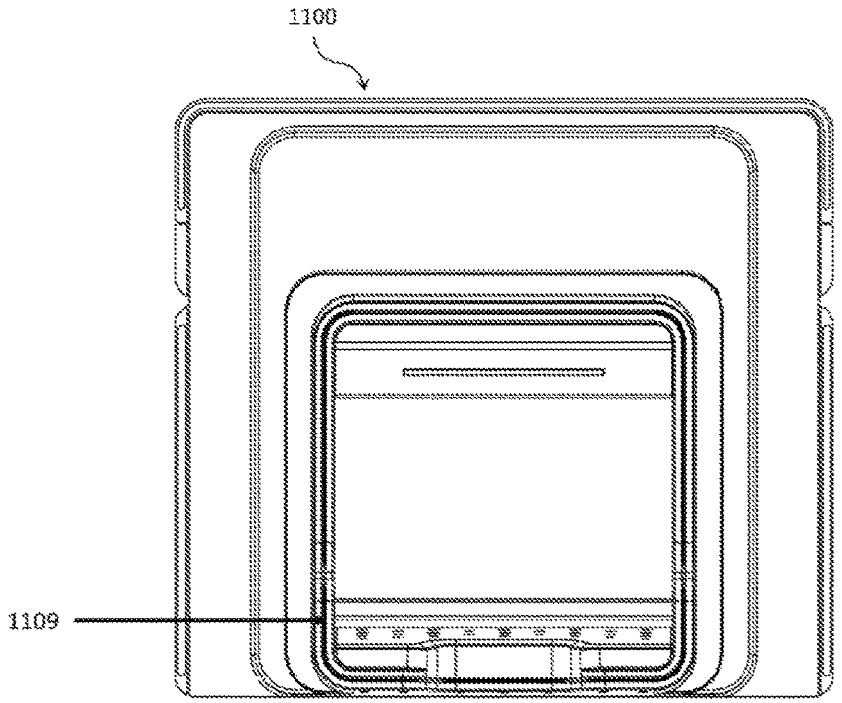
Figure 11D:
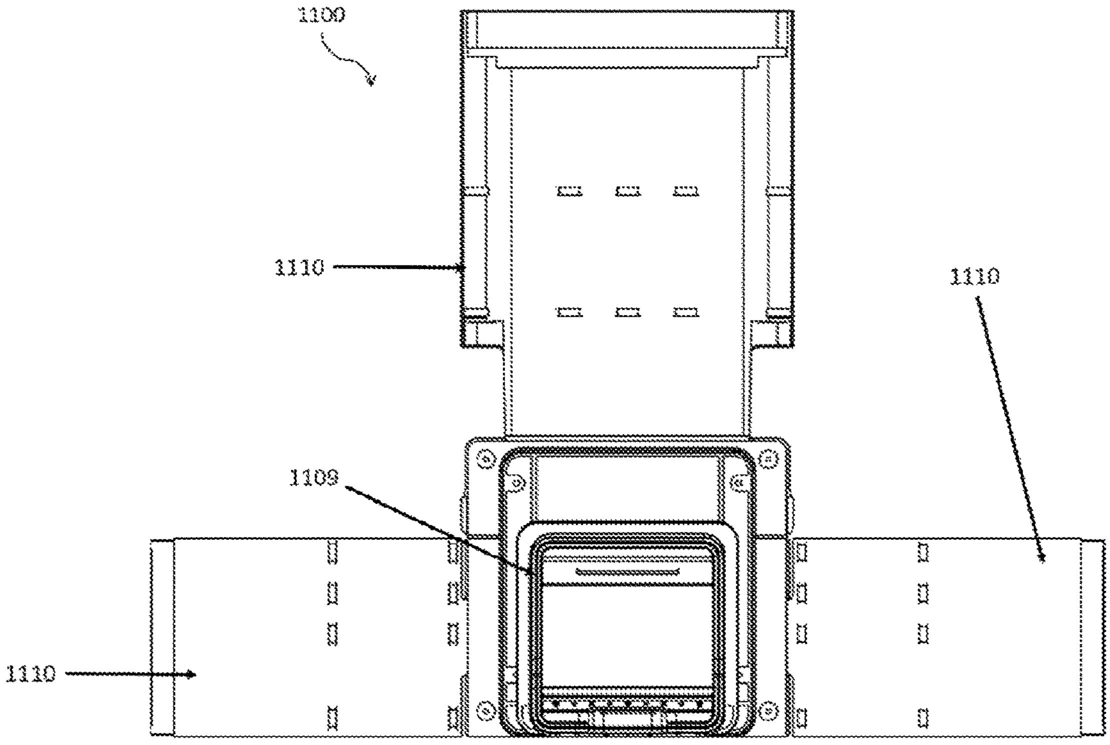
Figure 11F:
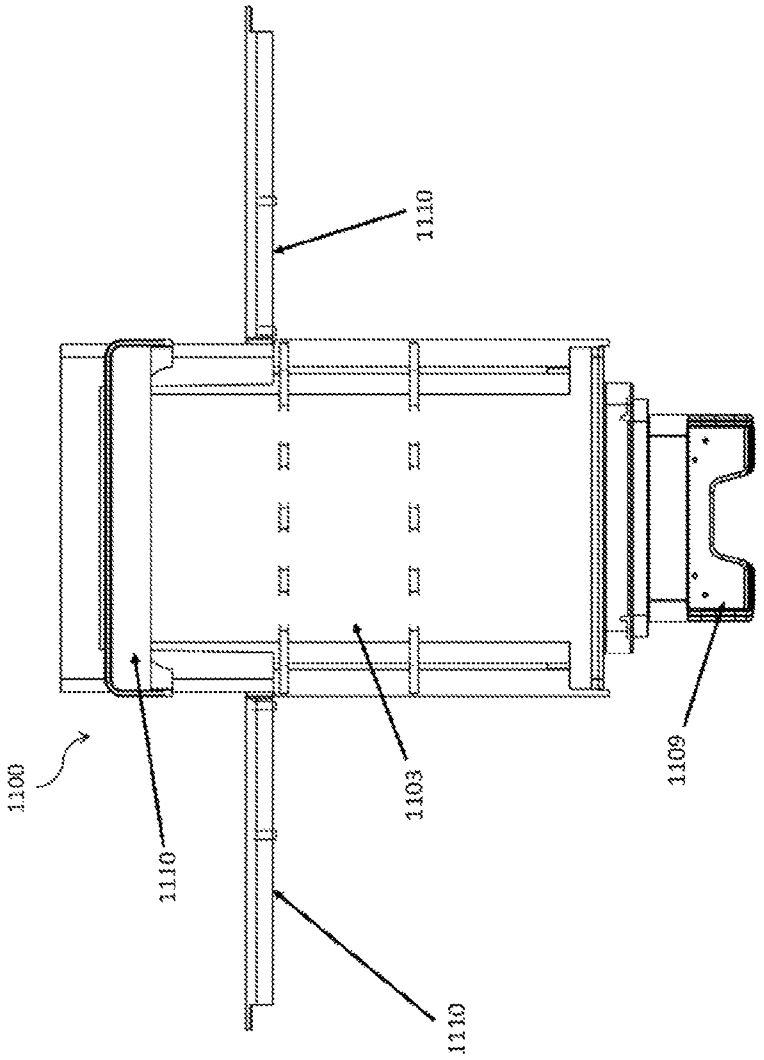
Figure 11E:
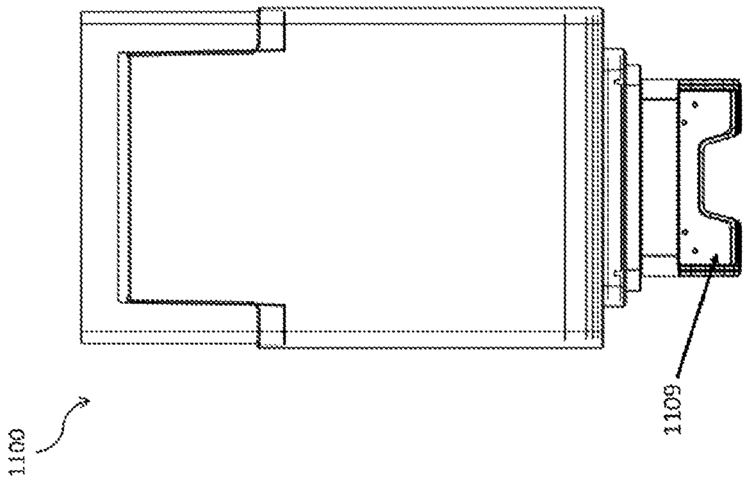
Figure 11H:
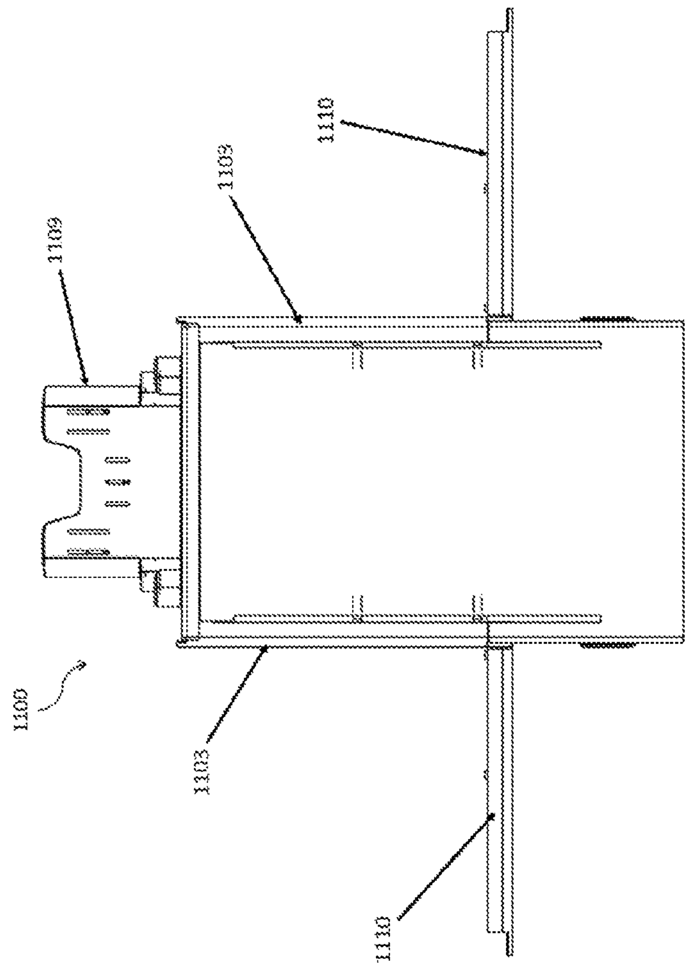
Figure 11G:
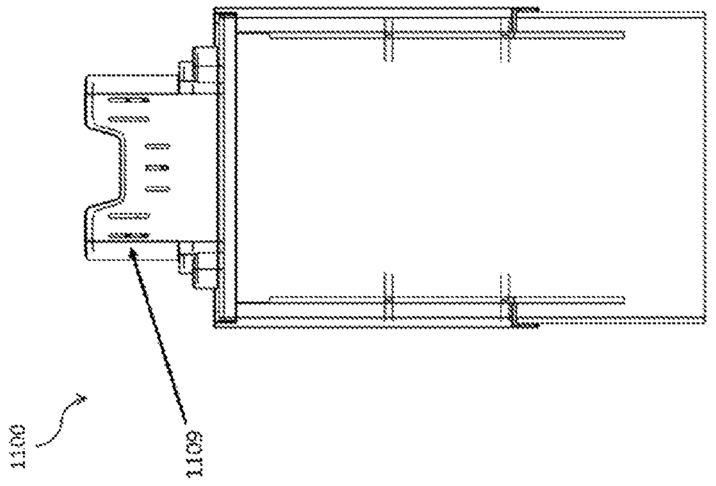
Figure 11I:
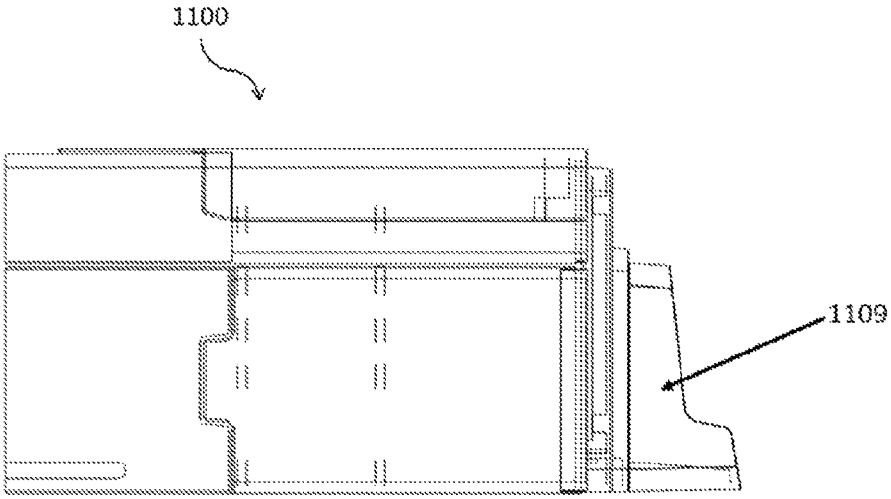
Figure 11J:
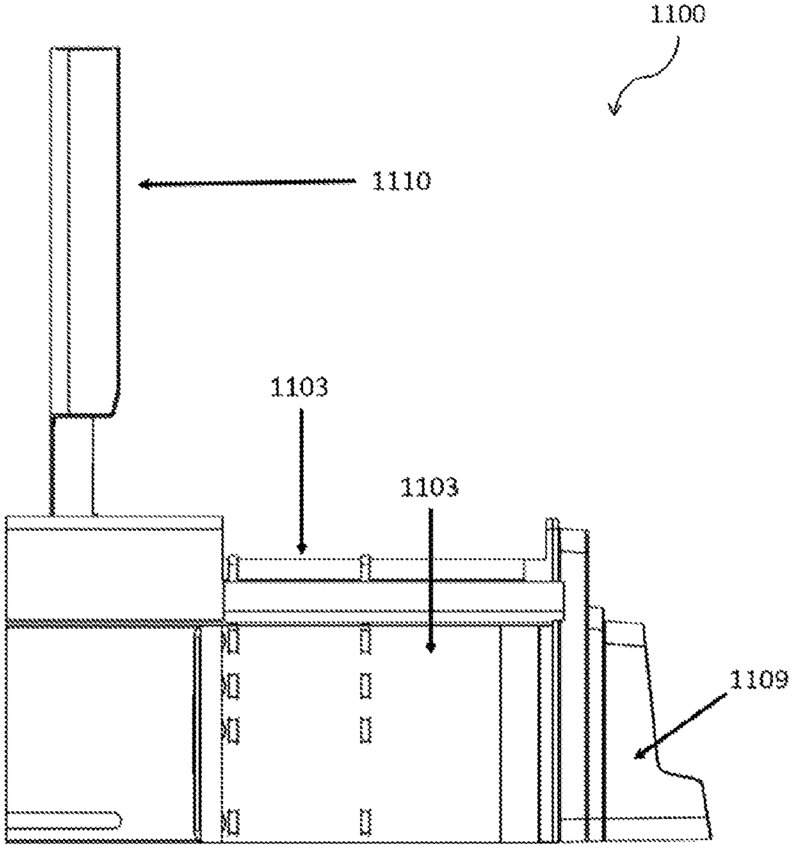
Figure 11K:
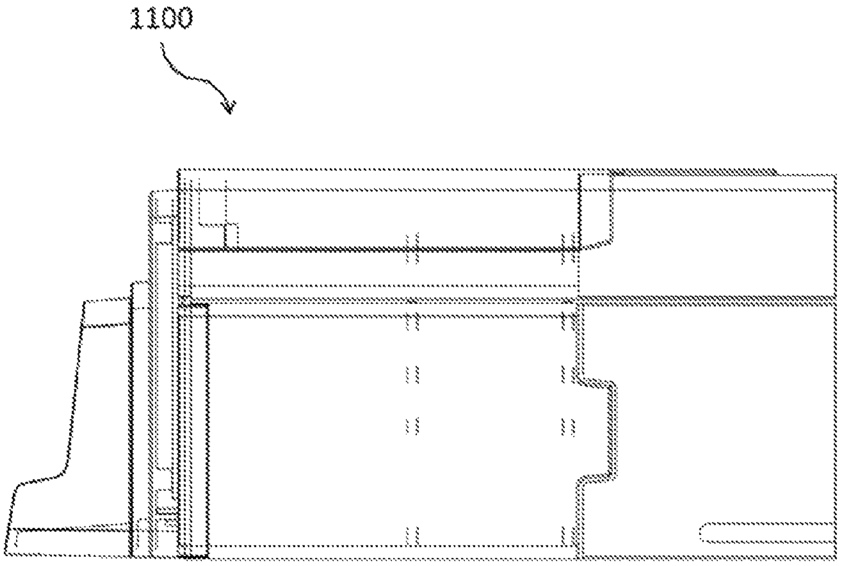
Figure 11L:
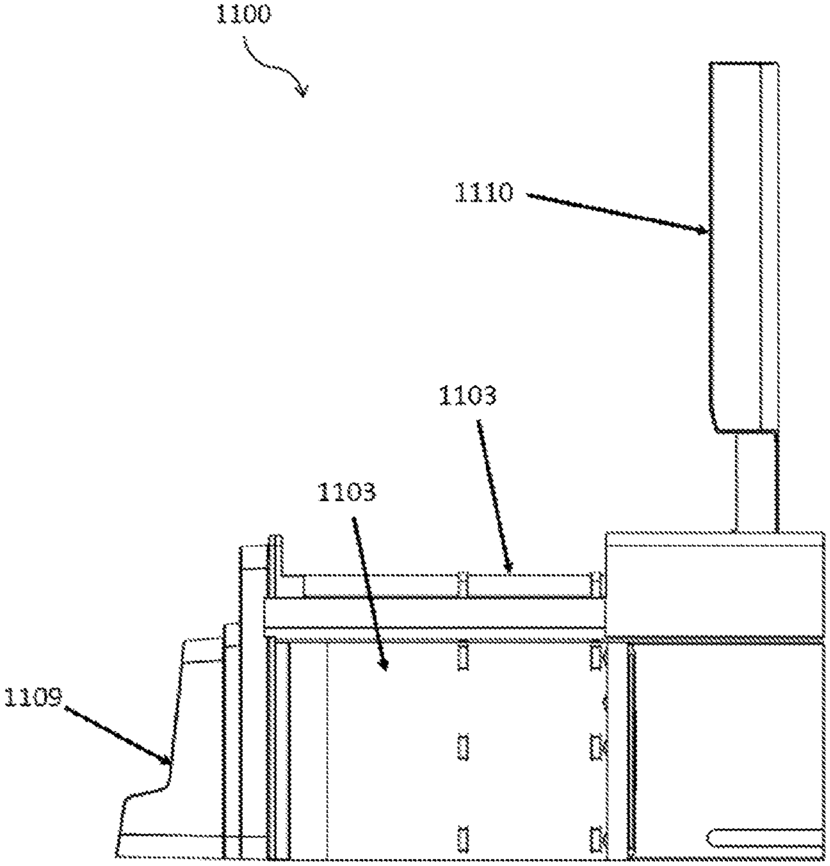

FIGS. 11A-11L illustrate various views of an example banknote the banknote accepting module 1100 with payment accepting and dispensing bezel 1109 in accordance with various embodiments of this disclosure. FIG. 11A illustrates a perspective view of the banknote accepting module 1100 with payment accepting and dispensing bezel 1109 and openable panels 1110 in a closed state. FIG. 11B illustrates a perspective view of the banknote accepting module 1100 with payment accepting and dispensing bezel 1109 and openable panels 1110 in an open state. FIG. 11C illustrates a front view of the banknote accepting module 1100 with payment accepting and dispensing bezel 1109 and openable panels 1110 in the closed state. FIG. 11D illustrates a front view of the banknote accepting module 1100 with payment accepting and dispensing bezel 1109 and openable panels 1110 in the open state. FIG. 11E illustrates a top view of the banknote accepting module 1100 with payment accepting and dispensing bezel 1109 and openable panels 1110 in the closed state. FIG. 11F illustrates a top view of the banknote accepting module 1100 with payment accepting and dispensing bezel 1109 and openable panels 1110 in the open state. FIG. 11G illustrates a bottom view of the banknote accepting module 1100 with payment accepting and dispensing bezel 1109 and openable panels 1110 in the closed state. FIG. 11H illustrates a bottom view of the banknote accepting module 1100 with payment accepting and dispensing bezel 1109 and openable panels 1110 in the open state. FIG. 11I illustrates a right side view of the banknote accepting module 1100 with payment accepting and dispensing bezel 1109 and openable panels 1110 in the closed state. FIG. 11J illustrates a right side view of the banknote accepting module 1100 with payment accepting and dispensing bezel 1109 and openable panels 1110 in the open state. FIG. 11K illustrates a left side view of the banknote accepting module 1100 with payment accepting and dispensing bezel 1109 and openable panels 1110 in the closed state. FIG. 11L illustrates a left side view of the banknote accepting module 1100 with payment accepting and dispensing bezel 1109 and openable panels 1110 in the open state. The banknote accepting module 1100 can come in a wide variety of configurations, and FIGS. 11A-11L do not limit the scope of this disclosure to any particular implementation of a banknote the banknote accepting module 1100.

The banknote accepting module 1100 can include a sensing module 702/802/902 disposed as a top portion of the banknote accepting module 1100, and a payment accepting and dispensing bezel 1109 can be installed on a front surface of the banknote accepting module 1100. The banknote accepting module 1100 and the banknote sensing module 702/802/902 can include openable panels 1110 that allow a user or operator to open the openable panel 1110 and access an interior portion of the banknote accepting module 1100. This allows the user or operator to access a banknote transportation path 1103 inside the banknote accepting module 1100. For example, while in the closed configuration, the banknote accepting module 1100 and sensing module 702/802/902 can be installed onto the spine module 708/808/908 and operated in conjunction with the banknote deposit-withdrawal system 700/800/900 to receive and dispense banknotes. The banknote accepting module 1100 and sensing module 702/802/902 each include within an interior portion a plurality of transport mechanisms such as rollers, rollers, belts, or other transport mechanisms. For example, rollers can be operable to transport banknotes along a banknote transportation path 1103 within each of the modules.

The accepting and sensing modules also include one or more openable panels 1110 that allow for an operator to inspect inside portions of the banknote accepting module 1100, such as in the event of a banknote jam. For example, the banknote accepting module 1100 can include one or more openable panels 1110 on a side exterior surface. Each openable panel 1110 can be hingedly coupled to a side of the banknote accepting module 1100 such that the side panel opens away from the side of the banknote accepting module and extends in a direction perpendicular to the banknote transportation path 1103 when fully opened. Opening the one or more side panels grants access to at least some of the transport mechanisms inside the banknote accepting module 1100, and the banknote transportation path 1103, such that, if a banknote is jammed, the jam can be corrected.

The banknote sensing module 702/802/902 can also include an openable panel, such as an openable panel 1110 on a top surface that, when opened fully, extends up vertically from a top of the banknote deposit-withdrawal system 700/800/900. While the banknote sensing module 702/802/902 is in the open configuration, an operator can inspect inside portions of the banknote sensing module 702/802/902, such as in the event of a banknote jam. For example, the openable panel 1110 on the top portion of the banknote sensing module 702/802/902 can be hingedly connected such that the operator can view inside the banknote sensing module 702/802/902 and reach into the banknote sensing module 702/802/902 if needed to correct issues within the banknote sensing module 702/802/902. In some embodiments, the banknote sensing module 702/802/902 can include transparent windows, such as transparent glass or plastic portions, that are disposed at one or more of the openable panels 1110, or elsewhere on various surfaces of the banknote sensing module 702/802/902, such as a top surface overlooking the banknote transportation path 1103 on the openable panel of the top portion, to allow an operator or user to view banknotes either traveling through the banknote transportation path 1103, or jammed banknotes. In some embodiments, the banknote sensing module 702/802/902 can include a banknote transportation path 1103 that is oriented in a different direction than that of the banknote accepting module 701/801/901, such that banknotes can be passed from the banknote accepting module 701/801/901 to the sensing module for banknote recognition, and then passed back to the banknote accepting module 701/801/901 for further processing through the banknote deposit-withdrawal system 700/800/900.

Although FIGS. 11A-11L illustrate various examples of a banknote the banknote accepting module 1100, various changes may be made to FIGS. 11A-11L. For example, the banknote accepting module 1100 could be used in automatic ticket seller machines, automatic teller machines, vending machines and other kiosks.

Figure 12A:
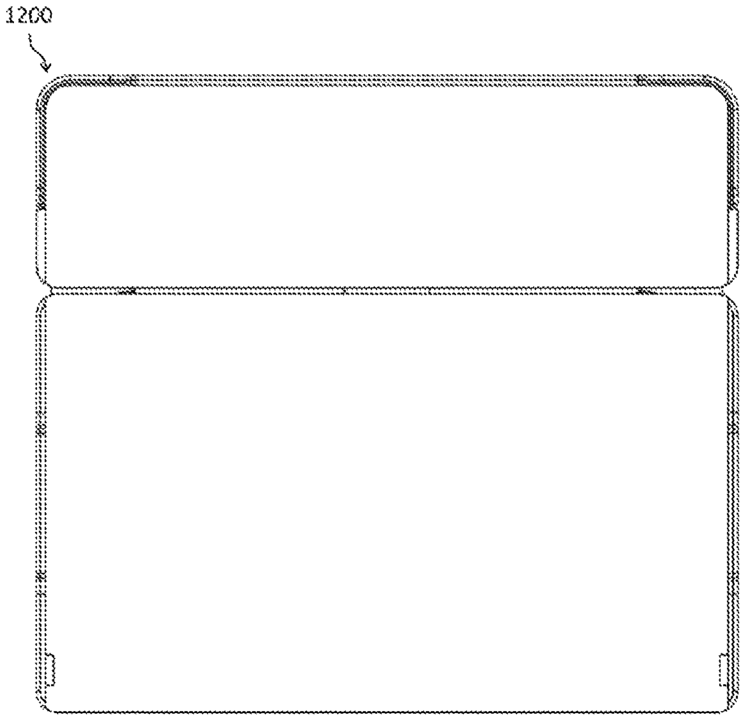
FIGS. 12A and 12B illustrate an example banknote accepting module in accordance with various embodiments of this disclosure.
Figure 12B:
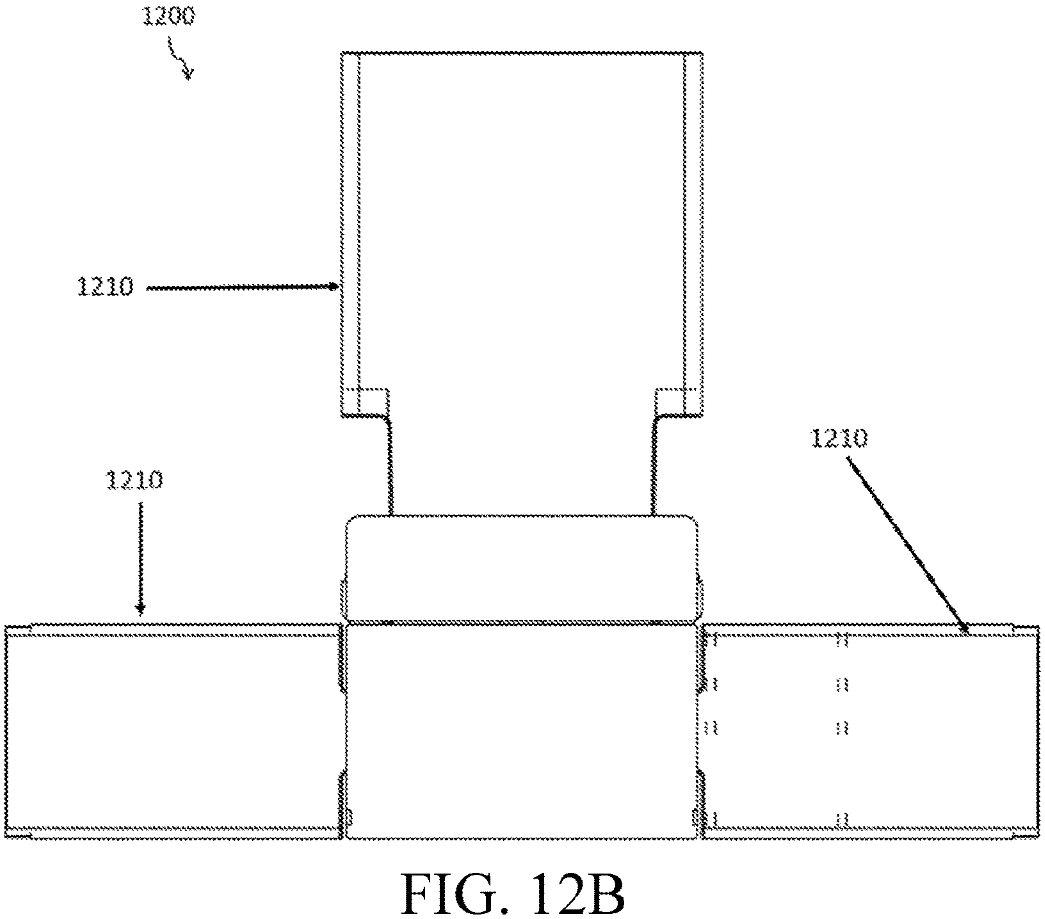

FIGS. 12A and 12B illustrate an example banknote the banknote accepting module 1200 in accordance with various embodiments of this disclosure. FIG. 12A illustrates a front view of the banknote accepting module 1200 in a closed state. FIG. 12B illustrates a front view of the banknote accepting module 1200 in an open state. The banknote accepting module 1200 can come in a wide variety of configurations, and FIGS. 12A and 12B do not limit the scope of this disclosure to any particular implementation of a banknote the banknote accepting module.

As described with respect to FIGS. 11A-11L, the banknote accepting module 1100 and the sensing module 702/802/902 can include openable panels 1110 for accessing interior portions of the banknote accepting module 1100. FIGS. 12A and 12B illustrate the banknote accepting module 1200 and sensing module 702/802/902 without a payment accepting and dispensing bezel 1109 installed on a front surface. The banknote accepting module 1200 includes openable panels 1210 to provide access to interior of the banknote accepting module 1200. In some embodiments, the banknote accepting module 1200 also can include a front openable panel (not shown) similar to the banknote storing modules 1000, as described with respect to FIGS. 9A-9L and 10A-10N.

Although FIGS. 12A and 12B illustrate an example of a banknote the banknote accepting module 1200, various changes may be made to FIGS. 12A and 12B. For example, the banknote accepting module 1200 could be used in automatic ticket seller machines, automatic teller machines, vending machines and other kiosks.

Figure 13B:
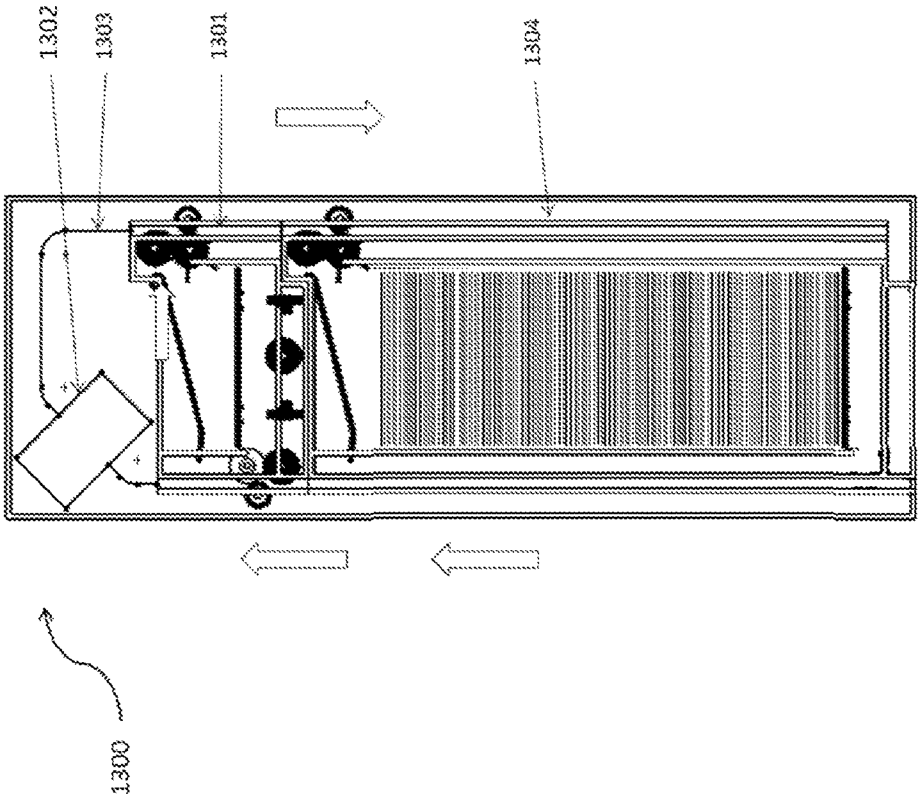
FIGS. 13A and 13B illustrate an example banknote accepting apparatus in accordance with various embodiments of the present disclosure.
Figure 13A:
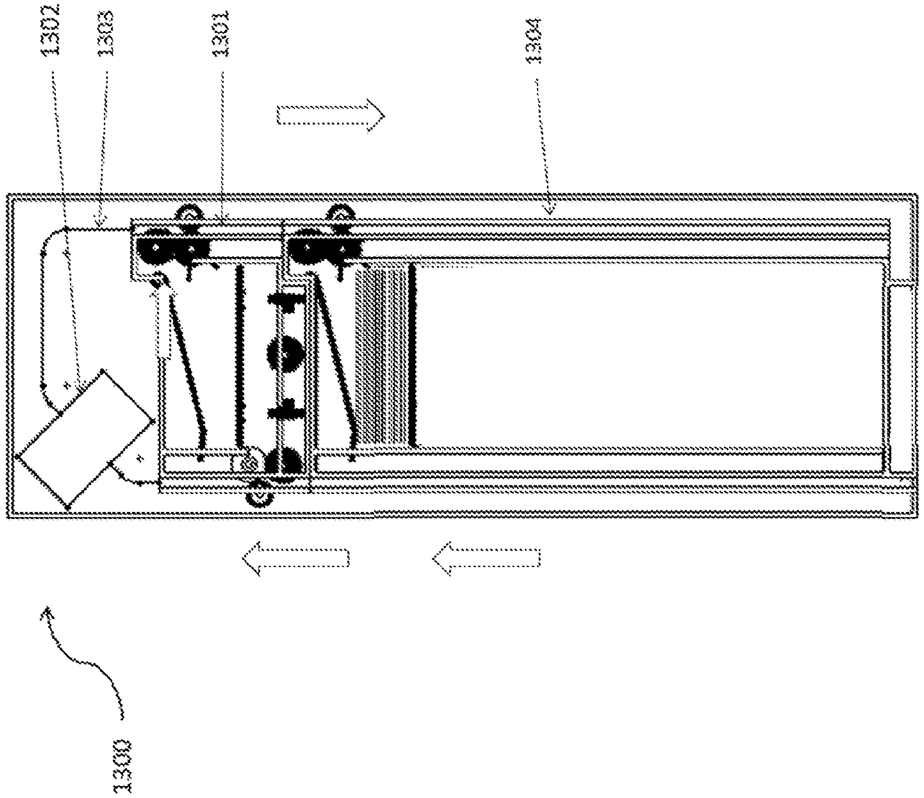

FIGS. 13A and 13B illustrate an example banknote acceptor system 1300 in accordance with various embodiments of the present disclosure. FIG. 13A shows a banknote acceptor configured to receive multiple banknotes in bulk to verify the authenticity of the inserted banknotes in bulk. A banknote accepting module 1301 accepts banknotes in bulk. Banknotes are inserted in the banknote accepting module 1301 in an orientation where the short edge of the banknotes is the leading-edge. Banknotes are transported in a short edge leading-edge orientation to a separation area inside the banknote accepting module 1301. Banknotes are separated and transported by a banknote transportation path 1303 towards a banknote sensing module 1302 serially in an orientation where the long edge of the banknotes is the leading-edge. The banknote transportation path 1303 is a part of a banknote transportation module. The banknote transportation module could also include one or more of rollers, belts, motors and ribs to transport banknotes along banknote transportation path 1303. If the sensing unit determines that an inserted banknote is acceptable, then the accepted banknote is transported to a banknote storage unit 1304 in the long edge leading orientation. Banknotes deemed not acceptable are returned to banknote accepting module 1301 by the banknote transport module in the long edge leading orientation. Unacceptable banknotes can be returned to the user in the short edge leading-edge orientation. Once the banknote storage unit 1304 is filled (as shown in FIG. 13B), after a certain number transactions, or after a fixed amount of time, the banknote storage unit 1304 is removed to collect banknotes from the banknote acceptor system 1300.

In some embodiments, the banknote acceptor system 1300 can be configured to receive one banknote at a time from the user to verify the authenticity of the inserted banknote. A banknote is inserted in the banknote accepting module 1301 in an orientation where the short edge of the banknote is the leading-edge. The banknote is transported by the short edge leading-edge orientation to a separation area inside the banknote accepting module 1301. The banknote is transported towards the banknote sensing module 1302 in an orientation where the long edge of the banknote is the leading-edge by the banknote transport module. If the banknote sensing module 1302 determines that the inserted banknote is acceptable, then the accepted banknote is transported to the banknote storage unit 1304 in the long edge leading orientation. A banknote deemed not acceptable is returned to the banknote accepting module 1301 by the banknote transport module in the long edge leading orientation. Unacceptable banknotes can be returned to the user in the short edge leading-edge orientation. Once the banknote storage unit 1304 is filled (as shown in FIG. 13B), after a certain number of transactions, or after a fixed amount of time, the banknote storage unit 1304 is removed to collect banknotes from the banknote acceptor system 1300.

In some embodiments, banknote acceptor system 1300 can be configured in such a manner that the operator can limit the operation of the banknote acceptor system 1300 to accept a single banknote at a time from the user and to allow the operator to provide an option to insert multiple banknotes in bulk. The operator can choose to use some of the banknote acceptor systems 1300 in a single banknote at a time acceptor mode and other banknote acceptor systems 1300 in a multiple banknotes in bulk acceptor mode. The operator can change the mode of operation of the banknote acceptor system 1300 from accepting a single banknote at a time to accepting multiple banknotes in bulk. The operator can also change the mode of operation from accepting multiple banknotes in bulk to accepting a single banknote at a time.

Figure 14B:
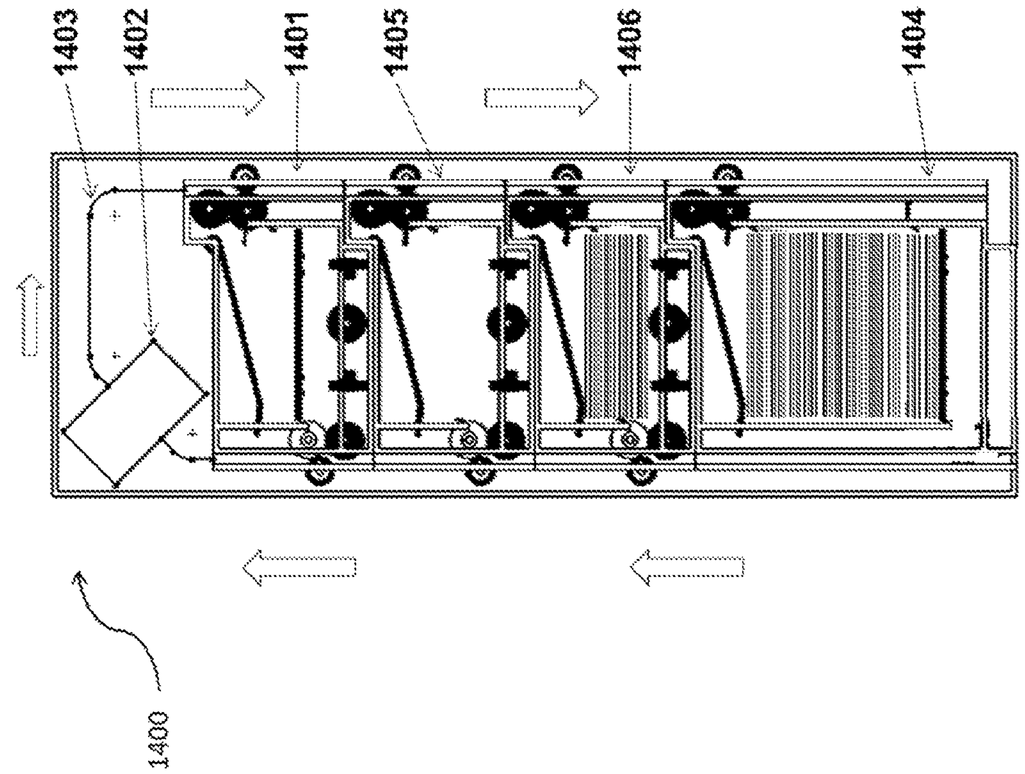
FIGS. 14A, 14B, 14C, 14D, and 14E illustrate an example banknote deposit-withdrawal system in accordance with various embodiments of the present disclosure.
Figure 14A:
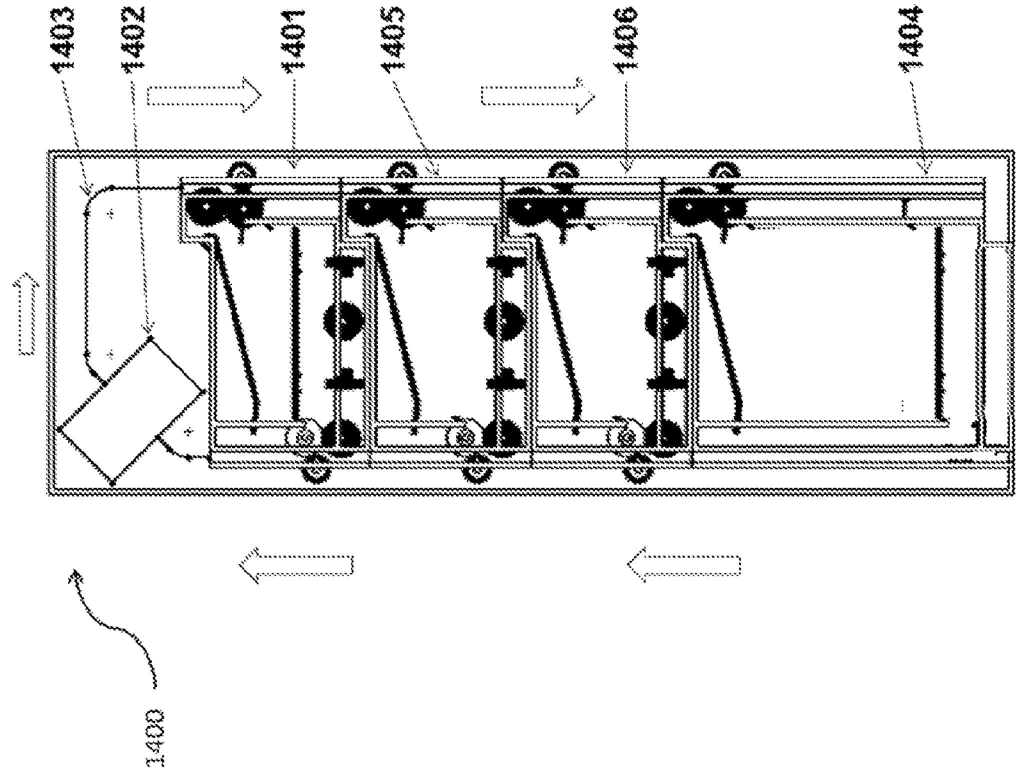

FIGS. 14A-14E illustrate various views of an example banknote deposit-withdrawal system 1400 in accordance with various embodiments of the present disclosure. FIG. 14A shows a banknote deposit-withdrawal system 1400 configured to receive multiple banknotes in bulk to verify the authenticity of the inserted banknotes in bulk. A banknote accepting module 1401 accepts banknotes in bulk. Banknotes are inserted in a banknote accepting module 1401 in an orientation where the short edge of the banknotes is the leading-edge. Banknotes are transported in the short edge leading-edge orientation to a separation area. Banknotes are separated and transported towards the banknote sensing module 1402 serially in an orientation where the long edge of the banknotes is the leading-edge by banknote transportation path 1403. The banknote transportation path 1403 is a part of a banknote transportation module. The banknote transportation module could also include one or more of rollers, belts, motors and ribs to transport banknotes along banknote transportation path 1403. Banknotes deemed not acceptable are returned to banknote accepting module 1401 by banknote transportation module in the long edge leading orientation. Unacceptable banknotes are returned to the user in the short edge leading-edge orientation. Once the banknote storage module 1404 is filled (as shown in FIG. 14B), after a certain number of transactions, or after a fixed amount of time, the banknote storage module 1404 is removed to collect banknotes from banknote deposit-withdrawal system 1400. The banknote deposit-withdrawal system 1400 also includes a banknote escrow module 1405. The banknote transportation module transports all accepted banknotes into the banknote escrow module 1405 for temporary storage in the long edge leading-edge orientation until completion of the transaction. If the user cancels transactions, then banknote transportation module transports banknotes from the banknote escrow module 1405 via the banknote sensing module 1402 to the banknote accepting module 1401 in the long edge leading-edge orientation and returns the banknotes to the user in the short edge leading-edge orientation. Upon completion of a successful transaction, banknotes from the banknote escrow module 1405 are moved either to the banknote storage module 1404 or a banknote recycling module 1406 in the long edge leading orientation via the banknote sensing module 1402 and the banknote accepting module 1401. The banknote recycling module 1406 accepts banknotes in the long edge leading-edge orientation for temporary storage. Banknotes stored in the banknote recycling module 1406 are used to provide change to the users to complete the transaction. Banknotes dispensed from the banknote recycling module 1406 are sent by the banknote transportation module to the banknote accepting module 1401 via the banknote sensing module 1402 in the long edge leading-edge orientation and dispensed to the user in the short edge leading-edge orientation.

Figure 14D:
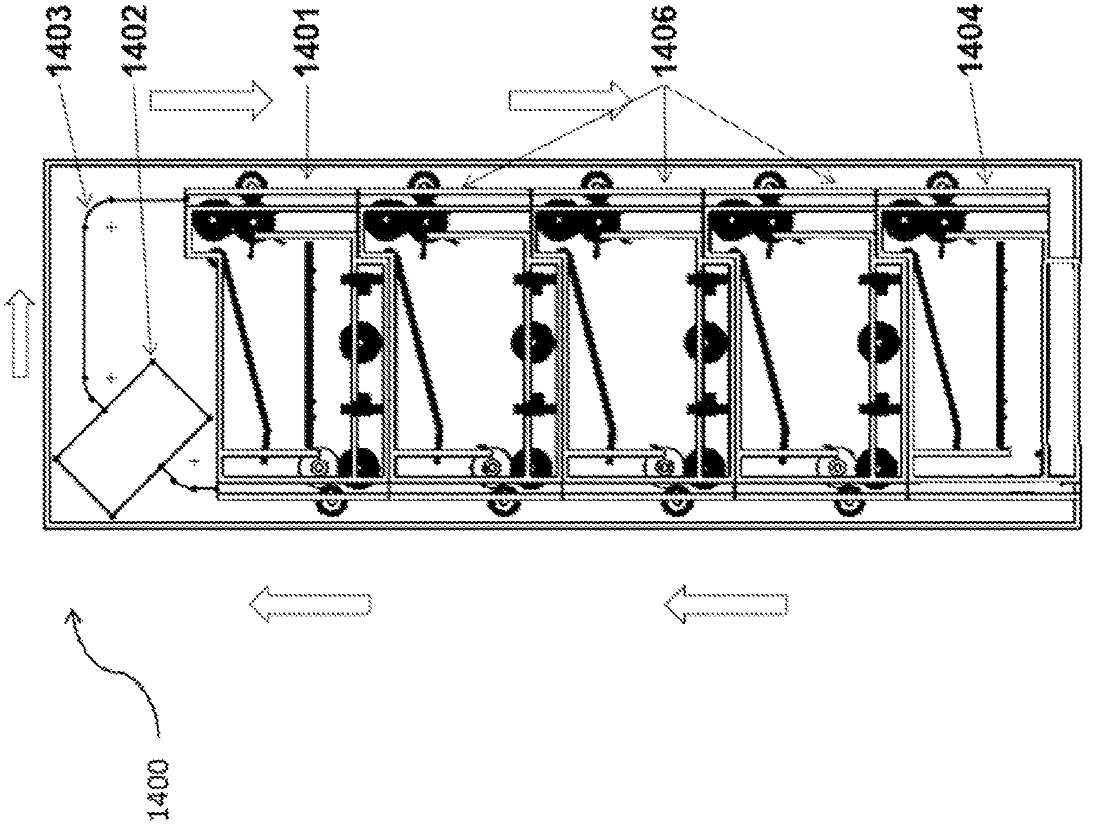
Figure 14C:
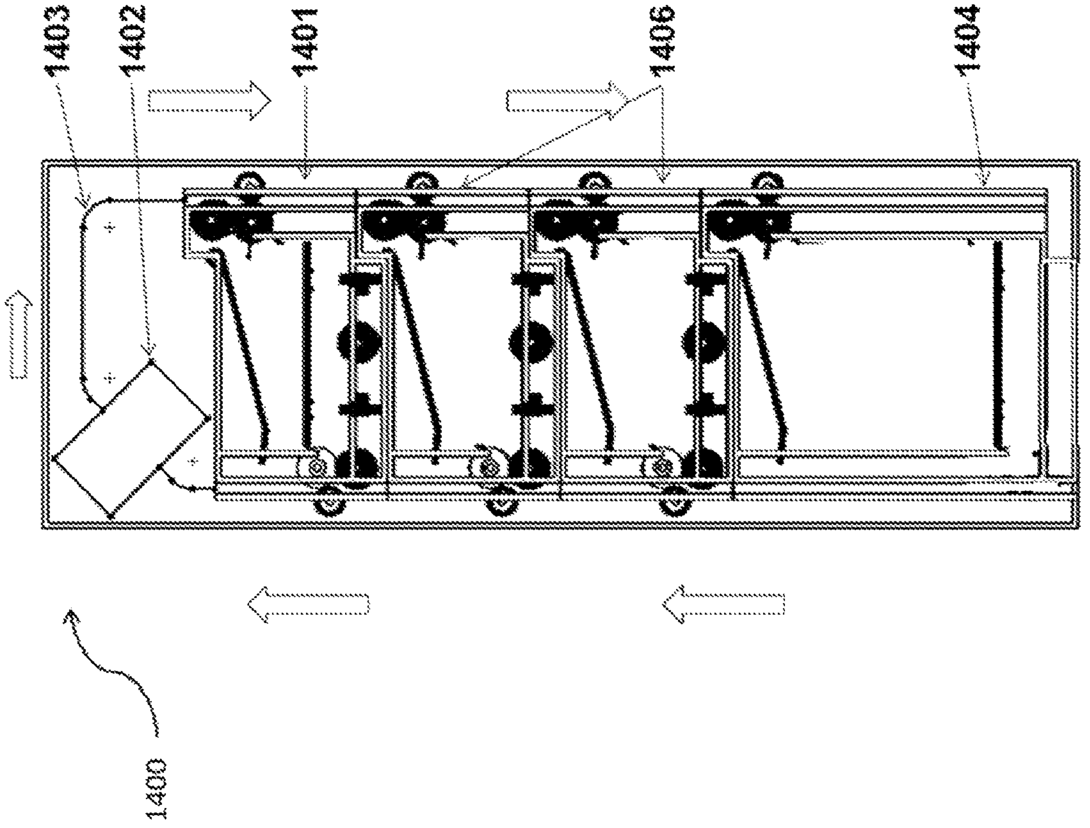

In some embodiments, the banknote escrow module 1405 may not be present, such as shown in FIG. 14C. Banknotes accepted by the banknote sensing module 1402 can be sent to either the banknote recycling module 1406 or the banknote storage module 1404. If the user cancels transactions, then banknotes from one of the banknote recycling module 1406 might be used to return different banknotes of the same values to the user. Banknotes dispensed from the banknote recycling module 1406 are sent by banknote transportation module to the banknote accepting module 1401 via the banknote sensing module 1402 in the long edge leading-edge orientation and dispensed to the user in the short edge leading-edge orientation.

In some embodiments, such shown in FIG. 14D, a banknote storage module 1404 can be similar to one of the banknote recycling modules 1406. Banknotes accepted by the banknote sensing module 1402 can be sent to either the banknote recycling module 1406 or the banknote storage module 1404. As the banknote deposit-withdrawal system 1400 can carry out many transactions, a smaller banknote storage module 1404 can be utilized. Small denomination banknotes that can be used for providing change to the users for transactions can be stored in one of the banknote recycling modules 1406 and large denomination banknotes that are not used for change can be stored in the banknote storage module 1404. Banknotes dispensed from the banknote recycling module 1406 are sent by banknote transportation module to the banknote accepting module 1401 via the banknote sensing module 1402 in the long edge leading-edge orientation and dispensed to the user in the short edge leading-edge orientation.

Figure 14E:
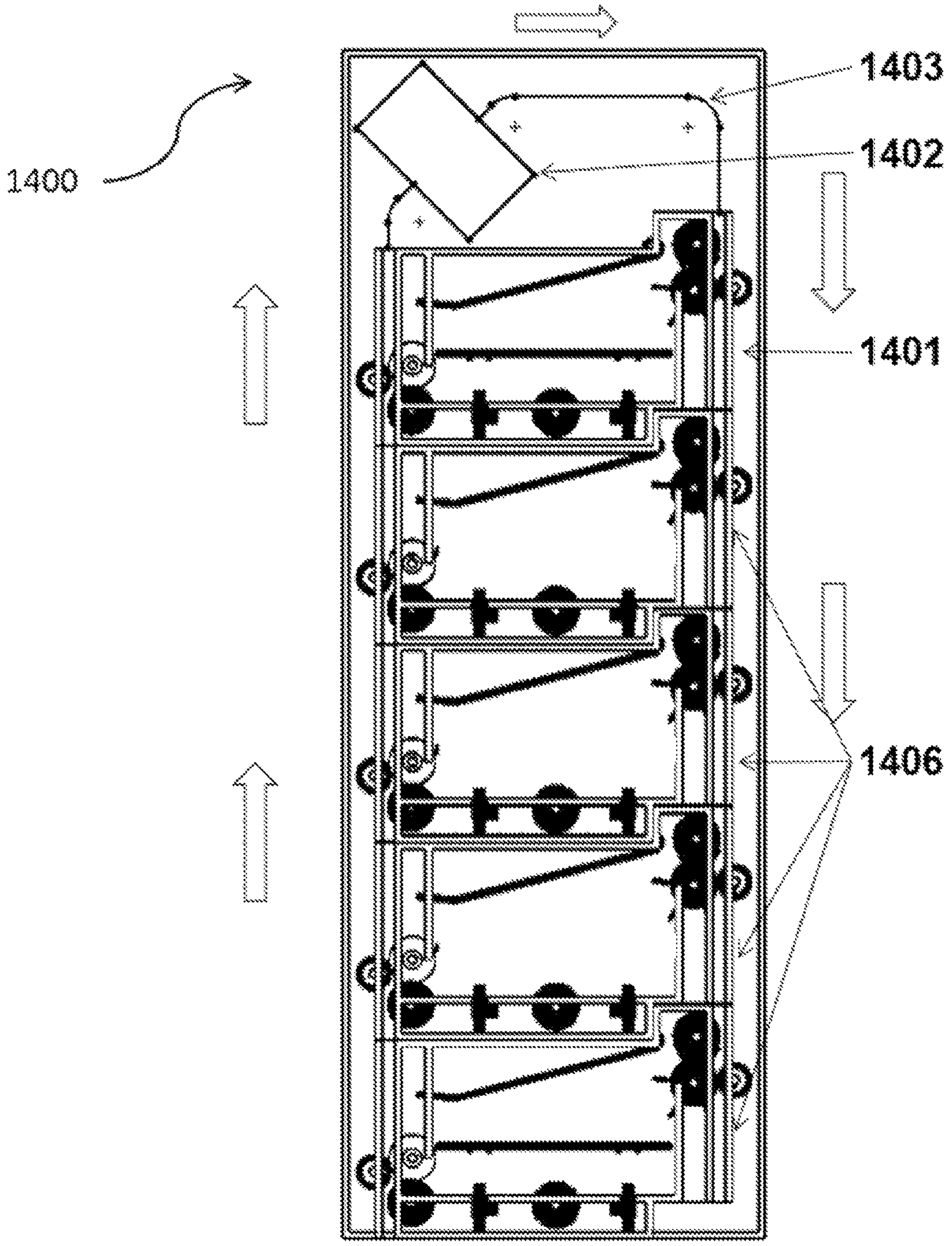

In some embodiments, such as shown in FIG. 14E, banknote storage module 1404 is not present. Banknotes accepted by the banknote sensing module 1402 can be sent to one of the banknote recycling modules 1406. Small denomination banknotes that can be used for providing change to the users for transactions can be stored in one of the banknote recycling modules 1406 and large denomination banknotes that are not used for change can be stored in one of the banknote recycling modules 1406. Banknotes dispensed from the banknote recycling module 1406 are sent by the banknote transportation module to the banknote accepting module 1401 via the banknote sensing module 1402 in the long edge leading-edge orientation and dispensed to the user in the short edge leading-edge orientation. As all banknotes being dispensed can be authenticated in the banknote sensing module 1402, banknotes not used for the transaction can be sent back to one of the banknote recycling module 1406 for storage. In this embodiment, if a particular banknote recycling module 1406 gets filled, that particular banknote recycling module 1406 can be emptied or replaced with an empty banknote recycling module 1406.

In some embodiments, a banknote deposit-withdrawal system 1400 can be configured to receive one banknote at a time from the user to verify the authenticity of the inserted banknote. A banknote is inserted in the banknote accepting module 1401 in an orientation where the short edge of the banknote is the leading-edge. The banknote is transported in the short edge leading-edge orientation to a separation area inside the banknote accepting module 1401. The banknote is transported towards the banknote sensing module 1402 in an orientation where the long edge of the banknote is the leading-edge by banknote transportation module. If the sensor or sensing unit determines that the inserted banknote is acceptable, then the accepted banknote is transported to banknote escrow module 1405 (if present), banknote storage module 1404 (if present), or banknote recycling module 1406 in the long edge leading orientation. A banknote deemed not acceptable is returned to banknote accepting module 1401 by banknote transportation module in the long edge leading orientation. An unacceptable banknote can be returned to the user in the short edge leading-edge orientation. Once the banknote storage module 1404 is filled (as shown in FIG. 14B), after a certain number of transactions, or after fixed amount of time, the banknote storage module 1404 is removed to collect banknotes from banknote deposit-withdrawal system 1400.

In other embodiments, a banknote deposit-withdrawal system 1400 can be configured in such a manner that the operator can limit the operation of the banknote deposit-withdrawal system 1400 to a single note at a time from the user and allow the operator to provide an option to insert multiple banknotes in bulk. The operator can choose to use some of the banknote deposit-withdrawal systems 1400 in a single banknote at a time acceptor mode and other banknote deposit-withdrawal systems 1400 in a multiple banknotes in bulk acceptor mode. The operator can change the mode of operation of the banknote deposit-withdrawal system 1400 from accepting a single banknote at a time to accepting multiple banknotes in bulk. The operator in addition, can also change the mode of operation from accepting multiple banknotes in bulk to accepting single banknote at a time.

Figure 15A:
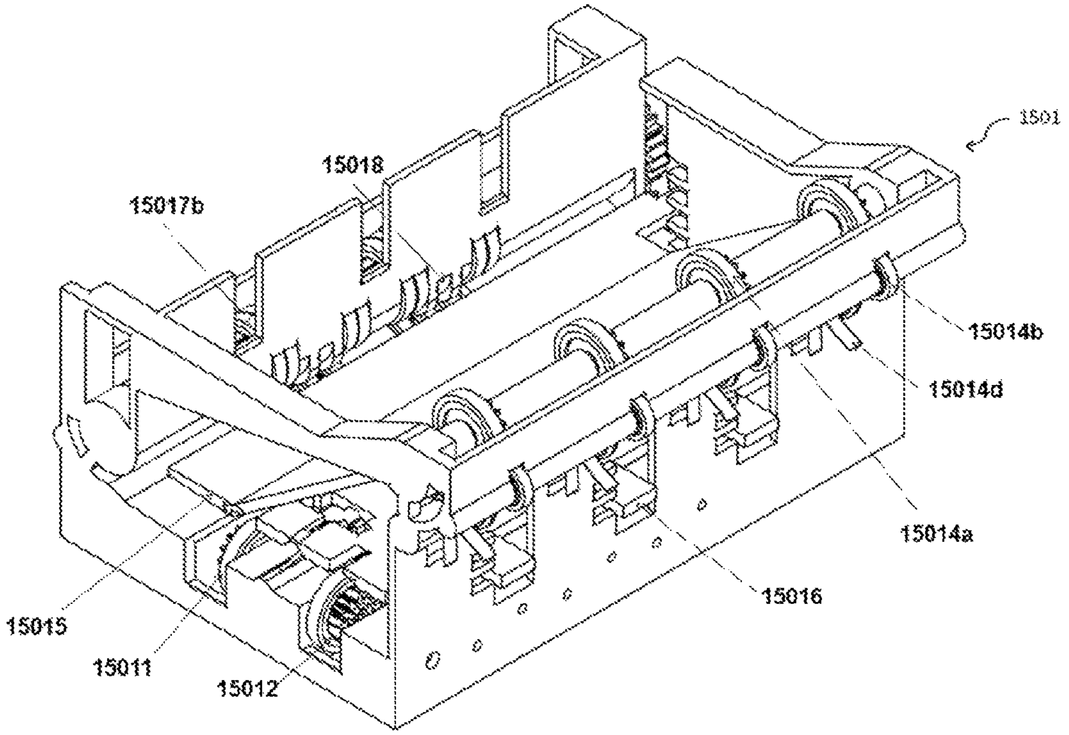
FIGS. 15A, 15B, 15C, 15D, 15E, 15F, 15G, and 15H illustrates various views of an example banknote accepting module in accordance with various embodiments of the present disclosure.
Figure 15B:
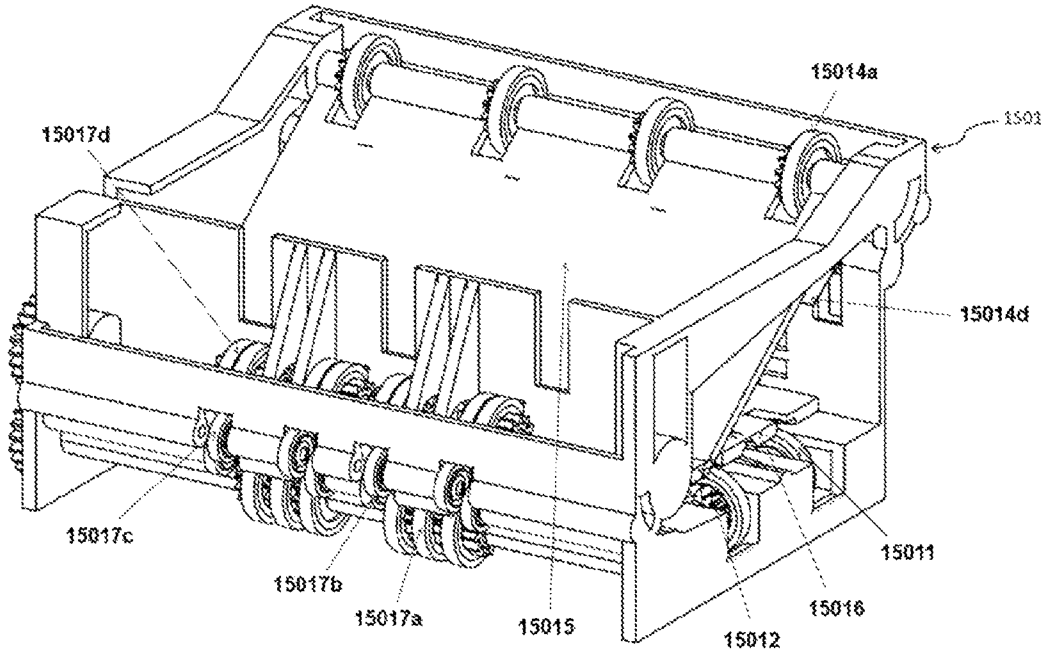
Figure 15C:
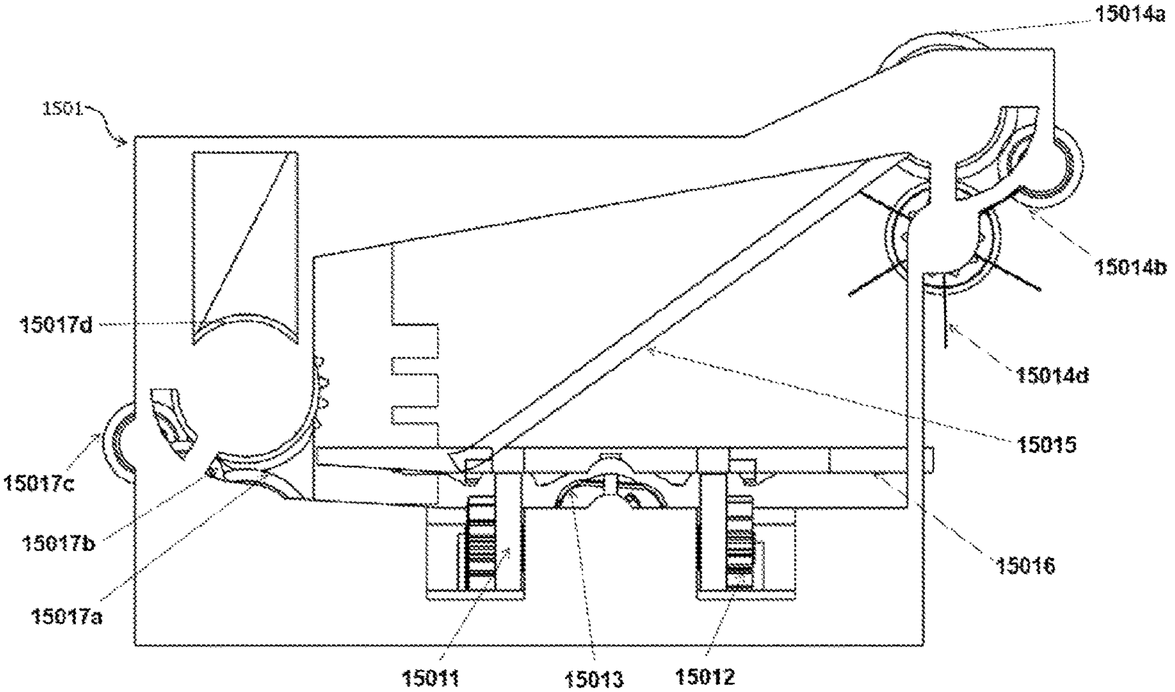
Figure 15D:
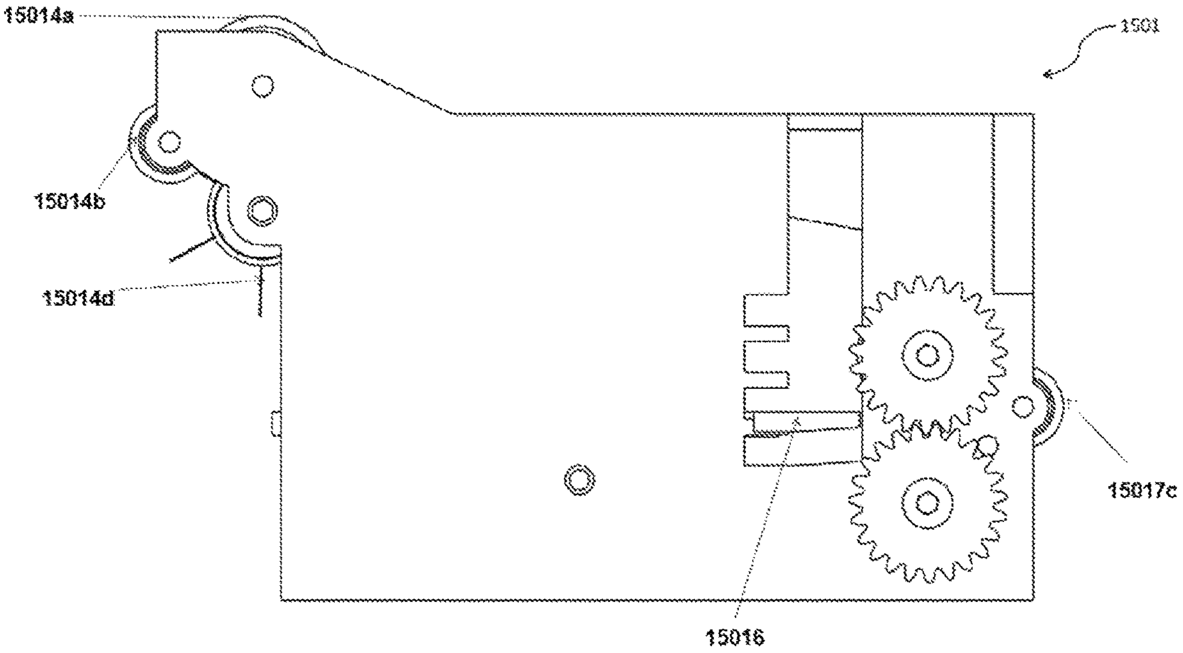
Figure 15E:
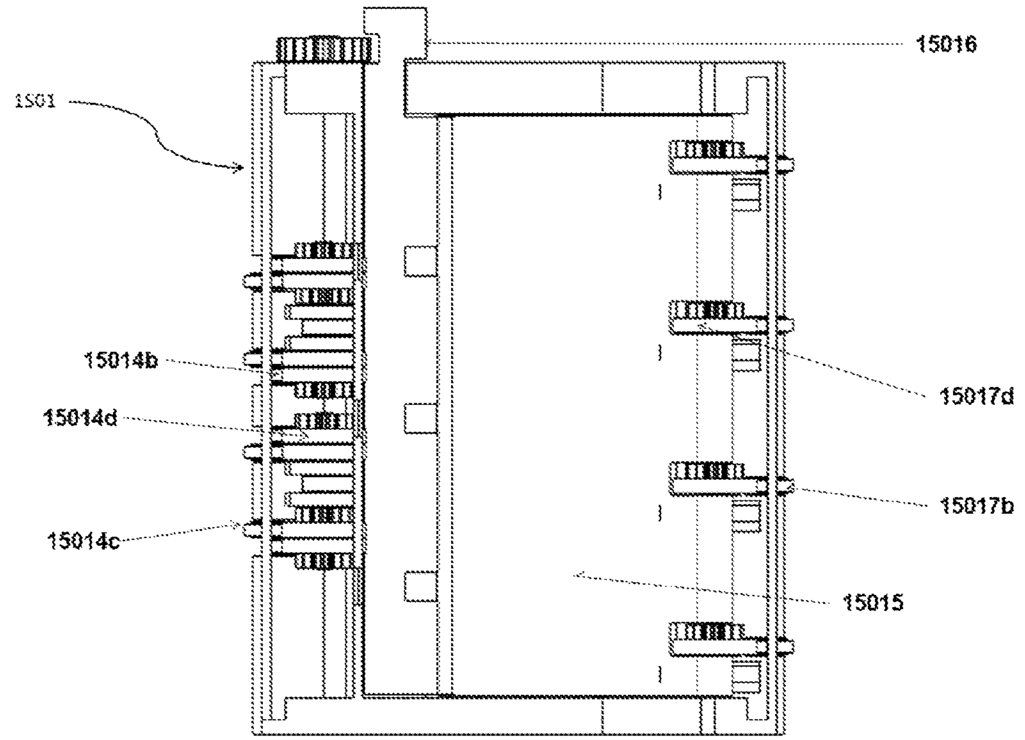
Figure 15F:
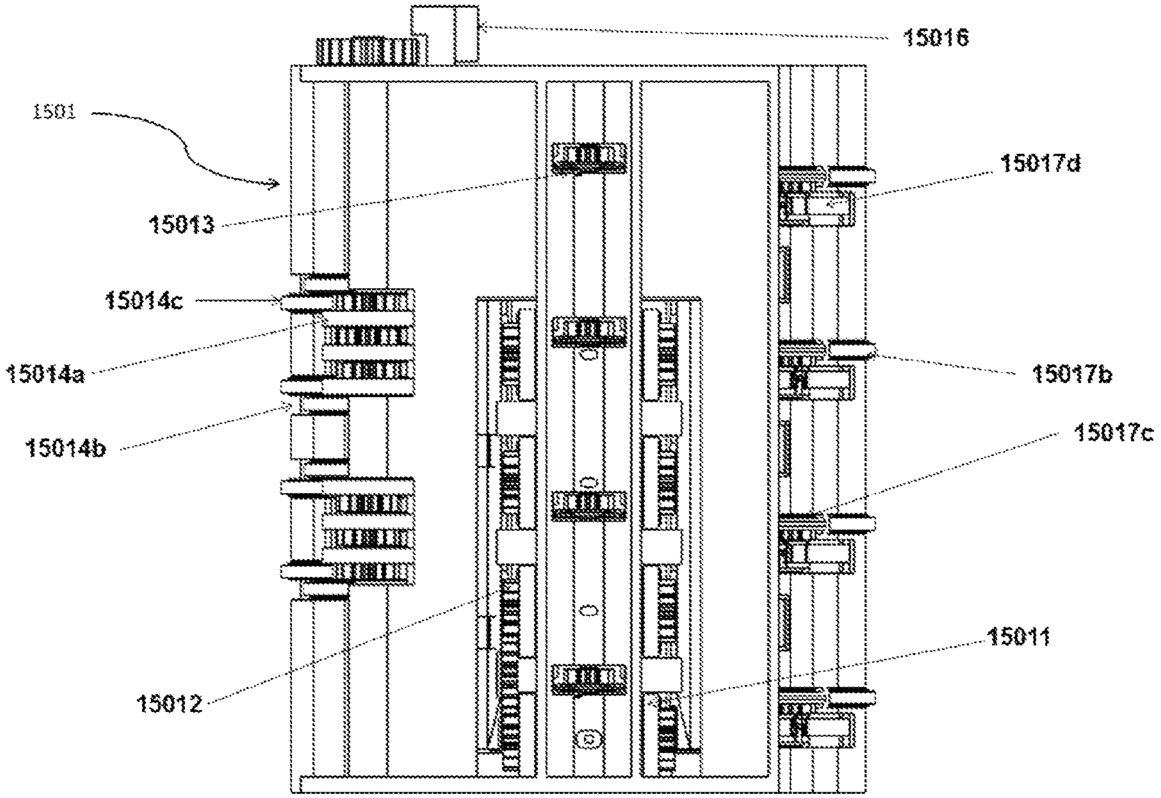
Figure 15G:
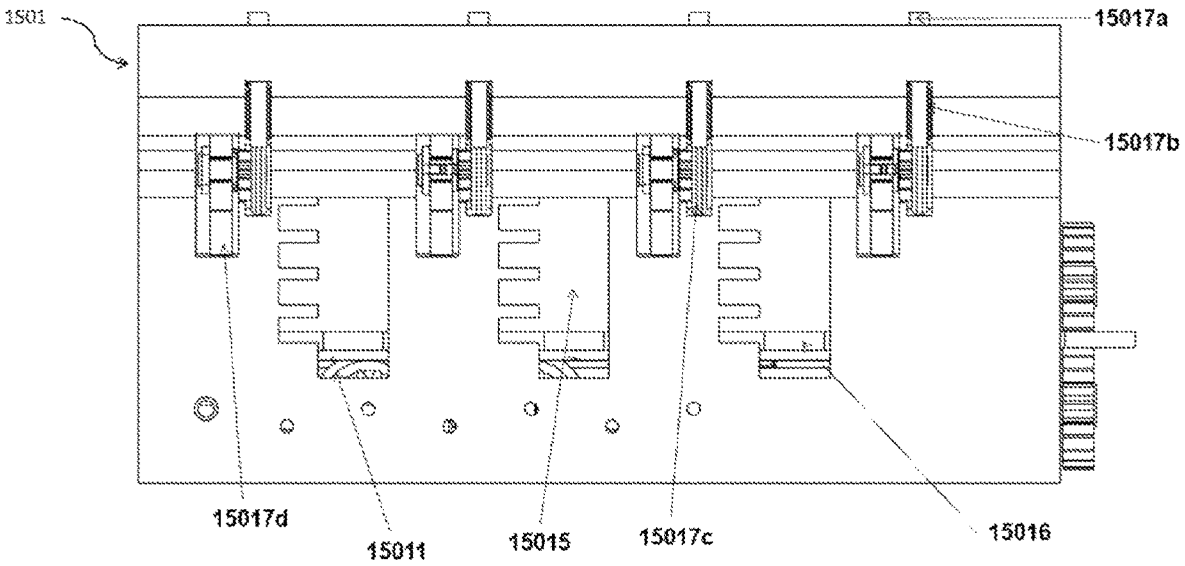
Figure 15H:
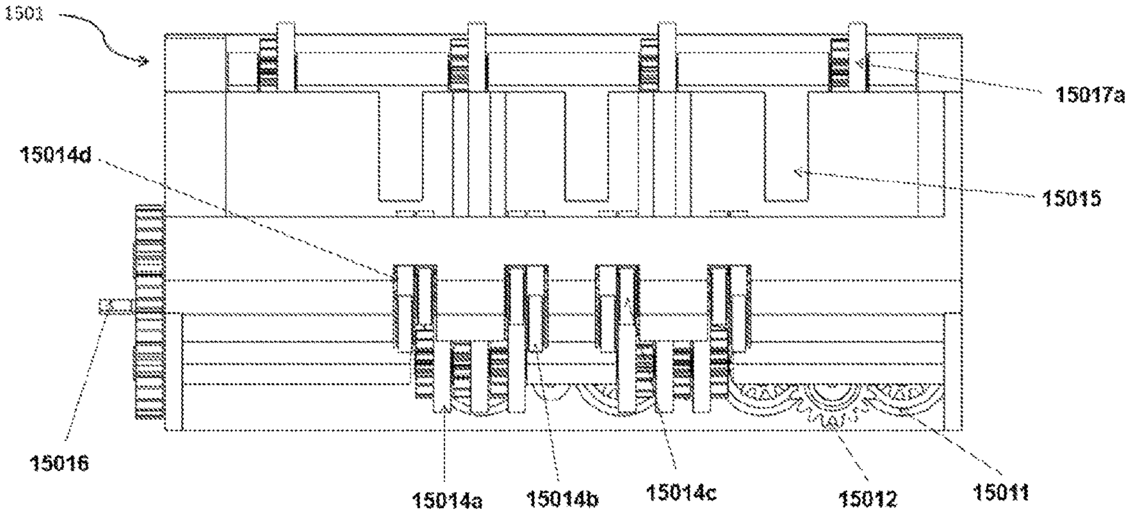

FIGS. 15A-15H illustrate various views of examples of a banknote accepting module 1501. FIG. 15A illustrates a perspective view of an example banknote accepting module 1501 in accordance with various embodiments of the present disclosure. FIG. 15B illustrates a perspective view of an example banknote accepting module 1501 in accordance with various embodiments of the present disclosure. FIG. 15C illustrates a front view of an example banknote accepting module 1501 in accordance with various embodiments of the present disclosure. FIG. 15D illustrates a back view of an example banknote accepting module 1501 in accordance with various embodiments of the present disclosure. FIG. 15E illustrates a top view of an example banknote accepting module 1501 in accordance with various embodiments of the present disclosure. FIG. 15F illustrates a bottom view of an example banknote accepting module 1501 in accordance with various embodiments of the present disclosure. FIG. 15G illustrates a side view of an example banknote accepting module 1501 in accordance with various embodiments of the present disclosure. FIG. 15H illustrates a side view of an example banknote accepting module 1501 in accordance with various embodiments of the present disclosure.

The banknote accepting module 1301/1401/1501 shown in FIGS. 15A-15H can accept banknotes in either a banknote acceptor system 1300 or a banknote deposit-withdrawal system 300, 700, 800, 900 or 1400. Banknotes can be inserted under the moveable platform 15016 and above intake rollers 15011, either serially or in bulk. If a banknote is inserted between the moveable platform 15016 and above intake rollers 15011, the intake rollers 15011 pull the banknote inward in the short edge leading-edge orientation. Gears 15012 can be used to transfer motion from a set of intake rollers 15011 to a next set of intake rollers 15011. Either intake rollers 15011 can be driven by a single motor, driven by differential motors, or driven by separate motors. Once the banknote is pulled into the banknote accepting module 1501 by intake rollers 15011 to a separation area, feed rollers 15013 feed the banknote to transport rollers 15017*a*, 15017*b*, 15017*c* and 15017*d* that transport the banknote by the long edge leading-edge orientation. If the user inserts banknotes in bulk between intake rollers 15011 and the moveable platform 15016, the banknotes in bulk are transported to a separation area. From the separation area, feed rollers 15013 feed the banknotes towards transport rollers 15017*a*, 15017*b*, 15017*c* and 15017*d*. As the transport rollers 15017*a*, 15017*b*, 15017*c*, and 15017*d* pull banknotes fed by feed rollers 15013 away from the separation area, retarding ribs 15018 retard banknotes not in direct contact with transport rollers 15017*a*. These retarding ribs 15018, along with transport rollers 15017*a*, separate and transport the bottom-most banknote in contact with transport rollers 15017*a* from multiple banknotes fed by the feed rollers 15013 towards the transport rollers 15017*b*, 15017*c* and 15017*d*, and pull the separated banknote in the long edge leading-edge orientation.

As explained in FIGS. 13A and 13B, and FIGS. 14A-14E, separated banknotes are sent to the banknote sensing module 1302/1402 by transport module in the long edge leading-edge orientation. Banknotes deemed not acceptable by the banknote sensing module 1302/1402 are sent back to the banknote accepting module 1301/1401/1501 by the transport module in the long edge leading-edge orientation.

A banknote deemed not acceptable is pulled in by transport rollers 15014*a*, 15014*b* and 15014*c*. As the banknote is transported by transport rollers 15014*a*, 15014*b*, and 15014*c*, a guide plate 15015 guides the banknote onto the moveable platform 15016, which guides the banknote into the banknote accepting module 1501. Once a banknote is guided on the moveable platform 15016 by guide plate 15015 and transport rollers 15014*a*, 15014*b*, and 15014*c*, rollers with impellers 15014*d* utilize impellers to push the trailing edge of the last banknote out of the way of one or more incoming banknote. As the trailing edge of banknote is kept out of the way by the rollers with impellers 15014*d*, a next banknote can be guided into banknote accepting module 1501. The next banknote is then guided by guide plate 15015 and transport rollers 15014*a*, 15014*b*, and 15014*c* on to the previously held banknote on the moveable platform 15016. Once the banknote is guided on previously held banknote on the moveable platform 15016, impellers of rollers with impellers 15014*d* move the trailing edge of now guided banknote. This action of the rollers with impellers 15014*d* keeps the trailing edges of banknotes guided on the moveable platform 15016 confined and out of the way for a next incoming banknote. Once all rejected banknotes are collected on the moveable platform 15016 and accepted banknotes are sent to the banknote storage units 1304/1404 or 1406, or the banknote escrow module 1405, the moveable platform 15016 can be lowered such that intake rollers 15011 can transport collected reject banknotes back to the user. If the user wishes to cancel the transaction, then banknotes from the storage units 1304/1404 or 1406 or banknote escrow module 1405 can be collected on the moveable platform 15016 to be provided back to the user by the transport module via the sensor or sensing unit 1302/1402 to banknote accepting module 1301/1401/1501. In some embodiments, the sensor 1302/1402 can be an optical sensor or imaging sensor that detects features of banknotes or captures images of banknotes. In some embodiments, the sensor 1302/1402 can include, or be coupled to, a processor for processing signals detected or provided by the sensor 1302/1402. Once accepted banknotes are collected on the moveable platform 15016, intake rollers 15011 can transport collected accepted banknotes back to the user.

The banknote accepting module 1401/1501 in banknote deposit-withdrawal system 1400, as explained in FIGS. 14A-14E, during conducting of transactions, can provide banknotes either in change or for cashback. Banknotes dispensed from the banknote recycling module 1406 are transported to be collected on the moveable platform 15016 to be provided back to the user by banknote transportation module via the banknote sensing module 1402 to the banknote accepting module 1401/1501. A banknote selected for dispensing to the user transported by banknote transportation module from the banknote sensing module 1402 is pulled in by the transport rollers 15014*a*, 15014*b* and 15014*c*. As the banknote is transported by transport rollers 15014*a*, 15014*b*, and 15014*c*, a guide plate 15015 guides the banknote onto the moveable platform 15016 guides into banknote accepting module 1501. Once a banknote is guided onto the moveable platform 15016 by guide plate 15015 and transport rollers 15014*a*, 15014*b*, and 15014*c*, the rollers with impellers 15014*d* utilize the impellers to move the trailing edge of the last banknote out of the way of incoming banknotes. As the trailing edge of the banknote is moved away by the rollers with impellers 15014*d*, a next banknote can be guided into the banknote accepting module 1501. The next banknote is then guided by guide plate 15015 and transport rollers 15014*a*, 15014*b*, and 15014*c* on to the previously held banknote on the moveable platform 15016. Once the banknote is guided on previously held banknote on the moveable platform 15016, the rollers with impellers 15014*d* move the trailing edge of now guided banknote. This action of the rollers with impellers 15014*d* keeps the trailing edges of banknotes guided on the moveable platform 15016 confined and out of the way for next incoming banknote. Once banknotes to be dispensed to the user are collected on the moveable platform 15016, intake rollers 15011 can transport collected accepted banknotes to the user.

The banknote accepting module 1401/1501 in banknote deposit-withdrawal system 1400, as explained in FIGS. 14A and 14B, during conducting of transactions, can provide banknotes back to the user if the user decides to cancel the transaction. Banknotes are inserted under the moveable platform 15016 and above intake rollers 15011, either serially or in bulk. The banknotes inserted by the user into banknote accepting module 1401/1501 are transported to a separation area by intake rollers 15011. From the separation area, feed rollers 15013 feed banknotes towards transport rollers 15017*a*, 15017*b*, 15017*c* and 15017*d*. As transport rollers 15017*a*, 15017*b*, 15017*c*, and 15017*d* pull banknotes fed by feed rollers 15013 away from the separation area, retarding ribs 15018 retard banknotes not in direct contact with transport rollers 15017*a*. These retarding ribs 15018, along with transport rollers 15017*a*, separate and transport the bottom-most banknote in contact with transport rollers 15017*a* from multiple banknotes fed by feed rollers 15013 towards transport rollers 15017*b*, 15017*c*, and 15017*d*, and pull the separated banknote in the long edge leading-edge orientation. Separated banknotes are transported by banknote transportation module to the banknote sensing module 1402. Banknotes deemed acceptable are sent to a banknote escrow module 1405 for temporary storage. If the user cancels the transaction, then banknotes inserted by the user and temporarily stored in the banknote escrow module 1405 are dispensed from the banknote escrow module 1405 and transported to be collected on the moveable platform 15016 to be provided back to the user by the banknote transportation module via the banknote sensing module 1402 to banknote accepting module 1401/1501. A banknote selected for dispensing to the user and transported by banknote transportation module from the banknote sensing module 1402 is pulled in by transport rollers 15014*a*, 15014*b* and 15014*c*. As the banknote is transported by transport rollers 15014*a*, 15014*b*, and 15014*c*, a guide plate 15015 guides the banknote onto the moveable platform 15016, which guides the banknote into the banknote accepting module 1501. Once a banknote is guided onto the moveable platform 15016 by guide plate 15015 and transport rollers 15014*a*, 15014*b*, and 15014*c*, rollers with impellers 15014*d* utilize the impellers to move the trailing edge of the last banknote out of the way of incoming banknotes. As the trailing edge of the banknote is moved out of the way by the rollers with impellers 15014*d*, a next banknote can be guided into banknote accepting module 1501. The next banknote is then guided by the guide plate 15015 and transport rollers 15014*a*, 15014*b*, and 15014*c* on to the previously held banknote on the moveable platform 15016. Once the banknote is guided on the previously held banknote on the moveable platform 15016, the rollers with impellers 15014*d* move the trailing edge of now guided banknote. This action of the rollers with impellers 15014*d* keeps the trailing edges of banknotes guided on the moveable platform 15016 confined and out of the way for next incoming banknote. Once banknotes to be dispensed to the user are collected on the moveable platform 15016, intake rollers 15011 can transport collected and accepted banknotes back to the user.

In other embodiments, the banknote accepting module 1301/1401/1501 with openable and removable modules in accordance with various embodiments of this disclosure.

In other embodiments, the banknote accepting module 1301/1401/1501 in banknote deposit-withdrawal system 1400, banknotes can be inserted above the moveable platform 15016. In this embodiment, the inserted banknotes are moved in short edge leading edge orientation by lowering the moveable platform 15016 down and pinching inserted banknotes between intake rollers 15011 and guide plate 15015. Once the banknote is pulled into the banknote accepting module 1501 by intake rollers 15011 to a separation area, feed rollers 15013 feed the banknote to transport rollers 15017*a*, 15017*b*, 15017*c* and 15017*d* that transport the banknote by the long edge leading-edge orientation. If the user inserts banknotes in bulk above the moveable platform 15016, the banknotes in bulk are transported to a separation area. From the separation area, feed rollers 15013 feed the banknotes towards transport rollers 15017*a*, 15017*b*, 15017*c* and 15017*d*. As the transport rollers 15017*a*, 15017*b*, 15017*c*, and 15017*d* pull banknotes fed by feed rollers 15013 away from the separation area, retarding ribs 15018 retard banknotes not in direct contact with transport rollers 15017*a*. These retarding ribs 15018, along with transport rollers 15017*a*, separate and transport the bottom-most banknote in contact with transport rollers 15017*a* from multiple banknotes fed by the feed rollers 15013 towards the transport rollers 15017*b*, 15017*c* and 15017*d*, and pull the separated banknote in the long edge leading-edge orientation.

In other embodiments, the banknote accepting module 1301/1401/1501 in banknote deposit-withdrawal system 1400, banknotes selected for dispensing to the user transported by banknote transportation module from the banknote sensing module 1402 are pulled in by the transport rollers 15014*a*, 15014*b* and 15014*c* serially. As the banknotes are transported by transport rollers 15014*a*, 15014*b*, and 15014*c*, a guide plate 15015 guides the banknote under the moveable platform 15016 into banknote accepting module 1501. Once a banknote is guided under the moveable platform 15016 by guide plate 15015 and transport rollers 15014*a*, 15014*b*, and 15014*c*, the rollers with impellers 15014*d* utilize the impellers to move the trailing edge of the last banknote out of the way of incoming banknotes. As the trailing edge of the banknote is moved away by the rollers with impellers 15014*d*, a next banknote can be guided into the banknote accepting module 1501. The next banknote is then guided by guide plate 15015 and transport rollers

15014*a*, 15014*b*, and 15014*c* on to the previously held banknote under the moveable platform 15016. Once the banknote is guided on previously held banknote under the moveable platform 15016, the rollers with impellers 15014*d* move the trailing edge of now guided banknote. This action of the rollers with impellers 15014*d* keeps the trailing edges of banknotes guided under the moveable platform 15016 confined and out of the way for next incoming banknote. Once banknotes to be dispensed to the user are collected under the moveable platform 15016, intake rollers 15011 can transport collected accepted banknotes to the user.

Figure 16B:
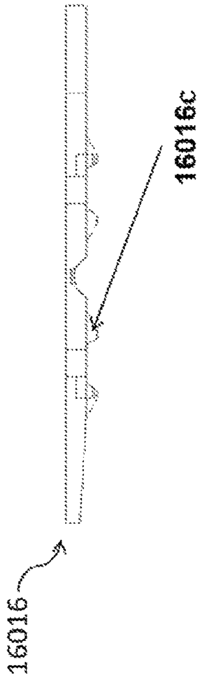
FIGS. 16A, 16B, 16C, and 16D illustrate various views of an example platform of a banknote accepting module in accordance with various embodiments of the present disclosure.
Figure 16D:
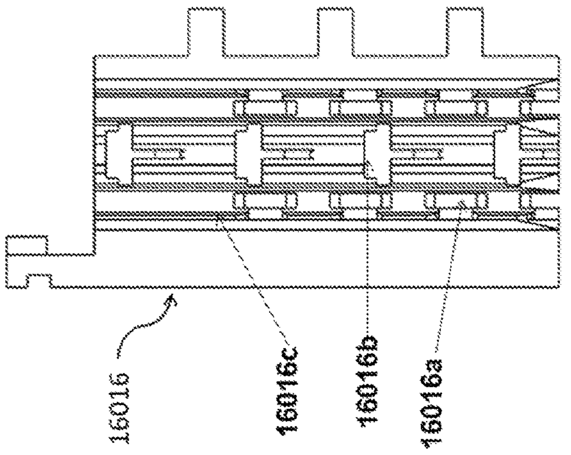
Figure 16A:
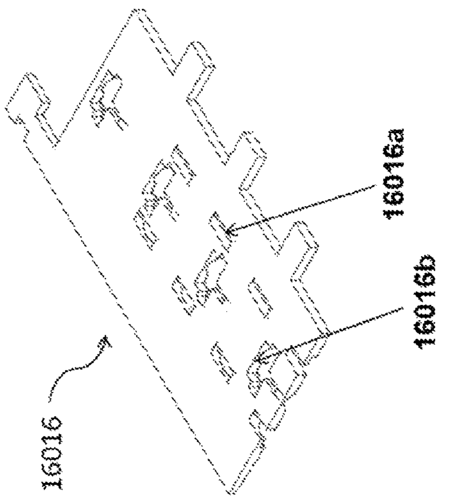
Figure 16C:
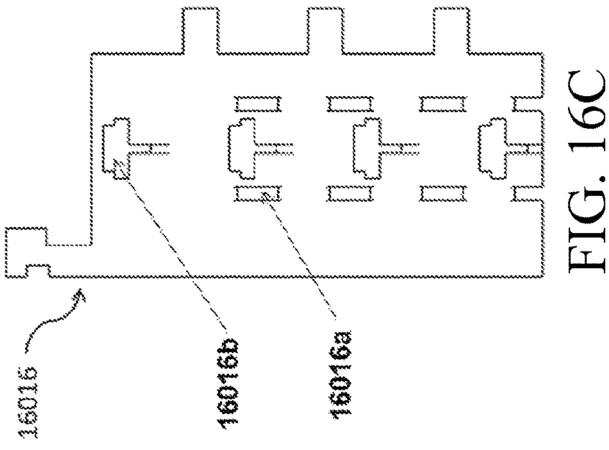

FIGS. 16A-16D illustrate various views of an example platform in a banknote accepting module 1301/1401/1501. FIG. 16A illustrates a perspective view of an example platform in a banknote accepting module 1301/1401/1501 in accordance with various embodiments of the present disclosure. FIG. 16B illustrates a front view of an example platform in a banknote accepting module 1301/1401/1501 in accordance with various embodiments of the present disclosure. FIG. 16C illustrates a top view of an example platform in a banknote accepting module 1301/1401/1501 in accordance with various embodiments of the present disclosure. FIG. 16D illustrates a bottom view of an example platform in a banknote accepting module 1301/1401/1501 in accordance with various embodiments of the present disclosure.

The moveable platform 15016 of the examples in FIGS. 15A-15H is explained in more detail in FIGS. 16A-16D as the moveable platform 16016. The moveable platform 16016 includes ribs 16016*c* on the bottom that align with intake rollers 15011. Inserted banknotes get pinched between intake rollers 15011 and ribs 16016*c* and travel in a direction of the intake rollers 15011. Once inserted, banknotes reach the separation area underneath the platform, and feed rollers 15013 feed banknotes to the intake rollers 15017*a*, 15017*b*, 15017*c*, and 15017*d* and retarding ribs 15018. The moveable platform 16016 keeps pressure on the banknotes and assists feed rollers 15013, and the moveable platform 16016 moves down as the bunch of banknotes becomes thinner. While dispensing banknotes are collected on top the moveable platform 16016, guided by guide plate 15015 and move away from incoming banknotes by the impellers of the rollers with impellers 15014*d*, the moveable platform 16016 moves down to keep a top banknote away from the guide plate 15015 and to maintain space for incoming banknotes. Once banknotes for dispensing are collected on the moveable platform 16016, the moveable platform 16016 moves down to allow intake rollers 15011 to peek through cavities 16016*a* to pull banknotes out to the user in the short edge leading-edge orientation.

If a control unit determines or is instructed to send collected banknotes on the moveable platform 16016 back to either banknote escrow module 1405, to one of the banknote the banknote recycling modules 1406, or to the banknote storage modules 1404, then the moveable platform 16016 moves downward allowing feed rollers 15013 to peek through cavities 16016*b* to feed banknotes to the intake rollers 15017*a*, 15017*b*, 15017*c*, and 15017*d* and the retarding ribs 15018 in the long edge leading-edge orientation.

In some embodiments, the users can be allowed to insert banknotes on top of the moveable platform 16016 instead of putting banknotes under the moveable platform 16016, as cavities 16016*a* and 16016*b* allow banknotes to transport the short edge leading-edge orientation or the long edge leading-edge orientation. If banknotes are put both on the moveable platform 15016 and between the moveable platform 15016 and intake rollers 15011 in the short edge leading-edge orientation in the separation area, then banknotes between the moveable platform 15016 and intake rollers 15011 can be fed by feed rollers 15013 towards transport rollers 15017*a*, 15017*b*, 15017*c*, and 15017*d* and retarding ribs 15018. Transport rollers 15017*a*, 15017*b*, 15017*c*, and 15017*d* pull banknotes fed by feed rollers 15013 away from the separation area and the retarding ribs 15018 retard banknotes not in direct contact with transport rollers 15017*a*. Once all banknotes between the moveable platform 15016 and intake rollers 15011 are separated and transported towards the sensor or sensing unit 1302/1402 by the transportation module, the moveable platform 16016 moves downward and allows feed rollers 15013 to peek through cavities 16016*b* to feed banknotes above the platform towards transport rollers 15017*a*, 15017*b*, 15017*c*, and 15017*d* and retarding ribs 15018. Transport rollers 15017*a*, 15017*b*, 15017*c*, and 15017*d* pull banknotes fed by feed rollers 15013 away from the separation area, and the retarding ribs 15018 retard banknotes not in direct contact with transport rollers 15017*a*.

Figure 17A:
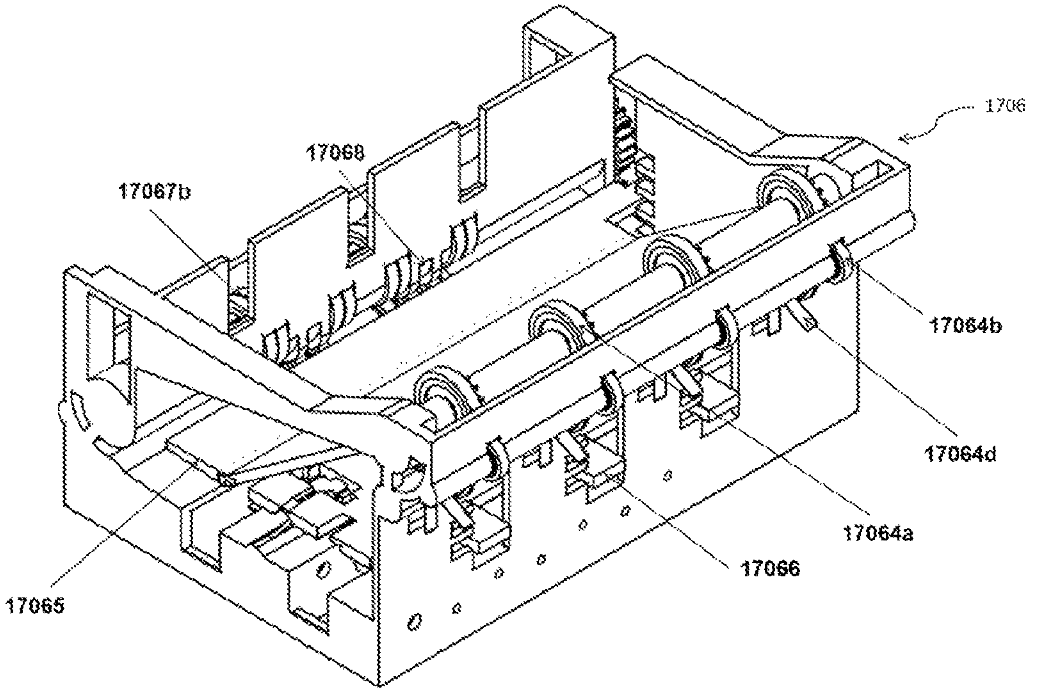
FIGS. 17A, 17B, 17C, 17D, 17E, 17F, 17G, and 17H illustrate various views of an example banknote recycling module in accordance with various embodiments of the present disclosure.
Figure 17B:
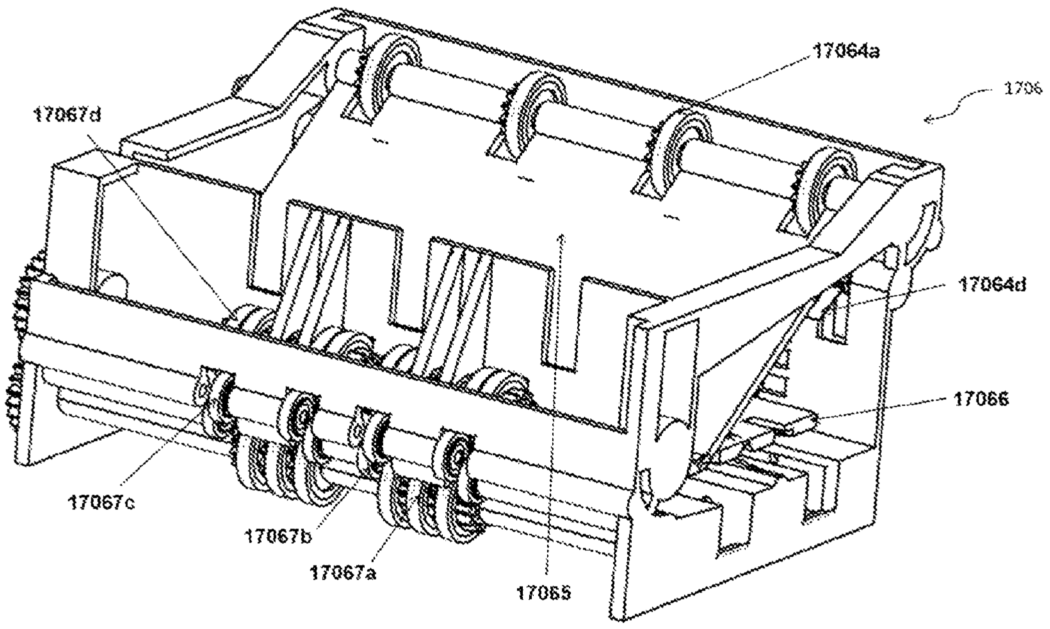
Figure 17C:
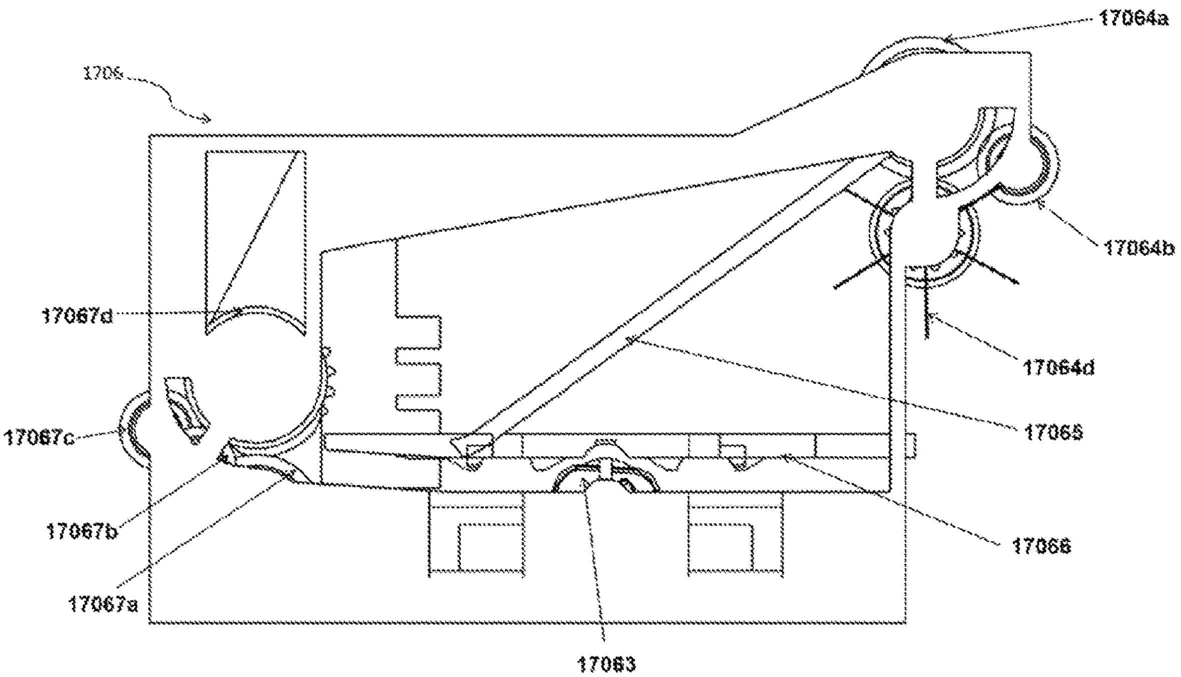
Figure 17D:
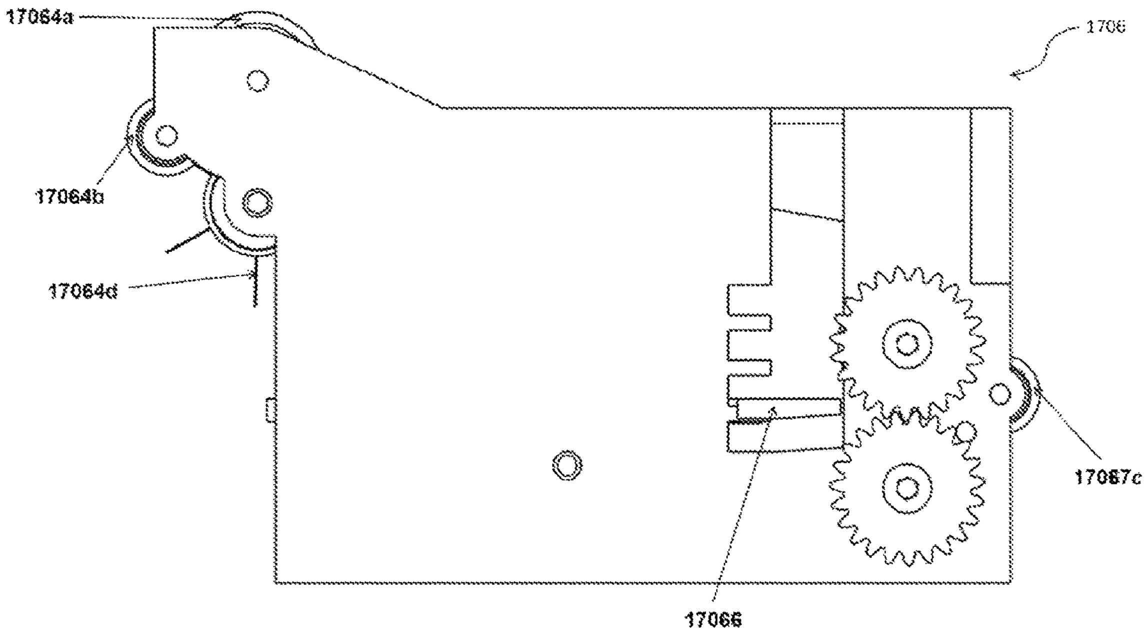
Figure 17E:
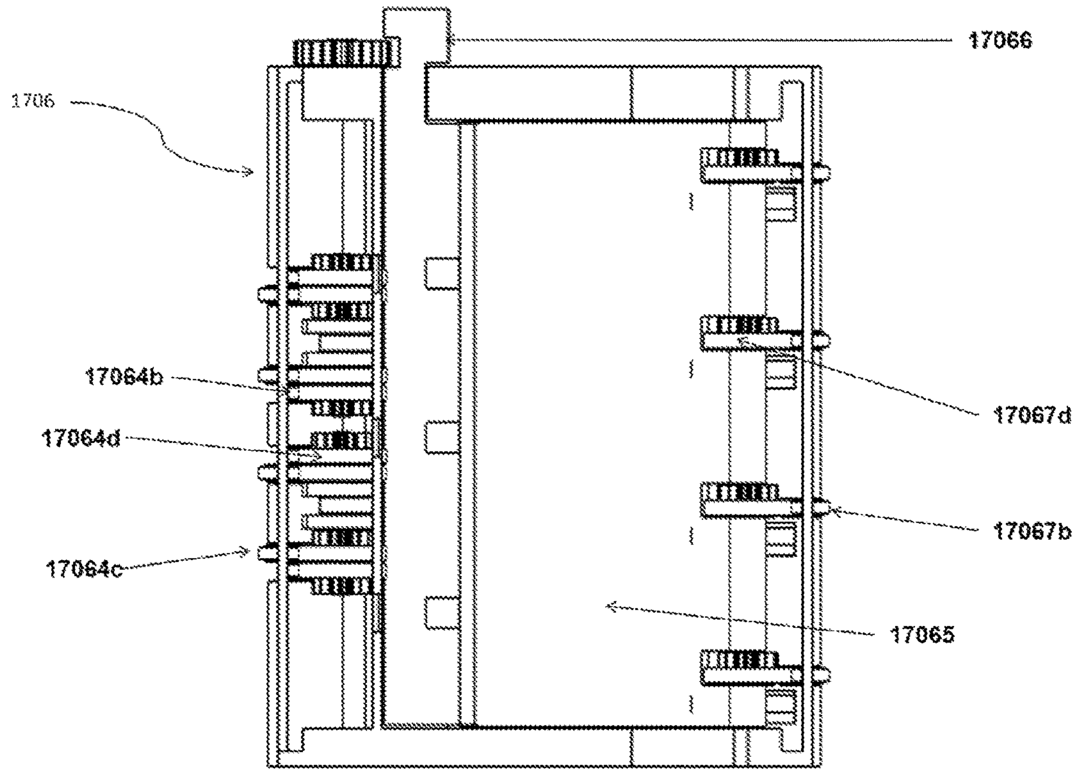
Figure 17F:
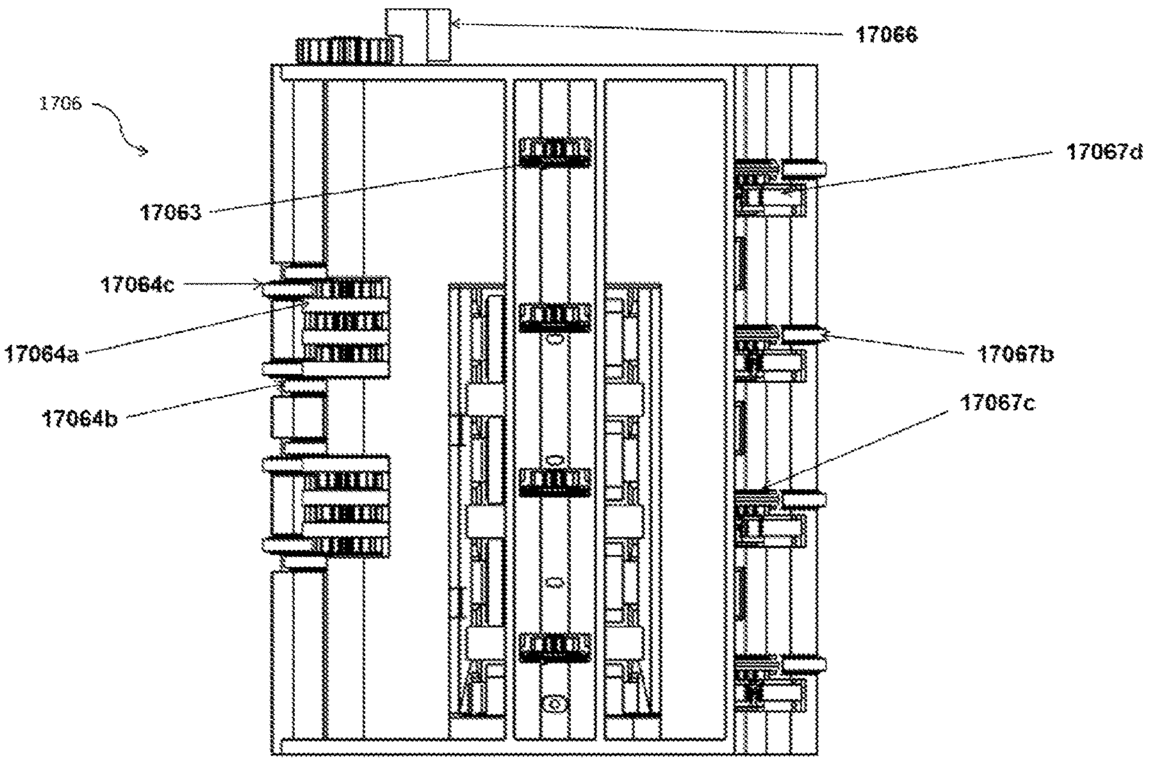
Figure 17G:
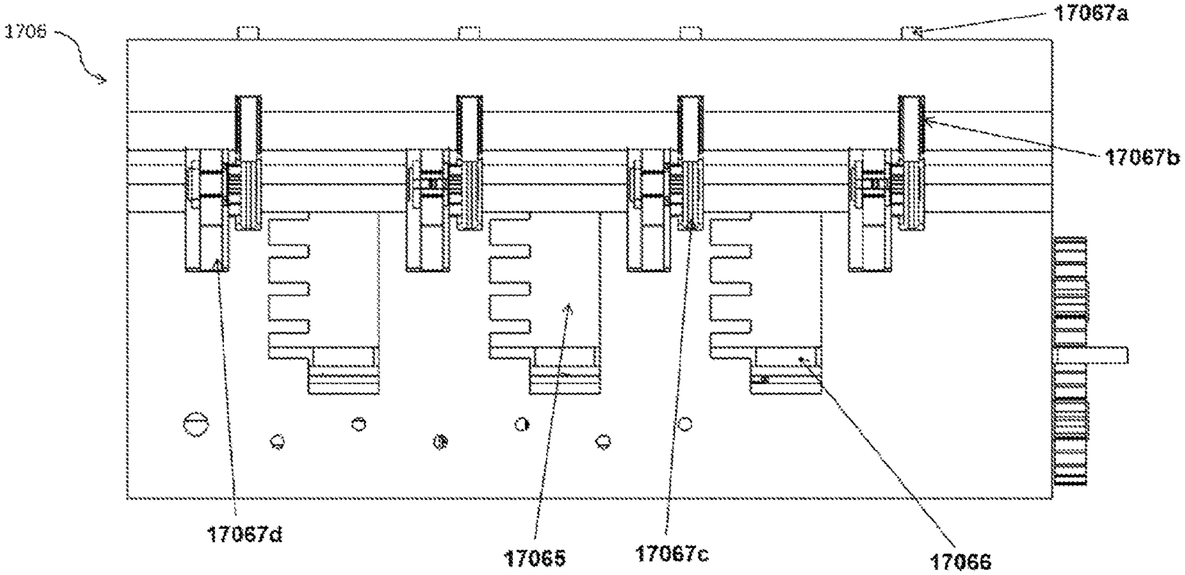
Figure 17H:
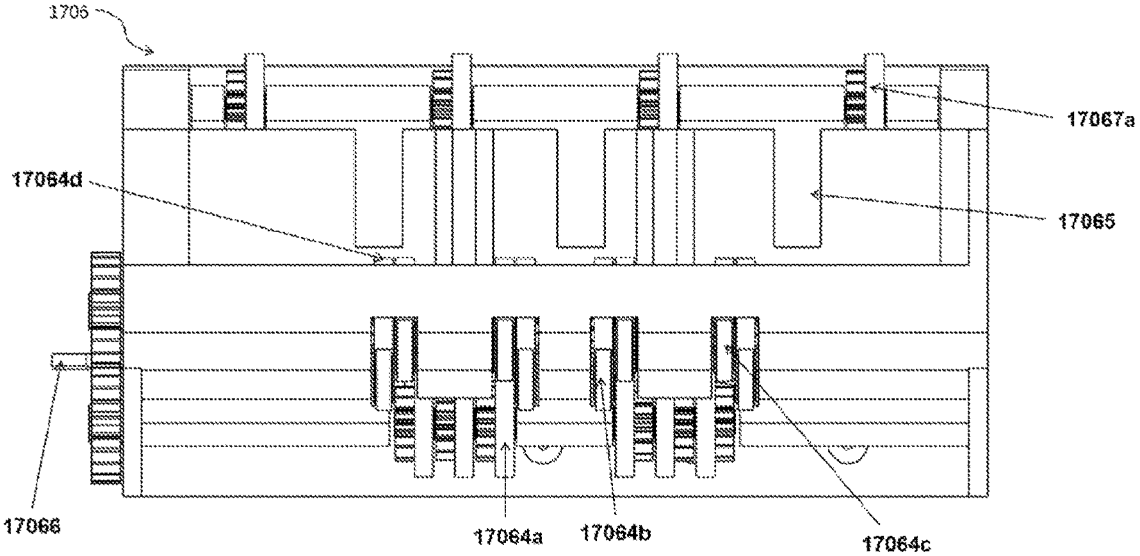

FIGS. 17A-17H illustrate various views of an example banknote recycling module 1706. FIG. 17A illustrates a perspective view of an example banknote recycling module 1706 in accordance with various embodiments of the present disclosure. FIG. 17B illustrates a perspective view of an example banknote recycling module 1706 in accordance with various embodiments of the present disclosure. FIG. 17C illustrates a front view of an example banknote recycling module 1706 in accordance with various embodiments of the present disclosure. FIG. 17D illustrates a back view of an example banknote recycling module 1706 in accordance with various embodiments of the present disclosure. FIG. 17E illustrates a top view of an example banknote recycling module 1706 in accordance with various embodiments of the present disclosure. FIG. 17F illustrates a bottom view of an example banknote recycling module 1706 in accordance with various embodiments of the present disclosure. FIG. 17G illustrates a side view of an example banknote recycling module 1706 in accordance with various embodiments of the present disclosure. FIG. 17H illustrates a side view of an example banknote recycling module 1706 in accordance with various embodiments of the present disclosure.

The banknote recycling module 1706 shown in FIGS. 17A-17H is a module that can accept or dispense banknotes in a banknote deposit-withdrawal system 1400. When the banknote deposit-withdrawal system 1400 described in FIGS. 14A-14E is initiated for the first time, the entire system may not have banknotes to carry out the transaction. Generally, an operator or owner would use some banknotes to fill banknote recycling modules 1706 with low denomination banknotes for providing change to the users. In some embodiments, the operator or owner can choose to provide cashback to the users using a high denomination. In this scenario, the operator or owner would use some banknotes to fill banknote recycling modules 1706 with high denomination banknotes. The operator or owner would insert banknotes in bulk into banknote accepting module 1501 either above the moveable platform 15016 or between the moveable platform 15016 and intake rollers 15011. If the operator or owner inserts banknotes in bulk between intake rollers 15011 and the moveable platform 15016, the banknotes in bulk are transported to a separation area. From the separation area, feed rollers 15013 feed banknotes towards transport rollers 15017*a*, 15017*b*, 15017*c* and 15017*d*. As transport rollers 15017*a*, 15017*b*, 15017*c*, and 15017*d* pull banknotes fed by feed rollers 15013 away from the separation area, retarding ribs 15018 retard banknotes not in direct contact with transport rollers 15017*a*. These retarding ribs

15018, along with transport rollers 15017*a*, separate and transport the bottom-most banknote in contact with transport rollers 15017*a* from multiple banknotes fed by feed rollers 15013 towards transport rollers 15017*b*, 15017*c*, and 15017*d*, and pull the separated banknote in the long edge leading-edge orientation. If the operator or owner inserts banknotes in bulk on the moveable platform 15016, the moveable platform 15016 lowers to allow intake rollers 15011 to peek through cavities 16016*a* and then the banknotes in bulk are transported to a separation area. From the separation area, feed rollers 15013 peek through cavities 16016*b* to feed banknotes towards transport rollers 15017*a*, 15017*b*, 15017*c* and 15017*d*. As transport rollers 15017*a*, 15017*b*, 15017*c*, and 15017*d* pull banknotes fed by feed rollers 15013 away from the separation area, retarding ribs 15018 retard banknotes not in direct contact with transport rollers 15017*a*. These retarding ribs 15018, along with transport rollers 15017*a*, separate and transport the bottom-most banknote in contact with transport rollers 15017*a* from multiple banknotes fed by feed rollers 15013 towards transport rollers 15017*b*, 15017*c*, and 15017*d* and pull the separated banknote in the long edge leading-edge orientation.

As explained in FIGS. 13A and 13B, and FIGS. 14A-14E, separated banknotes are sent to the banknote sensing module 1402 by the banknote transportation module in the long edge leading-edge orientation. Banknotes deemed not acceptable by the banknote sensing module 1402 are sent back to the banknote accepting module 1401/1501 by banknote transportation module in the long edge leading-edge orientation. A banknote deemed not acceptable is pulled in by transport rollers 15014*a*, 15014*b*, and 15014*c*. As the banknote is transported by transport rollers 15014*a*, 15014*b*, and 15014*c*, a guide plate 15015 guides the banknote onto the moveable platform 15016, which guides the banknote into the banknote accepting module 1501, and can be sent to the banknote sensing module 1402 once again in some embodiments. If banknotes are found not acceptable, then banknotes collected on the moveable platform 15016 are returned to the operator or owner.

The banknote transportation module can send accepted banknotes to at least one of the banknote recycling modules 1706. As explained in FIGS. 14A-14E, banknote deposit-withdrawal system 1400 can come in multiple embodiments and can include multiple banknote recycling modules 1706. Accepted banknotes transported from banknote accepting module 1401/1501 to the banknote recycling modules 1706 are transported to be collected on the moveable platform 17066 to be stored by banknote transportation module via the banknote sensing module 1402. Banknotes selected for storing are transported by banknote transportation module from the banknote sensing module 1402, and are pulled in by transport rollers 17064*a*, 17064*b*, and 17064*c*. As the banknote is transported by transport rollers 17064*a*, 17064*b*, and 17064*c*, a guide plate 17065 guides the banknote onto the moveable platform 17066, which guides the banknote into the banknote recycling module 1706. Once a banknote is guided on the moveable platform 17066 by guide plate 17065 and transport rollers 17064*a*, 17064*b*, and 17064*c*, rollers with impellers 17064*d* utilize impellers to push the trailing edge of the last banknote out of the way of incoming banknotes. As the trailing edge of the banknote is held on the moveable platform 17066 by the impellers of the rollers with impellers 17064*d*, a next banknote can be guided into the banknote recycling module 1706. The next banknote is then guided by guide plate 17065 and transport rollers 17064*a*, 17064*b*, and 17064*c* on to the previously held banknote on the moveable platform 17066. Once the banknote is guided on the previously held banknote on the moveable platform 17066, the impellers of the rollers with impellers 17064*d* move the trailing edge of now guided banknote. This action of impellers of rollers with impellers 17064*d* keeps the trailing edges of banknotes guided on the moveable platform 17066 confined and out of the way for a next incoming banknote. Once sufficient banknotes are stored on the moveable platform 17066, the moveable platform 17066 is lowered to allow more notes to come inside the banknote recycling module 1706.

During operation of banknote deposit-withdrawal system 1400 described in FIGS. 14A-14E, the banknote recycling modules 1706 can store lower denomination banknotes as well as provide lower denomination banknotes for change and higher or lower denomination banknotes for cashback. During dispensing, the banknote recycling modules 1706 can lower the moveable platform 17066 to allow feed rollers 17063 to peek through cavities 16016*b* to feed banknotes towards transport rollers 17067*a*, 17067*b*, 17067*c* and 17067*d*. As transport rollers 17067*a*, 17067*b*, 17067*c*, and 17067*d* pull banknotes fed by feed rollers 17063 away from the separation area, retarding ribs 17068 retard banknotes not in direct contact with transport rollers 17067*a*. These retarding ribs 17068, along with transport rollers 17067*a*, separate and transport the bottom-most banknote in contact with transport rollers 17067*a* from multiple banknotes fed by feed rollers 17063 towards transport rollers 17067*b*, 17067*c* and 17067*d* and pull separated banknote in the long edge leading-edge orientation. Banknotes separated for dispensing from the banknote recycling modules 1706 can be again sent to banknote accepting module 1401/1501 via the banknote sensing module 1402/1502 by banknote transportation module to be dispensed to the user.

Figure 18A:
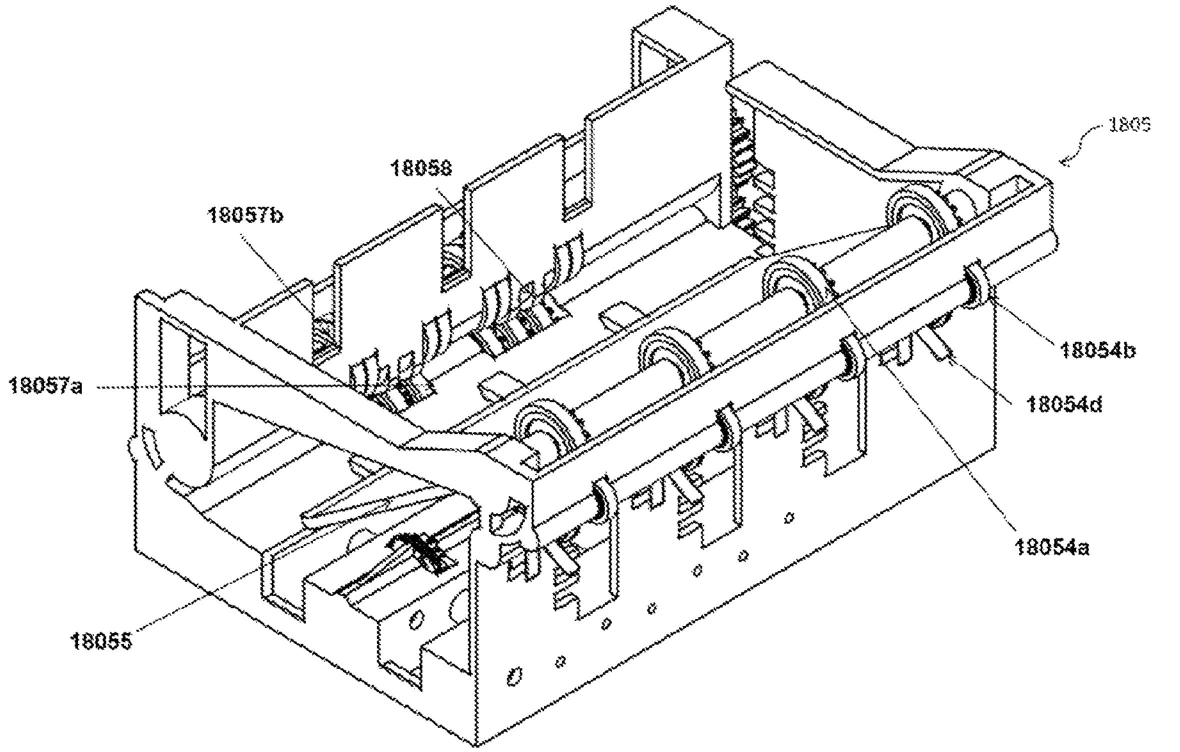
FIGS. 18A, 18B, 18C, 18D, 18E, 18F, 18G, and 18H illustrate various views of an example temporary banknote storage unit in accordance with various embodiments of the present disclosure.
Figure 18B:
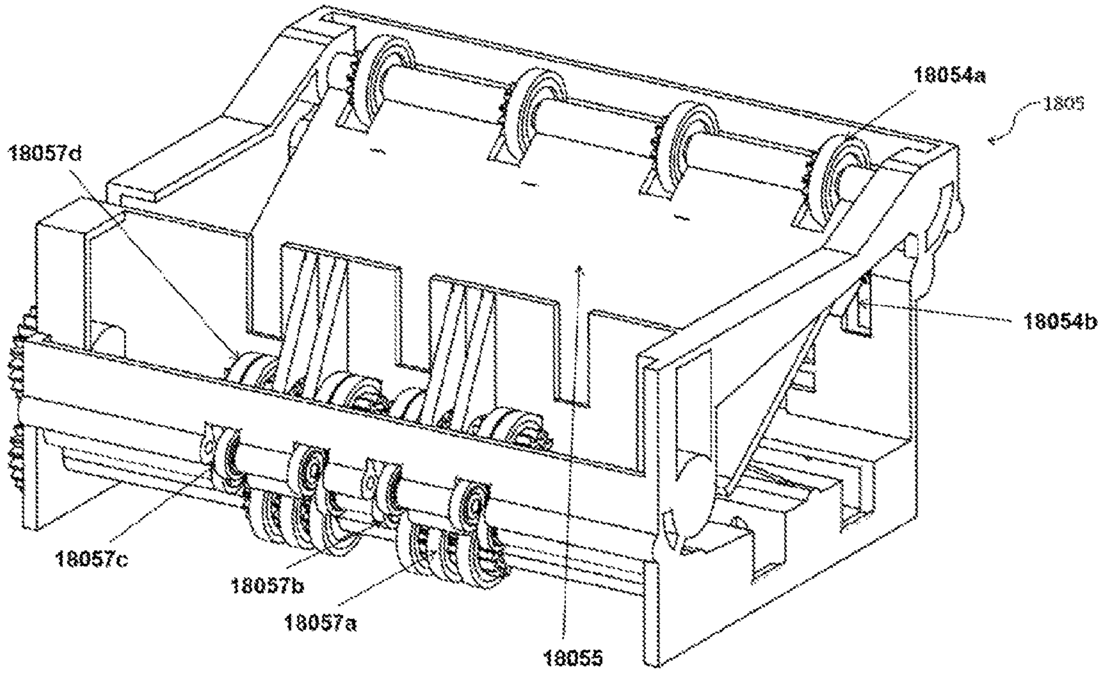
Figure 18C:
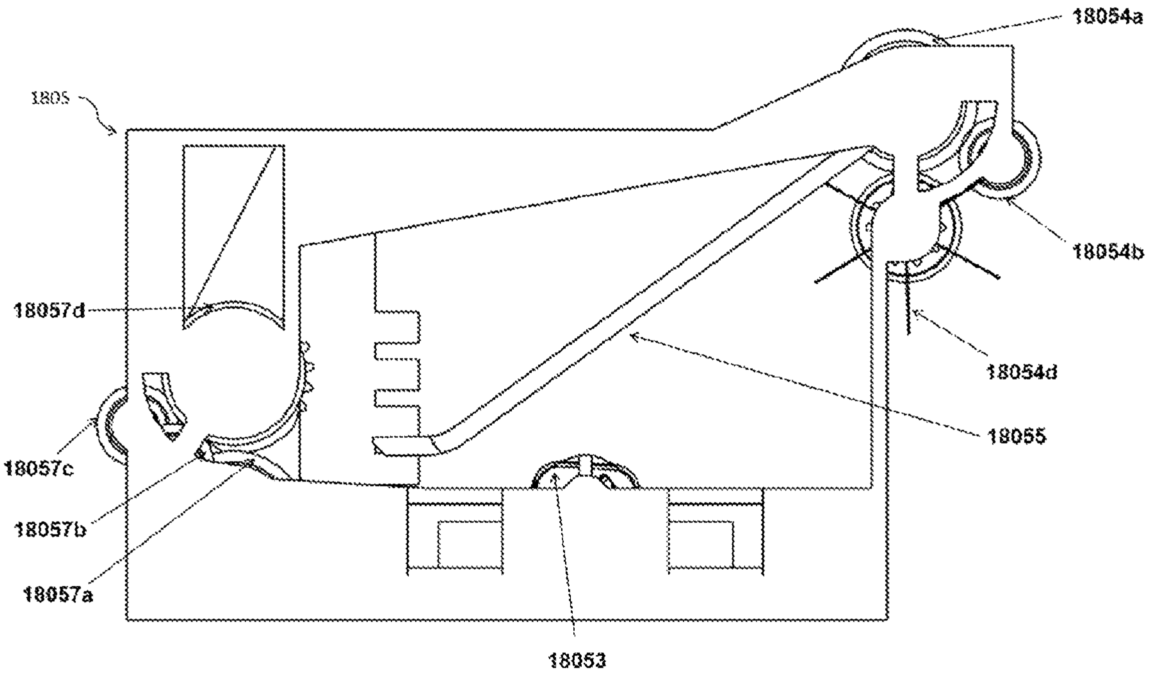
Figure 18D:
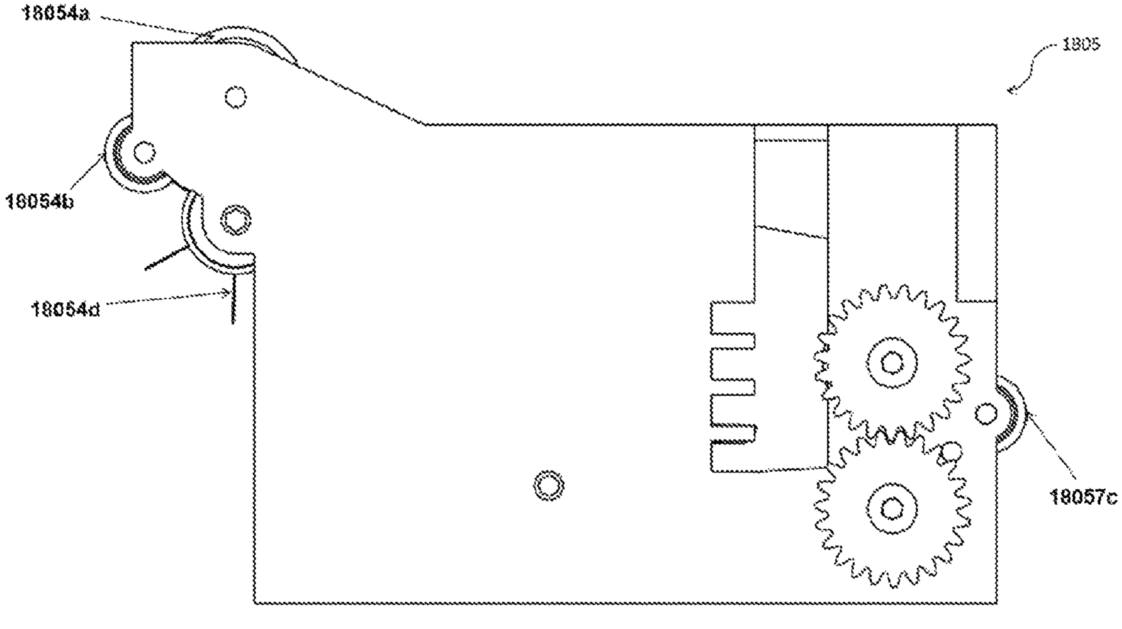
Figure 18E:
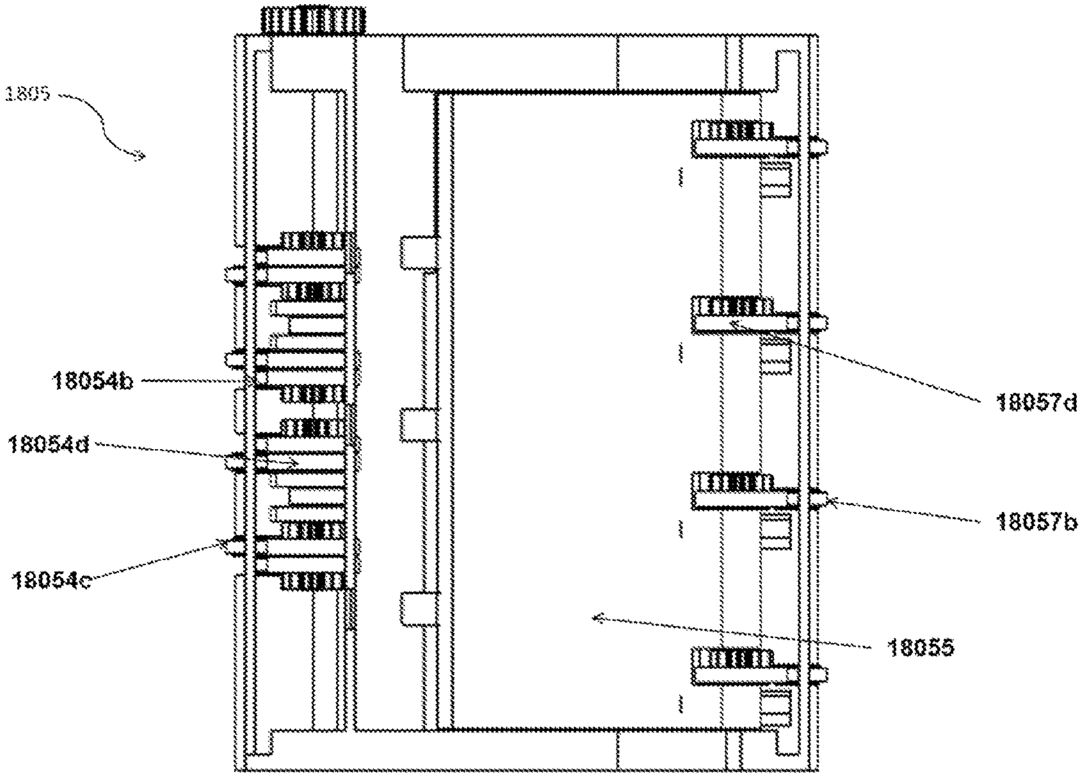
Figure 18F:
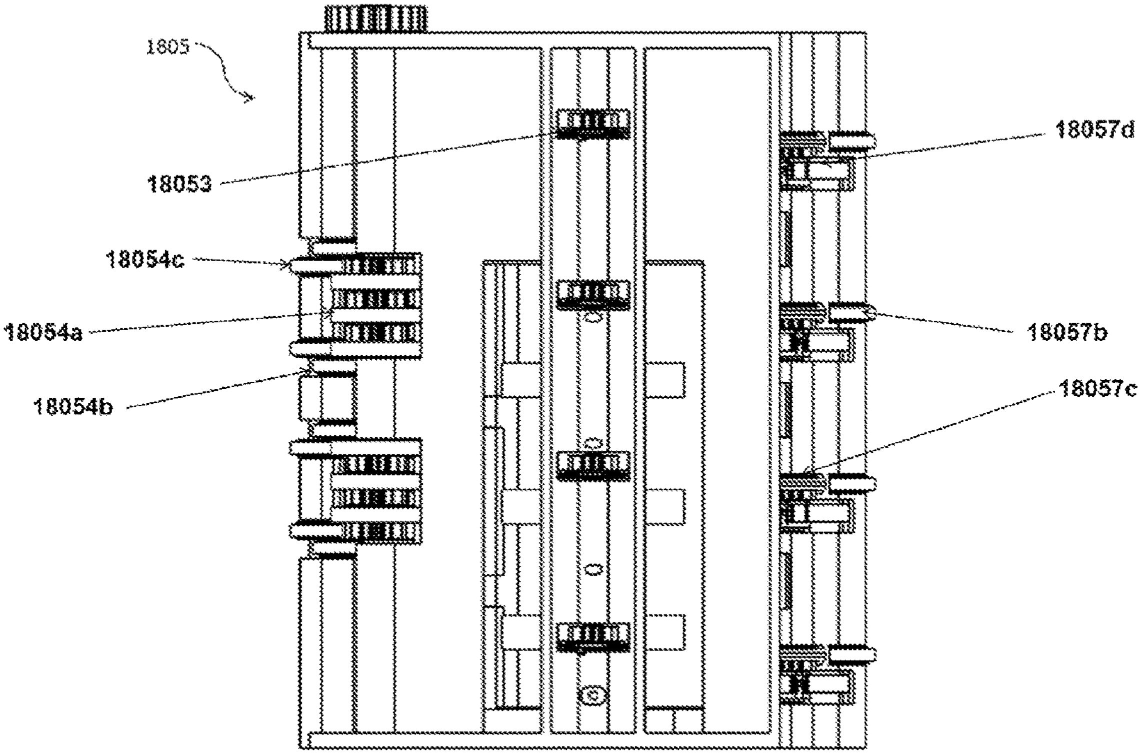
Figure 18G:
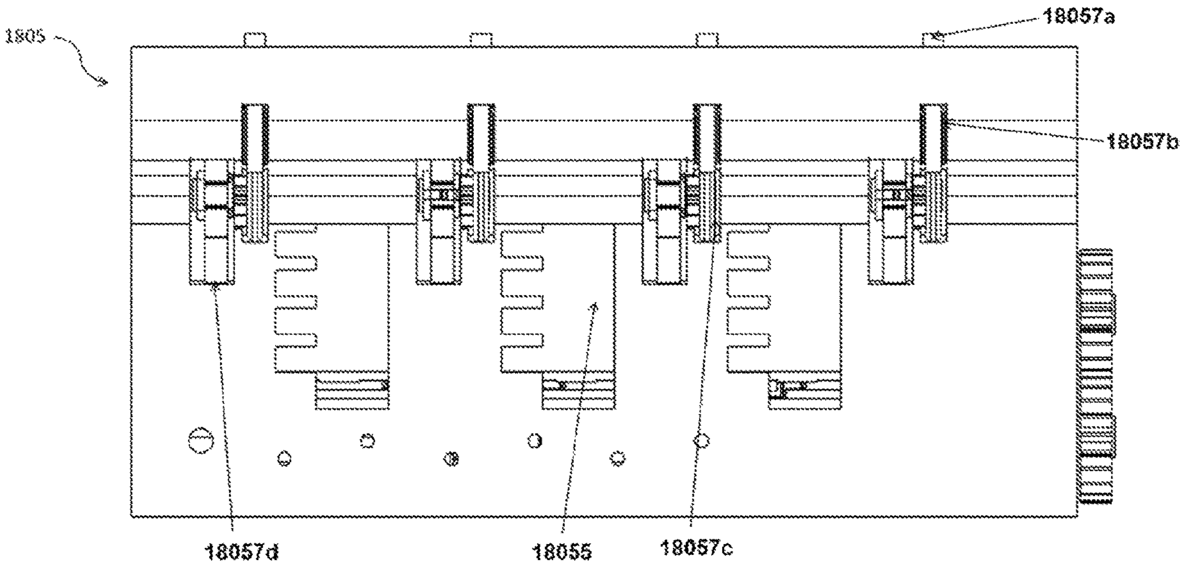
Figure 18H:
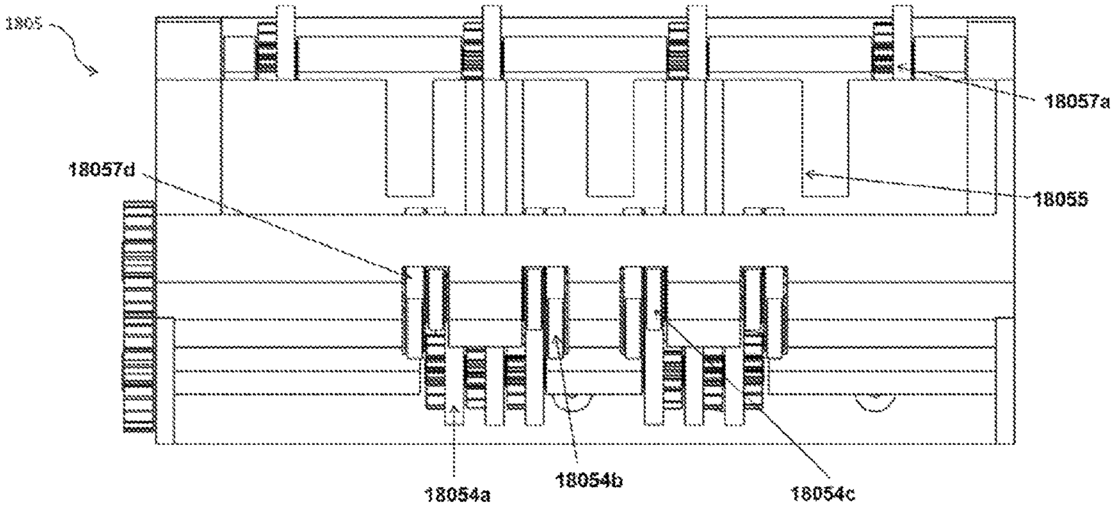

FIGS. 18A-18H illustrate various views of examples of a banknote escrow module 1805. FIG. 18A illustrates a perspective view of an example banknote escrow module 1805 in accordance with various embodiments of the present disclosure. FIG. 18B illustrates a perspective view of an example banknote escrow module 1805 in accordance with various embodiments of the present disclosure. FIG. 18C illustrates a front view of an example banknote escrow module 1805 in accordance with various embodiments of the present disclosure. FIG. 18D illustrates a back view of an example banknote escrow module 1805 in accordance with various embodiments of the present disclosure. FIG. 18E illustrates a top view of an example banknote escrow module 1805 in accordance with various embodiments of the present disclosure. FIG. 18F illustrates a bottom view of an example banknote escrow module 1805 in accordance with various embodiments of the present disclosure. FIG. 18G illustrates a side view of an example banknote escrow module 1805 in accordance with various embodiments of the present disclosure. FIG. 18H illustrates a side view of an example banknote escrow module 1805 in accordance with various embodiments of the present disclosure.

The banknote escrow module 1805 shown in FIGS. 18A-18H is a module that can accept or dispense banknotes in a banknote deposit-withdrawal system 1400 to assist in escrow functionality to store banknotes temporarily. The banknote deposit-withdrawal system 1400 as explained in FIGS. 14A-14E, can come in multiple embodiments and can include multiple banknote recycling module 1406 and can include a banknote escrow module 1405/1805 for temporary storage. Accepted banknotes inserted by the user are transported from banknote accepting module 1401/1501 to the banknote escrow module 1805, and are transported to be collected by banknote transportation module via the banknote sensing module 1402. The user can insert banknotes in bulk into the banknote accepting module 1501 either above the moveable platform 15016 or between the moveable platform 15016 and the intake rollers 15011. If the operator or owner inserts banknotes in bulk between the intake rollers 15011 and the moveable platform 15016, the banknotes in bulk are transported to a separation area. From the separation area, feed rollers 15013 feed banknotes towards transport rollers 15017*a*, 15017*b*, 15017*c*, and 15017*d*. As transport rollers 15017*a*, 15017*b*, 15017*c*, and 15017*d* pull banknotes fed by feed rollers 15013 away from separation area, retarding ribs 15018 retard banknotes not in direct contact with transport rollers 15017*a*. These retarding ribs 15018, along with transport rollers 15017*a*, separate and transport the bottom-most banknote in contact with transport rollers 15017*a* from multiple banknotes fed by feed rollers 15013 towards transport rollers 15017*b*, 15017*c*, and 15017*d*, and pull the separated banknote in the long edge leading-edge orientation. If the operator or owner inserts banknotes in bulk on the moveable platform 15016, the moveable platform 15016 lowers to allow intake rollers 15011 to peek through cavities 16016*a* and then the banknotes in bulk are transported to a separation area. From the separation area, feed rollers 15013 peek through cavities 16016*b* to feed banknotes towards transport rollers 15017*a*, 15017*b*, 15017*c*, and 15017*d*. As transport rollers 15017*a*, 15017*b*, 15017*c*, and 15017*d* pull banknotes fed by feed rollers 15013 away from the separation area, retarding ribs 15018 retard banknotes not in direct contact with transport rollers 15017*a*. These retarding ribs 15018, along with transport rollers 15017*a*, separate and transport the bottom-most banknote in contact with transport rollers 15017*a* from multiple banknotes fed by feed rollers 15013 towards transport rollers 15017*b*, 15017*c*, and 15017*d*, and pull the separated banknote in the long edge leading-edge orientation.

As explained in FIGS. 13A and 13B and FIGS. 14A-14E, separated banknotes are sent to the banknote sensing module 1402 by the banknote transportation module in the long edge leading-edge orientation. Banknotes deemed not acceptable by the banknote sensing module 1402 are sent back to banknote accepting module 1401/1501 by the banknote transportation module in the long edge leading-edge orientation. A banknote deemed not acceptable is pulled in by transport rollers 15014*a*, 15014*b*, and 15014*c*. As the banknote is transported by transport rollers 15014*a*, 15014*b*, and 15014*c*, a guide plate 15015 guides the banknote onto the moveable platform 15016, which guides the banknote into the banknote accepting module 1501, and can be sent to the banknote sensing module 1402 once again in some embodiments. If banknotes are found not acceptable then banknotes collected on the moveable platform 15016 are returned to the user.

The banknote transportation module can send accepted banknotes to temporary storage unit 1405/1805 for escrow. As explained in FIGS. 14A-14E, banknote deposit-withdrawal system 1400 can come in multiple embodiments and can include multiple recycling modules 1406/1706 and a temporary storage unit 1405/1805 for escrow. Accepted banknotes transported from banknote accepting module 1401/1501 to temporary storage unit 1405/1805 for escrow are transported to be stored by banknote transportation module via the banknote sensing module 1402. Banknotes selected for temporary storage are transported by banknote transportation module from the banknote sensing module 1402, and are pulled in by transport rollers 18054*a*, 18054*b*, and 18054*c*. As a banknote is transported by transport rollers 18054*a*, 18054*b*, and 18054*c*, a guide plate 18055 guides the banknote into the temporary storage unit 1405/1805 for escrow. Once a banknote is guided into the temporary storage unit 1405/1805 for escrow by guide plate 18055 and transport rollers 18054*a*, 18054*b*, and 18054*c*, rollers with impellers 18054*d* utilize impellers to keep the trailing edge of the last banknote out of the way of next banknote. As the trailing edge of the banknote is held on by impellers of rollers with impellers 18054*d*, a next banknote can be guided into temporary storage unit 1405/1805. The next banknote is then guided by guide plate 18055 and transport rollers 18054*a*, 18054*b*, and 18054*c* on to the previously held banknote in banknote escrow module 1405/1805.

In some embodiments, one of the recycling modules 1406/1706 can be used for the temporary storage unit 1405/1805. In these embodiments, the function of one of the recycling modules 1406/1706 can be to store banknotes temporarily to wait for the user to complete the transaction.

If the user decides to cancel the transaction, banknotes collected in temporary storage unit 1405/1805 can be dispensed back to the user. During dispensing, the temporary storage unit 1405/1805 allows feed rollers 18053 to feed banknotes towards transport rollers 18057*a*, 18057*b*, 18057*c*, and 18057*d*. As transport rollers 18057*a*, 18057*b*, 18057*c*, and 18057*d* pull banknotes fed by feed rollers 18053 away from the separation area, retarding ribs 18058 retard banknotes not in direct contact with transport rollers 18057*a*. These retarding ribs 18058, along with transport rollers 18057*a*, separate and transport the bottom-most banknote in contact with transport rollers 18057*a* from multiple banknotes fed by feed rollers 18053 towards transport rollers 18057*b*, 18057*c*, and 18057*d*, and pull the separated banknote in the long edge leading-edge orientation. Banknotes separated for dispensing from the temporary storage unit 1405/1805 can be again sent to the banknote accepting module 1401/1501 via the banknote sensing module 1402 by the banknote transportation module to be dispensed to the user.

If the user decides to conclude the transaction, then banknotes collected in temporary storage unit 1405/1805 can be dispensed back to banknote accepting module 1401/1501 to be stored in one of the recycling modules 1406/1706, or into the banknote storage modules 1404. During this reorganization, the banknote escrow module 1805 allows feed rollers 18053 to feed banknotes towards transport rollers 18057*a*, 18057*b*, 18057*c*, and 18057*d*. As transport rollers 18057*a*, 18057*b*, 18057*c*, and 18057*d* pull banknotes fed by feed rollers 18053 away from the separation area, retarding ribs 18058 retard banknotes not in direct contact with transport rollers 18057*a*. These retarding ribs 18058, along with transport rollers 18057*a*, separate and transport the bottom-most banknote in contact with transport rollers 18057*a* from multiple banknotes fed by feed rollers 18053 towards transport rollers 18057*b*, 18057*c*, and 18057*d* and pull separated banknote in the long edge leading-edge orientation. Banknotes separated for dispensing from temporary storage unit 1405/1805 can be again sent to banknote accepting module 1401/1501 via the banknote sensing module 1402 by banknote transportation module to be stored in one of the recycling modules 1406/1706 or into the banknote storage module 1404.

Figure 19A:
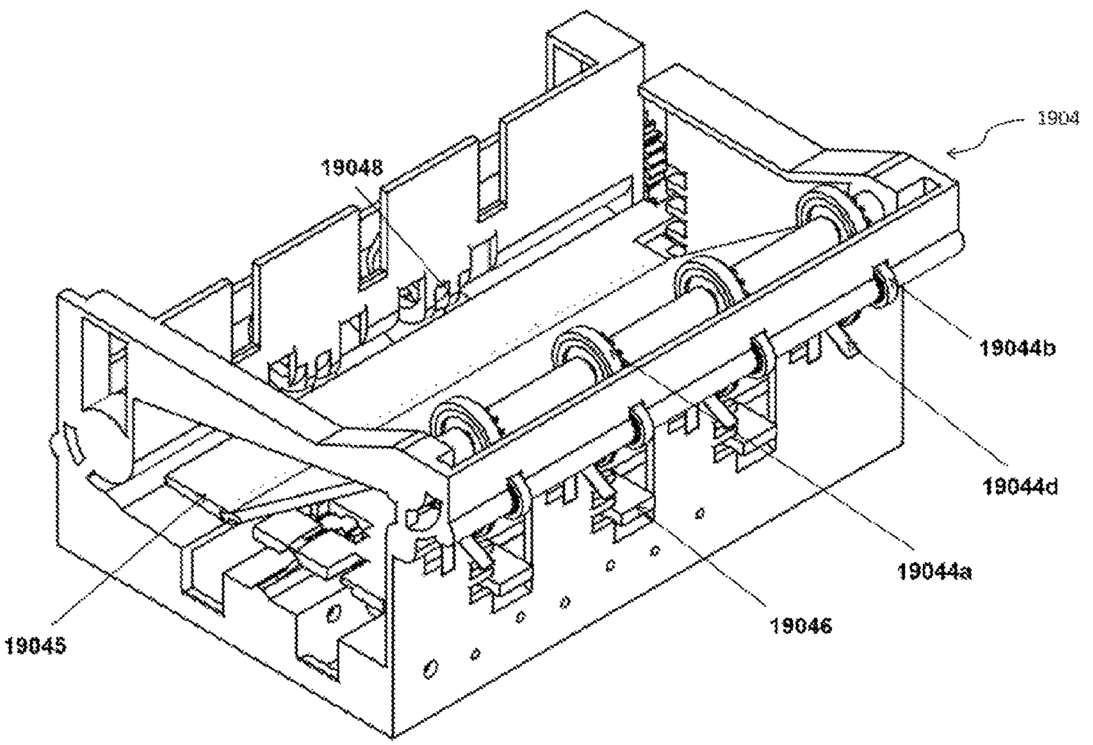
FIGS. 19A, 19B, 19C, 19D, 19E, 19F, 19G, and 19H illustrate various views of an example banknote storage unit in accordance with various embodiments of the present disclosure.
Figure 19B:
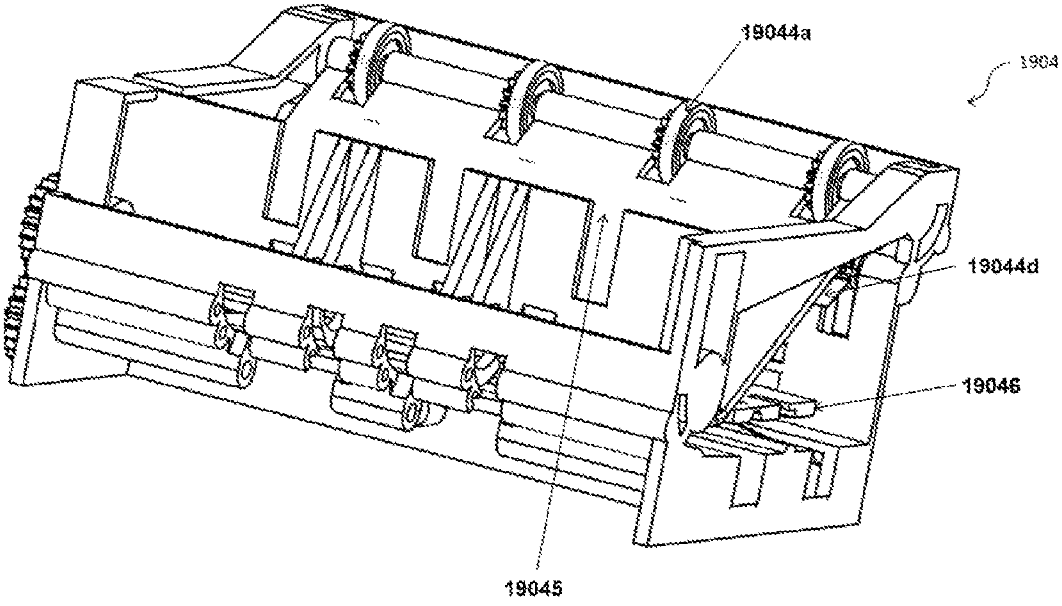
Figure 19C:
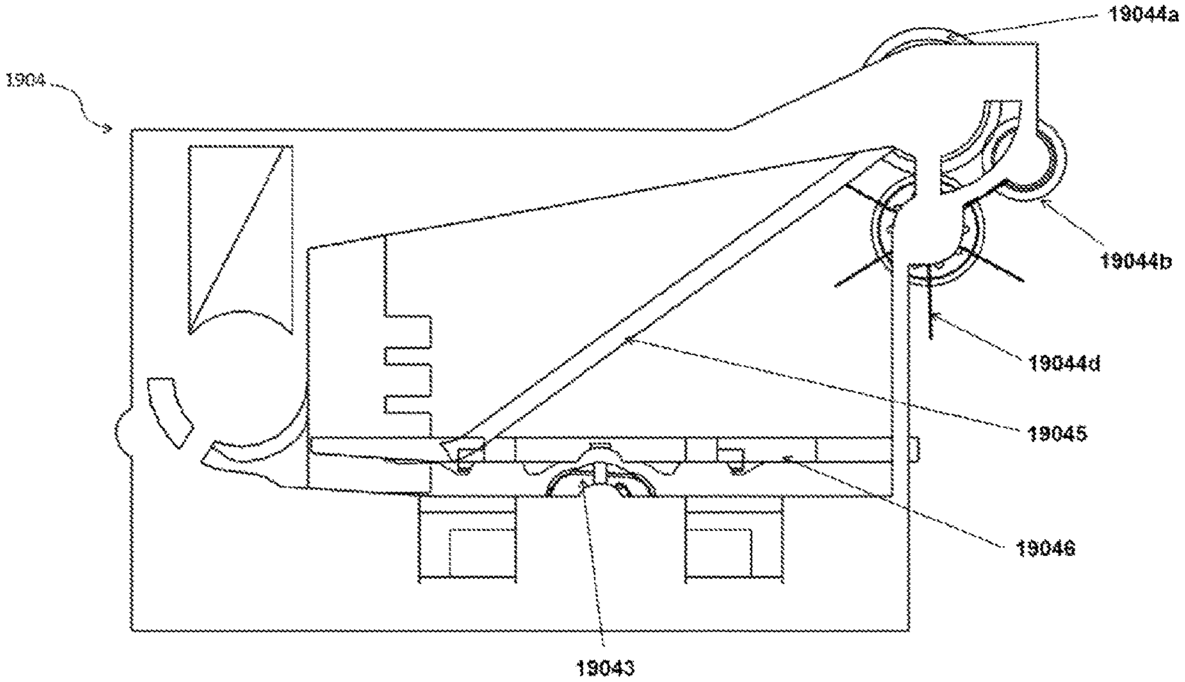
Figure 19D:
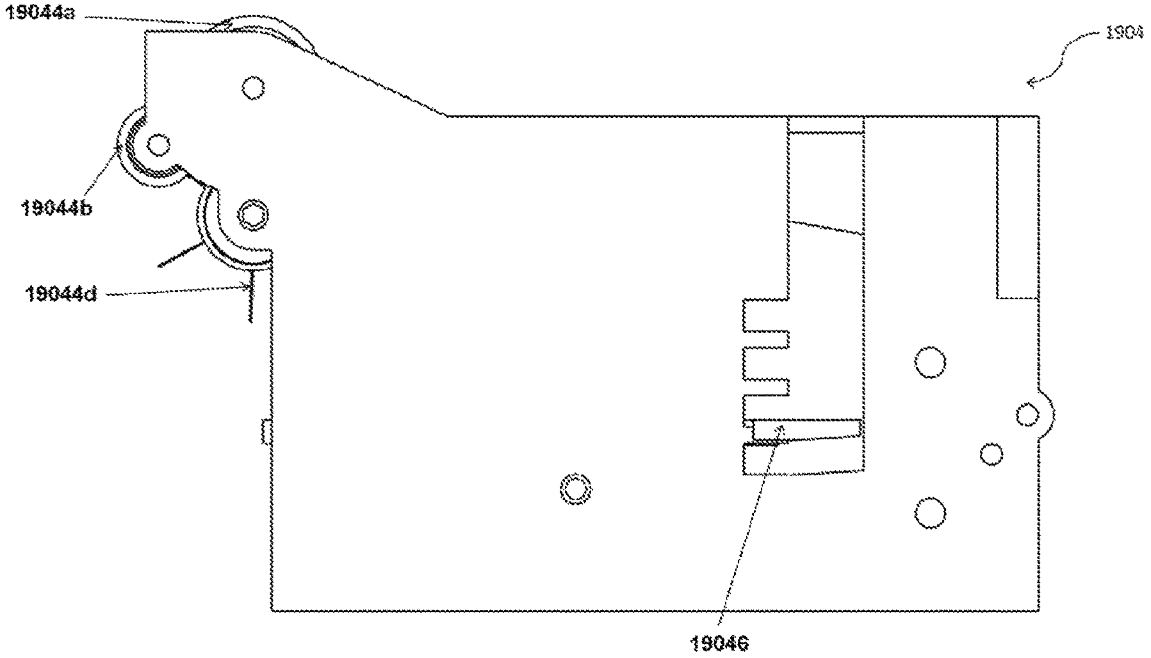
Figure 19E:
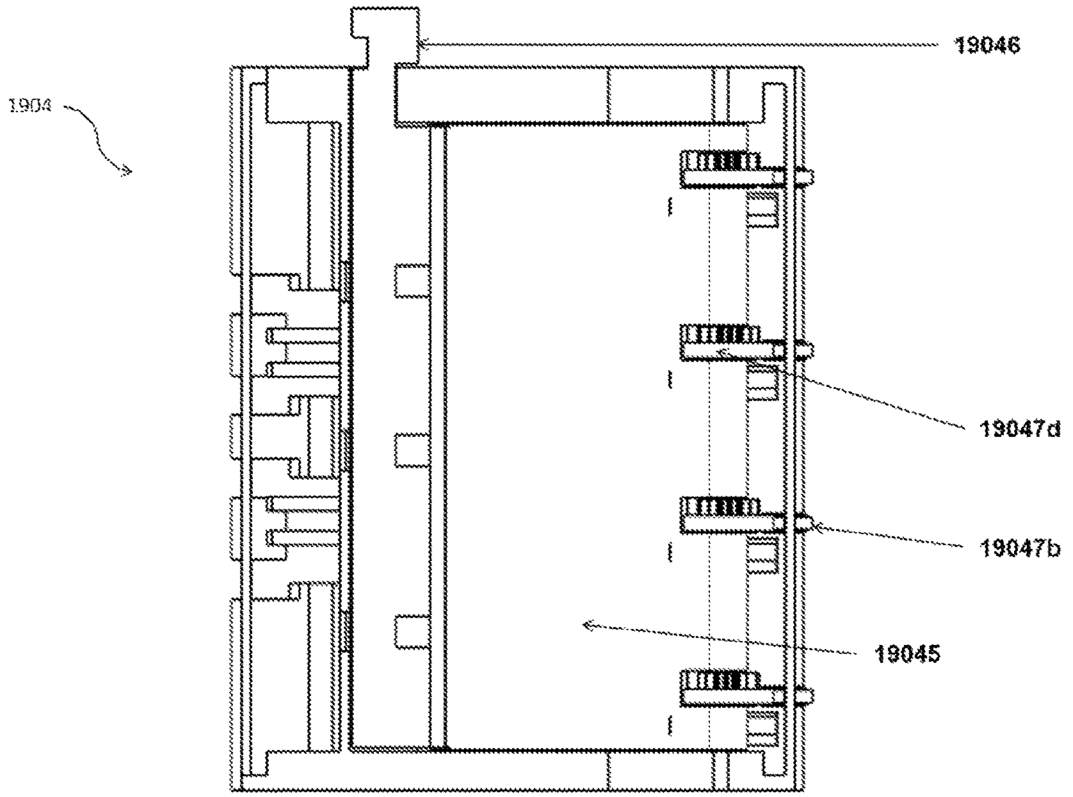
Figure 19F:
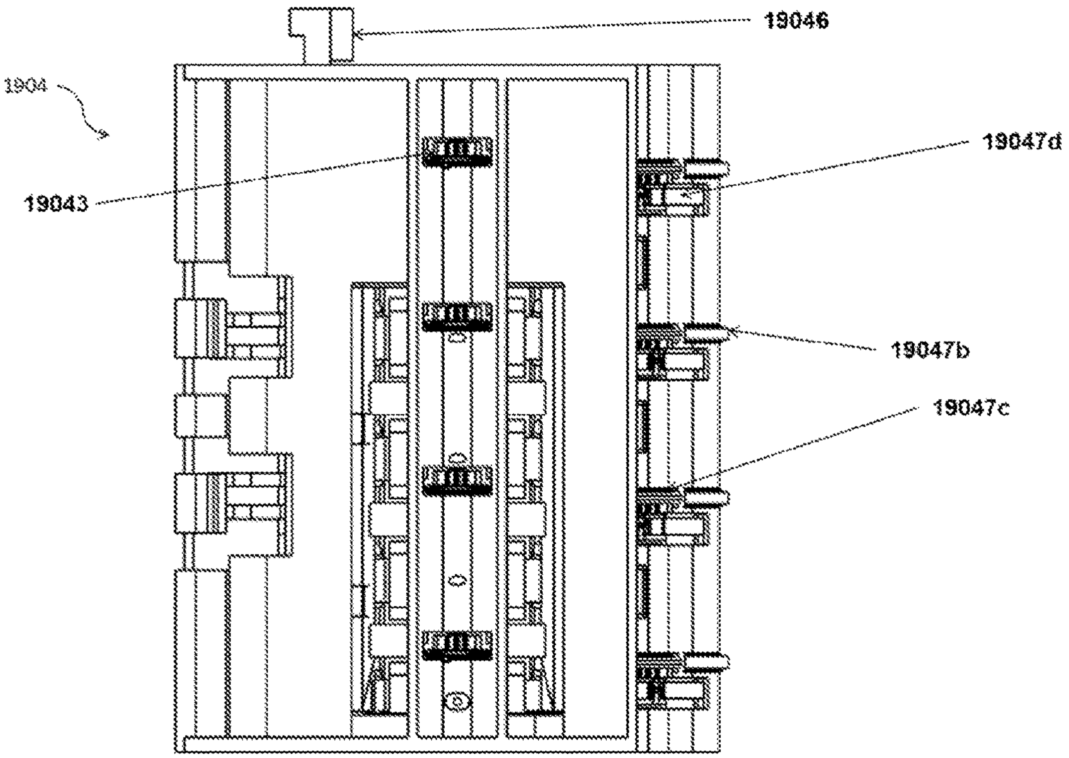
Figure 19G:
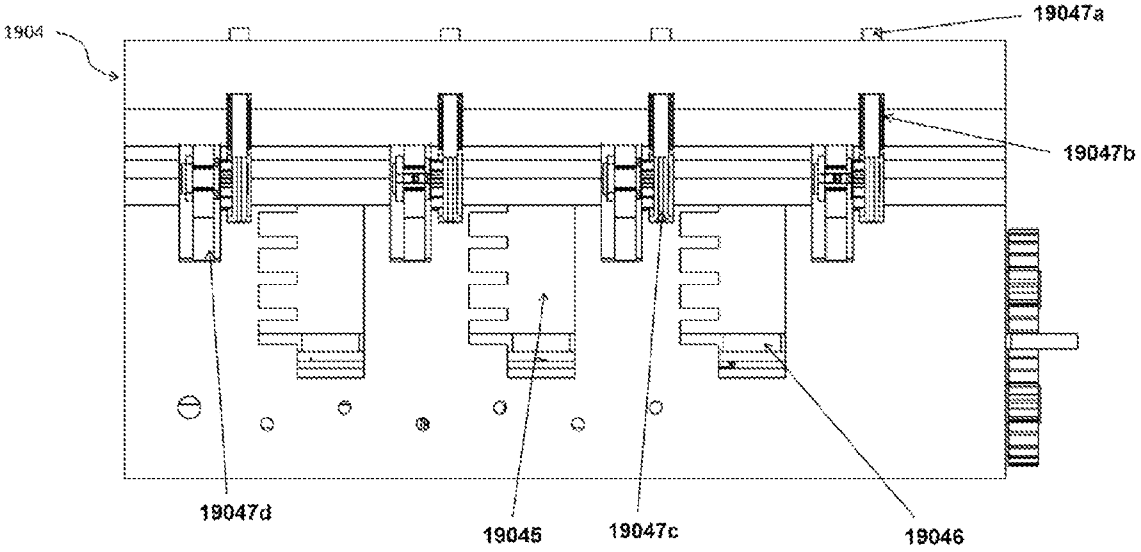
Figure 19H:
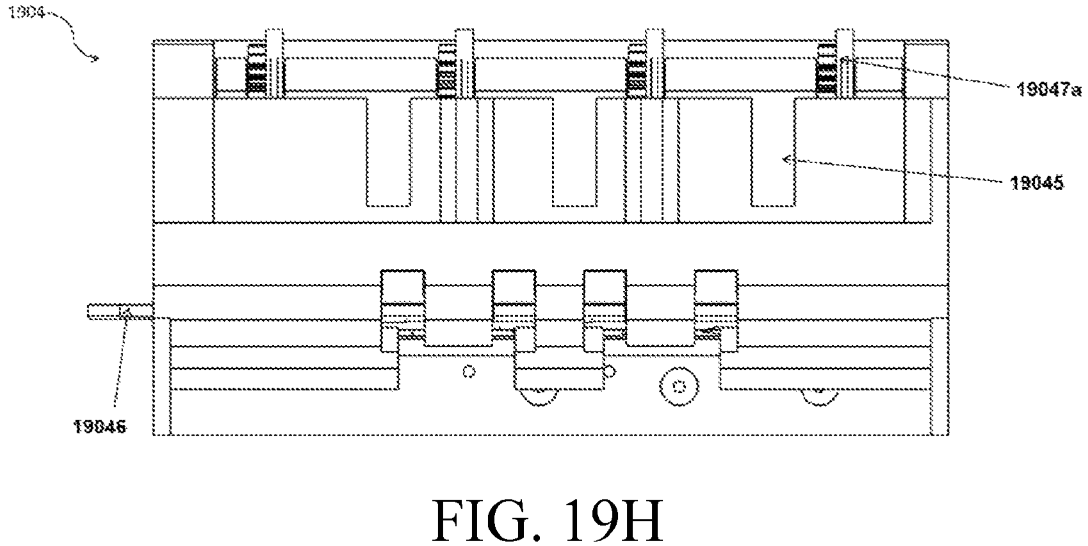

FIGS. 19A-19H illustrate various views of an example banknote storage module 1904. FIG. 19A illustrates a perspective view of an example banknote storage module 1904 in accordance with various embodiments of the present disclosure. FIG. 19B illustrates a perspective view of an example banknote storage module 1904 in accordance with various embodiments of the present disclosure. FIG. 19C illustrates a front view of an example banknote storage module 1904 in accordance with various embodiments of the present disclosure. FIG. 19D illustrates a back view of an example banknote storage module 1904 in accordance with various embodiments of the present disclosure. FIG. 19E illustrates a top view of an example banknote storage module 1904 in accordance with various embodiments of the present disclosure. FIG. 19F illustrates a bottom view of an example banknote storage module 1904 in accordance with various embodiments of the present disclosure. FIG. 19G illustrates a side view of an example banknote storage module 1904 in accordance with various embodiments of the present disclosure. FIG. 19H illustrates a side view of an example banknote storage module 1904 in accordance with various embodiments of the present disclosure.

The banknote storage module 1904 shown in FIGS. 19A-19H is a module that can store banknotes in a banknote accepting system or banknote deposit-withdrawal system 1300/1400. When the operator or owner, or the user, inserts banknotes in bulk into the banknote accepting module 1301/1401/1501 between the intake rollers 15011 and the moveable platform 15016, the banknotes in bulk are transported to a separation area. From the separation area, feed rollers 15013 feed banknotes towards transport rollers 15017*a*, 15017*b*, 15017*c*, and 15017*d*. As transport rollers 15017*a*, 15017*b*, 15017*c*, and 15017*d* pull banknotes fed by feed rollers 15013 away from the separation area, retarding ribs 15018 retard banknotes not in direct contact with transport rollers 15017*a*. These retarding ribs 15018, along with transport rollers 15017*a*, separate and transport the bottom-most banknote in contact with transport rollers 15017*a* from multiple banknotes fed by feed rollers 15013 towards transport rollers 15017*b*, 15017*c*, and 15017*d*, and pull the separated banknote in the long edge leading-edge orientation. If the operator or owner inserts banknotes in bulk on the moveable platform 15016, the moveable platform 15016 lowers to allow the intake rollers 15011 to peek through cavities 16016*a* and then the banknotes in bulk are transported to a separation area. From the separation area, feed rollers 15013 peek through cavities 16016*b* to feed banknotes towards transport rollers 15017*a*, 15017*b*, 15017*c*, and 15017*d*. As transport rollers 15017*a*, 15017*b*, 15017*c*, and 15017*d* pull banknotes fed by feed rollers 15013 away from the separation area, retarding ribs 15018 retard banknotes not in direct contact with transport rollers 15017*a*. These retarding ribs 15018, along with transport rollers 15017*a*, separate and transport the bottom-most banknote in contact with transport rollers 15017*a* from multiple banknotes fed by feed rollers 15013 towards transport rollers 15017*b*, 15017*c*, and 15017*d*, and pull the separated banknote in the long edge leading-edge orientation.

The transport module can send some or all of accepted banknotes to at least one of the banknote storage module 1904. As explained in FIGS. 13A and 13B, and FIGS. 14A-14E, banknote acceptor systems 1300 and banknote deposit-withdrawal systems 1400 can come in multiple embodiments and can include banknote storage modules 1904. Accepted banknotes transported from banknote accepting module 1401/1501 to one of the banknote storage modules 1904 are transported to be collected on the moveable platform 19046 to be stored by transport module via the sensor or sensing unit 1302/1402. Banknotes selected for storing are transported by transportation module from the sensing unit 1302/1402, and are pulled in by transport rollers 19044*a*, 19044*b*, and 19044*c*. As a banknote is transported by transport rollers 19044*a*, 19044*b*, and 19044*c*, a guide plate 19045 guides the banknote onto the moveable platform 19046, which guides the banknote into one of the banknote storage modules 1904. Once a banknote is guided on the moveable platform 19046 by guide plate 19045 and transport rollers 19044*a*, 19044*b*, and 19044*c*, rollers with impellers 19044*d* utilize impellers to move the trailing edge of the last banknote out of the way of incoming banknotes. As the trailing edge of the banknote is moved by the impellers of the rollers with impellers 19044*d*, a next banknote can be guided into one of the banknote storage modules 1904. The next banknote is then guided by guide plate 19045 and transport rollers 19044*a*, 19044*b*, and 19044*c* on to the previously held banknote on the moveable platform 19046. Once the banknote is guided on the previously held banknote on the moveable platform 19046, the impellers of the rollers with impellers 19044*d* move the trailing edge of now guided banknote. This action of the rollers with impellers 19044*d* keeps the trailing edges of banknotes guided on the moveable platform 19046 confined and out of the way for next incoming banknote. Once sufficient banknotes are stored on the moveable platform 19046, the moveable platform 19046 is lowered to allow more notes to come inside one of the banknote storage modules 1904. The operator or owner at their discretion or upon filling of one of the banknote storage modules 1904 can remove the filled or partially filled banknote storage modules 1904 out of the machine.

Figure 20A:
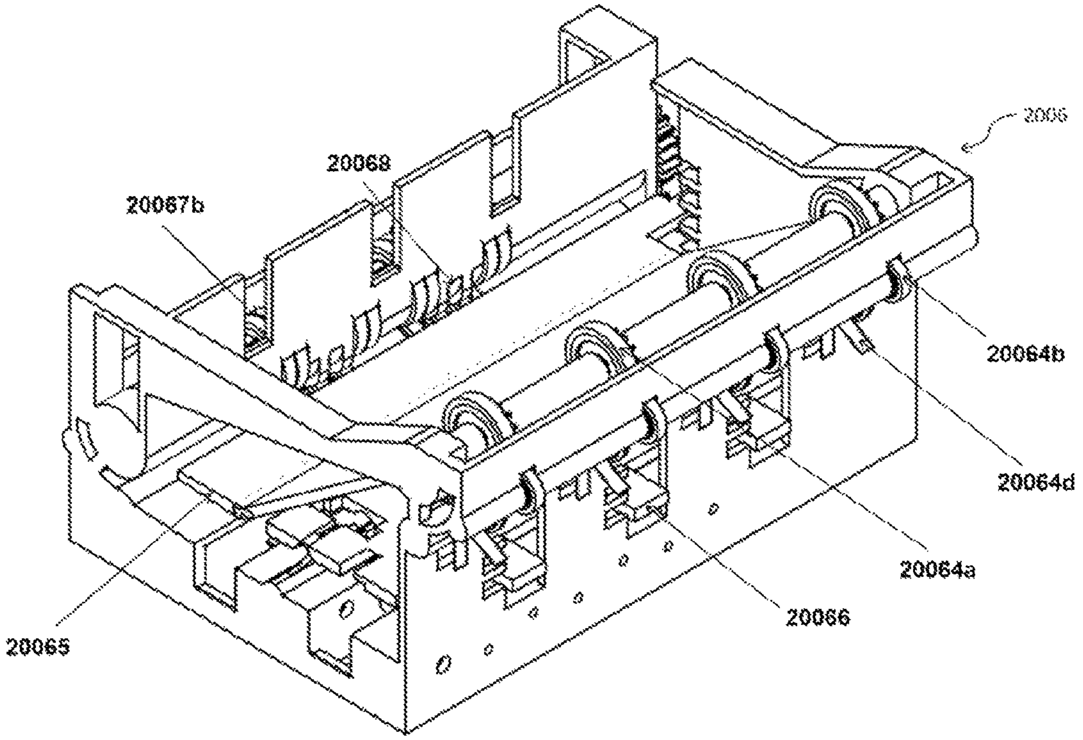
FIGS. 20A, 20B, 20C, 20D, 20E, 20F, 20G, and 20H illustrate various views of an example banknote recycling module in accordance with various embodiments of the present disclosure.
Figure 20B:
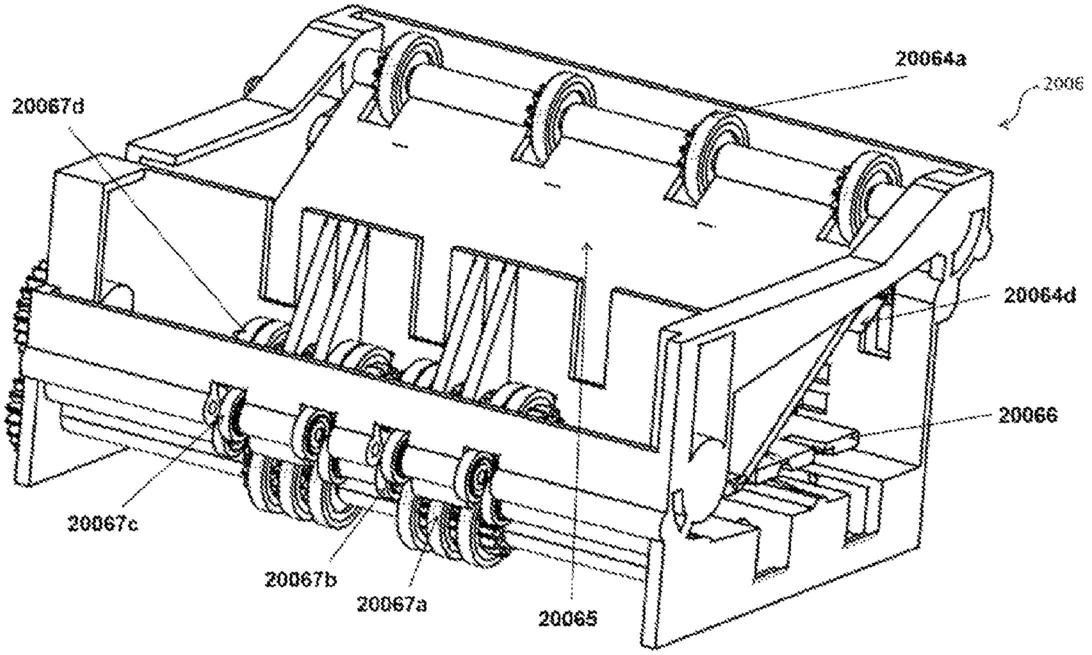
Figure 20C:
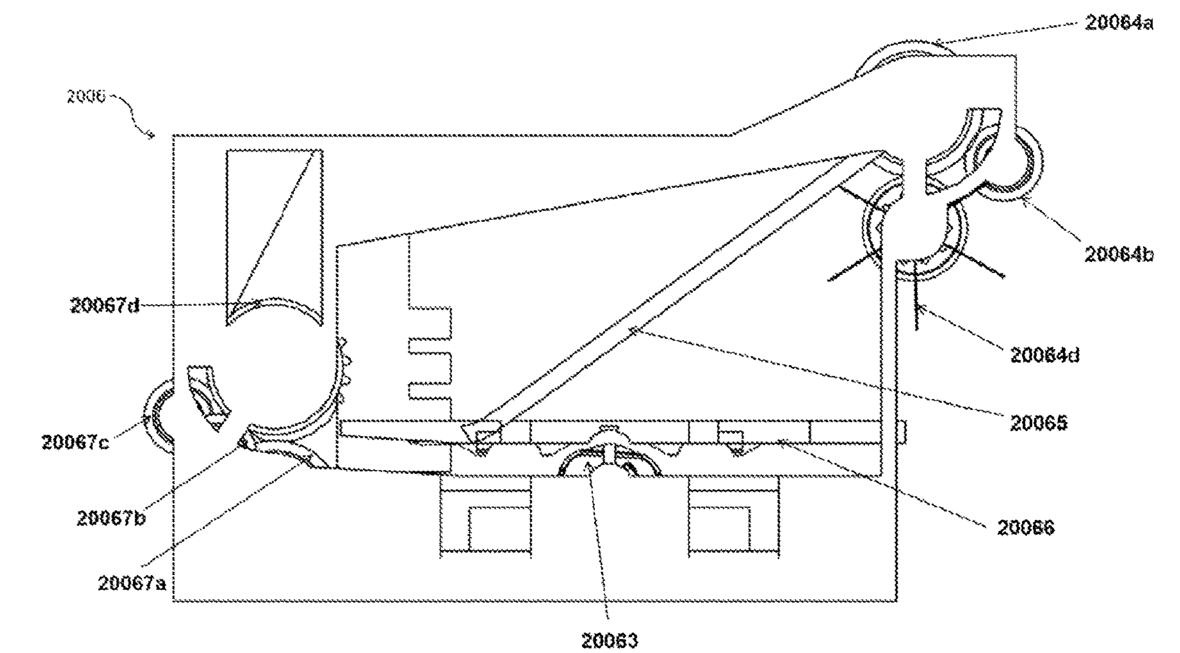
Figure 20D:
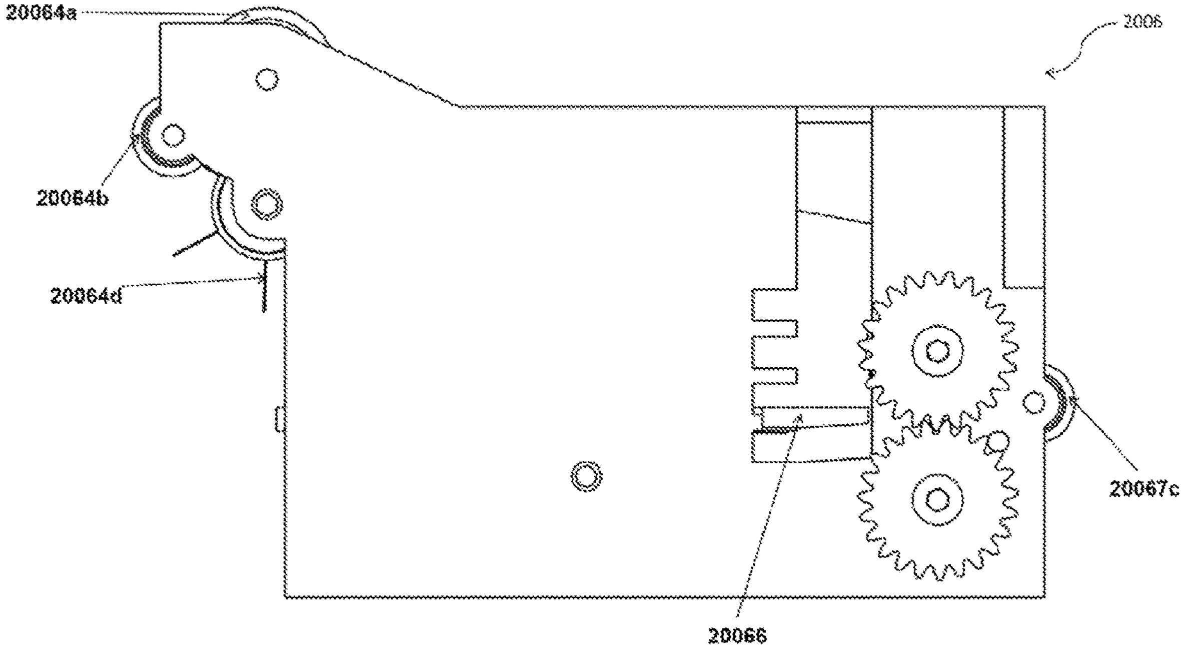
Figure 20E:
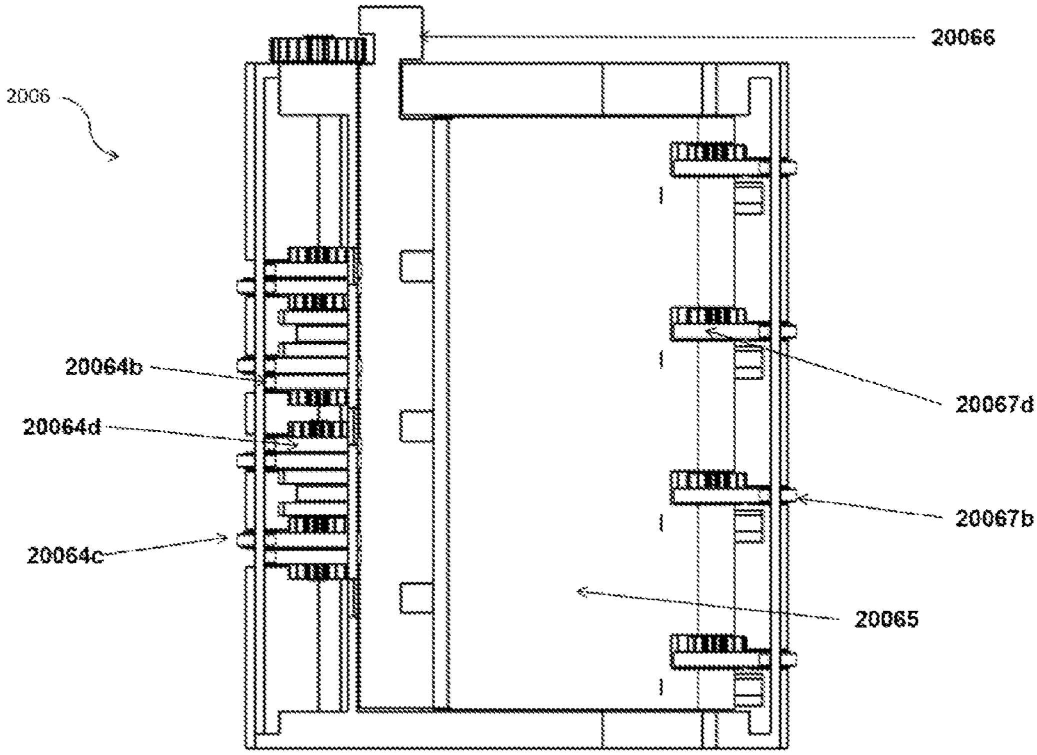
Figure 20F:
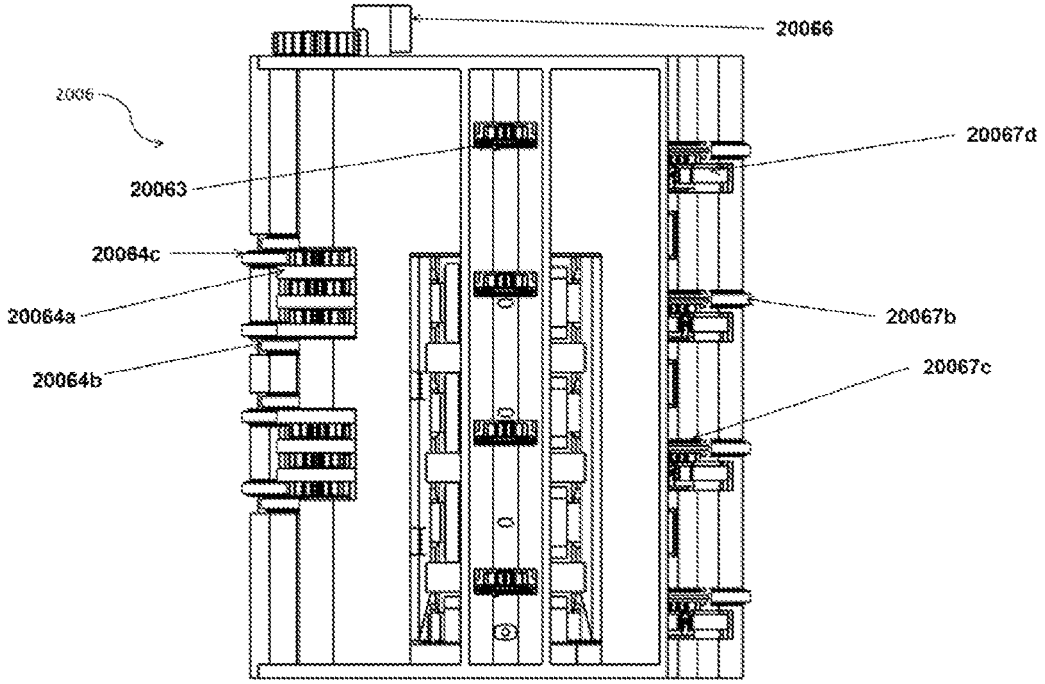
Figure 20G:
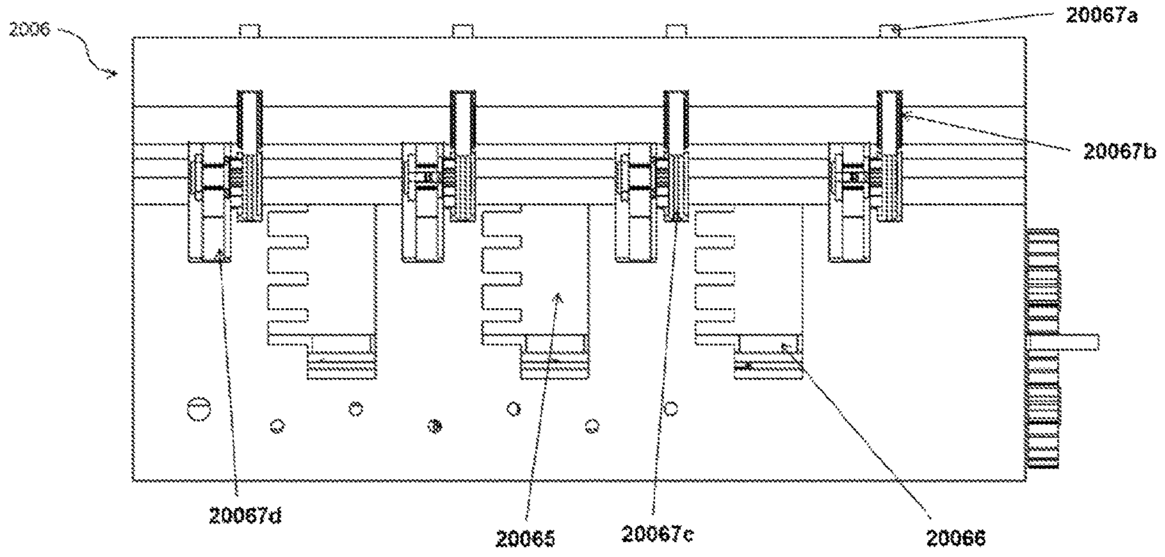
Figure 20H:
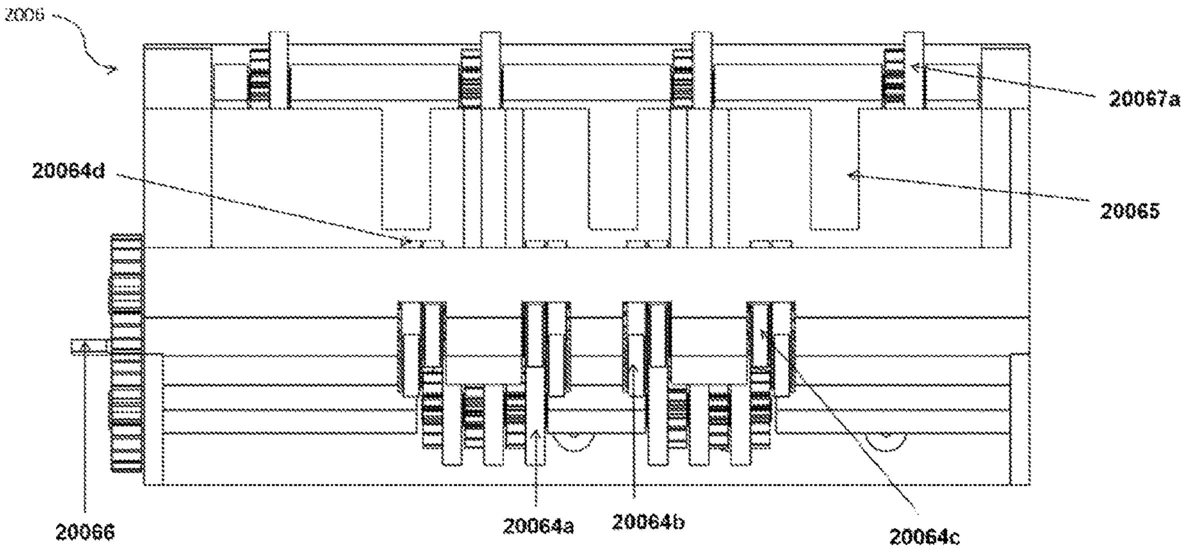

FIGS. 20A-20H illustrate various views of examples of a banknote recycling module 2006. FIG. 20A illustrates a perspective view of an example banknote recycling module 2006 in accordance with various embodiments of the present disclosure. FIG. 20B illustrates a perspective view of an example banknote recycling module 2006 in accordance with various embodiments of the present disclosure. FIG. 20C illustrates a front view of an example banknote recycling module 2006 in accordance with various embodiments of the present disclosure. FIG. 20D illustrates a back view of an example banknote recycling module 2006 in accordance with various embodiments of the present disclosure. FIG. 20E illustrates a top view of an example banknote recycling module 2006 in accordance with various embodiments of the present disclosure. FIG. 20F illustrates a bottom view of an example banknote recycling module 2006 in accordance with various embodiments of the present disclosure. FIG. 20G illustrates a side view of an example banknote recycling module 2006 in accordance with various embodiments of the present disclosure. FIG. 20H illustrates a side view of an example banknote recycling module 2006 in accordance with various embodiments of the present disclosure.

The banknote recycling module 2006 shown in FIGS. 20A-20H is a module that can accept or dispense banknotes of different dimensions or denominations in a banknote deposit-withdrawal system 1400. When the banknote deposit-withdrawal system 1400 described in FIGS. 14A-14E is initiated for the first time, the entire system may not have banknotes to carry out the transaction. Generally, an operator or owner would use some banknotes to fill banknote recycling modules 2006 with low and high denomination banknotes for providing change to the users. The banknote recycling module 2006 can store banknotes with two different denominations or dimensions. In some embodiments, additional banknote denominations can be used to increase the functionality of banknote deposit-withdrawal system 1400 with a banknote escrow module 1405. This two banknote denomination banknote recycling module 2006 can be used in a banknote deposit-withdrawal system 1400 where the operator or owner may want to recycle denominations of banknotes that can be used less frequently. The operator or owner would insert banknotes in bulk into banknote accepting module 1501 either above the moveable platform 15016 or between the moveable platform 15016 and the intake rollers 15011. If the operator or owner inserts banknotes in bulk between the intake rollers 15011 and the moveable platform 15016, the banknotes in bulk are transported to a separation area. From the separation area, feed rollers 15013 feed banknotes towards transport rollers 15017*a*, 15017*b*, 15017*c*, and 15017*d*. As transport rollers 15017*a*, 15017*b*, 15017*c*, and 15017*d* pull banknotes fed by feed rollers 15013 away from the separation area, retarding ribs 15018 retard banknotes not in direct contact with transport rollers 15017*a*. These retarding ribs 15018, along with transport rollers 15017*a*, separate and transport the bottom-most banknote in contact with transport rollers 15017*a* from multiple banknotes fed by feed rollers 15013 towards transport rollers 15017*b*, 15017*c*, and 15017*d*, and pull the separated banknote in the long edge leading-edge orientation. If the operator or owner inserts banknotes in bulk on the moveable platform 15016, the moveable platform 15016 lowers to allow the intake rollers 15011 to peek through the cavities 16016*a* and then the banknotes in bulk are transported to a separation area. From the separation area, feed rollers 15013 peek through the cavities 16016*b* to feed banknotes towards the transport rollers 15017*a*, 15017*b*, 15017*c*, and 15017*d*. As transport rollers 15017*a*, 15017*b*, 15017*c*, and 15017*d* pull banknotes fed by feed rollers 15013 away from the separation area, retarding ribs 15018 retard banknotes not in direct contact with transport rollers 15017*a*. These retarding ribs 15018 along with transport rollers 15017*a* separate and transport the bottom-most banknote in contact with transport rollers 15017*a* from multiple banknotes fed by feed rollers 15013 towards transport rollers 15017*b*, 15017*c*, and 15017*d*, and pull the separated banknote in the long edge leading-edge orientation.

As explained in FIGS. 13A and 13B, and FIGS. 14A-14E, separated banknotes are sent to the banknote sensing module 1402 by the banknote transportation module in the long edge leading-edge orientation. Banknotes deemed not acceptable by the banknote sensing module 1402 are sent back to the banknote accepting module 1401/1501 by banknote transportation module in the long edge leading-edge orientation. A banknote deemed not acceptable is pulled in by transport rollers 15014*a*, 15014*b*, and 15014*c*. As the banknote is transported by transport rollers 15014*a*, 15014*b*, and 15014*c*, a guide plate 15015 guides the banknote onto the moveable platform 15016, which guides the banknote into the banknote accepting module 1501, and can be sent to the banknote sensing module 1402 once again in some embodiments. If banknotes are found not acceptable, then banknotes collected on the moveable platform 15016 are returned to operator or owner.

The banknote transportation module can send accepted banknotes to at least one of the banknote recycling module 2006. As explained in FIGS. 14A-14E, banknote deposit-withdrawal system 1400 can come in multiple embodiments and can include multiple banknote recycling modules 2006. Accepted banknotes transported from the banknote accepting module 1401/1501 to the banknote recycling module 2006 are transported to be collected above or below the moveable platform 20066 to be stored by the banknote transportation module via the banknote sensing module 1402. In this embodiment, the moveable platform 20066 can store banknotes of a denomination above the moveable platform 20066 and banknotes of another denomination under the moveable platform 20066. A banknote selected for storing in the banknote recycling modules 2006 are transported by the banknote transportation module from the banknote sensing module 1402, and is pulled in by transport rollers 20064*a*, 20064*b*, and 20064*c*. If the transported banknote is to be stored below the moveable platform 20066, then the moveable platform 20066 is moved above the transport rollers 20064*a*, 20064*b*, and 20064*c* and then the selected banknote is transported by transport rollers 20064*a*, 20064*b*, and 20064*c* under the moveable platform 20066. Once the banknote is transported below the moveable platform 20066, rollers with impellers 20064*d* utilize impellers to prevent the trailing edge of the last banknote from curling up and allows a next banknote to enter under the moveable platform 20066. If the transported banknote is to be stored on the moveable platform 20066, then the moveable platform 20066 is moved under the transport rollers 20064*a*, 20064*b*, and 20064*c*. As the banknote is transported by the transport rollers 20064*a*, 20064*b*, and 20064*c*, a guide plate 20065 guides the banknote onto the moveable platform 20066, which guides the banknote into the banknote recycling module 2006. Once a banknote is guided on the moveable platform 20066 by guide plate 20065 and transport rollers 20064*a*, 20064*b*, and 20064*c*, rollers with impellers 20064*d* utilize impellers to push the trailing edge of the last banknote out of the way of incoming banknotes. As the trailing edge of the banknote is moved by the impellers of the rollers with impellers 20064*d*, a next banknote can be guided into banknote recycling module 2006. The next banknote is then guided by guide plate 20065 and transport rollers 20064*a*, 20064*b*, and 20064*c* on to the previously held banknote on the moveable platform 20066. Once the banknote is guided on the previously held banknote on the moveable platform 20066, the impellers of the rollers with impellers 20064*d* move the trailing edge of now guided banknote. This action of the impellers of the rollers with impellers 20064*d* keeps the trailing edges of banknotes guided on the moveable platform 20066 confined and out of the way for next incoming banknote. Once sufficient banknotes are stored on the moveable platform 20066, the moveable platform 20066 is lowered to allow more notes to come inside the banknote recycling module 2006.

During dispensing, the banknote recycling module 2006 can first dispense banknotes stored under the moveable platform 20066. Feed rollers 20063 feed banknotes towards transport rollers 20067*a*, 20067*b*, 20067*c* and 20067*d*. As transport rollers 20067*a*, 20067*b*, 20067*c*, and 20067*d* pull banknotes fed by feed rollers 20063 away from the separation area, retarding ribs 20068 retard banknotes not in direct contact with transport rollers 20067*a*. These retarding ribs 20068, along with transport rollers 20067*a*, separate and transport the bottom-most banknote in contact with transport rollers 20067*a* from multiple banknotes fed by feed rollers 20063 towards transport rollers 20067*b*, 20067*c*, and 20067*d*, and pull the separated banknote in the long edge leading-edge orientation. Banknotes separated for dispensing from the banknote recycling module 2006 can be sent to the banknote sensing module 1402 by the banknote transportation module. If the transported banknote is to be dispensed to the user then it can be sent to the banknote accepting module 1401/1501. Otherwise, the transported banknote can be sent to the banknote escrow module 1405 for temporary storage. Once all banknotes under the moveable platform 20066 are either sent to the banknote accepting module 1401/1501 or to the banknote escrow module

1405, the banknote recycling modules 2006 can lower the moveable platform 20066 to allow feed rollers 20063 to peek through the cavities 16016*b* to feed banknotes stored above the moveable platform 20066 towards the transport rollers 20067*a*, 20067*b*, 20067*c*, and 20067*d*. As transport rollers 20067*a*, 20067*b*, 20067*c*, and 20067*d* pull banknotes fed by feed rollers 20063 away from the separation area, retarding ribs 20068 retard banknotes not in direct contact with transport rollers 20067*a*. These retarding ribs 20068, along with transport rollers 20067*a*, separate and transport the bottom-most banknote in contact with transport rollers 20067*a* from multiple banknotes fed by feed rollers 20063 towards transport rollers 20067*b*, 20067*c*, and 20067*d*, and pull the separated banknote in the long edge leading-edge orientation. Banknotes separated for dispensing from the banknote recycling module 2006 can be again sent to banknote accepting module 1401/1501 via the banknote sensing module 1402 by banknote transportation module to be dispensed to the user. After completion of the transaction, the banknotes from the banknote escrow module 1405 can be sent to the banknote sensing module 1402 by banknote transportation module and, depending on denomination, can be sent to either above or below the moveable platform 20066 of the banknote recycling module 2006.

In some embodiments, the operator or owner can empty all of the banknote escrow modules 1405 and all banknote recycling module 1406 into one of the banknote storage modules 1404, to empty the banknote deposit-withdrawal system 1400. The operator or owner initiates complete emptying out of the banknote recycling modules 1406. Once initiated, banknotes collected in temporary storage unit 1405/1805 can be dispensed back to banknote accepting module 1401/1501 to be stored in one of the recycling modules 1406/1706 or into the banknote storage module 1404. During this reorganization, the banknote escrow module 1805 allows feed rollers 18053 to feed banknotes towards transport rollers 18057*a*, 18057*b*, 18057*c*, and 18057*d*. As transport rollers 18057*a*, 18057*b*, 18057*c*, and 18057*d* pull banknotes fed by feed rollers 18053 away from the separation area, retarding ribs 18058 retard banknotes not in direct contact with transport rollers 18057*a*. These retarding ribs 18058, along with transport rollers 18057*a*, separate and transport the bottom-most banknote in contact with transport rollers 18057*a* from multiple banknotes fed by feed rollers 18053 towards transport rollers 18057*b*, 18057*c*, and 18057*d*, and pull the separated banknote in the long edge leading-edge orientation. These banknotes are sent to banknote storage units 1404/1904 via the banknote sensing module 1402 by the banknote transportation module. Banknotes separated for dispensing from temporary storage unit 1405/1805 can be again sent to the banknote accepting module 1401/1501 via the banknote sensing module 1402 by the banknote transportation module to be stored in one of the banknote storage module 1404. In addition, the recycling modules 1406/1706 can lower the moveable platform 17066 to allow feed rollers 17063 to peek through the cavities 16016*b* to feed the banknotes towards the transport rollers 17067*a*, 17067*b*, 17067*c*, and 17067*d*. As transport rollers 17067*a*, 17067*b*, 17067*c*, and 17067*d* pull banknotes fed by feed rollers 17063 away from the separation area, retarding ribs 17068 retard banknotes not in direct contact with transport rollers 17067*a*. These retarding ribs 17068 along with transport rollers 17067*a* separate and transport the bottom-most banknote in contact with transport rollers 17067*a* from multiple banknotes fed by feed rollers 17063 towards transport rollers 17067*b*, 17067*c*, and 17067*d*, and pull the separated banknote in the long edge leading-edge orientation. These banknotes are sent to banknote storage units 1404/1904 via the banknote sensing module 1402 by the banknote transportation module.

Figure 21A:
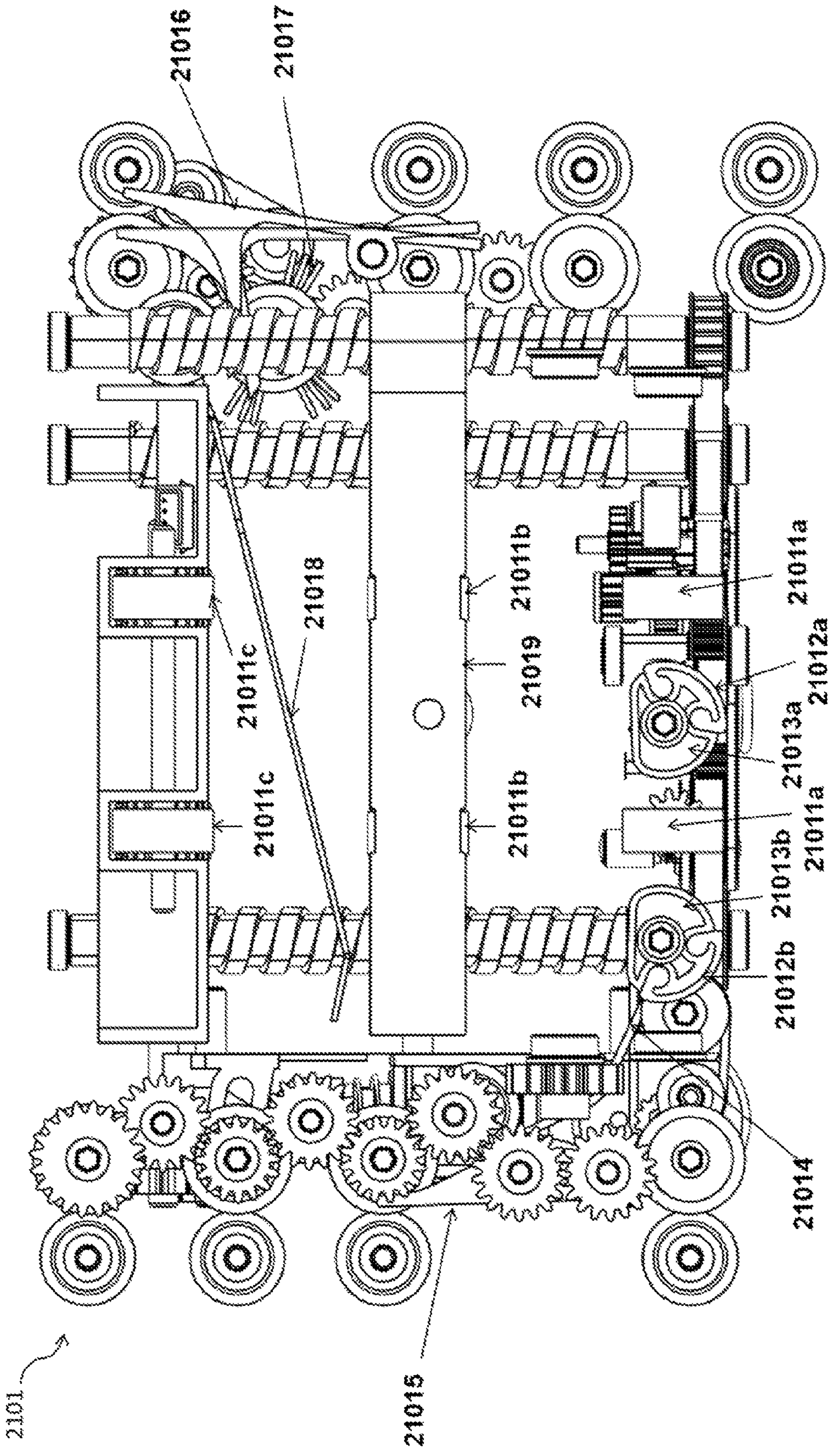
FIG. 21A illustrates a front view of an example banknote accepting module in accordance with various embodiments of the present disclosure.
Figure 21B:
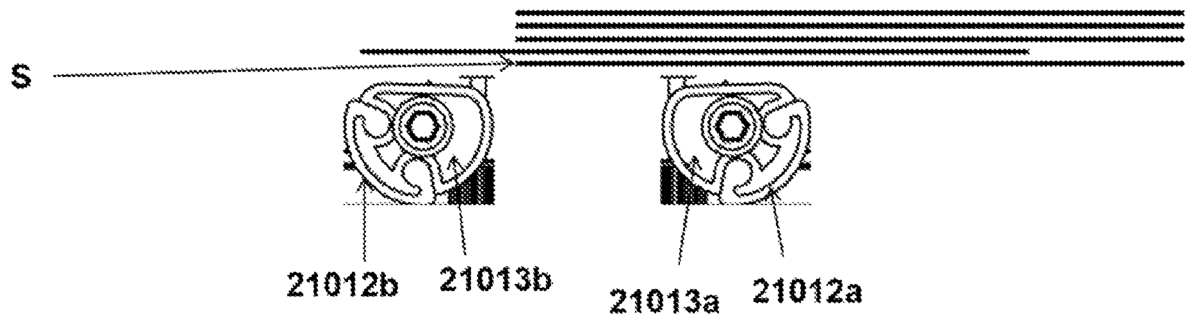
Figure 21C:
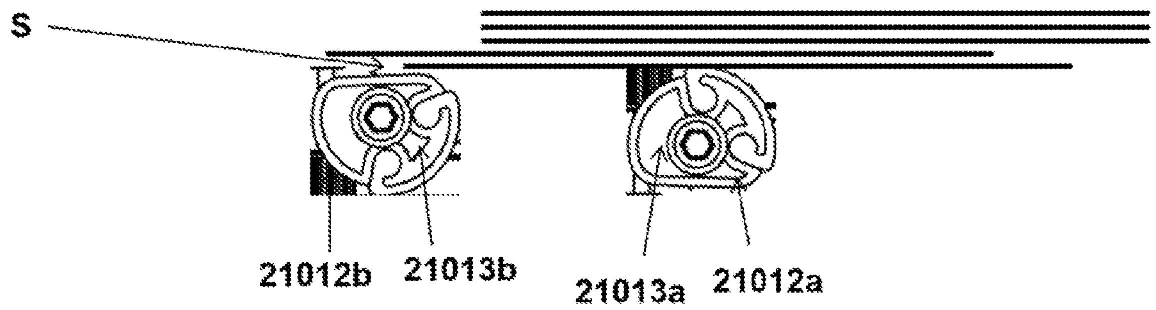
Figure 21D:
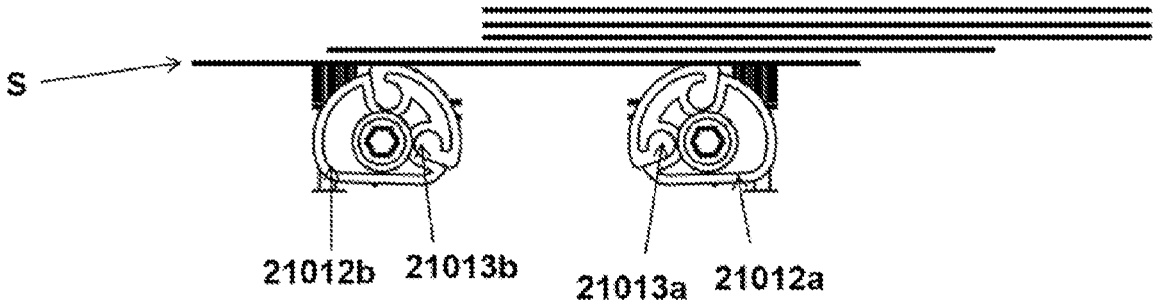
Figure 21E:
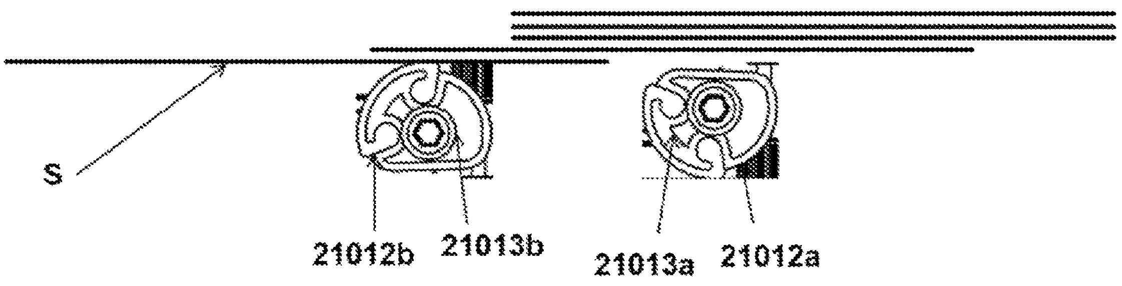
Figure 21F:
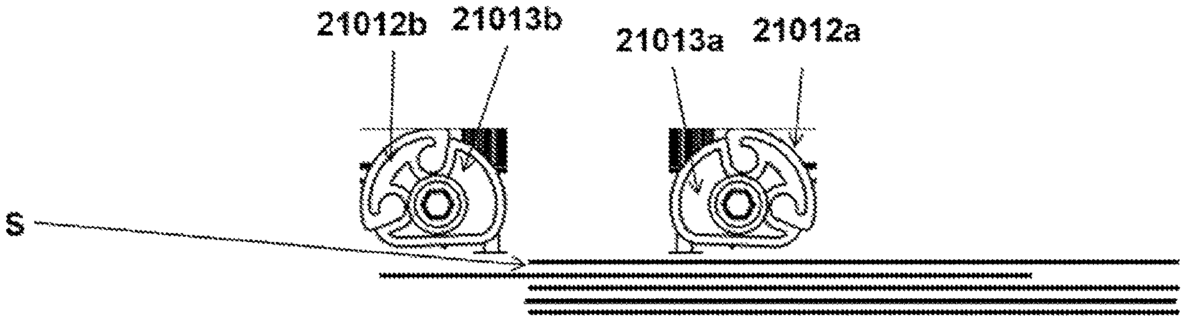
Figure 21G:
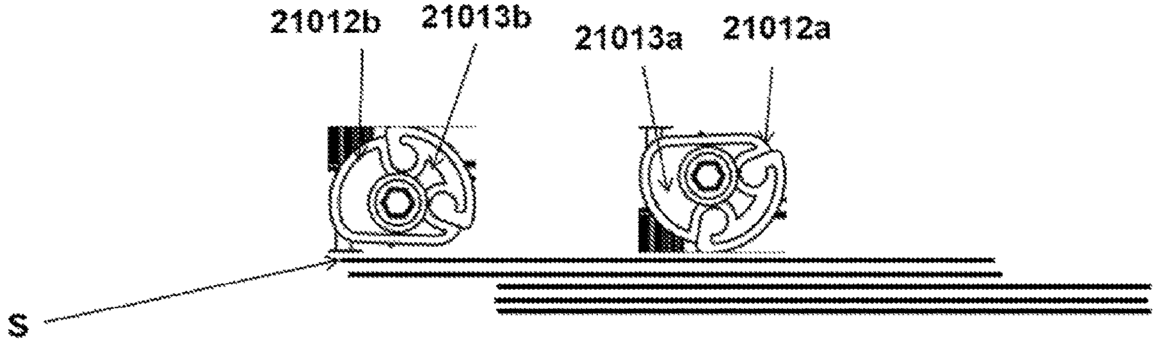
Figure 21H:
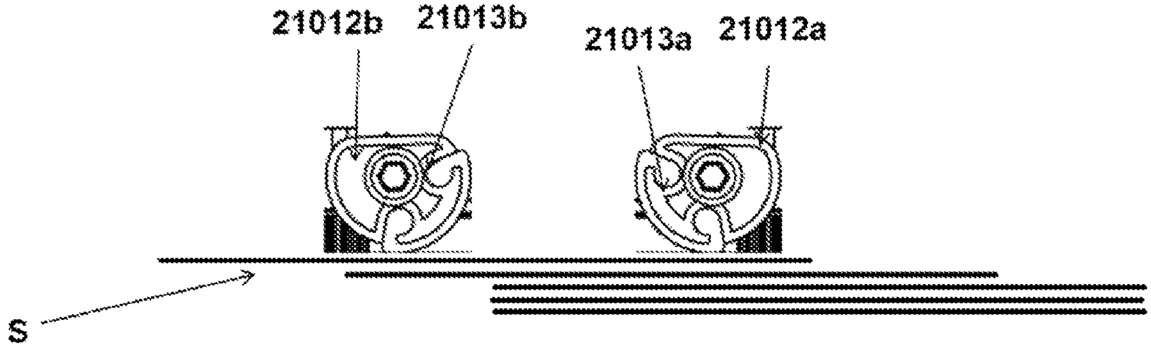
Figure 21I:
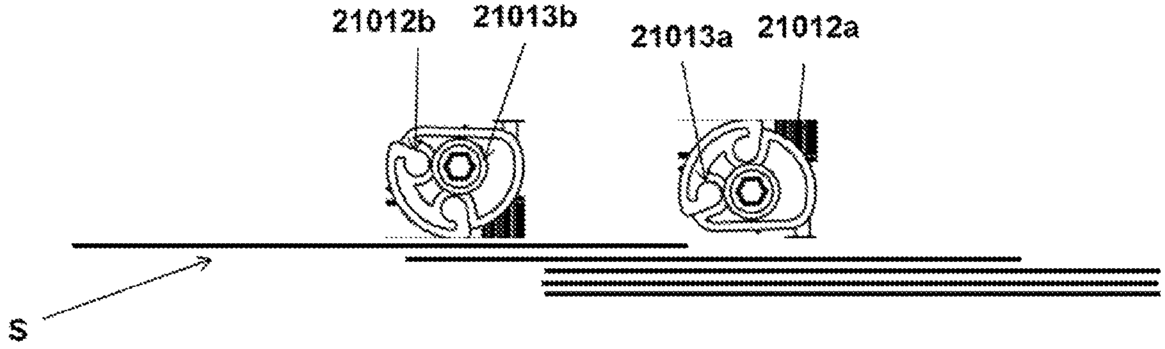

FIG. 21A illustrates a front view of an example banknote accepting module 2101 in accordance with various embodiments of the present disclosure. In other embodiments, FIG. 21A illustrates a banknote recycling module in accordance with various embodiments of the present disclosure. In other embodiments, FIG. 21A represents a size agnostic banknote recycling module in accordance with various embodiments of the present disclosure. FIGS. 21B-21E illustrate separation of a bottom most banknote from the bulk of banknotes in accordance with various embodiments of the present disclosure. FIGS. 21F-21I illustrate separation of a top most banknote from the bulk of banknotes in accordance with various embodiments of the present disclosure.

As illustrated in FIG. 21A the banknote accepting module 2101 is a module that can accept banknotes in either a banknote acceptor system 100/1300 or a banknote deposit-withdrawal system 100/700/800/900/1400. Once banknotes are inserted under the moveable platform 21019 and over intake belts 21011*a*, the moveable platform 21019 is moved down to pinch either a single inserted banknote or a bulk of banknotes. Once either the inserted single banknote or bulk of banknotes are pinched, then the inserted banknote or bulk of banknotes are pulled into the banknote accepting module 2101 in a short edge leading edge orientation by intake belts 21011*a* and 21011*b*.

In case of a single banknote insertion, once the pulled banknote reaches the separation area distal feed rollers 21013*a*, and proximal feed rollers 21013*b* push single banknote towards the two-way gate 21015 via separation mechanism 21014 in long edge leading edge orientation. The distal and proximal feed rollers 21013*a* and 21013*b* include friction pads 21012*a* and 21012*b* at radial offset. This radial offset results in inserted banknote first coming in contact with the friction pads 21012 of distal feed rollers 21013*a* and then pushed towards the proximal feed rollers 21013*b*. The friction pads 21012*b* of proximal feed rollers 21013*b* then push the banknote towards the two-way gate 21015 via separation mechanism 21014 in long edge leading edge orientation.

In case of a bulk of banknotes insertion, once the pulled bulk of banknotes reaches the separation area distal feed rollers 21013*a*, and proximal feed rollers 21013*b* push the bottom most banknote towards the two-way gate 21015 via separation mechanism 21014 in long edge leading edge orientation. The distal and proximal feed rollers 21013*a* and 21013*b* include friction pads 21012*a* and 21012*b* at radial offset. This radial offset results in the bottom most banknote "S" first coming in contact with the friction pads 21012*a* of distal feed rollers 21013*a* and then is pushed towards the proximal feed rollers 21013*b* as shown in FIGS. 21B-21E. The friction pads 21012*b* of proximal feed rollers 21013*b* then pushes the banknote towards the two-way gate 21015 via separation mechanism 21014 in long edge leading edge orientation. The radial offset of friction pads 21012*a* and 21012*b* on distal and proximal feed rollers 21013*a* and 21013*b* prevents the friction pad 21012*b* of proximal feed rollers 21013*b* to coming in contact with the banknote above the bottom most banknote "S".

In embodiments, where banknotes of different sizes are mixed and inserted in bulk, once the pulled the bulk of banknotes reaches the separation area distal feed rollers 21013*a*, and proximal feed rollers 21013*b* push the bottom most banknote towards the two-way gate 21015 via separation mechanism 21014 in long edge leading edge orientation. The distal and proximal feed rollers 21013*a* and 21013*b* include friction pads 21012*a* and 21012*b* at radial offset. This radial offset results in the bottom most banknote “S” first coming in contact with the friction pads 21012*a* of distal feed rollers 21013*a* and then is pushed towards the proximal feed rollers 21013*b* as shown in FIGS. 21B-21E. The friction pads 21012*b* of proximal feed rollers 21013*b* then push the banknote towards the two-way gate 21015 via separation mechanism 21014 in long edge leading edge orientation. The radial offset of friction pads 21012*a* and 21012*b* on distal and proximal feed rollers 21013*a* and 21013*b* prevents the friction pad 21012*b* of proximal feed rollers 21013*b* to coming in contact with the banknote above the bottom most banknote “S”.

In other embodiments, in case of a bulk of banknotes insertion, once the pulled the bulk of banknotes reaches the separation area distal feed rollers 21013*a*, and proximal feed rollers 21013*b* push the top most banknote towards the two-way gate 21015 via separation mechanism 21014 in long edge leading edge orientation. The distal and proximal feed rollers 21013*a* and 21013*b* include friction pads 21012*a* and 21012*b* at radial offset. This radial offset results in the bottom most banknote “S” first coming in contact with the friction pads 21012*a* of distal feed rollers 21013*a* and then is pushed towards the proximal feed rollers 21013*b* as shown in FIGS. 21F-21I. The friction pads 21012*b* of proximal feed rollers 21013*b* then push the banknote towards the two-way gate 21015 via separation mechanism 21014 in long edge leading edge orientation. The radial offset of friction pads 21012*a* and 21012*b* on distal and proximal feed rollers 21013*a* and 21013*b* prevents the friction pad 21012*b* of proximal feed rollers 21013*b* to coming in contact with the banknote below the top most banknote “S”.

In embodiments, where banknotes of different sizes are mixed and inserted in bulk, once the pulled the bulk of banknotes reaches the separation area distal feed rollers 21013*a*, and proximal feed rollers 21013*b* push the top most banknote towards the two-way gate 21015 via separation mechanism 21014 in long edge leading edge orientation. The distal and proximal feed rollers 21013*a* and 21013*b* include friction pads 21012*a* and 21012*b* at radial offset. This radial offset results in the bottom most banknote “S” first coming in contact with the friction pads 21012*a* of distal feed rollers 21013*a* and then is pushed towards the proximal feed rollers 21013*b* as shown in FIGS. 21F-I. The friction pads 21012*b* of proximal feed rollers 21013*b* then push the banknote towards the two-way gate 21015 via separation mechanism 21014 in long edge leading edge orientation. The radial offset of friction pads 21012*a* and 21012*b* on distal and proximal feed rollers 21013*a* and 21013*b* prevents the friction pad 21012*b* of proximal feed rollers 21013*b* to coming in contact with the banknote below the top most banknote “S”.

Figure 22A:
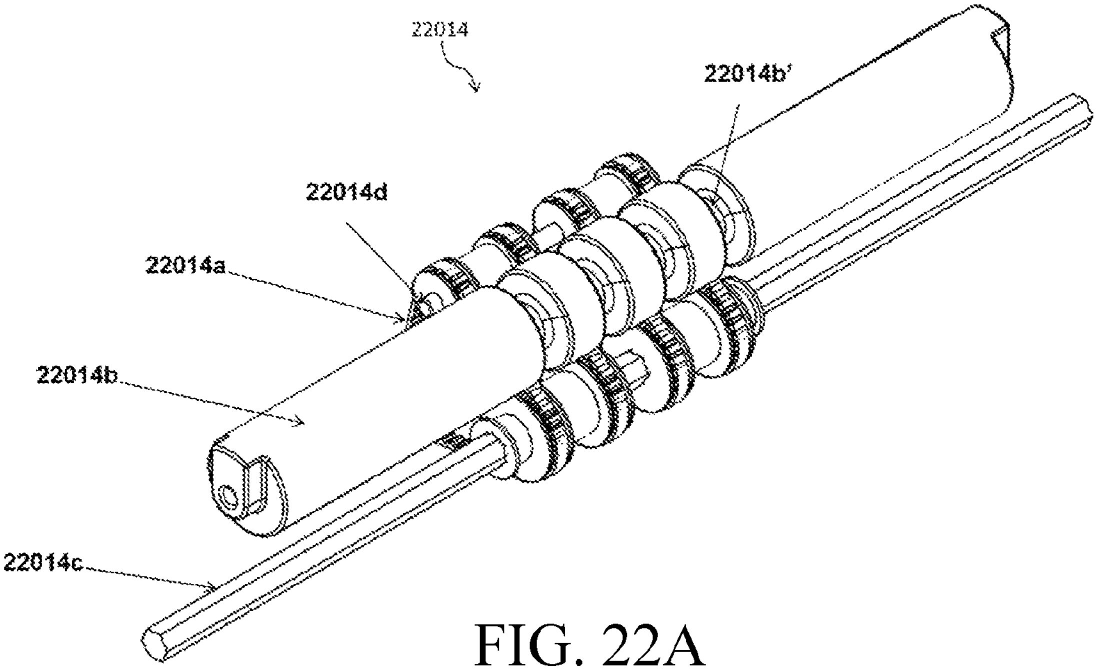
Figure 22B:
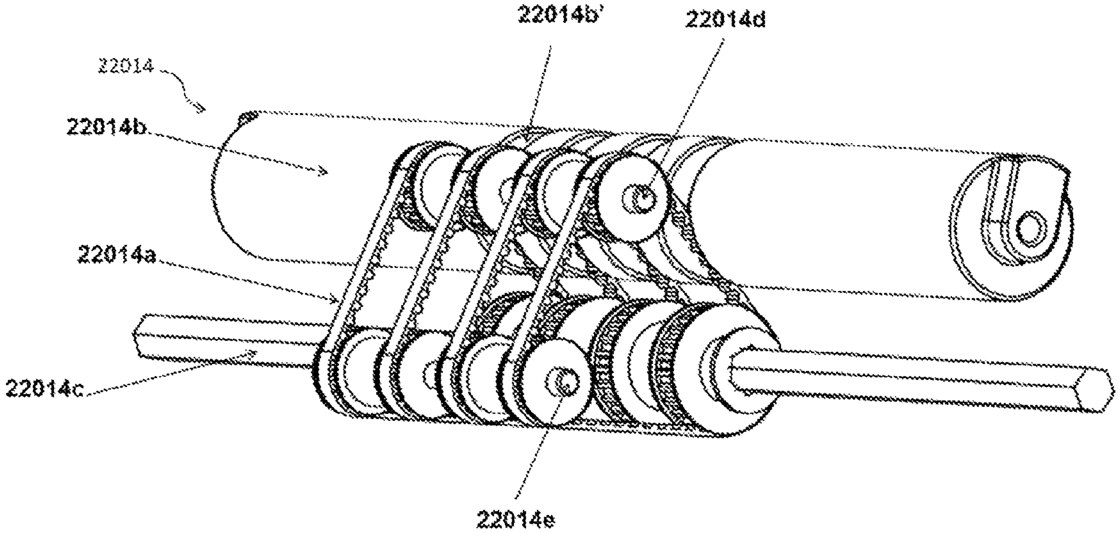
Figure 22C:
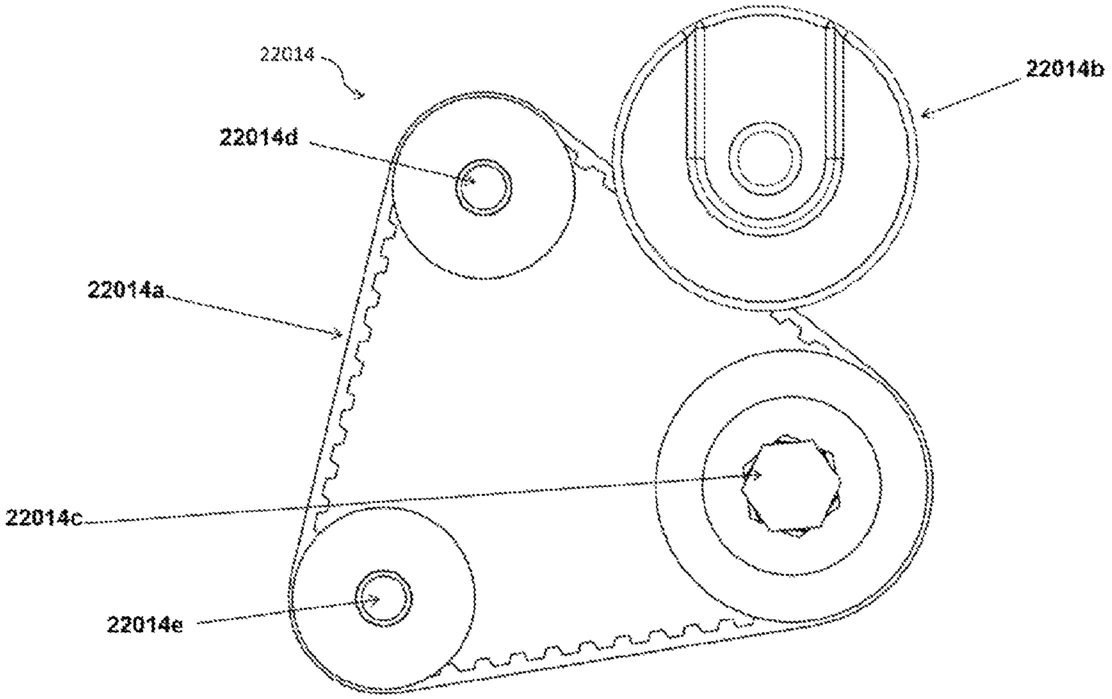
Figure 22D:
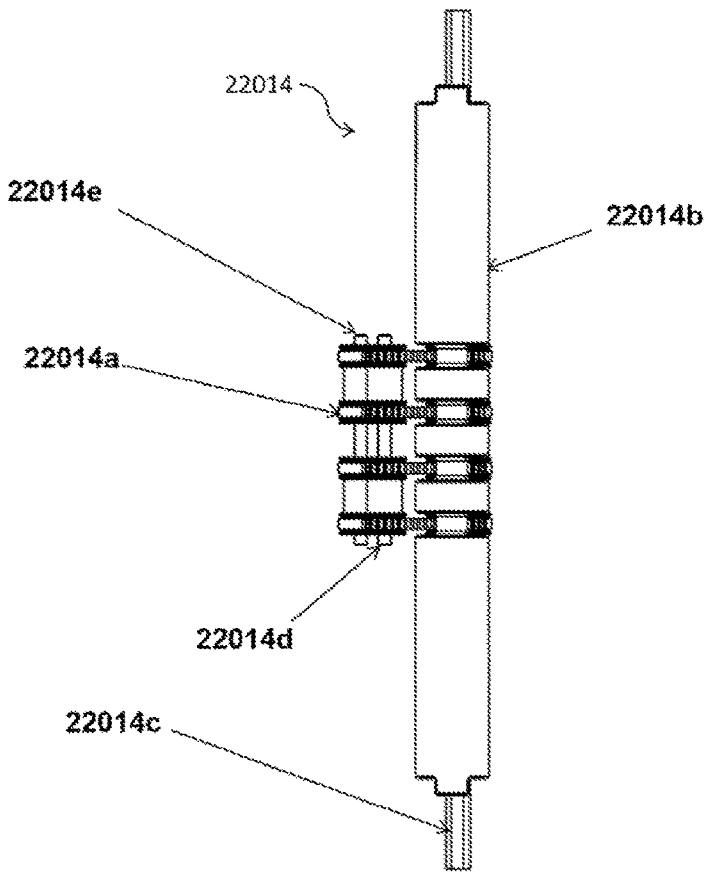
Figure 22E:
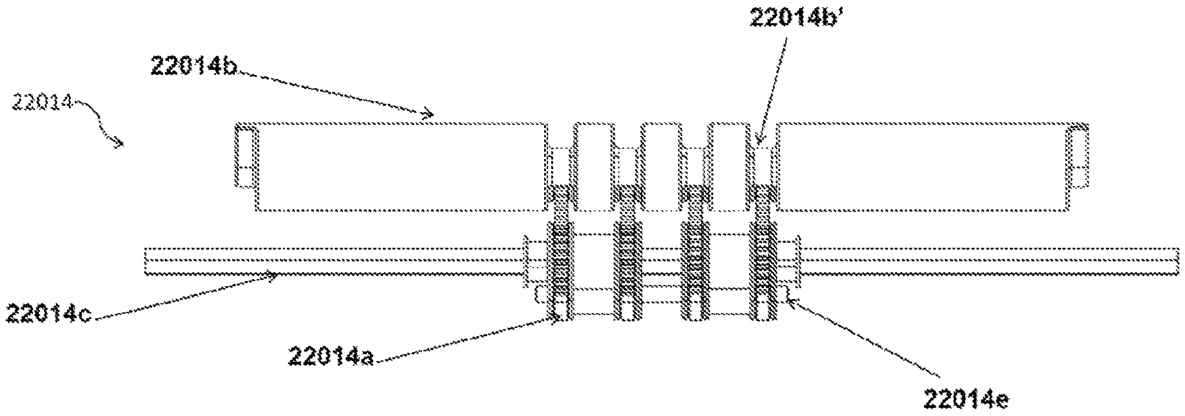

FIGS. 22A-22G illustrate various views of separation mechanism 22014 in accordance with various embodiments of the present disclosure. FIG. 22A illustrates a perspective view of an example of the separation mechanism 22014 in accordance with various embodiments of the present disclosure. FIG. 22B illustrates a perspective view of an example of the separation mechanism 22014 in accordance with various embodiments of the present disclosure. FIG. 22C illustrates a front view of an example of the separation mechanism 22014 in accordance with various embodiments of the present disclosure. FIG. 22D illustrates a top view of an example of the separation mechanism 22014 in accordance with various embodiments of the present disclosure. FIG. 22E illustrates a side view of an example of the separation mechanism 22014 in accordance with various embodiments of the present disclosure. FIG. 22F illustrates a side view of an example of the separation mechanism 22014 in accordance with various embodiments of the present disclosure. FIG. 22G illustrates a side view of an example of the separation mechanism 22014 in accordance with various embodiments of the present disclosure.

FIGS. 22A-22G show the separation mechanism 21014 in more detail as 22014. The separation mechanism 21014 includes rotating belts 22014*a* mounted on pulleys mounted on shafts 22014*c*, 22014*d* and 22014*e* where at least one of the shaft 22014*c* is driven. A retarding rib 22014*b* is mounted at an offset to rotating belts 22014*a*. The retarding rib 22014*b* includes at least a recess 22014*b*' to accommodate rotating belts 22014*a*. Rotating belts 22014*a* are in contact with recesses 22014*b*' in idle position when there is no banknote being pulled. The recess 22014*b*' in the retarding rib 22014*b* control an angle of the rotating belt 22014*a* relative to the lead in angle of the banknotes. Rotating belts 22014*a* pass through the surface of the retarding rib 22014*b* as rotating belts 22014*a* are on the exterior of the curve. As the banknotes are pulled towards the banknote transportation path 303, 703, 803, 903, 1303/1403, the bottom most banknote comes in contact with the rotating belt 22014*a*. Another face of the banknote that is in contact with the rotating belt 22014*a*, contacts the retarding rib 22014*b* and bends because of the offset and passes towards the banknote transportation path 303, 703, 803, 903, 1303/1403. As the banknote is pulled in by the rotating belt 22014*a* and retarded by the retarding rib 22014*b*, the banknote is pinched between the rotating belt 22014*a* and the retarding rib 22014*b*. When the banknote at the bottom moves forward, the overlap between rotating belts 22014*a* and the retarding rib 22014*b* causes the belts 22014*a* to change position away from the recess 22014*b*' shown in FIG. 22F to a pulling position shown in FIG. 22G resulting in a gap between rotating belts 22014*a* and the retarding rib 22014*b* as the thickness of the banknote. If more than one banknote is pulled into the separation mechanism 22014, then the banknote that is in contact with the rotating belt 22014*a* is pulled forward while other banknotes are stopped by the retarding rib 22014*b*. Higher friction between the banknote and the rotating belt 22014*a* compared to friction between two banknotes prevents banknote not in contact with the rotating belt 22014*a* from moving forward. Higher friction between the retarding rib 22014*b* and the banknote not in contact with the rotating belt 22014*a* prevents the banknote in contact with the retarding rib 22014*b* from moving forward.

In other embodiments, the retarding rib 22014*b* can move to adjust tension in rotating belts 22014*a*. In other embodiments, the shaft 22014*e* can move to adjust tension in rotating belts 22014*a*. In other embodiments, the retarding rib 22014*b* and the shaft 22014*e* both can move to adjust tension in rotating belts 22014*a*.

Figure 23A:
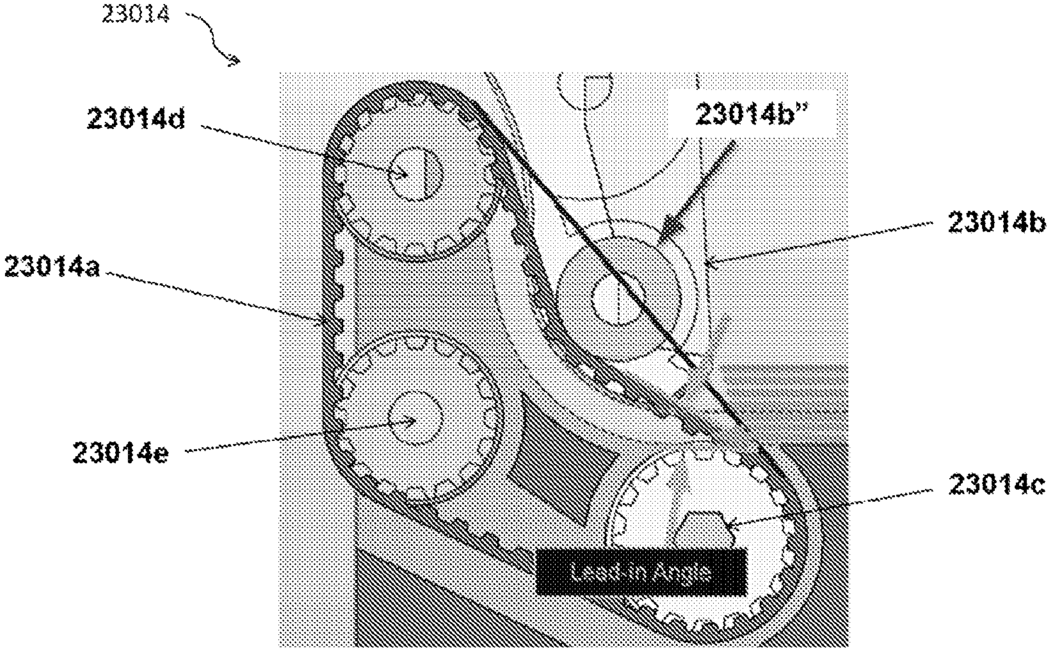
FIG. 23A illustrates a side view of the example banknote separation mechanism in accordance with various embodiments of the present disclosure.
Figure 23B:
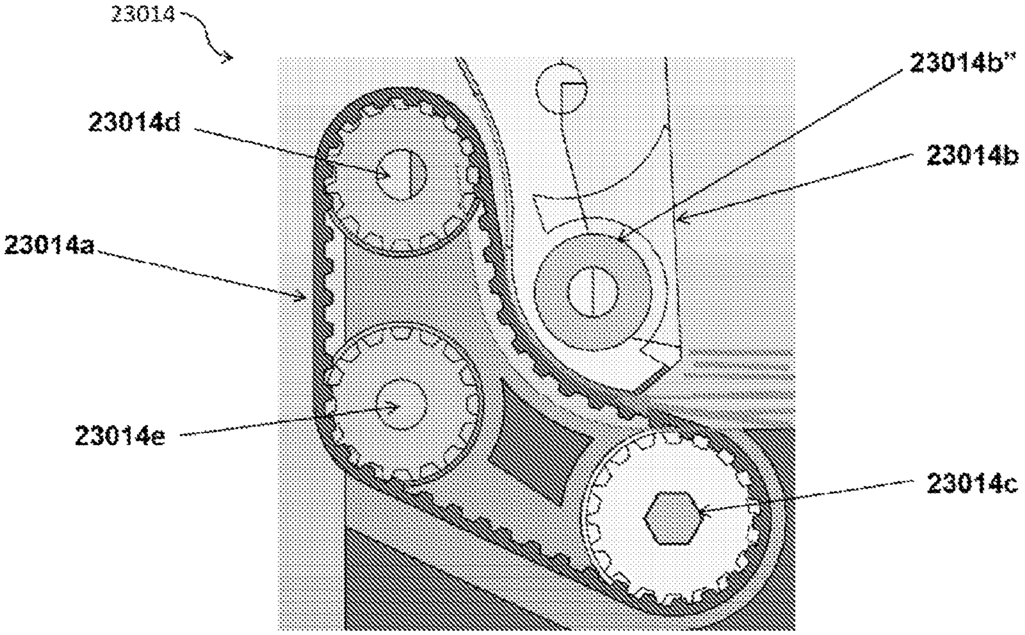
FIG. 23B illustrates another side view of the example banknote separation mechanism in accordance with various embodiments of the present disclosure.

FIGS. 23A and 23B illustrate various views of separation mechanism 23014 in accordance with various embodiments of the present disclosure. FIG. 23A illustrates a side view of an example of the separation mechanism 23014 in accordance with various embodiments of the present disclosure. FIG. 23B illustrates a side view of an example of the separation mechanism 23014 in accordance with various embodiments of the present disclosure.

FIGS. 23A and 23B show the separation mechanism 21014 in more detail as 23014. The separation mechanism 21014 includes rotating belts 23011*a* mounted on pulleys mounted on shafts 23014*c*, 23014*d* and 23014*e* where at least one of the shaft 23014*c* is driven. A retarding rib 23014*b* is mounted at an offset to rotating belts 23014*a*. The retarding rib 23014*b* includes at least a belt idler 23014*b*' to accommodate rotating belts 23014*a*. Rotating belts 23014*a* are in contact with belt idlers 23014*b*' in idle position when there is no banknote being pulled. The belt idler 23014*b*' in the retarding rib 23014*b* control an angle of the rotating belt 23014*a* relative to the lead in angle of the banknotes. Rotating belts 23014*a* pass through the surface of the retarding rib 23014*b* as rotating belts 23014*a* are on the exterior of the curve. As the banknotes are pulled towards the banknote transportation path 303, 703, 803, 903, 1303/1403, the bottom most banknote comes in contact with the rotating belt 23014*a*. Another face of the banknote that is in contact with the rotating belt 23014*a*, contacts the retarding rib 23014*b* and bends because of the offset and passes towards the banknote transportation path 303, 703, 803, 903, 1303/1403. When the banknote at the bottom moves forward, the overlap between rotating belts 23014*a* and the retarding rib 23014*b* causes rotating belts 23014*a* to change position away from the belt idler 23014*b*' shown in FIG. 23A to a pulling position shown in FIG. 23B resulting in a gap between the rotating belt 23014*a* and the retarding rib 23014*b* as the thickness of the banknote. If more than one banknote is pulled into the separation mechanism 23014, then the banknote that is in contact with the rotating belt 23014*a* is pulled forward while other banknotes are stopped by the retarding rib 23014*b*. Higher friction between the banknote and the rotating belt 23014*a* compared to friction between two banknotes prevents banknote not in contact with the rotating belt 23014*a* from moving forward. Higher friction between the retarding rib 23014*b* and the banknote not in contact with the rotating belt 23014*a* prevents the banknote in contact with the retarding rib 23014*b* from moving forward.

In other embodiments, the retarding rib 23014*b* can move to adjust tension in rotating belts 23014*a*. In other embodiments, the shaft 23014*e* can move to adjust tension in rotating belts 23014*a*. In other embodiments, the retarding rib 23014*b* and the shaft 23014*e* both can move to adjust tension in rotating belts 23014*a*.

Figure 24:
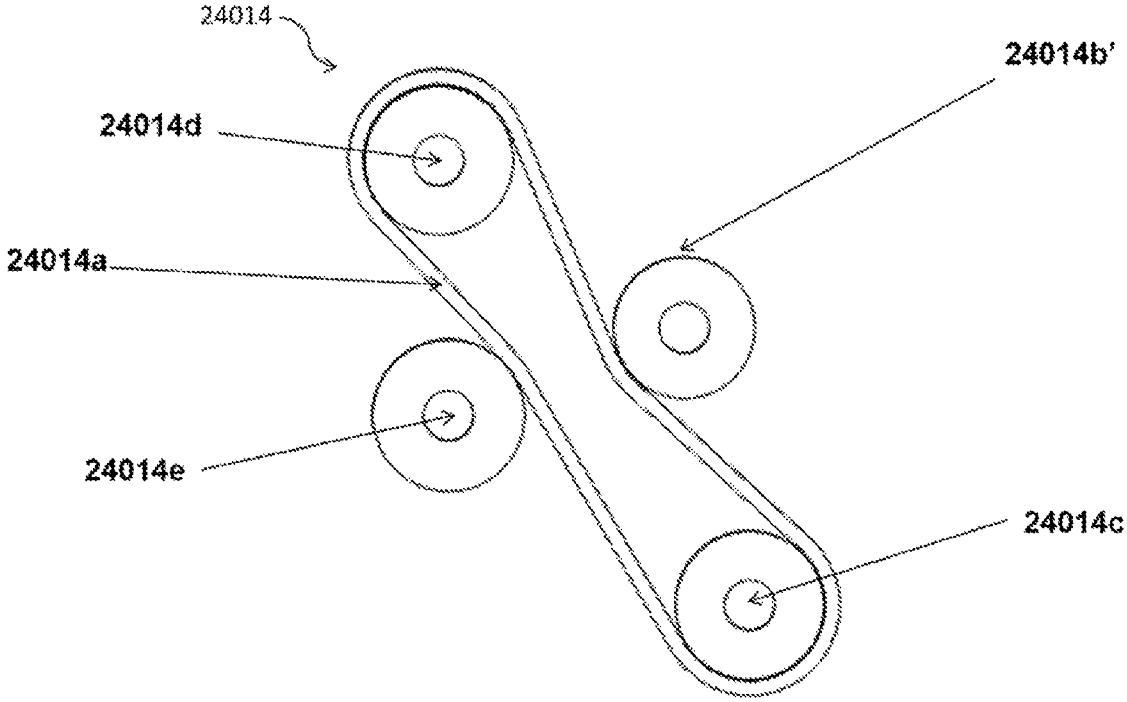
FIG. 24 illustrates a side view of the example banknote separation mechanism in accordance with various embodiments of the present disclosure.

FIG. 24 illustrates a side view of an example of the separation mechanism 24014 in accordance with various embodiments of the present disclosure. FIG. 24 shows the separation mechanism 21014 in more detail as 24014. The separation mechanism 21014 shown in FIG. 24 includes rotating belts 24014*a* mounted on pulleys mounted on shafts 24014*c* and 24014*d* where at least one of the shaft 24014*c* is driven. Rotating belts 24014*a* are guided by pulleys mounted on shaft 24014*e*. A retarding rib 24014*b* (not shown) is mounted at an offset to rotating belts 24014*a*. The retarding rib 24014*b* includes at least a belt idler 24014*b*' to accommodate rotating belts 24014*a*. Rotating belts 24014*a* are in contact with belt idlers 24014*b*' in idle position when there is no banknote being pulled. The belt idler 24014*b*' in the retarding rib 24014*b* control an angle of the rotating belt 24014*a* relative to the lead in angle of the banknotes. Rotating belts 24014*a* pass through the surface of the retarding rib 24014*b* as rotating belts 24014*a* are on the exterior of the curve. As the banknotes are pulled towards the banknote transportation path 303, 703, 803, 903, 1303/1403, the bottom most banknote comes in contact with the rotating belt 24014*a*. Another face of the banknote that is in contact with the rotating belt 24014*a*, contacts the retarding rib 24014*b* and bends because of the offset and passes towards the banknote transportation path 303, 703, 803, 903, 1303/1403. When the banknote at the bottom moves forward, the overlap between rotating belts 24014*a* and the retarding rib 24014*b* causes rotating belts 24014*a* to change position away from the belt idler 24014*b*' resulting in a gap between the rotating belt 24014*a* and the retarding rib 24014*b* as the thickness of the banknote as explained in FIGS. 22F and 22G. If more than one banknote is pulled into the separation mechanism 24014, then the banknote that is in contact with the rotating belt 24014*a* is pulled forward while other banknotes are stopped by the retarding rib 24014*b*. Higher friction between the banknote and the rotating belt 24014*a* compared to friction between two banknotes prevents banknote not in contact with the rotating belt 24014*a* from moving forward. Higher friction between the retarding rib 24014*b* and the banknote not in contact with the rotating belt 24014*a* prevents the banknote in contact with the retarding rib 24014*b* from moving forward.

In other embodiments, the retarding rib 24014*b* can move to adjust tension in rotating belts 24014*a*. In other embodiments, the shaft 24014*e* can move to adjust tension in rotating belts 24014*a*. In other embodiments, the retarding rib 24014*b* and the shaft 24014*e* both can move to adjust tension in rotating belts 24014*a*.

Figure 25:
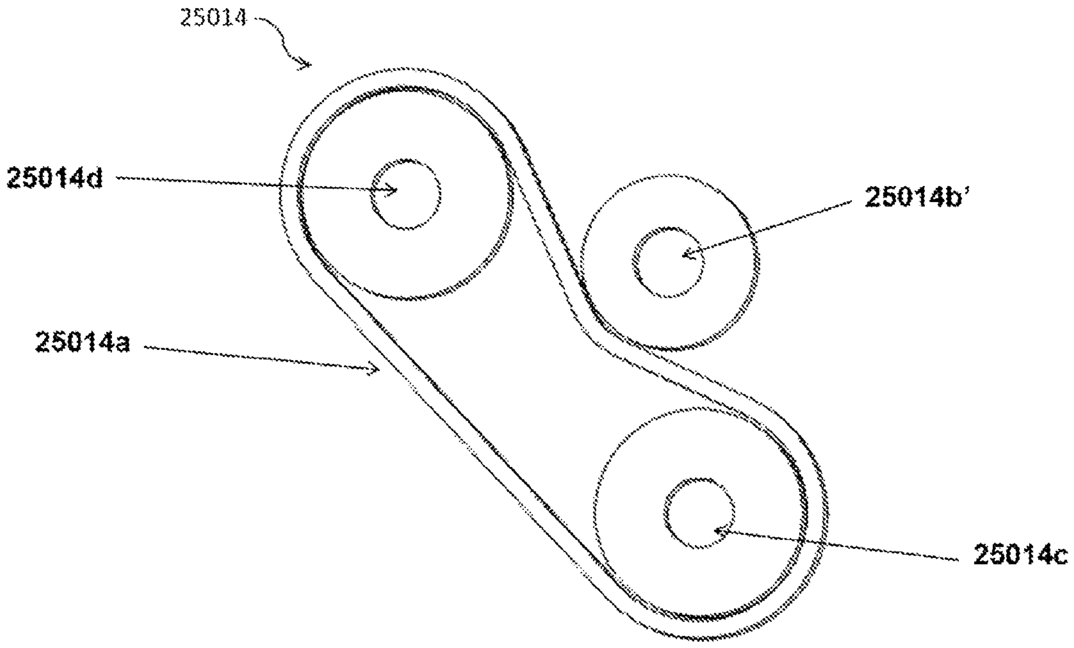
FIG. 25 illustrates another side view of the example banknote separation mechanism in accordance with various embodiments of the present disclosure.

FIG. 25 illustrates a side view of an example of the separation mechanism 25014 in accordance with various embodiments of the present disclosure. FIG. 25 shows the separation mechanism 21014 in more detail as 25014. The separation mechanism 21014 shown in FIG. 25 includes rotating belts 25014*a* mounted on pulleys mounted on shafts 25014*c* and 25014*d* where at least one of the shaft 25014*c* is driven. A retarding rib 25014*b* (not shown) is mounted at an offset to rotating belts 25014*a*. The retarding rib 25014*b* includes at least a belt idler 25014*b*' to accommodate rotating belts 25014*a*. Rotating belts 25014*a* are in contact with belt idlers 25014*b*' in idle position when there is no banknote being pulled. The belt idler 25014*b*' in the retarding rib 25014*b* control an angle of the rotating belt 25014*a* relative to the lead in angle of the banknotes. Rotating belts 25014*a* pass through the surface of the retarding rib 25014*b* as rotating belts 25014*a* are on the exterior of the curve. As the banknotes are pulled towards the banknote transportation path 303, 703, 803, 903, 1303/1403, the bottom most banknote comes in contact with the rotating belt 25014*a*. Another face of the banknote that is in contact with the rotating belt 25014*a*, contacts the retarding rib 25014*b* and bends because of the offset and passes towards the banknote transportation path 303, 703, 803, 903, 1303/1403. When the banknote at the bottom moves forward, the overlap between rotating belts 25014*a* and the retarding rib 25014*b* causes rotating belts 25014*a* to change position away from the belt idler 25014*b*' resulting in a gap between the rotating belt 25014*a* and the retarding rib 25014*b* as the thickness of the banknote as explained in FIGS. 22F and 22G. If more than one banknote is pulled into the separation mechanism 25014, then the banknote that is in contact with the rotating belt 25014*a* is pulled forward while other banknotes are stopped by the retarding rib 25014*b*. Higher friction between the banknote and the rotating belt 25014*a* compared to friction between two banknotes prevents banknote not in contact with the rotating belt 25014*a* from moving forward. Higher friction between the retarding rib 25014*b* and the banknote not in contact with the rotating belt 25014*a* prevents the banknote in contact with the retarding rib 25014*b* from moving forward.

In other embodiments, the retarding rib 25014*b* can move to adjust tension in rotating belts 25014*a*. In other embodiments, the shaft 25014*d* can move to adjust tension in rotating belts 25014*a*. In other embodiments, the retarding rib 25014*b* and the shaft 25014*d* both can move to adjust tension in rotating belts 25014*a*.

In other embodiments, the separation mechanisms 22014, 23014, 24014 and 25014 can be used in embodiments described FIGS. 15A-15H, 17A-20H. Transport rollers 15017*a*, 15017*b*, 15017*c*, and 15017*d*, 17067*a*, 17067*b*, 17067*c*, and 17067*d*, 18057*a*, 18057*b*, 18057*c*, and 18057*d*, and 20067*a*, 20067*b*, 20067*c*, and 20067*d* described in FIGS. 15A-15H and 17A-20H can be replaced by belts 22014*a*, 23014*a*, 24014*a* and 25014 described in FIGS. 22A-25. Retarding ribs 15018, 17068, 18058, 19048, and 20068 described in FIGS. 15A-15H and 17A-20H can be replaced by retarding ribs 22014*b*, 23014*b*, 24014*b*, 25014*b* described in FIGS. 22A-25.

Figure 26A:
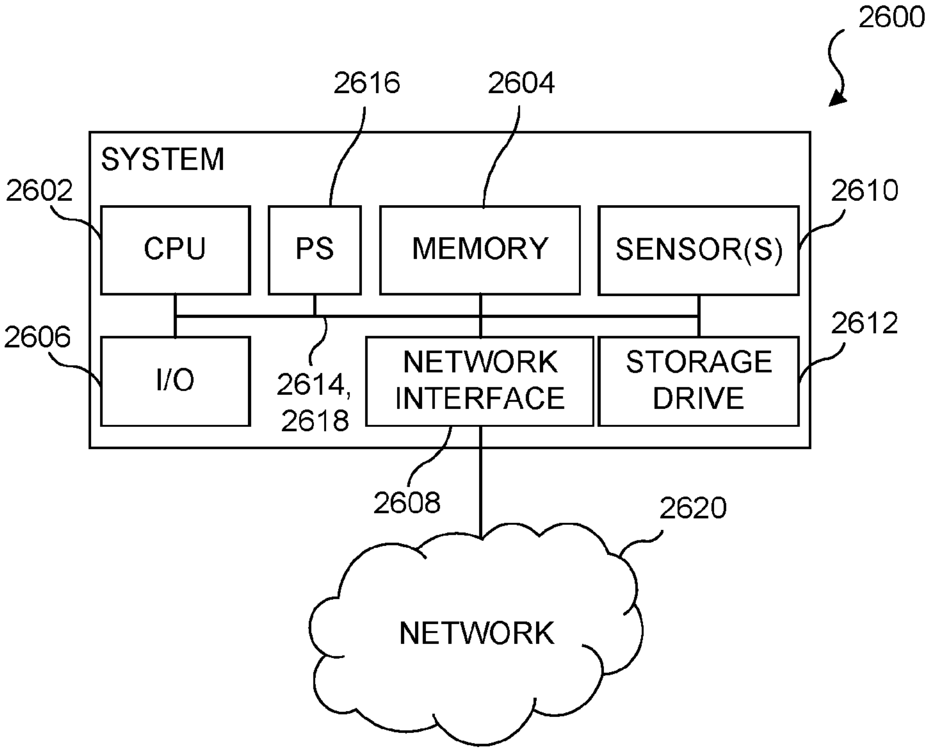
FIGS. 26A and 26B illustrate example electronic systems in accordance with various embodiments of this disclosure.
Figure 26B:
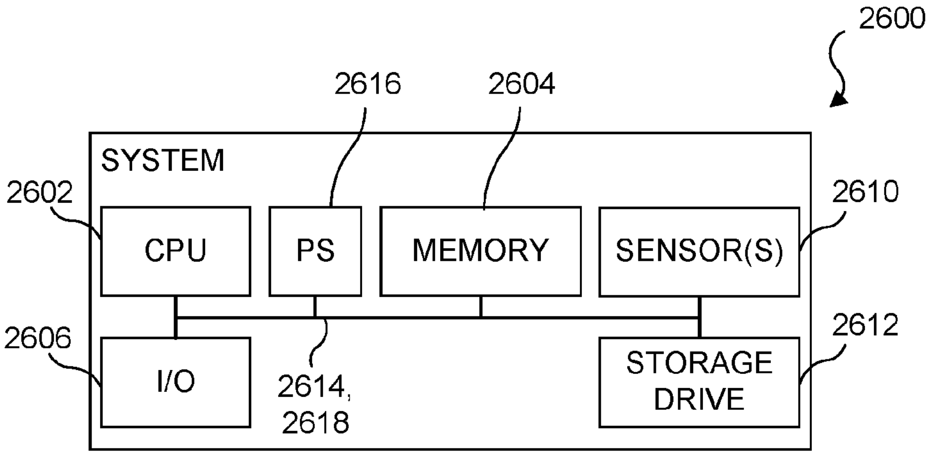

FIGS. 26A and 26B illustrate example electronic systems 2600 in accordance with various embodiments of this disclosure. The systems 2600 include examples of electronic components of a portion of a banknote deposit-withdrawal system, such as components within the banknote accepting module 701, the banknote sensing module 702, the banknote escrow module 704, the banknote storage module 705, the dispensing modules 706, or a combination thereof. The system 2600 includes a controller (e.g., a processor/central processing unit ("CPU")) 2602, a memory unit 2604, and an input/output ("I/O") device 2606. The system 2600 also can include at least one network interface 2608, or network interface controllers (NICs), as shown in FIG. 26A. In some embodiments, the system 2600 does not include a network interface 2608, as shown in FIG. 26B. The system 2600 further includes at least one sensor 2610, such as the sensor or sensing unit 1302/1402, which can be an optical sensor or imaging sensor in some embodiments. The sensor 2610 can also be included in the banknote sensing module 702/802/902. The sensor 2610 can detect and/or authenticate banknotes, as well as detect banknote denomination of banknotes inserted into a banknote deposit-withdrawal system, or during dispensing of banknotes from the banknote deposit-withdrawal system. The system 2600 also includes a storage drive 2612, which can be used for storing content document or banknote characteristics in some embodiments. The components 2602, 2604, 2606, 2608, 2610, and 2612 are interconnected by a data transport system (e.g., a bus) 2614. A power supply unit (PSU) 2616 provides power to components of the system 2600 via a power transport system 2618 (shown with data transport system 2614, although the power and data transport systems may be separate).

The sensor 2610 can be physically or communicatively coupled to the processor 2602 and/or the memory 2604 for controlling transport of banknotes based on the detection of the banknote by the sensor 2610, as described in the various embodiments herein. For example, the processor 2602 can, based on the banknote detection performed by the sensor 2610, transport banknotes to different storage areas, reject banknotes, store banknote data in the memory 2604 and/or the storage drive 2612 when a banknote is received into the banknote deposit-withdrawal system, and remove banknote data from the memory 2604 and/or the storage drive 2612 when a banknote is sensed during dispensing of the banknote. The memory 2604 and/or the storage drive 2612 can also store banknote characteristics of the detected banknote, such as serial numbers, denomination, or other characteristics, so that the banknote deposit-withdrawal system can track the banknote in the banknote deposit-withdrawal system and keep an accurate accounting of the banknotes stored in the banknote deposit-withdrawal system.

It is understood that the system 2600 may be differently configured and that each of the listed components may actually represent several different components. For example, the processor 2602 may actually represent a multiprocessor or a distributed processing system; the memory unit 2604 may include different levels of cache memory, and main memory; the I/O device 2606 may include monitors, keyboards, touchscreens, and the like; the at least one network interface 2608 may include one or more network cards providing one or more wired and/or wireless connections to a network 2620; and the storage drive 2612 may include hard disks and remote storage locations. Therefore, a wide range of flexibility is anticipated in the configuration of the device system, which may range from a single physical platform configured primarily for a single user or autonomous operation to a distributed multi-user platform such as a cloud computing system.

The device system may use any operating system (or multiple operating systems), including various versions of operating systems provided by Microsoft (such as WINDOWS), Apple (such as Mac OS X), UNIX, RTOS, and LINUX, and may include operating systems specifically developed for handheld devices (e.g., iOS, Android, RTOS, Blackberry, and/or Windows Phone), personal computers, servers, and other computing platforms depending on the use of the system 2600. The operating system, as well as other instructions (e.g., for telecommunications and/or other functions provided by the system 2600), may be stored in the memory unit 2604 and executed by the processor 2602.

The network 2620 may be a single network or may represent multiple networks, including networks of different types, whether wireless or wired. For example, the system 2600 may be coupled to external devices via a network that includes a cellular link coupled to a data packet network, or may be coupled via a data packet link such as a wide local area network (WLAN) coupled to a data packet network or a Public Switched Telephone Network (PSTN). Accordingly, many different network types and configurations may be used to couple the system 2600 with external devices.

In one example embodiment, a banknote acceptor for performing deposit of banknotes to assist in a financial transaction comprises an opening to receive banknotes in bulk in a first orientation, the opening comprising a bottom surface and a moveable top surface, the moveable top surface coupled to a bottom of a moving platform, a transportation mechanism to transport banknotes from the opening to a separation area in the first orientation, a sensing unit for validating an authenticity of inserted banknotes in a second orientation, wherein the second orientation is substantially orthogonal to the first orientation, a separator mechanism to separate banknotes from bulk in the separation area and to transport individual banknotes serially to the sensing unit in the second orientation, wherein the transportation mechanism transports rejected banknotes from the sensing unit to a surface coupled to top of the moving platform, wherein the moving platform is disposed above the separation area and moves after collecting the rejected banknotes. The rejected banknotes are presented to a user in bulk in the first orientation.

In one or more of the above examples, the transportation mechanism of the banknote acceptor moves accepted banknotes to a banknote storage module in substantially forward direction. In one or more of the above examples, the transportation mechanism moves inserted banknotes in substantially forward direction between modules. In one or more of the above examples, the transportation mechanism moves rejected banknotes in substantially forward direction. In one or more of the above examples, the transportation mechanism of the banknote acceptor moves banknotes in reverse to clear a jam and/or to straighten a banknote.

In another example embodiment, a banknote acceptor for performing deposit of banknotes to assist in a financial transaction comprises an opening to receive banknotes in bulk in a first orientation, the opening comprising a top surface and a moveable bottom surface, the moveable bottom surface coupled to a top of a moving platform, a transportation mechanism to transport banknotes from the opening to a separation area in the first orientation, a sensing unit for validating an authenticity of inserted banknotes in a second orientation and the second orientation is substantially orthogonal to the first orientation, a separator mechanism to separate banknotes from bulk in the separation area and to transport individual banknotes serially to the sensing unit in the second orientation, wherein the transportation mechanism transports rejected banknotes from the sensing unit to a surface under a bottom of the moving platform, wherein the moving platform is disposed above the separation area. The moving platform moves after collecting the rejected banknotes, and the rejected banknotes are presented to a user in bulk in the first orientation.

In one or more of the above examples, the transportation mechanism of the banknote acceptor moves accepted banknotes to a banknote storage module in a forward direction. In one or more of the above examples, In one or more of the above examples, the transportation mechanism moves inserted banknotes in only forward direction between modules. In one or more of the above examples, the transportation mechanism moves rejected banknotes in only forward direction. In one or more of the above examples, the transportation mechanism of the banknote acceptor moves banknotes in reverse to clear a jam and/or to straighten a banknote.

In another example embodiment, a banknote deposit-withdrawal system for performing deposit or withdrawal of banknotes to assist in a financial transaction comprises an opening to receive or dispense banknotes in bulk in a first orientation, the opening comprising a bottom surface and a moveable top surface, the moveable top surface coupled to a bottom of a moving platform, a transportation mechanism to transport banknotes from the opening to a separation area in the first orientation, a sensing unit for validating an authenticity of inserted banknotes in a second orientation, wherein the second orientation is substantially orthogonal to the first orientation, a separator mechanism to separate banknotes from bulk in the separation area and to transport individual banknotes serially to the sensing unit in the second orientation, wherein the transportation mechanism transports accepted banknotes from the sensing unit to a plurality of banknote storing units, at least one of the plurality of banknote storing units accepts and dispenses banknotes in the second orientation, banknotes dispensed from the at least one of the plurality of banknote storing units is transported through the sensing unit to a surface coupled to top of the moving platform, the moving platform is disposed above the separation area and the platform moves after collecting the dispensed banknotes, and the dispensed banknotes are presented to a user in bulk in the first orientation.

In one or more of the above examples, the transportation mechanism of the banknote acceptor moves accepted banknotes to a banknote storage module in a substantially forward direction. In one or more of the above examples, the transportation mechanism of the banknote acceptor moves inserted banknotes in a substantially forward direction between modules. In one or more of the above examples, the transportation mechanism of the banknote acceptor moves rejected banknotes in a substantially forward direction. In one or more of the above examples, the transportation mechanism of the banknote acceptor moves banknotes in reverse to clear a jam and/or to straighten a banknote.

In another example, embodiment, a banknote deposit-withdrawal system for performing deposit or withdrawal of banknotes to assist in a financial transaction comprises an opening to receive or dispense banknotes in bulk in a first orientation, the opening comprising a top surface and a moveable bottom surface, the moveable bottom surface coupled to top of a moving platform, a transportation mechanism to transport banknotes from the opening to a separation area in the first orientation, a sensing unit or sensor for validating an authenticity of inserted banknotes in a second orientation, wherein the second orientation is substantially orthogonal to the first orientation, a separator mechanism to separate banknotes from bulk in the separation area and to transport individual banknotes serially to the sensing unit in the second orientation, the transportation mechanism transports accepted banknotes from the sensing unit to a plurality of banknote storing units, wherein at least one of the plurality of banknote storing units accepts and dispenses banknotes in the second orientation, banknotes dispensed from the at least one of the plurality of banknote storing units is transported through the sensing unit to a surface under bottom of the moving platform, the moving platform is disposed under the separation area and the platform moves after collecting the dispensed banknotes, and the dispensed banknotes are presented to a user in bulk in the first orientation.

In one or more of the above examples, the transportation mechanism of the banknote acceptor moves accepted banknotes to a banknote storage module in a substantially forward direction. In one or more of the above examples, the transportation mechanism of the banknote acceptor moves inserted banknotes in a substantially forward direction between modules. In one or more of the above examples, the transportation mechanism of the banknote acceptor moves rejected banknotes in a substantially forward direction. In one or more of the above examples, the transportation mechanism of the banknote acceptor moves banknotes in reverse to clear a jam and/or to straighten a banknote.

In another example embodiment, a method of operating a banknote deposit-withdrawal system, the method includes accepting at least a banknote in a short edge leading edge orientation into a banknote accepting module. The method further includes transporting the said banknote further inside the banknote accepting module in the short edge leading edge orientation. The method also includes transporting the banknote towards a sensing unit in a long edge leading edge orientation in clockwise direction using a transportation unit. If the banknote is deemed not acceptable by the sensing unit then the said transportation unit transports the unacceptable banknote is sent to the banknote accepting module in clockwise direction to dispense the unacceptable banknote. If the banknote is deemed genuine by the sensing unit then the said transportation unit transports the genuine banknote towards a banknote storing unit from the sensing unit in clockwise direction. If a banknote stored in the storing unit is to be dispensed then the banknote is transported from the said storing unit to sensing module in the long edge leading edge orientation in clockwise direction to the banknote sensing module and is further transported to the banknote accepting module in clockwise direction to dispense the unacceptable banknote. The method further includes the transportation unit transporting banknotes in the long edge leading edge is further configured to transport the banknote only in clockwise direction. The transportation mechanism of the banknote acceptor moves banknotes in counter-clockwise to clear a jam and/or to straighten a banknote.

In another example embodiment, a method of operating a banknote deposit-withdrawal system comprises accepting at least a banknote in a short edge leading edge orientation into a banknote accepting module. The method further includes, transporting the said banknote further inside the banknote accepting module in the short edge leading edge orientation. The method also includes transporting the banknote towards a sensing unit in a long edge leading edge orientation in counter-clockwise direction using a transportation unit. If the banknote is deemed not acceptable by the sensing unit then the said transportation unit transports the unacceptable banknote is sent to the banknote accepting module in counter-clockwise direction to dispense the unacceptable banknote. If the banknote is deemed genuine by the sensing unit then the said transportation unit transports the genuine banknote towards a banknote storing unit from the sensing unit in counter-clockwise direction. If a banknote stored in the storing unit is to be dispensed then the banknote is transported from the said storing unit to sensing module in the long edge leading edge orientation in counter-clockwise direction to the banknote sensing module and is further transported to the banknote accepting module in counter-clockwise direction to dispense the unacceptable banknote. The method further includes the transportation unit transporting banknotes in the long edge leading edge is further configured to transport the banknote only in counter-clockwise direction. The transportation mechanism of the banknote acceptor moves banknotes in clockwise to clear a jam and/or to straighten a banknote.

In another example embodiment, a method of operating a banknote deposit-withdrawal system comprises accepting banknotes in a stack in a first orientation into a banknote accepting module. The method comprises transporting the banknotes in a stack further inside the said banknote accepting module in the first orientation. The method comprises separating banknotes from the banknotes in a stack. The method comprises transporting the separated banknotes towards a sensing unit serially in a second orientation in clockwise direction using a transportation unit. If the banknote is deemed not acceptable by the sensing unit then the said transportation unit transports the unacceptable banknote is sent to the banknote accepting module in clockwise direction to dispense the unacceptable banknote. If the banknote is deemed genuine by the sensing unit then the said transportation unit transports the genuine banknote towards a banknote storing unit from the sensing unit in clockwise direction. If a banknote stored in the storing unit is to be dispensed then the banknote is transported from the said storing unit to sensing module in the second orientation in clockwise direction to the banknote sensing module and is further transported to the banknote accepting module in clockwise direction to dispense the unacceptable banknote. The method comprises transporting banknotes in the second orientation is further configured to transport the banknote substantially in clockwise direction. The transportation mechanism of the banknote acceptor moves banknotes in counter-clockwise to clear a jam and/or to straighten a banknote.

In another example embodiment, a method of operating a banknote deposit-withdrawal system comprises accepting banknotes in a stack in a first orientation into a banknote accepting module. The method comprises transporting the banknotes in a stack further inside the said banknote accepting module in the first orientation. The method comprises separating banknotes from the banknotes in a stack. The method comprises transporting the separated banknotes towards a sensing unit serially in a second orientation in counter-clockwise direction using a transportation unit. If the banknote is deemed not acceptable by the sensing unit then the said transportation unit transports the unacceptable banknote is sent to the banknote accepting module in counter-clockwise direction to dispense the unacceptable banknote. If the banknote is deemed genuine by the sensing unit then the said transportation unit transports the genuine banknote towards a banknote storing unit from the sensing unit in counter-clockwise direction. If a banknote stored in the storing unit is to be dispensed then the banknote is transported from the said storing unit to sensing module in the second orientation in counter-clockwise direction to the banknote sensing module and is further transported to the banknote accepting module in counter-clockwise direction to dispense the unacceptable banknote. The method comprises transporting banknotes in the second orientation is further configured to transport the banknote substantially in counter-clockwise direction. The transportation mechanism of the banknote acceptor moves banknotes in clockwise to clear a jam and/or to straighten a banknote.

In another example embodiment, a banknote acceptor for performing deposit of banknotes to assist in the financial transaction comprises an opening for the user to insert banknotes in first orientation. The opening comprises a moveable shutter. The opening is operable in three distinct operating modes.

i) the opening formed to allow one banknote at a time to enter the opening;

ii) the opening formed to dispense banknote to user; and iii) the opening formed to allow insertion of banknotes in bulk.

In one or more of the above examples, the moveable shutter comprises an indicia to indicate operating mode. In one or more of the above examples, the moveable shutter comprises a transparent plate allowing user a view of the moveable platform. In one or more of the above examples, the moveable shutter comprises a mesh allowing user a view of the moveable platform. In one or more of the above examples, the moveable shutter comprises a window allowing user a view of the moveable platform. In one or more of the above examples, the moveable shutter can display text and video messages. In one or more of the above examples, the moveable shutter comprises multiple moving plates such that the opening can be formed by moving more than one plates.

In another example embodiment, a method of operating an opening of a banknote acceptor comprises opening the opening to accept a single banknote. The method comprises opening the said opening to dispense banknote to user. The method comprises opening the said opening to accept banknotes in bulk from a user. The method comprises moving a shutter to control dimensions of the said opening. The method comprises showing an indicia to indicate operating mode on the shutter. The method comprises allowing user a view of a moveable platform through the shutter that is transparent. The method comprises allowing user a view of a moveable platform through the shutter that comprises mesh. The method comprises allowing user a view of a moveable platform through the shutter that comprises window. The method comprises showing display text and video messages on the shutter.

In another example embodiment, a banknote deposit-withdrawal system for performing deposit or withdrawal of banknotes to assist in a financial transaction comprises an opening for the user to insert banknotes in first orientation. The opening comprises a moveable shutter. The opening may be operable in three distinct operating modes.

i) the opening formed to allow one banknote at a time to enter the opening;
ii) the opening formed to dispense banknote to user; and
iii) the opening formed to allow insertion of banknotes in bulk.

In one or more of the above examples, the moveable shutter comprises an indicia to indicate operating mode. In one or more of the above examples, the moveable shutter comprises a transparent plate allowing user a view of the moveable platform. In one or more of the above examples, the moveable shutter comprises a mesh allowing user a view of the moveable platform. In one or more of the above examples, the moveable shutter comprises a window allowing user a view of the moveable platform. In one or more of the above examples, the moveable shutter can display text and video messages. In one or more of the above examples, the moveable shutter comprises multiple moving plates such that the opening can be formed by moving more than one plates.

In another examples embodiment, a banknote acceptor for performing deposit of banknotes to assist in the financial transaction includes an opening for the user to insert banknotes in first orientation. The opening includes a moveable shutter and a moveable platform and at least a roller. The moveable shutter includes at least a roller coupled to move along with the moveable shutter. The moveable platform also includes a transportation mechanism to transport banknote in a short edge leading edge orientation into the banknote accepting module. The opening may be operable in three distinct operating modes:

i) The opening formed between the moveable shutter and at least a roller to allow one banknote at a time to enter the opening;
ii) The opening formed between the moveable shutter and the moveable platform to dispense banknote to user; and
iii) The opening formed between the moveable platform and at least a roller to allow insertion of banknotes in bulk.

In one or more of the above examples, the moveable shutter comprises an indicia to indicate operating mode. In one or more of the above examples, the moveable shutter comprises a transparent plate allowing user a view of the moveable platform. In one or more of the above examples, the moveable shutter comprises a mesh allowing user a view of the moveable platform. In one or more of the above examples, the moveable shutter comprises a window allowing user a view of the moveable platform. In one or more of the above examples, the moveable shutter can display text and video messages. In one or more of the above examples, the moveable shutter comprises multiple moving plates such that the opening can be formed by moving more than one plates.

In another example embodiment, a banknote deposit-withdrawal system for performing deposit of banknotes to assist in a financial transaction includes an opening for the user to insert banknotes in first orientation. The opening includes a moveable shutter and a moveable platform and at least a roller. The moveable shutter includes at least a roller coupled to move along with the moveable shutter. The moveable platform also includes a transportation mechanism to transport banknote in a short edge leading edge orientation into the banknote accepting module. The opening may be operable in three distinct operating modes:

i) The opening formed between the moveable shutter and at least a roller to allow one banknote at a time to enter the opening;
ii) The opening formed between the moveable shutter and the moveable platform to dispense banknote to user; and
iii) The opening formed between the moveable platform and at least a roller to allow insertion of banknotes in bulk.

In one or more of the above examples, the moveable shutter comprises an indicia to indicate operating mode. In one or more of the above examples, the moveable shutter comprises a transparent plate allowing user a view of the moveable platform. In one or more of the above examples, the moveable shutter comprises a mesh allowing user a view of the moveable platform. In one or more of the above examples, the moveable shutter comprises a window allowing user a view of the moveable platform. In one or more of the above examples, the moveable shutter can display text and video messages. In one or more of the above examples, the moveable shutter comprises multiple moving plates such that the opening can be formed by moving more than one plates.

In another example embodiment, a banknote acceptor for performing deposit of banknotes to assist in a financial transaction includes an opening for the user to insert banknotes in first orientation. The opening includes a moveable shutter and a moveable platform and at least a roller. The moveable platform includes at least a roller coupled to move along with the moveable platform. The moveable platform also includes a transportation mechanism to transport banknote in a short edge leading edge orientation into the banknote accepting module. The opening may be operable in three distinct operating modes:

i) The opening formed between the moveable shutter and at least a roller to allow one banknote at a time to enter the opening;
ii) The opening formed between the moveable shutter and the moveable platform to dispense banknote to user; and
iii) The opening formed between the moveable platform and at least a roller to allow insertion of banknotes in bulk.

In one or more of the above examples, the moveable shutter comprises an indicia to indicate operating mode. In one or more of the above examples, the moveable shutter comprises a transparent plate allowing user a view of the moveable platform. In one or more of the above examples, the moveable shutter comprises a mesh allowing user a view of the moveable platform. In one or more of the above examples, the moveable shutter comprises a window allowing user a view of the moveable platform. In one or more of the above examples, the moveable shutter can display text and video messages. In one or more of the above examples, the moveable shutter comprises multiple moving plates such that the opening can be formed by moving more than one plates.

In another example embodiment, a banknote deposit-withdrawal system for performing deposit of banknotes to assist in the financial transaction includes an opening for the user to insert banknotes in first orientation. The opening includes a moveable shutter and a moveable platform and at least a roller. The moveable platform includes at least a roller coupled to move along with the moveable platform. The moveable platform also includes a transportation mechanism to transport banknote in a short edge leading edge orientation into the banknote accepting module. The opening may be operable in three distinct operating modes:

i) The opening formed between the moveable shutter and at least a roller to allow one banknote at a time to enter the opening;

ii) The opening formed between the moveable shutter and the moveable platform to dispense banknote to user; and iii) The opening formed between the moveable platform and at least a roller to allow insertion of banknotes in bulk.

In one or more of the above examples, the moveable shutter comprises an indicia to indicate operating mode. In one or more of the above examples, the moveable shutter comprises a transparent plate allowing user a view of the moveable platform. In one or more of the above examples, the moveable shutter comprises a mesh allowing user a view of the moveable platform. In one or more of the above examples, the moveable shutter comprises a window allowing user a view of the moveable platform. In one or more of the above examples, the moveable shutter can display text and video messages. In one or more of the above examples, the moveable shutter comprises multiple moving plates such that the opening can be formed by moving more than one plates.

In another example embodiment, a method of operating an opening of a banknote deposit-withdrawal system comprises opening the opening to accept a single banknote. The method comprises opening the said opening to dispense banknote to user. The method comprises opening the said opening to accept banknotes in bulk from a user. The method comprises moving a shutter to control dimensions of the said opening. The method comprises showing an indicia to indicate operating mode on the shutter. The method comprises allowing user a view of a moveable platform through the shutter that is transparent. The method comprises allowing user a view of a moveable platform through the shutter that comprises mesh. The method comprises allowing user a view of a moveable platform through the shutter that comprises window. The method comprises showing display text and video messages on the shutter. The method includes moving plates of the shutter in a manner that the opening can be formed by moving more than one plates.

In another example embodiment, a banknote accepting module in a banknote acceptor for performing deposit of banknotes to assist in the financial transaction includes a moveable shutter to operate the banknote acceptor in a single banknote accept mode, a bulk banknotes accepting mode, a banknote reject mode and banknote dispensing mode. The moveable shutter comprises an indicia to indicate operating mode. The moveable shutter comprises a transparent plate allowing user a view of the moveable platform. The moveable shutter comprises a mesh allowing user a view of the moveable platform. The moveable shutter comprises multiple moving plates such that the opening can be formed by moving more than one plates. The moveable shutter can display text and video messages. The moveable shutter comprises a window allowing user a view of the moveable platform.

In another example embodiment, a method of operating an opening of a banknote acceptor, the method includes opening the opening to accept a single banknote. The method includes opening the said opening to dispense banknote to user. The method includes opening the said opening to accept banknotes in bulk from a user. The method of operating the opening also includes moving a shutter control dimensions of the said opening. The method comprises showing an indicia to indicate operating mode on the shutter. The method comprises allowing user a view of a moveable platform through the shutter that is transparent. The method comprises allowing user a view of a moveable platform through the shutter that comprises mesh. The method comprises allowing user a view of a moveable platform through the shutter that comprises window. The method comprises showing display text and video messages on the shutter.

In another example embodiment, a banknote accepting module in a banknote deposit-withdrawal system for performing deposit of banknotes to assist in the financial transaction includes a moveable shutter to operate the banknote acceptor in a single banknote accept mode, a bulk banknotes accepting mode, a banknote reject mode and banknote dispensing mode. The moveable shutter comprises an indicia to indicate operating mode. The moveable shutter comprises a transparent plate allowing user a view of the moveable platform. The moveable shutter comprises a mesh allowing user a view of the moveable platform. The moveable shutter comprises a window allowing user a view of the moveable platform. The moveable shutter can display text and video messages.

In another example embodiment, a method of operating an opening of a banknote deposit-withdrawal system, the method includes opening the opening to accept a single banknote. The method includes opening the said opening to dispense banknote to user. The method includes opening the said opening to accept banknotes in bulk from a user. The method of operating the opening also includes moving a shutter control dimensions of the said opening. The method comprises showing an indicia to indicate operating mode on the shutter. The method comprises allowing user a view of a moveable platform through the shutter that is transparent. The method comprises allowing user a view of a moveable platform through the shutter that comprises mesh. The method comprises allowing user a view of a moveable platform through the shutter that comprises window. The method comprises showing display text and video messages on the shutter.

In another example embodiment, a moveable platform in a banknote accepting module in a banknote acceptor for performing deposit of banknotes to assist in the financial transaction includes a platform having upper and lower surfaces. The platform includes a first transportation mechanism configured to move inserted banknotes in a short edge leading edge orientation. The first transportation mechanism is configured to move one or more banknotes further into the banknote accepting module in a short edge leading edge orientation during a single banknote accept mode and a bulk banknotes accepting mode. The first transportation mechanism is configured to dispense one or more banknotes out of the banknote accepting module in a short edge leading edge orientation during a banknote reject mode and a banknote dispense mode. A second transportation mechanism moves the platform in a single axis to various positions on the single axis to operate the banknote acceptor in a single banknote accept mode, a bulk banknotes accepting mode, a banknote reject mode and a banknote dispense mode. The single axis is substantially orthogonal to direction of travel of banknotes travelling in the short edge leading edge. The first transportation mechanism moves inserted banknotes in a first orientation comprises belts to transport banknotes in a short edge leading edge orientation. The moveable platform uses the same belts to transport banknotes in a first orientation on both the top and the bottom of the moveable platform. The first transportation mechanism moves inserted banknotes in a first orientation comprises rollers to transport banknotes in a short edge leading edge orientation. The moveable platform uses the same rollers to transport banknotes in a first orientation on both the top and the bottom of the moveable platform.

In another example embodiment, a moveable platform in a banknote accepting module in a banknote deposit-withdrawal system for performing deposit of banknotes to assist in the financial transaction includes a platform having upper and lower surfaces. The platform includes a first transportation mechanism configured to move inserted banknotes in a short edge leading edge orientation. The first transportation mechanism is configured to move one or more banknotes further into the banknote accepting module in a short edge leading edge orientation during a single banknote accept mode and a bulk banknotes accepting mode. The first transportation mechanism is configured to dispense one or more banknotes out of the banknote accepting module in a short edge leading edge orientation during a banknote reject mode and a banknote dispense mode. A second transportation mechanism moves the platform in a single axis to various positions on the single axis to operate the banknote acceptor in a single banknote accept mode, a bulk banknotes accepting mode, a banknote reject mode and a banknote dispense mode. The single axis is substantially orthogonal to direction of travel of banknotes travelling in the short edge leading edge. The first transportation mechanism moves inserted banknotes in a first orientation comprises belts to transport banknotes in a short edge leading edge orientation. The moveable platform uses the same belts to transport banknotes in a first orientation on both the top and the bottom of the moveable platform. The first transportation mechanism moves inserted banknotes in a first orientation comprises rollers to transport banknotes in a short edge leading edge orientation. The moveable platform uses the same rollers to transport banknotes in a first orientation on both the top and the bottom of the moveable platform.

In another example embodiment, a banknote deposit-withdrawal system including an externally accessible banknote transportation path comprises a spine module operable to support and couple with one or more other modules, one or more banknote storing modules operable to store banknotes received from one or more other modules in the banknote deposit-withdrawal system, each of the one or more banknote modules includes at least one openable panel that provides access to a banknote transportation path, at least one indicator is configured to signal an operation status of the banknote storing module, the indicator is configured to signal an operation status of the banknote module using visual indicia, and the visual indicia can comprise an optical light guide.

In another example embodiment, a banknote deposit-withdrawal system includes an attachable banknote dispensing module that can be attached to a banknote accepting module. The attachable banknote dispensing module can dispense banknotes in bulk or serially to the banknote accepting head. Banknotes dispensed by the attachable banknote dispensing module are used to fill one or more of the recycling modules in the banknote deposit-withdrawal system.

In another example embodiment, a banknote deposit-withdrawal system includes an attachable banknote dispensing module can be attached to a banknote accepting and dispensing bezel of the banknote accepting module. The attachable banknote dispensing module can dispense banknotes in bulk or serially to the banknote accepting head. Banknotes dispensed by the attachable banknote dispensing module are used to fill one or more of the recycling modules in the banknote deposit-withdrawal system.

In another example embodiment, a banknote accepting module inside a banknote deposit-withdrawal system for performing deposit or withdrawal of banknotes to assist in a financial transaction comprises at least one transportation roller to transport inserted banknotes in a first direction, a separator mechanism to separate banknotes from bulk in a separation area and to transport individual banknotes serially to a sensing unit in a second direction, wherein the second direction is substantially orthogonal to the first direction, a platform includes cavities to allow rollers to emerge from a bottom surface of the platform to move banknotes in the first direction, the platform also including cavities to allow rollers to emerge from the bottom surface of the platform to move banknotes in the second direction, the platform configured to move in a third direction that is substantially orthogonal to both the first direction and the second direction, a raised portion on the bottom surface of the platform, wherein the raised portion is in the first direction, the raised portion of the bottom surface permits banknotes to be pressed between the rollers to move banknotes in the first direction, and a guide plate to guide banknotes to be dispensed to a top surface of the platform.

In another example embodiment, a banknote accepting module inside a banknote deposit-withdrawal system for performing deposit or withdrawal of banknotes to assist in a financial transaction comprises at least one transportation roller to transport inserted banknotes in a first direction, a separator mechanism to separate banknotes from bulk in a separation area and to transport individual banknotes serially to a sensing unit in a second direction, wherein the second direction is substantially orthogonal to the first direction, a platform includes cavities to allow rollers to emerge from a top surface of the platform to move banknotes in the first direction, the platform also includes cavities to allow rollers to emerge from the top surface of the platform to move banknotes in the second direction, the platform is configured to move in a third direction that is substantially orthogonal to both the first direction and the second direction, a raised portion on the top surface of the platform, wherein the raised portion is in the first direction, the raised portion of the top surface permitting banknotes to be pressed between the rollers to move banknotes in the first direction, and a guide plate to guide banknotes to be dispensed under a bottom surface of the platform.

In another example embodiment, a banknote accepting module inside a banknote deposit-withdrawal system for performing deposit or withdrawal of banknotes to assist in a financial transaction comprises at least one transportation roller to transport inserted banknotes in a first direction. A separator mechanism separates banknotes from bulk in a separation area and to transport individual banknotes serially to a sensing unit in a second direction, wherein the second direction is substantially orthogonal to the first direction. A platform includes cavities to allow rollers to emerge from a bottom surface of the platform to move banknotes in the first direction. The platform also includes cavities to allow rollers to emerge from the bottom surface of the platform to move banknotes in the second direction. The platform is configured to move in a third direction that is substantially orthogonal to both the first direction and the second direction. The platform includes a raised portion on the bottom surface of the platform, wherein the raised portion is in the first direction. The raised portion of the bottom surface permits banknotes to be pressed between the rollers to move banknotes in the first direction. The platform includes a guide plate to guide banknotes to be rejected to a top surface of the platform.

In another example embodiment, a banknote accepting module inside a banknote deposit-withdrawal system for performing deposit or withdrawal of banknotes to assist in a financial transaction comprises at least one transportation roller to transport inserted banknotes in a first direction, a separator mechanism to separate banknotes from bulk in a separation area and to transport individual banknotes serially to a sensing unit in a second direction, wherein the second direction is substantially orthogonal to the first direction, a platform includes cavities to allow rollers to emerge from a top surface of the platform to move banknotes in the first direction, the platform also includes cavities to allow rollers to emerge from the top surface of the platform to move banknotes in the second direction, the platform is configured to move in a third direction that is substantially orthogonal to both the first direction and the second direction, a raised portion on the top surface of the platform, wherein the raised portion is in the first direction, the raised portion of the top surface permits banknotes to be pressed between the rollers to move banknotes in the first direction, and a guide plate to guide banknotes to be rejected under a bottom surface of the platform.

In another example embodiment, a banknote recycling module inside a banknote deposit-withdrawal system for performing deposit or withdrawal of banknotes to assist in a financial transaction comprises at least one transportation roller to transport inserted banknotes in a first direction, a separator mechanism to separate banknotes from bulk in a separation area and to transport individual banknotes serially to a sensing unit in a second direction, wherein the second direction is substantially orthogonal to the first direction, a platform includes cavities to allow rollers to emerge from a bottom surface of the platform to move banknotes in the first direction, the platform also including cavities to allow rollers to emerge from the bottom surface of the platform to move banknotes in the second direction, the platform configured to move in a third direction that is substantially orthogonal to both the first direction and the second direction, a raised portion on the bottom surface of the platform, wherein the raised portion is in the first direction, the raised portion of the bottom surface permits banknotes to be pressed between the rollers to move banknotes in the first direction, and a guide plate to guide banknotes to be dispensed to a top surface of the platform.

In another example embodiment, a banknote recycling module inside a banknote deposit-withdrawal system for performing deposit or withdrawal of banknotes to assist in a financial transaction comprises at least one transportation roller to transport inserted banknotes in a first direction, a separator mechanism to separate banknotes from bulk in a separation area and to transport individual banknotes serially to a sensing unit in a second direction, wherein the second direction is substantially orthogonal to the first direction, a platform includes cavities to allow rollers to emerge from a top surface of the platform to move banknotes in the first direction, the platform also includes cavities to allow rollers to emerge from the top surface of the platform to move banknotes in the second direction, the platform is configured to move in a third direction that is substantially orthogonal to both the first direction and the second direction, a raised portion on the top surface of the platform, wherein the raised portion is in the first direction, the raised portion of the top surface permitting banknotes to be pressed between the rollers to move banknotes in the first direction, and a guide plate to guide banknotes to be dispensed under a bottom surface of the platform.

In another example embodiment, a banknote recycling module inside a banknote deposit-withdrawal system for performing deposit or withdrawal of banknotes to assist in a financial transaction comprises at least one transportation roller to transport inserted banknotes in a first direction. A separator mechanism separates banknotes from bulk in a separation area and to transport individual banknotes serially to a sensing unit in a second direction, wherein the second direction is substantially orthogonal to the first direction. A platform includes cavities to allow rollers to emerge from a bottom surface of the platform to move banknotes in the first direction. The platform also includes cavities to allow rollers to emerge from the bottom surface of the platform to move banknotes in the second direction. The platform is configured to move in a third direction that is substantially orthogonal to both the first direction and the second direction. The platform includes a raised portion on the bottom surface of the platform, wherein the raised portion is in the first direction. The raised portion of the bottom surface permits banknotes to be pressed between the rollers to move banknotes in the first direction. The platform includes a guide plate to guide banknotes to be rejected to a top surface of the platform.

In another example embodiment, a banknote recycling module inside a banknote deposit-withdrawal system for performing deposit or withdrawal of banknotes to assist in a financial transaction comprises at least one transportation roller to transport inserted banknotes in a first direction, a separator mechanism to separate banknotes from bulk in a separation area and to transport individual banknotes serially to a sensing unit in a second direction, wherein the second direction is substantially orthogonal to the first direction, a platform includes cavities to allow rollers to emerge from a top surface of the platform to move banknotes in the first direction, the platform also includes cavities to allow rollers to emerge from the top surface of the platform to move banknotes in the second direction, the platform is configured to move in a third direction that is substantially orthogonal to both the first direction and the second direction, a raised portion on the top surface of the platform, wherein the raised portion is in the first direction, the raised portion of the top surface permits banknotes to be pressed between the rollers to move banknotes in the first direction, and a guide plate to guide banknotes to be rejected under a bottom surface of the platform.

In another example embodiment, a banknote recycling module inside a banknote deposit-withdrawal system for performing deposit or withdrawal of banknotes to assist in a financial transaction includes at least one roller to collect banknotes in the recycling module. The banknote recycling module includes a separator mechanism to separate banknotes from bulk in a separation area. The banknote recycling module includes a moveable platform, where the moveable platform moves above the roller to collect banknotes in the recycling module. The roller moves banknotes towards the separator mechanism to separate banknotes from bulk in the separation area. The moveable platform includes cavities that allow rollers to emerge from a bottom surface of the moveable platform to move banknotes.

In another example embodiment, a banknote recycling module inside a banknote deposit-withdrawal system for performing deposit or withdrawal of banknotes to assist in a financial transaction includes at least one roller to collect banknotes in the recycling module. The banknote recycling module includes a separator mechanism to separate banknotes from bulk in a separation area. The banknote recycling module includes a moveable platform, where the moveable platform moves below the roller to collect banknotes in the recycling module. The roller move banknotes towards the separator mechanism to separate banknotes from bulk in the separation area. The moveable platform includes cavities that allow rollers to emerge from a top surface of the moveable platform to move banknotes.

In another example embodiment, a moveable platform inside a banknote deposit-withdrawal system for performing deposit or withdrawal of banknotes to assist in a financial transaction comprises a top surface to collect banknotes. The moveable platform comprises a bottom surface with ribs in a first orientation. The moveable platform comprises cavities in the first orientation, where the cavities in the first orientation allow rollers to emerge from the bottom surface to move banknotes in the first orientation. The moveable platform comprises cavities in a second orientation, where the second orientation is substantially orthogonal to the first orientation. The cavities in the second orientation allow rollers to emerge from the bottom surface of the moveable platform to move banknotes in the second orientation.

In another example embodiment, a moveable platform inside a banknote deposit-withdrawal system for performing deposit or withdrawal of banknotes to assist in a financial transaction comprises a bottom surface to collect banknotes. The moveable platform comprises a top surface with ribs in a first orientation. The moveable platform comprises cavities in the first orientation, where the cavities in the first orientation allow rollers to emerge from the top surface to move banknotes in the first orientation. The moveable platform comprises cavities in a second orientation, where the second orientation is substantially orthogonal to the first orientation. The cavities in the second orientation allow rollers to emerge from the top surface of the moveable platform to move banknotes in the second orientation.

In another example embodiment, a moveable platform inside a banknote deposit-withdrawal system for performing deposit or withdrawal of banknotes to assist in a financial transaction includes a top surface with ribs in a first orientation. The moveable platform comprises cavities in the first orientation, where the cavities in the first orientation allow rollers to emerge from the top surface to move banknotes in the first orientation. The moveable platform comprises cavities in a second orientation, wherein the second orientation is substantially orthogonal to the first orientation, and wherein the cavities in the second orientation allow rollers to emerge from the top surface of the moveable platform to move banknotes in the second orientation. Banknotes are collected under the moveable platform.

In another example embodiment, a moveable platform inside a banknote deposit-withdrawal system for performing deposit or withdrawal of banknotes to assist in a financial transaction includes a bottom surface with ribs in a first orientation. The moveable platform comprises cavities in the first orientation, where the cavities in the first orientation allow rollers to emerge from the bottom surface to move banknotes in the first orientation. The moveable platform comprises cavities in a second orientation, wherein the second orientation is substantially orthogonal to the first orientation, and wherein the cavities in the second orientation allow rollers to emerge from the bottom surface of the moveable platform to move banknotes in the second orientation. Banknotes are collected above the moveable platform.

In another example embodiment, a banknote recycling module inside a banknote deposit-withdrawal system for performing deposit or withdrawal of banknotes to assist in a financial transaction comprises at least one roller to collect banknotes in the recycling module. The banknote recycling module comprises a separator mechanism to separate banknotes from bulk in a separation area. The banknote recycling module comprises a moveable platform, where the moveable platform is configured to move above a belt to collect banknotes in the recycling module. The roller moves banknotes towards the separator mechanism to separate banknotes from bulk in the separation area. The moveable platform includes cavities that allow rollers to emerge from a bottom surface of the moveable platform to move banknotes.

In another example embodiment, a banknote recycling module inside a banknote deposit-withdrawal system for performing deposit or withdrawal of banknotes to assist in a financial transaction comprises at least one roller to collect banknotes in the recycling module. The banknote recycling module comprises separator mechanism to separate banknotes from bulk in a separation area. The banknote recycling module comprises a moveable platform, where the moveable platform is configured to move below a belt to collect banknotes in the recycling module. The roller moves banknotes towards the separator mechanism to separate banknotes from bulk in the separation area. The moveable platform includes cavities that allow rollers to emerge from a top surface of the moveable platform to move banknotes.

In another example embodiment, a banknote separation mechanism in a banknote acceptor for performing deposit of banknotes to assist in the financial transaction comprises at least a feeder roller to push a banknote from a bulk of banknotes. The banknote separation mechanism comprises at least a separation belt to pull the banknote pushed by the feeder roller. The separation belt is mounted on a pulley mounted on a driving shaft and a pulley mounted on at least an idle shaft. The banknote separation mechanism comprises at least a retarding rib to retard banknote pushed by feeder roller. A part of the retarding rib configured to avoid physical contact with the said separation belt. The retarding rib comprising at least a recess where the recess is configured to come in contact of the separation belt. The banknote separation mechanism comprises an actuator to drive the separation belt to pull banknote forward and separate banknotes from the bulk. The recess of the retarding rib in the banknote separation mechanism comprises a belt idler. At least one of the pulleys mounted on a shaft to adjust tension in the separation belt. The retarding rib configured to adjust tension in the separation belt.

In another example embodiment, a banknote separation mechanism in a banknote deposit-withdrawal system for performing deposit of banknotes to assist in the financial transaction comprises at least a feeder roller to push a banknote from a bulk of banknotes. The banknote separation mechanism comprises at least a separation belt to pull the banknote pushed by the feeder roller. The separation belt is mounted on a pulley mounted on a driving shaft and a pulley mounted on at least an idle shaft. The banknote separation mechanism comprises at least a retarding rib to retard banknote pushed by feeder roller. A part of the retarding rib configured to avoid physical contact with the said separation belt. The retarding rib comprising at least a recess where the recess is configured to come in contact of the separation belt. The banknote separation mechanism comprises an actuator to drive the separation belt to pull banknote forward and separate banknotes from the bulk. The recess of the retarding rib in the banknote separation mechanism comprises a belt idler. At least one of the pulleys mounted on a shaft to adjust tension in the separation belt. The retarding rib configured to adjust tension in the separation belt.

In another example embodiment, a banknote separation mechanism in a banknote acceptor for performing deposit of banknotes to assist in the financial transaction includes at least a feeder roller to push a banknote from a bulk of banknotes. The separation mechanism includes at least a separation belt to pull the banknote pushed by the feeder roller. The separation mechanism includes at least a retarding rib configured to avoid physical contact with the said separation belt. The retarding rib is configured to retard banknote pushed by feed roller. An actuator to drive the separation belt to pull banknote forward and separate banknotes from the bulk.

In another example embodiment, a banknote separation mechanism in a banknote deposit-withdrawal system for performing deposit of banknotes to assist in the financial transaction includes at least a feeder roller to push a banknote from a bulk of banknotes. The separation mechanism includes at least a separation belt to pull the banknote pushed by the feeder roller. The separation mechanism includes at least a retarding rib configured to avoid physical contact with the said separation belt. The retarding rib is configured to retard banknote pushed by feed roller. An actuator to drive the separation belt to pull banknote forward and separate banknotes from the bulk.

In another example embodiment, a method of separating a banknote from bulk of banknotes in a banknote acceptor includes pushing a banknote from a bulk of banknotes. The method of separating a banknote from bulk of banknotes in a banknote acceptor includes pulling the pushed banknote through a gap formed between a separation belt and a retarding rib configured to avoid physical contact with the separation belt. The method of separating a banknote from bulk of banknotes in a banknote acceptor includes adjusting tension in the separation belt using the retarding rib. The method of separating a banknote from bulk of banknotes in a banknote acceptor includes adjusting tension in the separation belt using a pulley mounted on a shaft.

In another example embodiment, a method of separating a banknote from bulk of banknotes in a banknote deposit-withdrawal system includes pushing a banknote from a bulk of banknotes. The method of separating a banknote from bulk of banknotes in a banknote acceptor includes pulling the pushed banknote through a gap formed between a separation belt and a retarding rib configured to avoid physical contact with the separation belt. The method of separating a banknote from bulk of banknotes in a banknote acceptor includes adjusting tension in the separation belt using the retarding rib. The method of separating a banknote from bulk of banknotes in a banknote acceptor includes adjusting tension in the separation belt using a pulley mounted on a shaft.

In another example embodiment, a banknote feeding mechanism inside a banknote accepting module of a banknote acceptor includes at least a proximal feeding roller and at least a distal feeding roller to feed a banknote from a bulk of banknotes to a banknote separating mechanism. The feed rollers comprising friction pads to push a banknote from a bulk of banknotes. A banknote feeding mechanism inside a banknote accepting module of a banknote acceptor, also includes an actuator to drive at least a proximal feeding roller and a distal feeding roller. The friction pad of the proximal feeding roller and the friction pad of the distal feeding roller are radially offset.

In another example embodiment, a banknote feeding mechanism inside a banknote recycling module of a banknote deposit-withdrawal system includes at least a proximal feeding roller and at least a distal feeding roller to feed a banknote from a bulk of banknotes to a banknote separating mechanism, the feed rollers comprising friction pads to push a banknote from a bulk of banknotes. A banknote feeding mechanism inside a banknote accepting module of a banknote acceptor also includes an actuator to drive at least a proximal feeding roller and a distal feeding roller. The friction pad of the proximal feeding roller and the friction pad of the distal feeding roller are radially offset.

In another example embodiment, a banknote feeding mechanism inside a banknote storing module of a banknote acceptor includes at least a proximal feeding roller and at least a distal feeding roller to feed a banknote from a bulk of banknotes to a banknote separating mechanism, the feed rollers comprising friction pads to push a banknote from a bulk of banknotes. A banknote feeding mechanism inside a banknote storing module of a banknote acceptor, includes an actuator to drive at least a proximal feeding roller and a distal feeding roller. The friction pad of the proximal feeding roller and the friction pad of the distal feeding roller are radially offset.

In another example embodiment, a banknote feeding mechanism inside a banknote storing module of a banknote deposit-withdrawal system includes at least a proximal feeding roller and at least a distal feeding roller to feed a banknote from a bulk of banknotes to a banknote separating mechanism. The feed rollers comprising friction pads to push a banknote from a bulk of banknotes. A banknote feeding mechanism inside a banknote storing module of a banknote acceptor, includes an actuator to drive at least a proximal feeding roller and a distal feeding roller. The friction pad of the proximal feeding roller and the friction pad of the distal feeding roller are radially offset.

In another example embodiment, a method of operating feed rollers to separate a banknote from bulk of banknotes in a banknote acceptor includes arranging a friction pad of a proximal feeding roller at a radial offset from a friction pad of a distal feeding roller. A method of operating feed rollers to separate a banknote from bulk of banknotes in a banknote acceptor, the method also includes rotating feed rollers in such a manner that the friction pad of distal feeding roller pushes a banknote from the bulk of banknotes prior to friction pad of proximal feeding roller pushes the banknote pushed by the friction pad of the distal feeding roller.

In another example embodiment, a method of operating feed rollers to separate a banknote from bulk of banknotes in a banknote deposit-withdrawal system includes arranging a friction pad of a proximal feeding roller at a radial offset from a friction pad of a distal feeding roller. A method of operating feed rollers to separate a banknote from bulk of banknotes in a banknote acceptor, the method also includes rotating feed rollers in such a manner that the friction pad of distal feeding roller pushes a banknote from the bulk of banknotes prior to friction pad of proximal feeding roller pushes the banknote pushed by the friction pad of the distal feeding roller.

In another example, a banknote recycling module inside a banknote deposit-withdrawal system is configured to accept and to dispense banknotes of different dimensions. The banknote recycling module accepts banknotes of different dimensions in a single stack serially, and dispense banknotes of different dimensions from the single stack serially. The banknote recycling module includes a banknote feeding mechanism to separate banknotes from the stack to dispense banknotes serially. The banknote feeding mechanism includes at least a proximal feeding roller and at least a distal feeding roller to feed a banknote from a bulk of banknotes to a banknote separating mechanism. The feed rollers include friction pads to push a banknote from a bulk of banknotes. A banknote feeding mechanism inside a banknote accepting module of a banknote recycling module also includes an actuator to drive at least a proximal feeding roller and a distal feeding roller. The friction pad of the proximal feeding roller and the friction pad of the distal feeding roller are radially offset.

In another example, a banknote accepting module inside a banknote deposit-withdrawal system is configured to accept banknotes of different dimensions in a single stack. The banknote accepting module dispenses banknotes of different dimensions from the single stack serially to other modules of the banknote deposit-withdrawal system. The banknote accepting module includes a banknote feeding mechanism to separate banknotes from the stack to dispense banknotes serially. The banknote feeding mechanism includes at least a proximal feeding roller and at least a distal feeding roller to feed a banknote from a bulk of banknotes to a banknote separating mechanism. The feed rollers include friction pads to push a banknote from a bulk of banknotes. A banknote feeding mechanism inside a banknote accepting module of a banknote accepting module also includes an actuator to drive at least a proximal feeding roller and a distal feeding roller. The friction pad of the proximal feeding roller and the friction pad of the distal feeding roller are radially offset.

In another example embodiment, a banknote deposit-withdrawal system for performing deposit of banknotes to assist in a financial transaction comprises an opening to receive banknotes in bulk in a first orientation, the opening including a bottom surface and a moveable top surface, wherein the moveable top surface is coupled to a bottom of a moveable platform, a transportation path to transport banknotes from the opening to a separation area in the first orientation, a sensor for validating an authenticity of inserted banknotes in a second orientation, wherein the second orientation is substantially orthogonal to the first orientation, and a separator to separate banknotes from bulk in the separation area and to transport individual banknotes serially to the sensor in the second orientation, wherein the transportation path transports rejected banknotes from the sensor to a surface coupled to a top of the moveable platform, wherein the moveable platform is disposed above the separation area, wherein the moveable platform moves after collecting the rejected banknotes, and wherein the rejected banknotes are presented to a user in bulk in the first orientation.

In one or more of the above examples, the transportation path is further configured to move accepted banknotes to a banknote storage module in a substantially forward direction.

In one or more of the above examples, the transportation path is further configured to move inserted banknotes in a substantially forward direction between modules.

In one or more of the above examples, the transportation path is further configured to move rejected banknotes in a substantially forward direction.

In another example embodiment, a banknote deposit-withdrawal system for performing deposit of banknotes to assist in a financial transaction comprises an opening for a user to insert banknotes in first orientation, the opening including a moveable shutter, wherein the opening is operable in three distinct operating modes:

i) a first mode wherein the opening allows one banknote at a time to enter the opening;

ii) a second mode wherein the opening dispenses banknotes to a user; and iii) a third mode wherein the opening allows insertion of banknotes in bulk.

In one or more of the above examples, the moveable shutter further includes an indicia to indicate one of the three distinct operating modes.

In one or more of the above examples, the moveable shutter further includes a transparent plate allowing the user a view of a moveable platform operable to collect banknotes.

In one or more of the above examples, the moveable shutter further includes a mesh allowing the user a view of a moveable platform operable to collect banknotes.

In one or more of the above examples, the moveable shutter further includes a window allowing the user a view of a moveable platform operable to collect banknotes.

In one or more of the above examples, the moveable shutter is further configured to display text and video messages.

In another example embodiment, a banknote separator in a banknote deposit-withdrawal system for performing deposit of banknotes to assist in a financial transaction, comprises at least one feeder roller to push a banknote from a bulk of banknotes, at least one separation belt to pull the banknote pushed by the at least one feeder roller, wherein the at least one separation belt is mounted on a first pulley mounted on a driving shaft and a second pulley mounted on at least an idle shaft, at least one retarding rib to retard the banknote pushed by the at least one feeder roller, wherein a part of the at least one retarding rib is configured to avoid physical contact with the at least one separation belt, wherein at least one the at least one retarding rib includes at least a recess, and wherein the recess is configured to come in contact with the at least one separation belt, and an actuator to drive the at least one separation belt.

In one or more of the above examples, the recess includes a belt idler.

In one or more of the above examples, at least one of the first pulley or the second pulley is operable to adjust tension in the at least one separation belt.

In one or more of the above examples, the at least one retarding rib is configured to adjust tension in the at least one separation belt.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A banknote deposit-withdrawal system for performing deposit of banknotes to assist in a financial transaction, the banknote deposit-withdrawal system comprising:

a transportation path;

an acceptance module with an opening to receive the banknotes in bulk in a short leading edge orientation, wherein the acceptance module includes a surface of the transportation path and a movable platform disposed above the surface of the transportation path, and the banknotes are received into the opening between the surface of the transportation path and a bottom surface of the movable platform positioned in a first position, and wherein the opening includes a movable shutter configured to move to a plurality of different positions each corresponding to one of three distinct operating modes, wherein the three distinct operating modes includes a single banknote insertion mode, a bulk banknote insertion mode, and a banknote rejection mode, and wherein the movable shutter moves to the plurality of different positions each corresponding to the one of the three distinct operating modes to vary a size of the opening based on the one of the three distinct operating modes;

a separation area disposed in the transportation path beyond the acceptance module that receives the banknotes in bulk in the short leading edge orientation;

a separator in the separation area to separate the banknotes from bulk and to provide individual banknotes serially along the transportation path in a long leading edge orientation; and a sensor disposed within a sensing module for validating an authenticity of the banknotes received into the sensing module in the long leading edge orientation, wherein the transportation path transports rejected banknotes in the long leading edge orientation from the sensing module back to a top surface of the movable platform, wherein the movable platform moves to a second position after collecting the rejected banknotes, and wherein the rejected banknotes are presented from the opening to a user in bulk in the short leading edge orientation.

2. The banknote deposit-withdrawal system of claim 1, wherein the transportation path is further configured to move accepted banknotes to a banknote storage module in a substantially forward direction.

3. The banknote deposit-withdrawal system of claim 1, wherein the transportation path is further configured to move inserted banknotes in a substantially forward direction between modules.

4. The banknote deposit-withdrawal system of claim 1, wherein the transportation path is further configured to move rejected banknotes in a substantially forward direction.

5. A banknote deposit-withdrawal system for performing deposit of banknotes to assist in a financial transaction, the banknote deposit-withdrawal system comprising:

a transportation path;

an acceptance module with an opening to receive the banknotes in a short leading edge orientation and operable in three distinct operating modes including a single banknote insertion mode, a bulk banknote insertion mode, and a banknote rejection mode, wherein the acceptance module includes a surface of the transportation path and a movable platform disposed above the surface of the transportation path and the banknotes are received into the opening between the surface of the transportation path and a bottom surface of the movable platform, wherein the opening includes a movable shutter configured to move to a plurality of different positions and to vary a size of the opening for each of the three distinct operating modes, a separation area disposed in the transportation path beyond the acceptance module that receives the banknotes in the short leading edge orientation;

a separator in the separation area to separate the banknotes from bulk and to provide individual banknotes serially along the transportation path in a long leading edge orientation; and a sensor disposed within a sensing module for validating an authenticity of the banknotes received into the sensing module in the long leading edge orientation, wherein in bulk banknote insertion mode, the banknotes are received in bulk into the opening with the movable platform and the movable shutter each positioned in a first position, and transported along the transportation path in the short leading edge orientation to the separation area, wherein in banknote rejection mode, rejected banknotes transported along the transportation path in the long leading edge orientation from the sensing module are received onto a top surface of the movable platform, the movable platform and movable shutter each move to a second position after collecting the rejected banknotes, and the rejected banknotes are dispensed from the opening in bulk in the short leading edge orientation.

6. The banknote deposit-withdrawal system of claim 5, wherein in the single banknote insertion mode, the banknotes are received serially into the opening with the movable platform and the movable shutter each positioned in a third position and transported along the transportation path in the short leading edge orientation to the separation area.

* * * * *